Feb. 5, 1952     R. C. DAVIS ET AL     2,584,261
GROUND TRAINER FOR AIRCRAFT CREW
Filed June 30, 1944     56 Sheets-Sheet 1

INVENTORS
R. C. DAVIS
E. J. FOGARTY
R. O. RIPPERE
BY P. C. Smith
ATTORNEY

Feb. 5, 1952 R. C. DAVIS ET AL 2,584,261
GROUND TRAINER FOR AIRCRAFT CREW
Filed June 30, 1944 56 Sheets-Sheet 6

INVENTORS: R. C. DAVIS
E. J. FOGARTY
R. O. RIPPERE
BY P. C. Smith
ATTORNEY

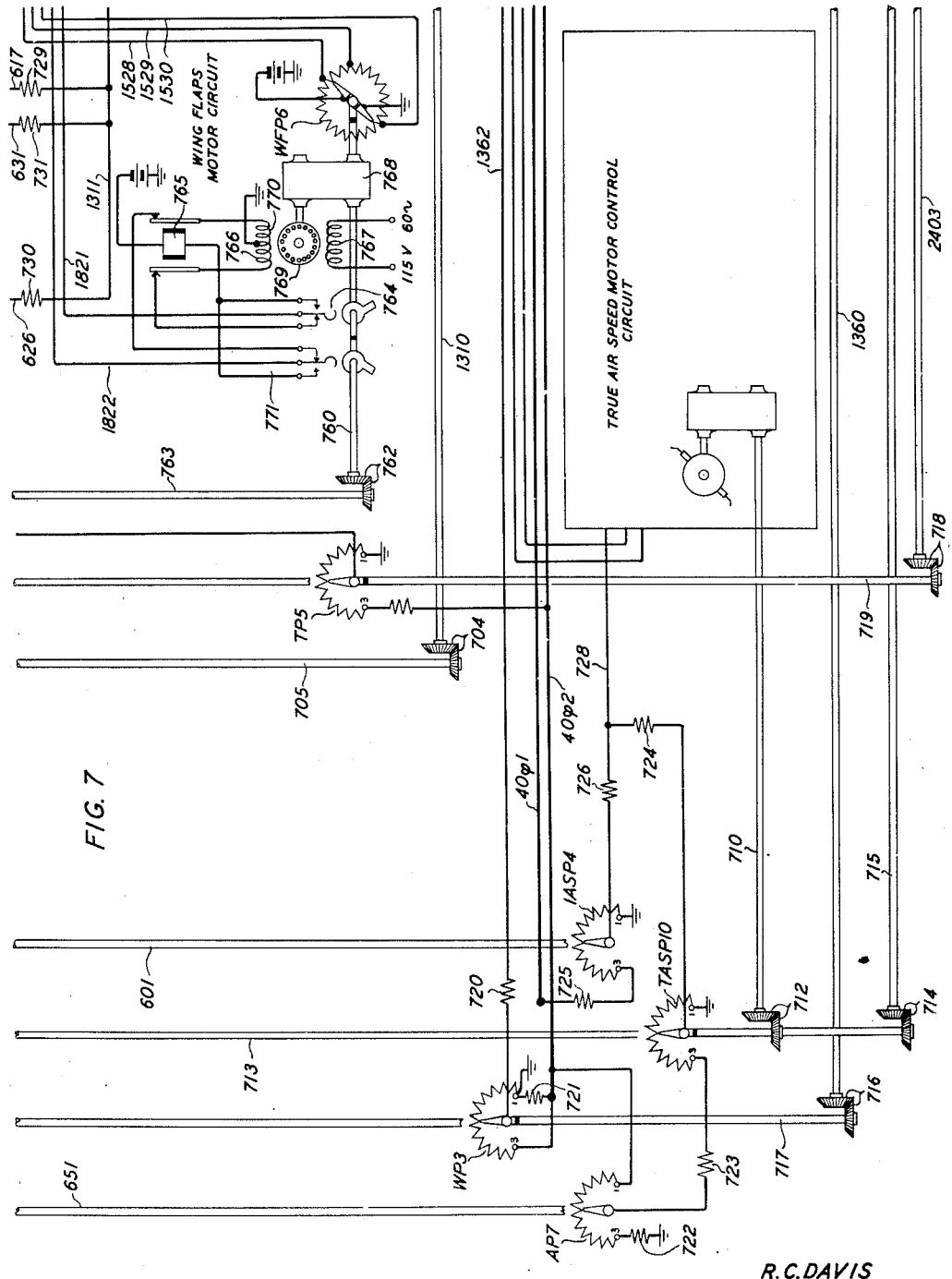

Feb. 5, 1952  R. C. DAVIS ET AL  2,584,261
GROUND TRAINER FOR AIRCRAFT CREW
Filed June 30, 1944  56 Sheets-Sheet 8
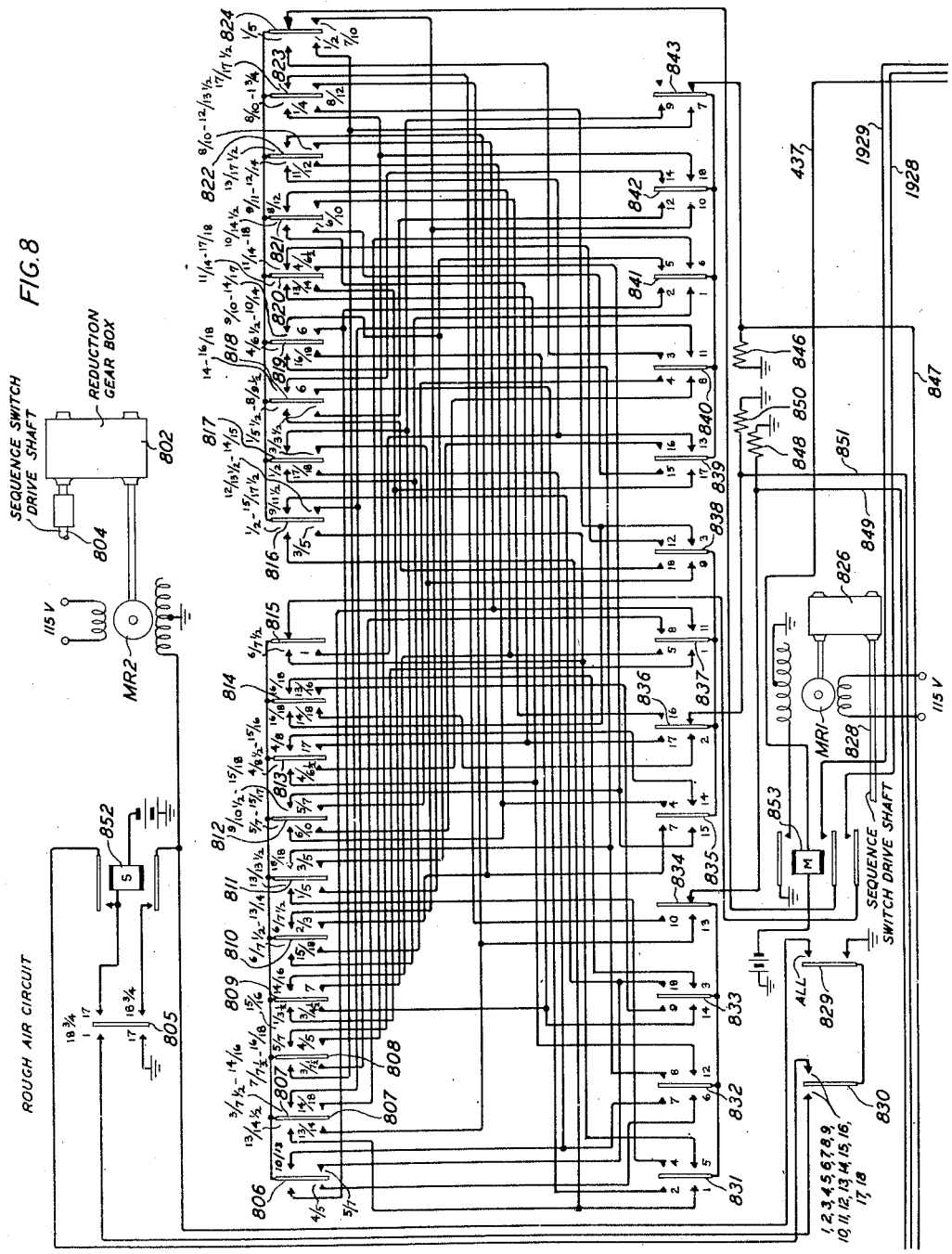
INVENTORS R.C. DAVIS
E.J. FOGARTY
R.O. RIPPERE
BY
P. C. Smith
ATTORNEY

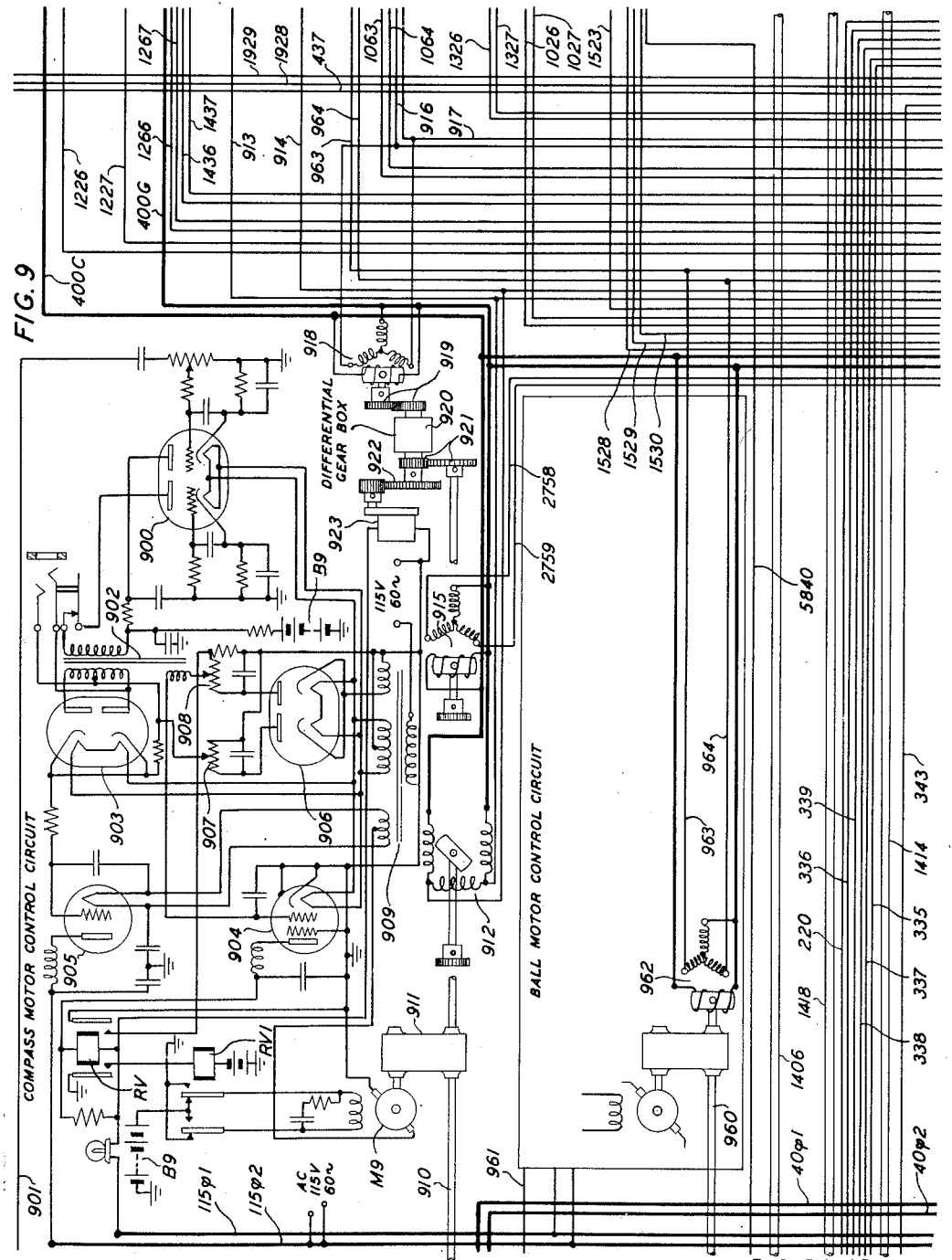

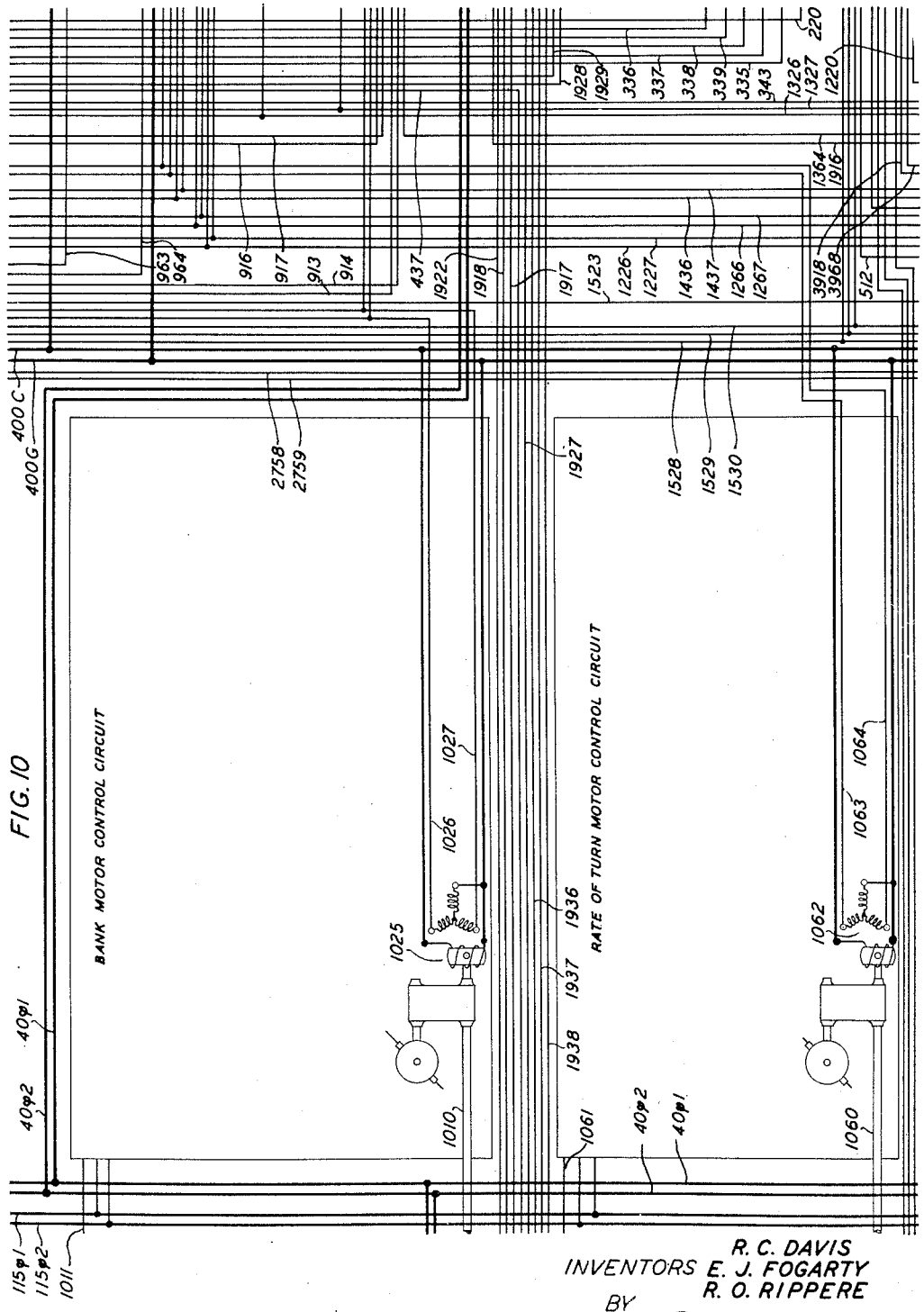

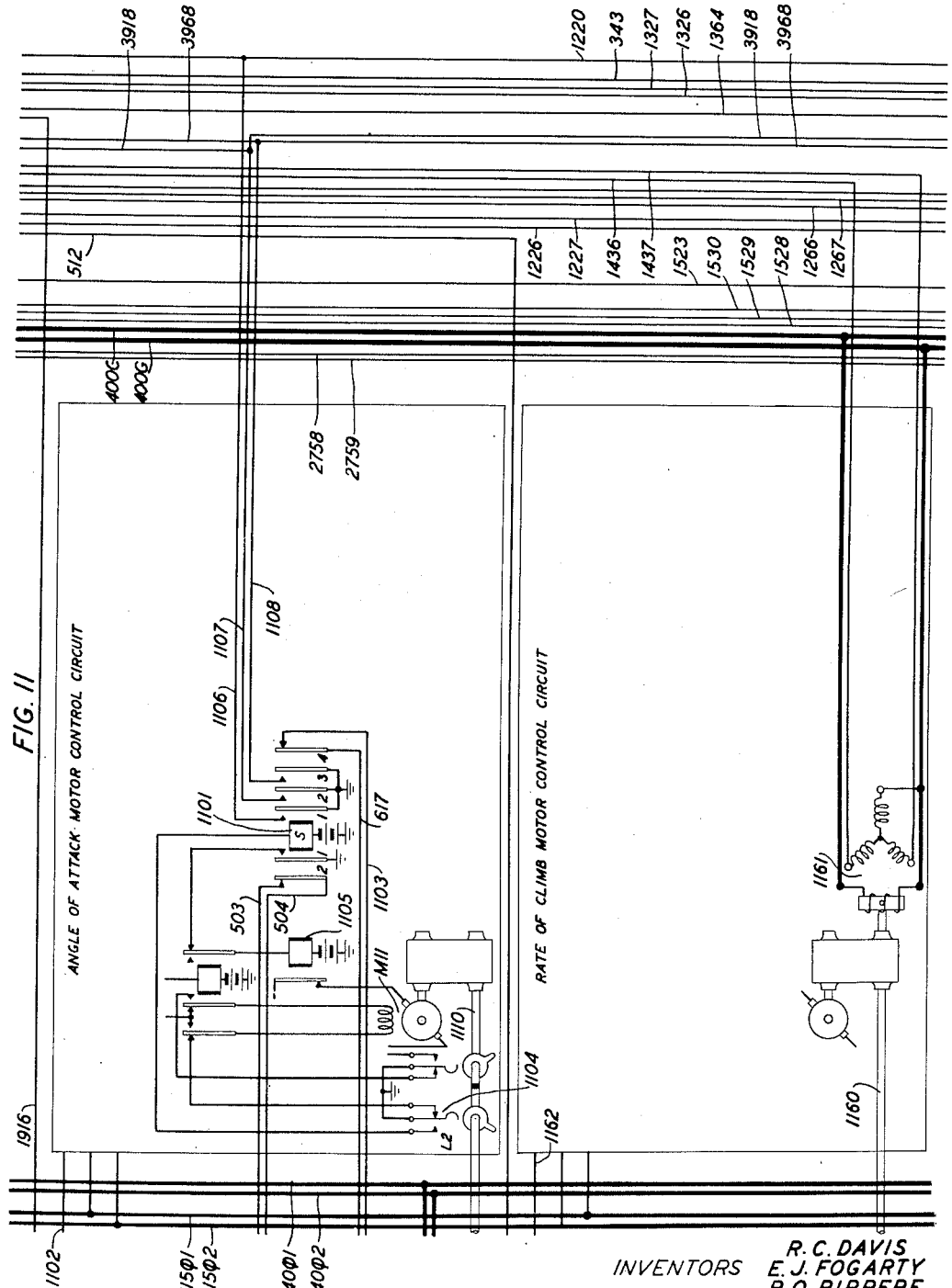

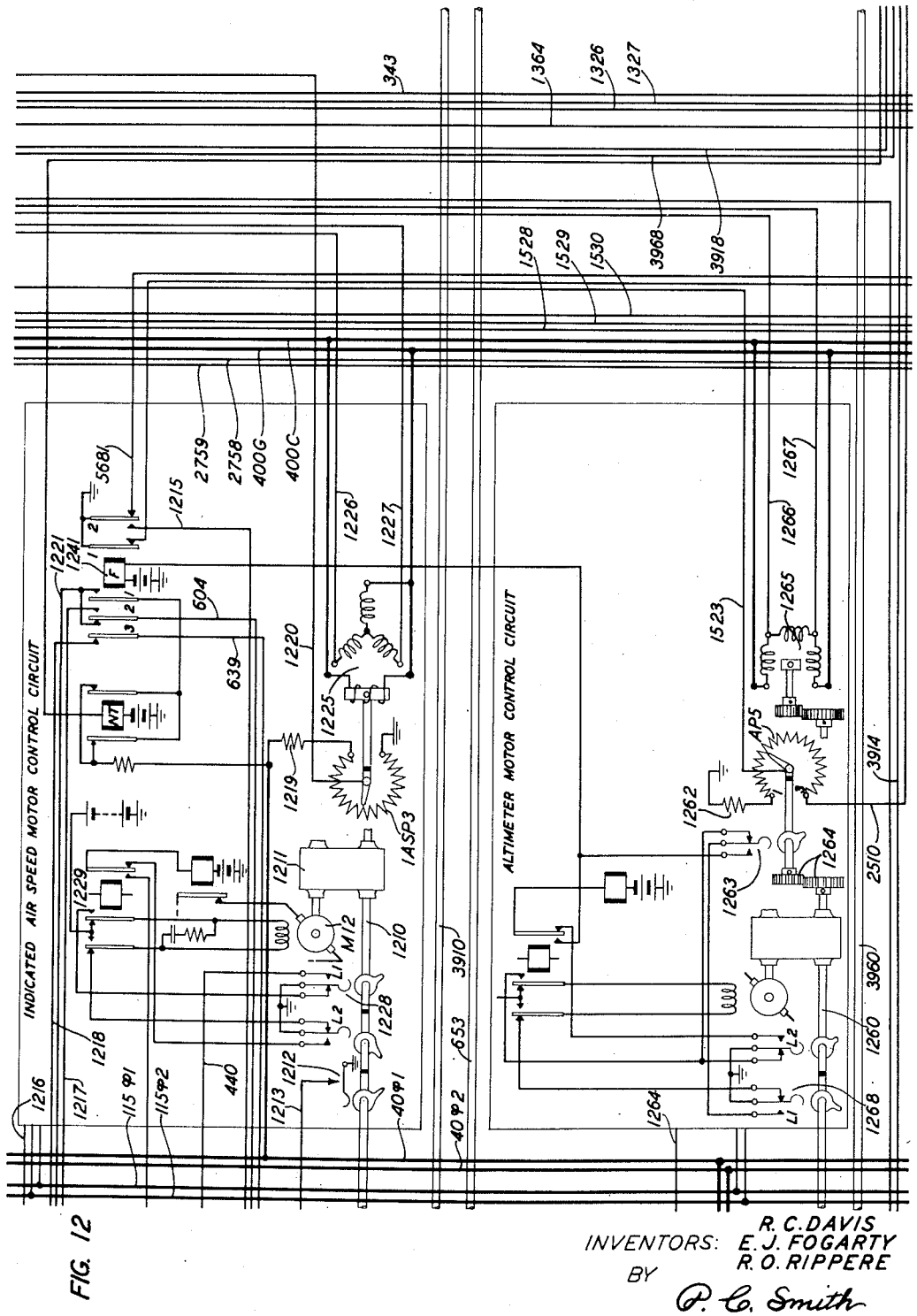

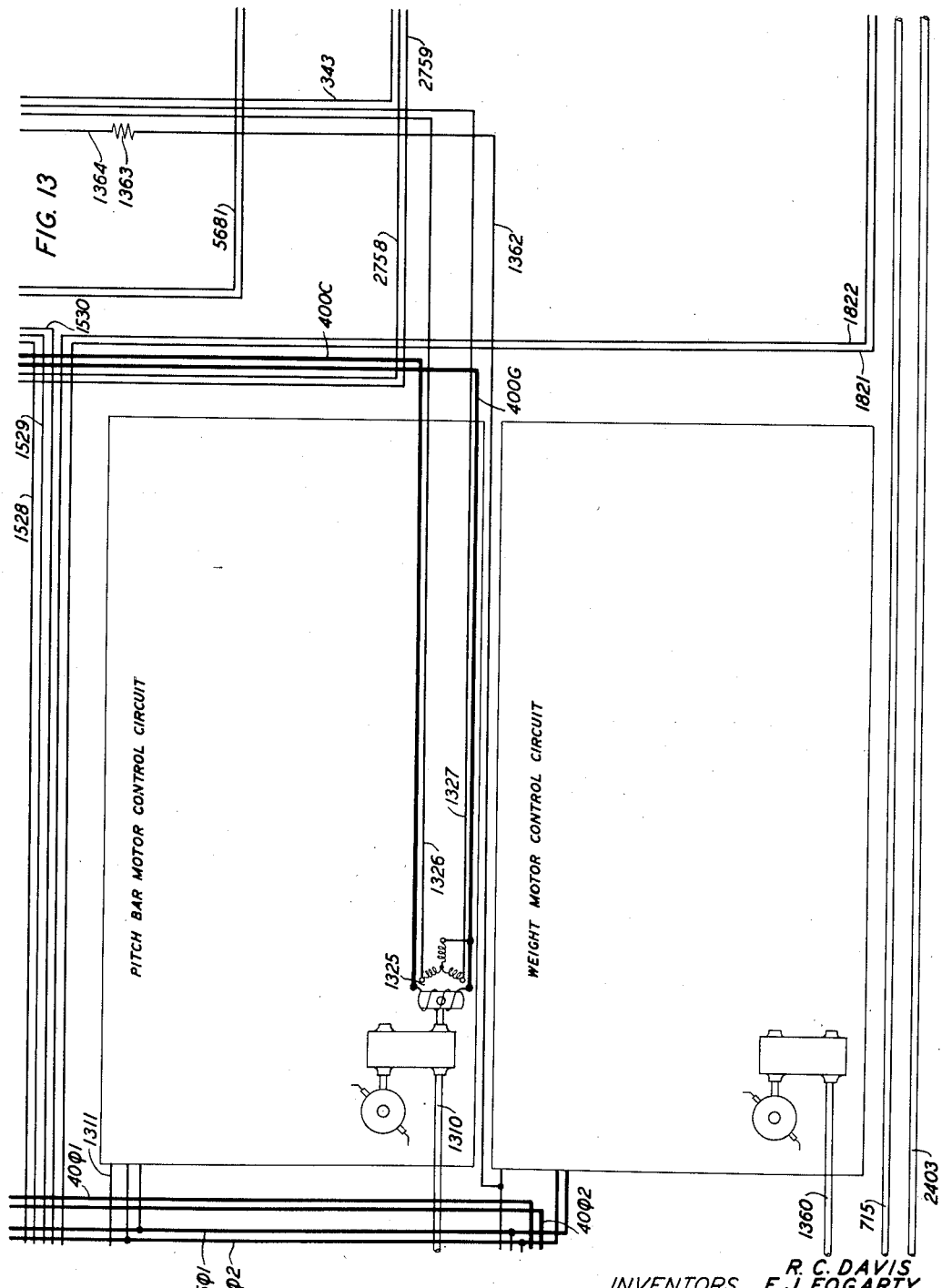

Feb. 5, 1952     R. C. DAVIS ET AL     2,584,261
GROUND TRAINER FOR AIRCRAFT CREW
Filed June 30, 1944     56 Sheets-Sheet 14

INVENTORS R. C. DAVIS
E. J. FOGARTY
R. O. RIPPERE
BY P. C. Smith
ATTORNEY

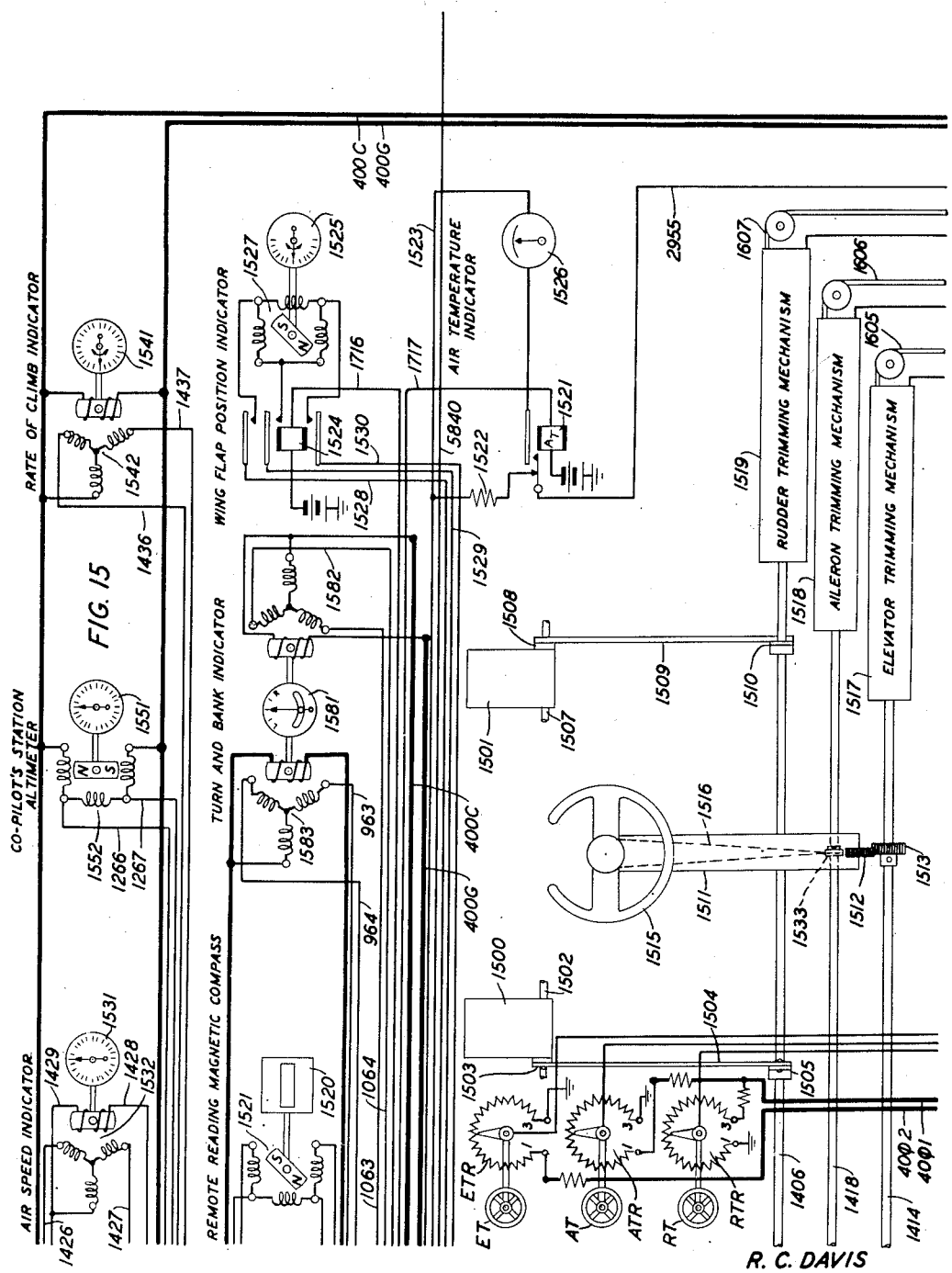

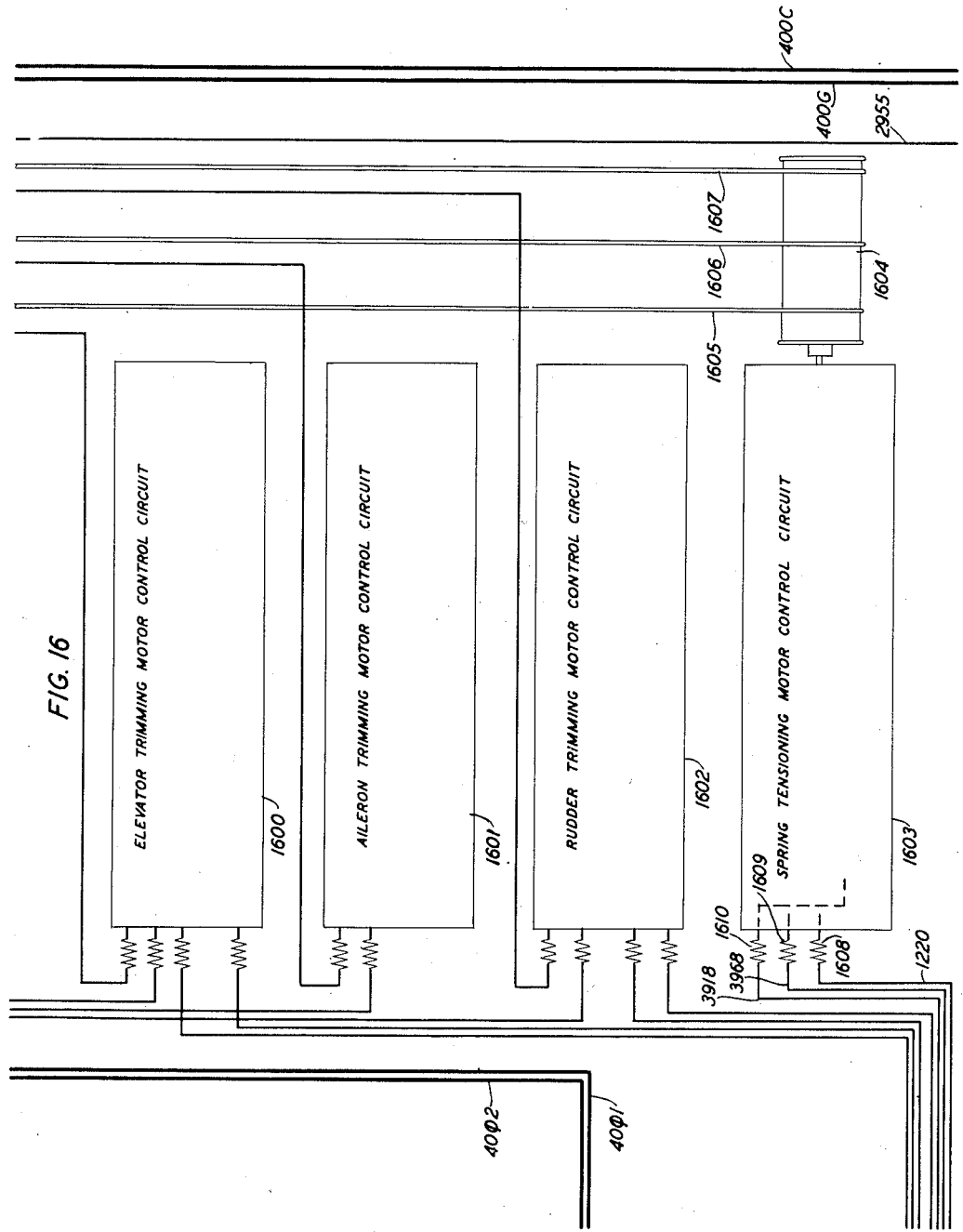

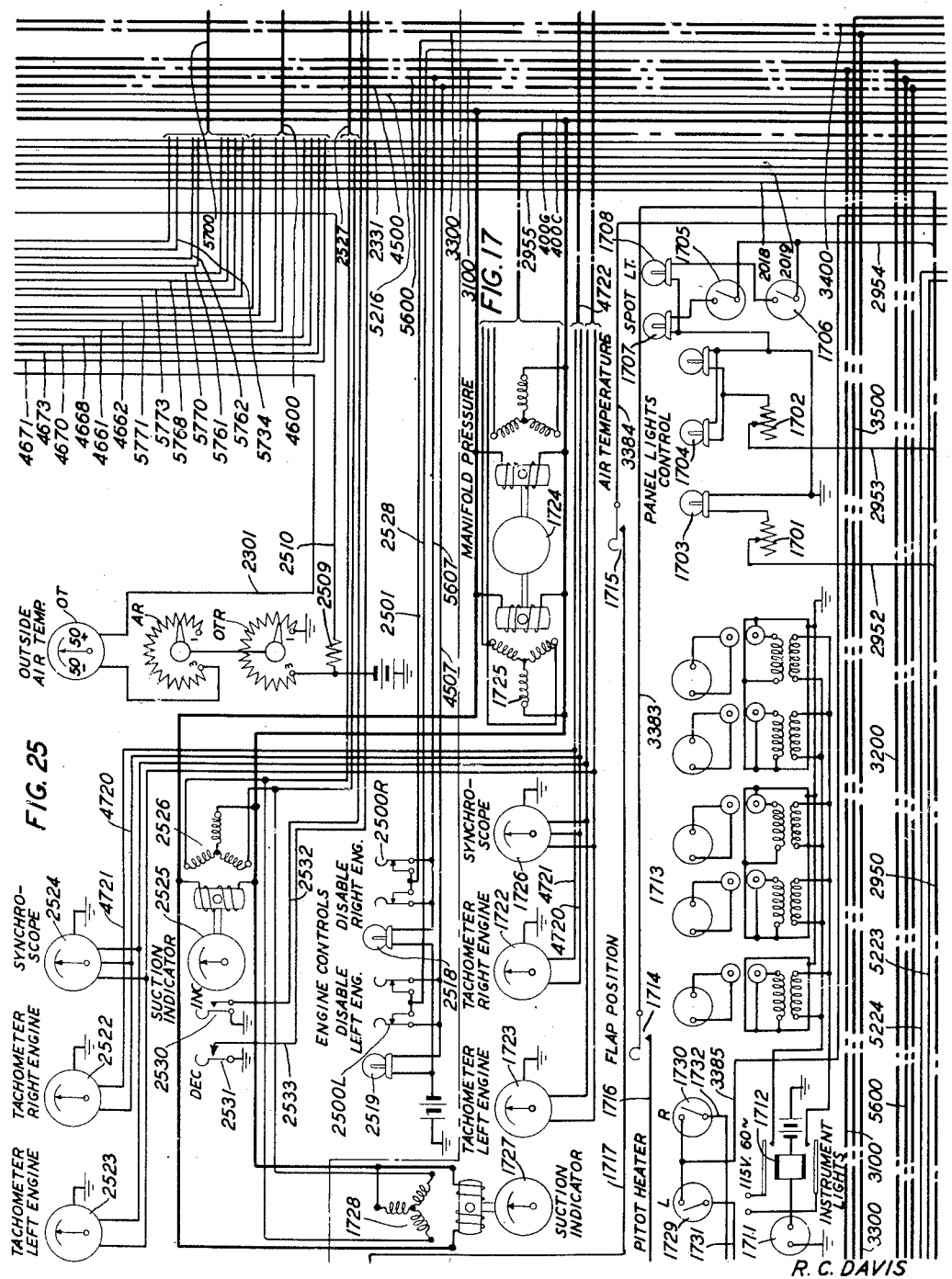

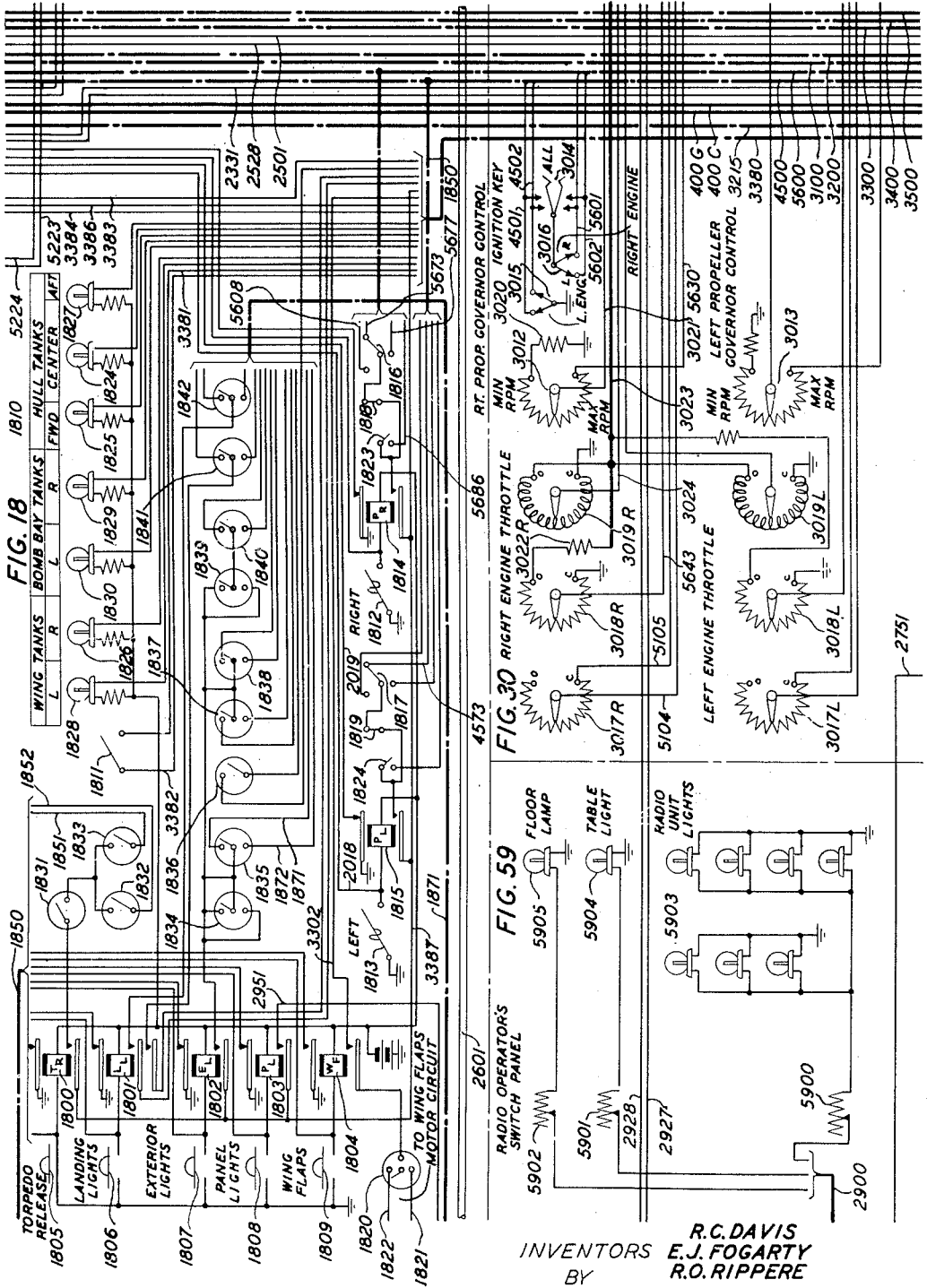

Feb. 5, 1952     R. C. DAVIS ET AL     2,584,261
GROUND TRAINER FOR AIRCRAFT CREW

Filed June 30, 1944

INVENTORS   R. C. DAVIS
               E. J. FOGARTY
               R. O. RIPPERE
BY P. C. Smith
ATTORNEY

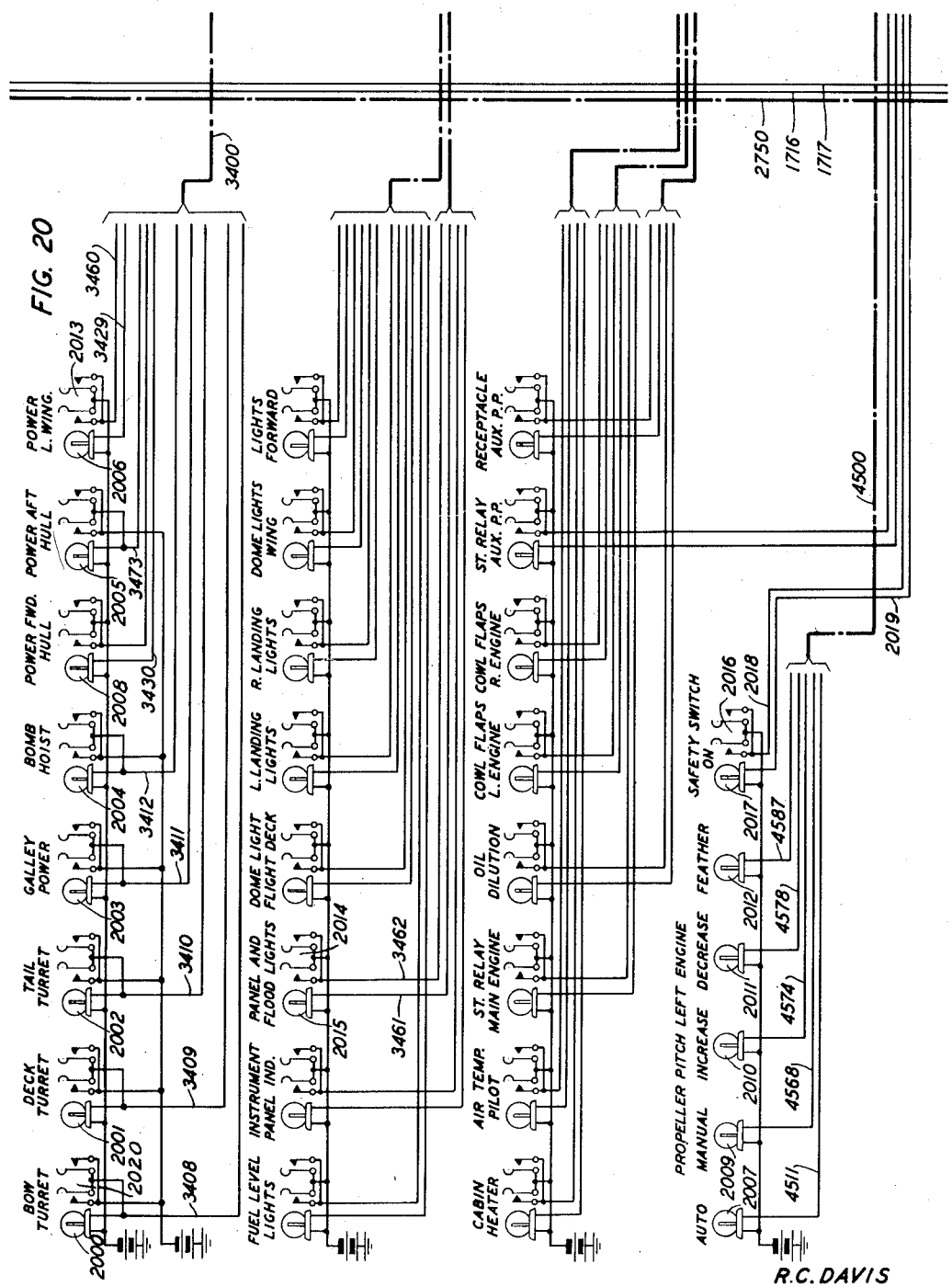

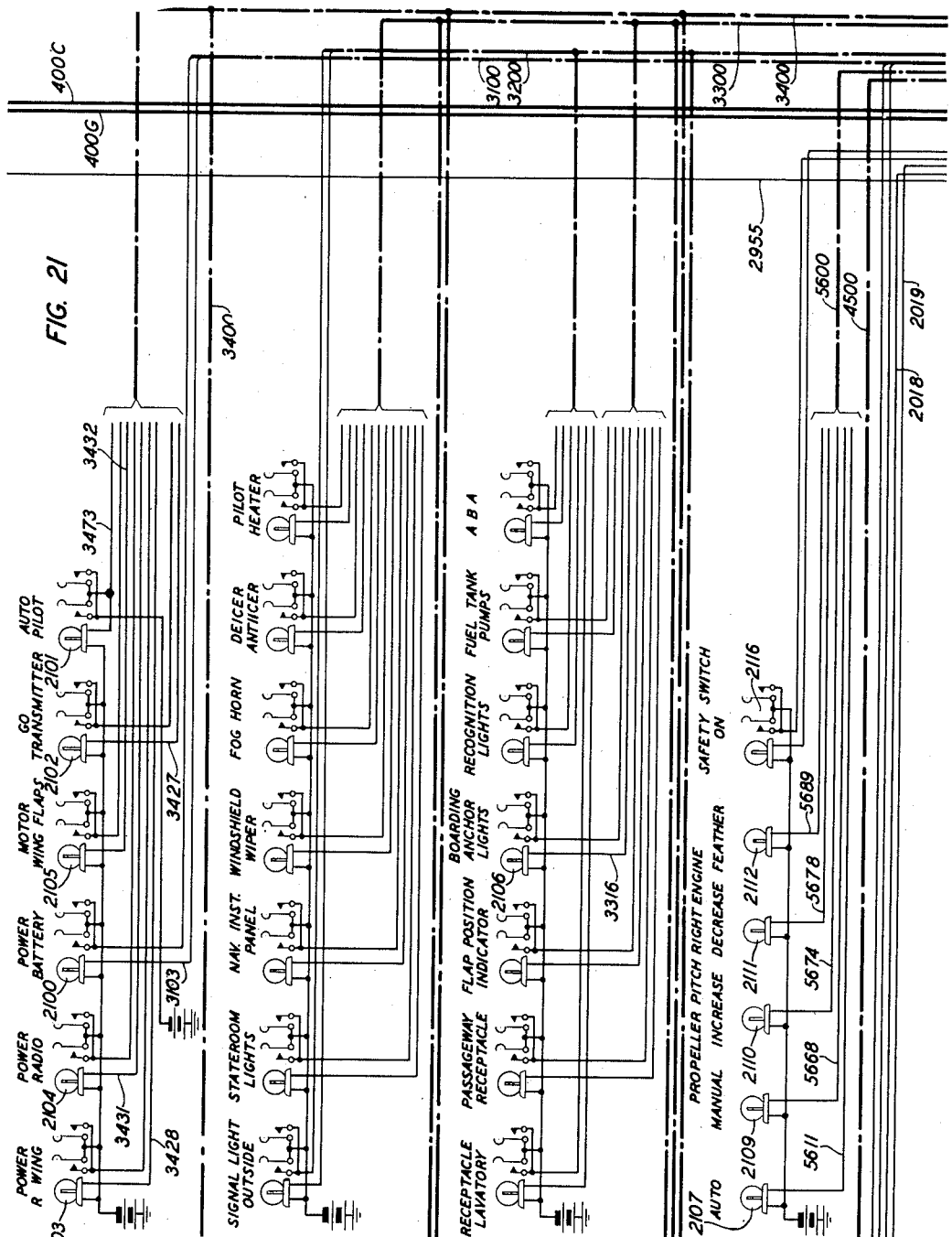

Feb. 5, 1952  R. C. DAVIS ET AL  2,584,261
GROUND TRAINER FOR AIRCRAFT CREW
Filed June 30, 1944  56 Sheets-Sheet 22
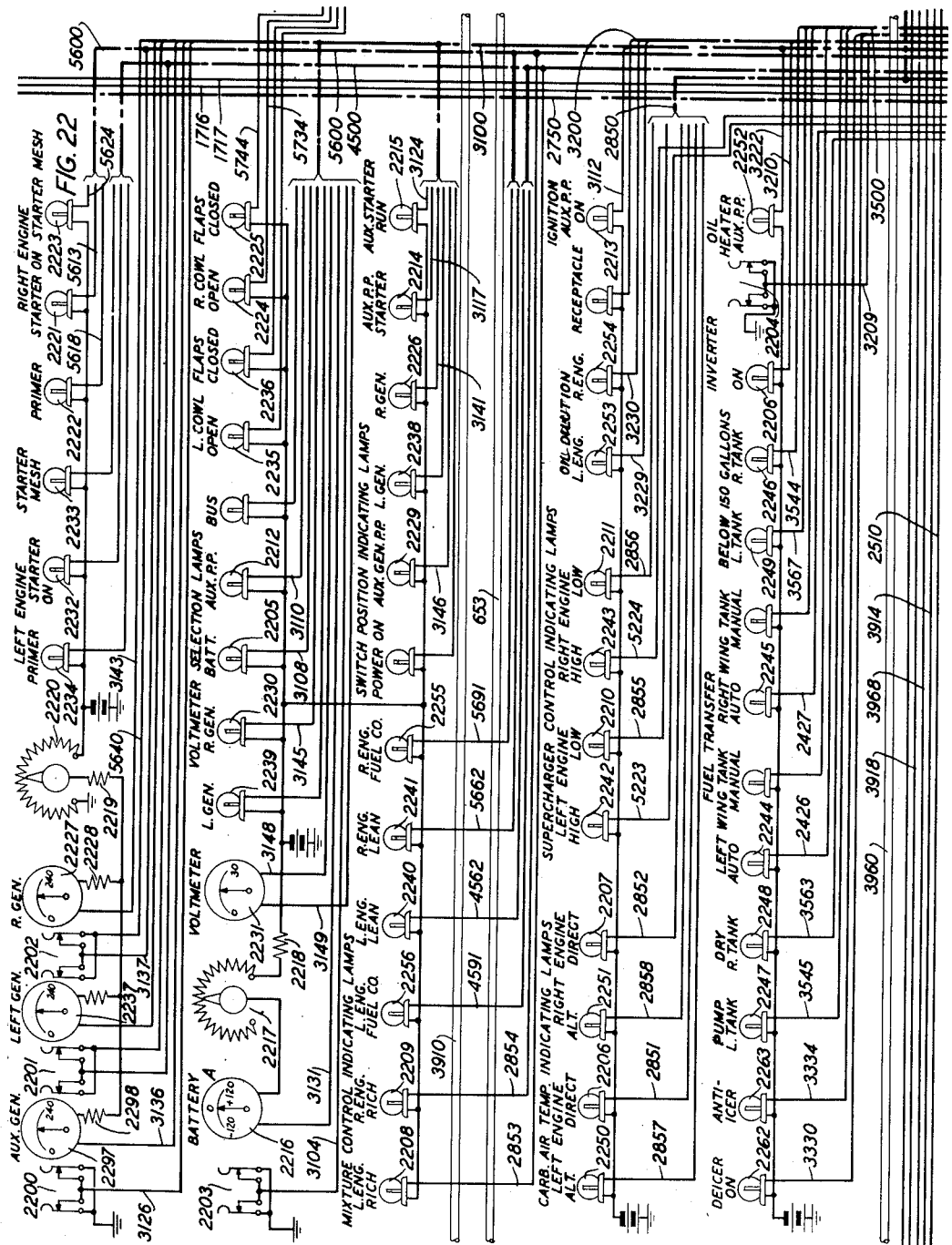
INVENTORS R.C.DAVIS
E.J.FOGARTY
BY R.O.RIPPERE
P. C. Smith
ATTORNEY INVENTORS
R. C. DAVIS
E. J. FOGARTY
R. O. RIPPERE
BY
P. C. Smith
ATTORNEY Feb. 5, 1952 — R. C. DAVIS ET AL — 2,584,261
GROUND TRAINER FOR AIRCRAFT CREW
Filed June 30, 1944 — 56 Sheets-Sheet 24

FIG. 24

INVENTORS
R.C. DAVIS
E.J. FOGARTY
R.O. RIPPERE
BY P.C. Smith
ATTORNEY

Feb. 5, 1952 R. C. DAVIS ET AL 2,584,261
GROUND TRAINER FOR AIRCRAFT CREW
Filed June 30, 1944 56 Sheets-Sheet 25

INVENTORS R.C.DAVIS
E.J.FOGARTY
R.O.RIPPERE
BY
P.C. Smith
ATTORNEY

Feb. 5, 1952 R. C. DAVIS ET AL 2,584,261
GROUND TRAINER FOR AIRCRAFT CREW
Filed June 30, 1944 56 Sheets-Sheet 26

FIG.27

INVENTORS
R. C. DAVIS
E. J. FOGARTY
R. O. RIPPERE
BY
P. C. Smith
ATTORNEY

INVENTORS R. C. DAVIS
E. J. FOGARTY
R. O. RIPPERE
BY
P. C. Smith
ATTORNEY

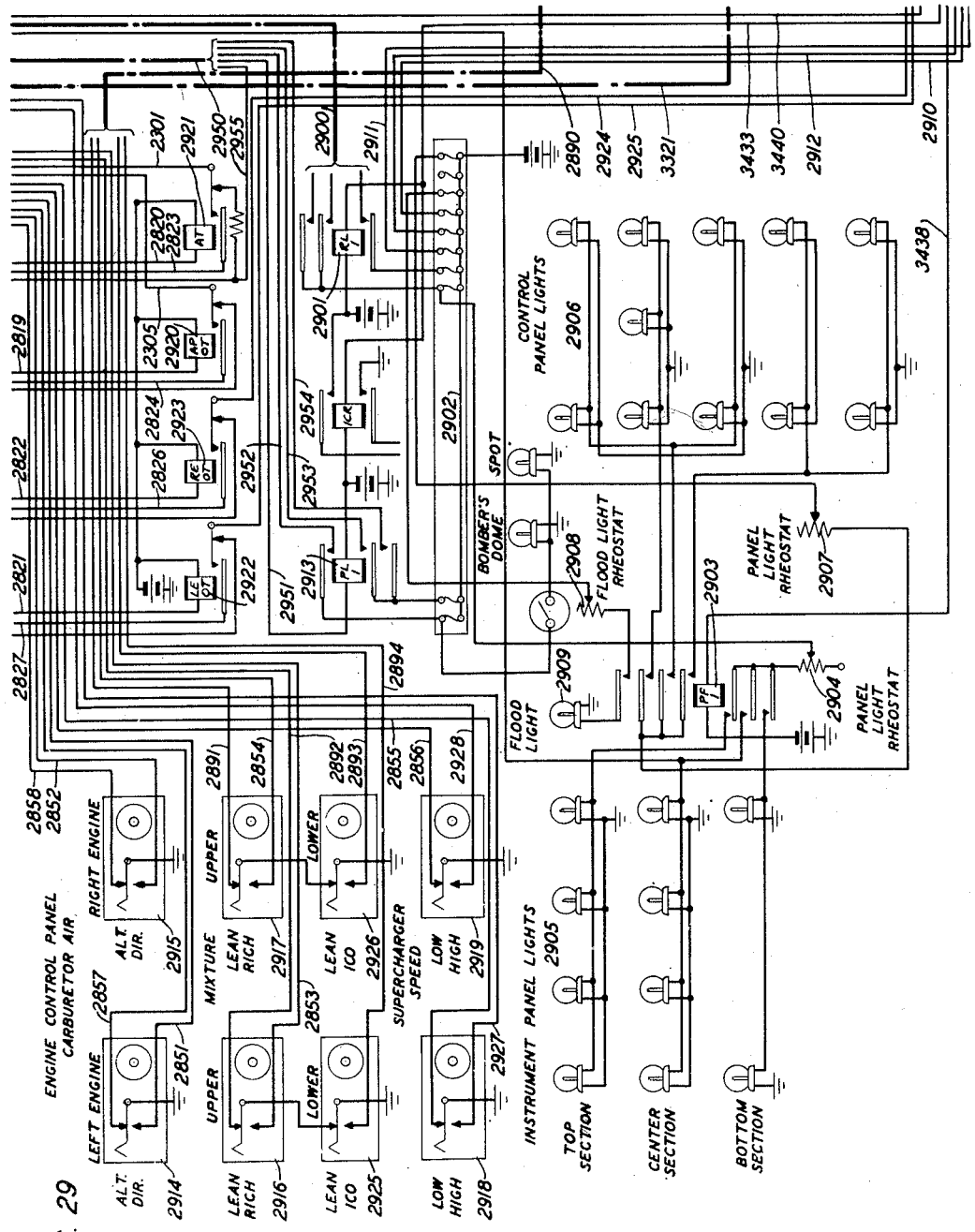

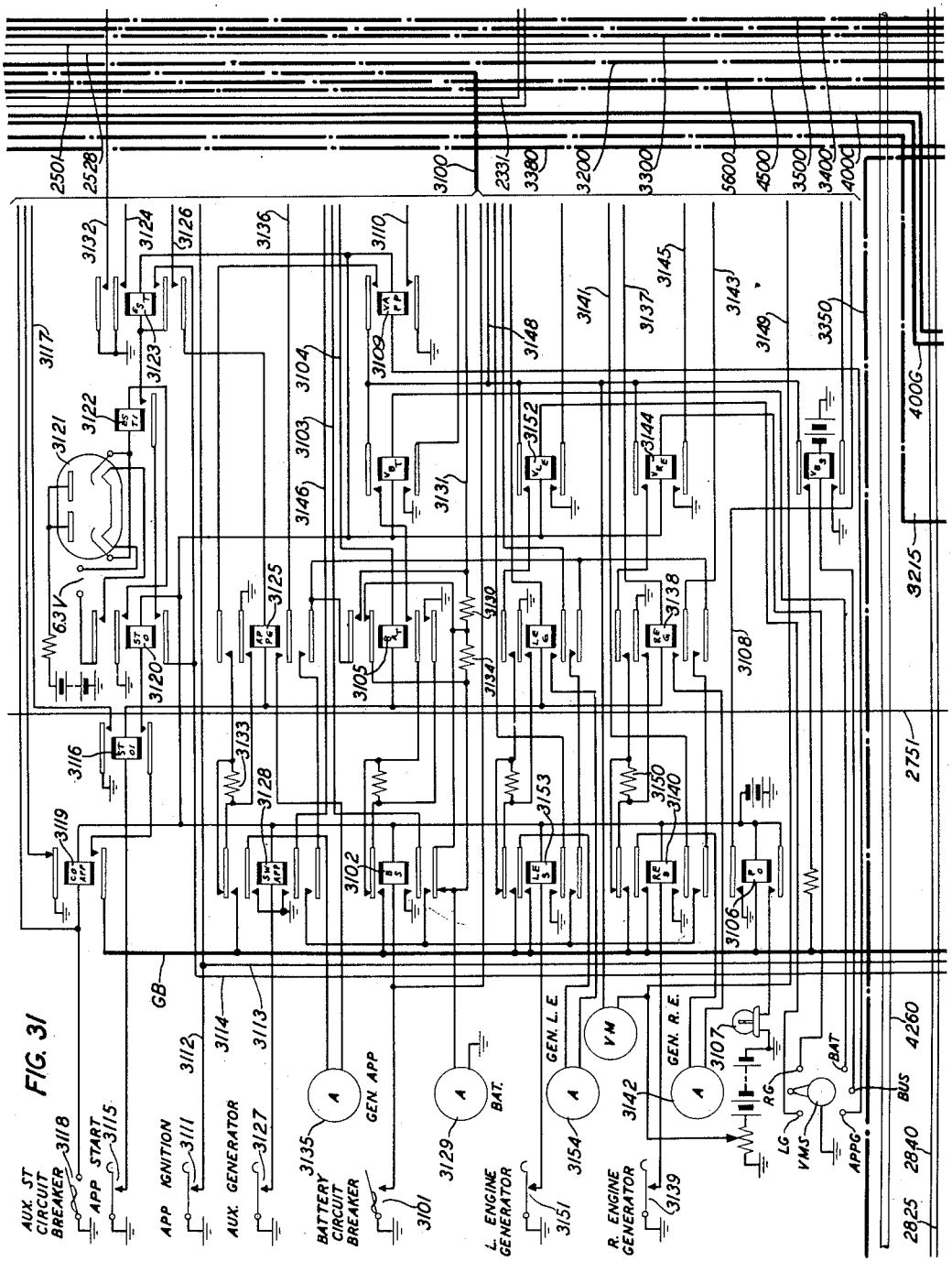

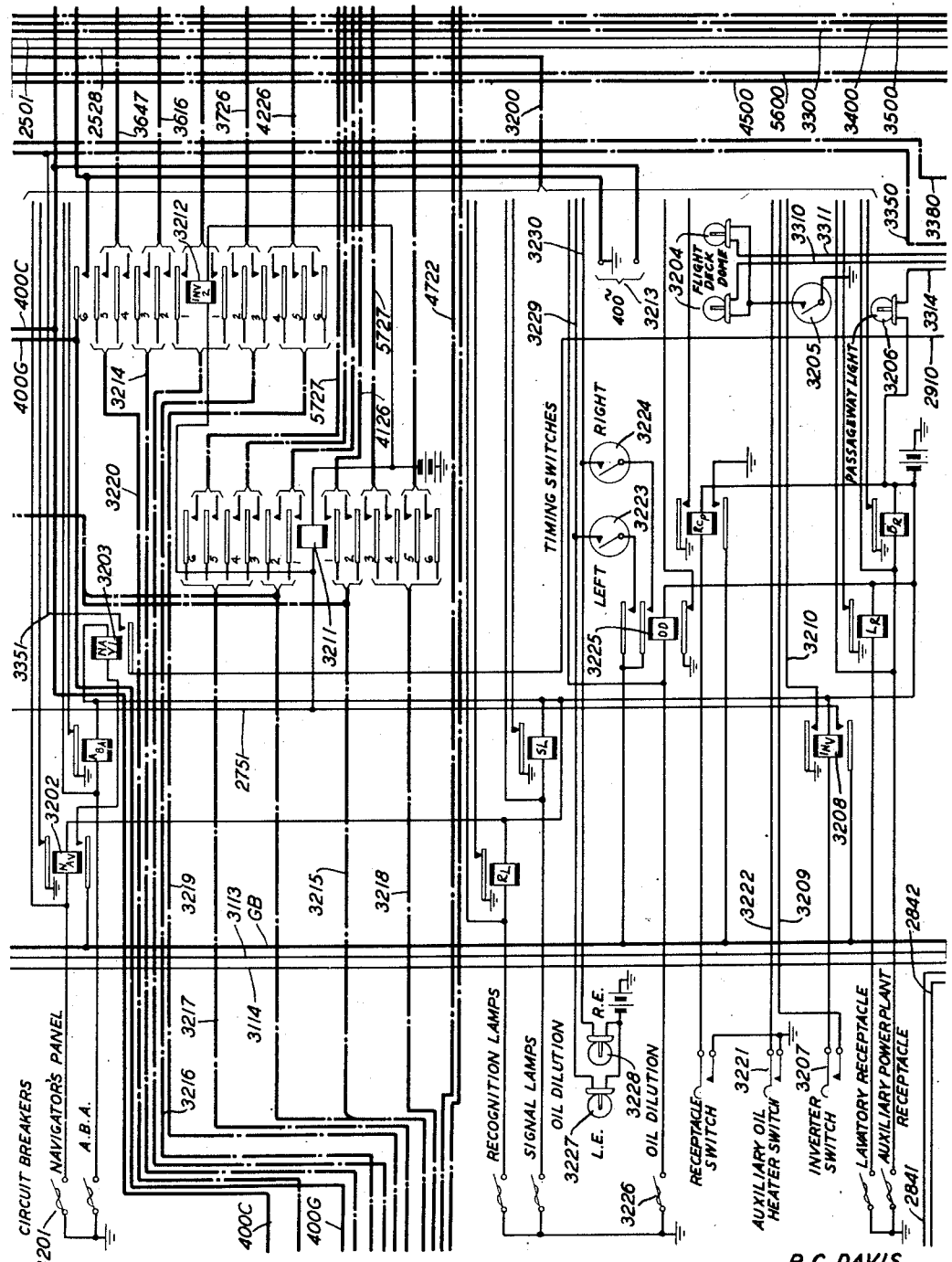

INVENTORS
R.C. DAVIS
E.J. FOGARTY
R.O. RIPPERE
BY
P.C. Smith
ATTORNEY

Feb. 5, 1952     R. C. DAVIS ET AL     2,584,261
GROUND TRAINER FOR AIRCRAFT CREW
Filed June 30, 1944     56 Sheets-Sheet 33

FIG. 35

INVENTORS
R. C. DAVIS
E. J. FOGARTY
R. O. RIPPERE
BY
P. C. Smith
ATTORNEY

INVENTORS: R. C. DAVIS
E. J. FOGARTY
R. O. RIPPERE
BY P. C. Smith
ATTORNEY

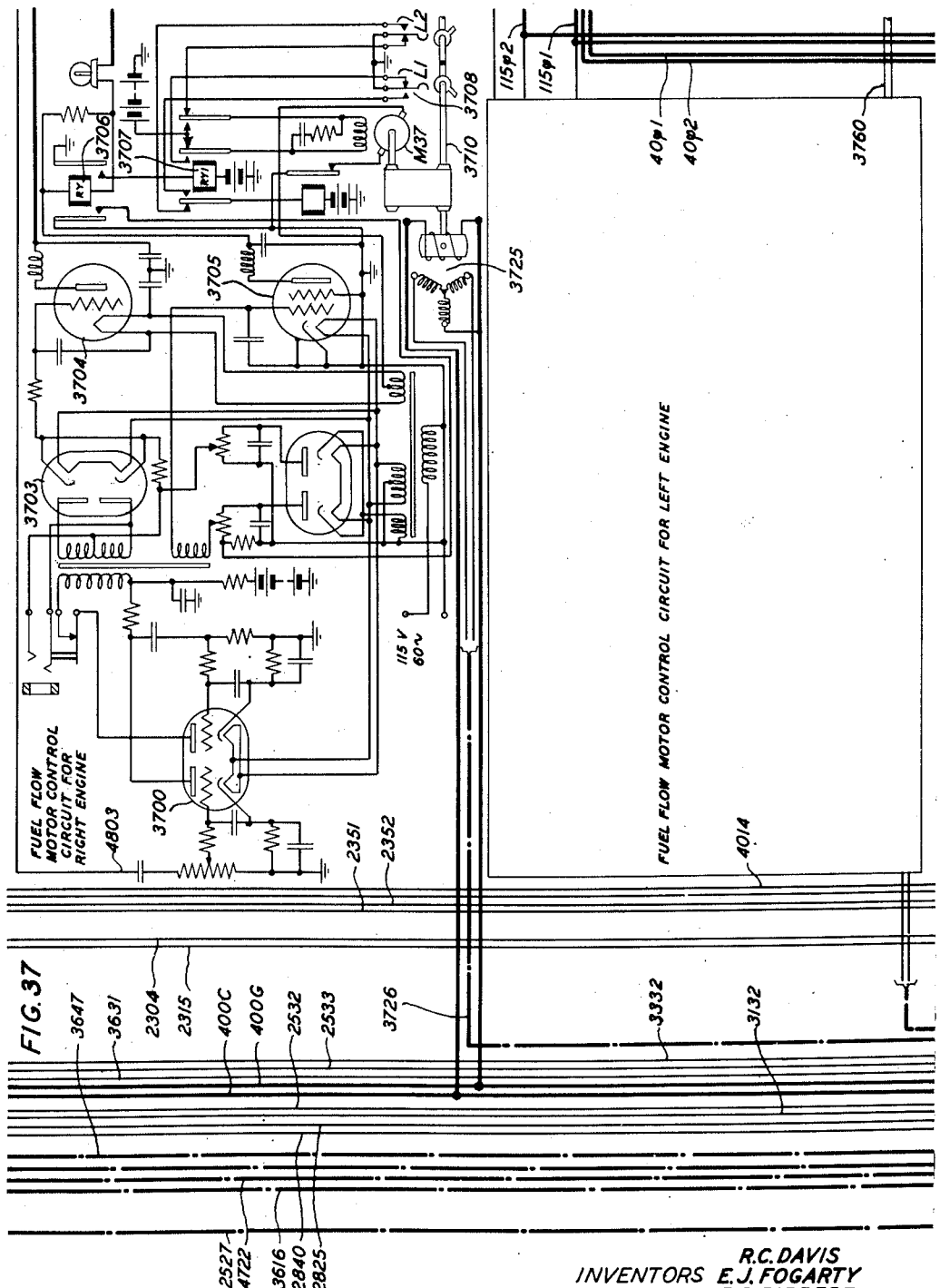

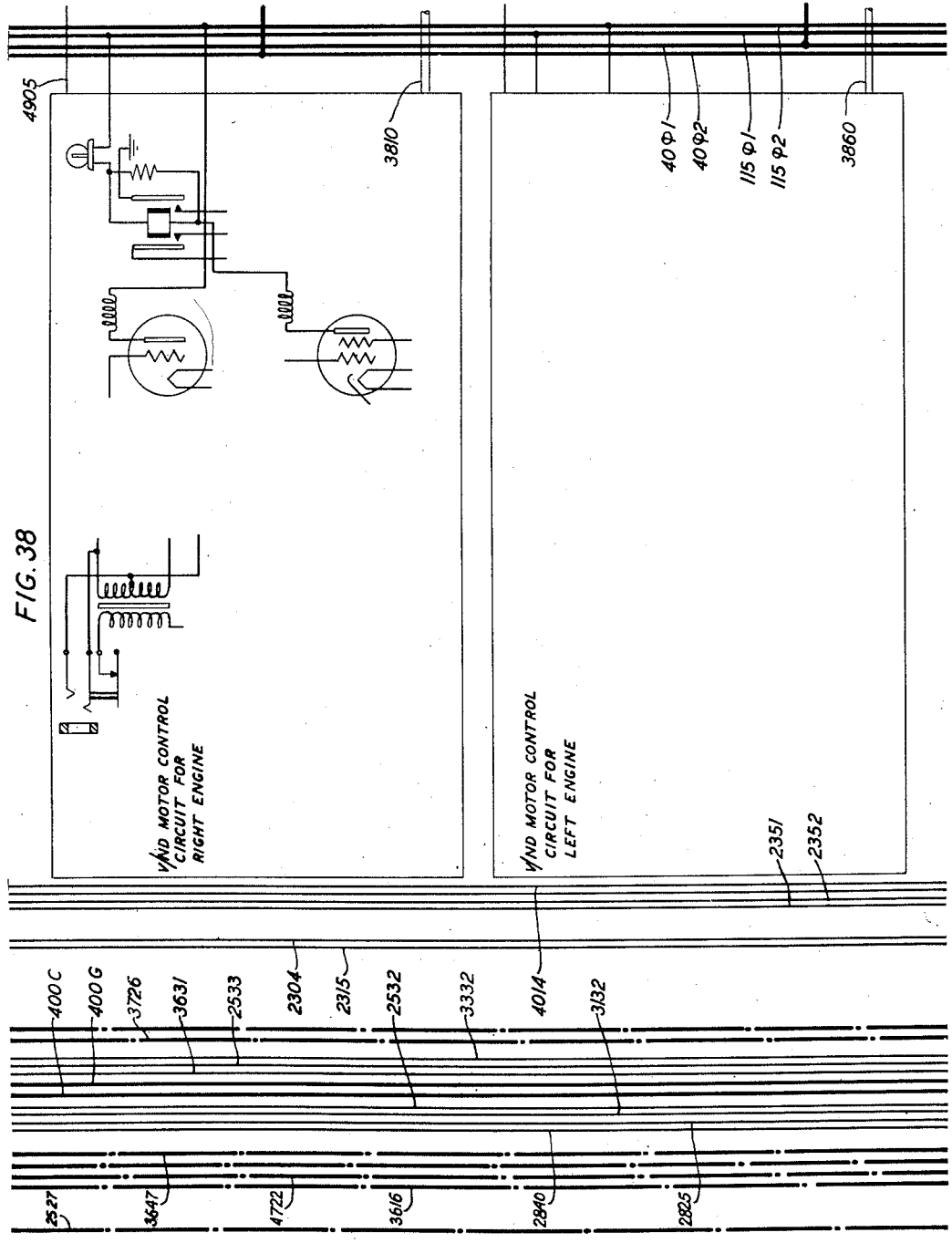

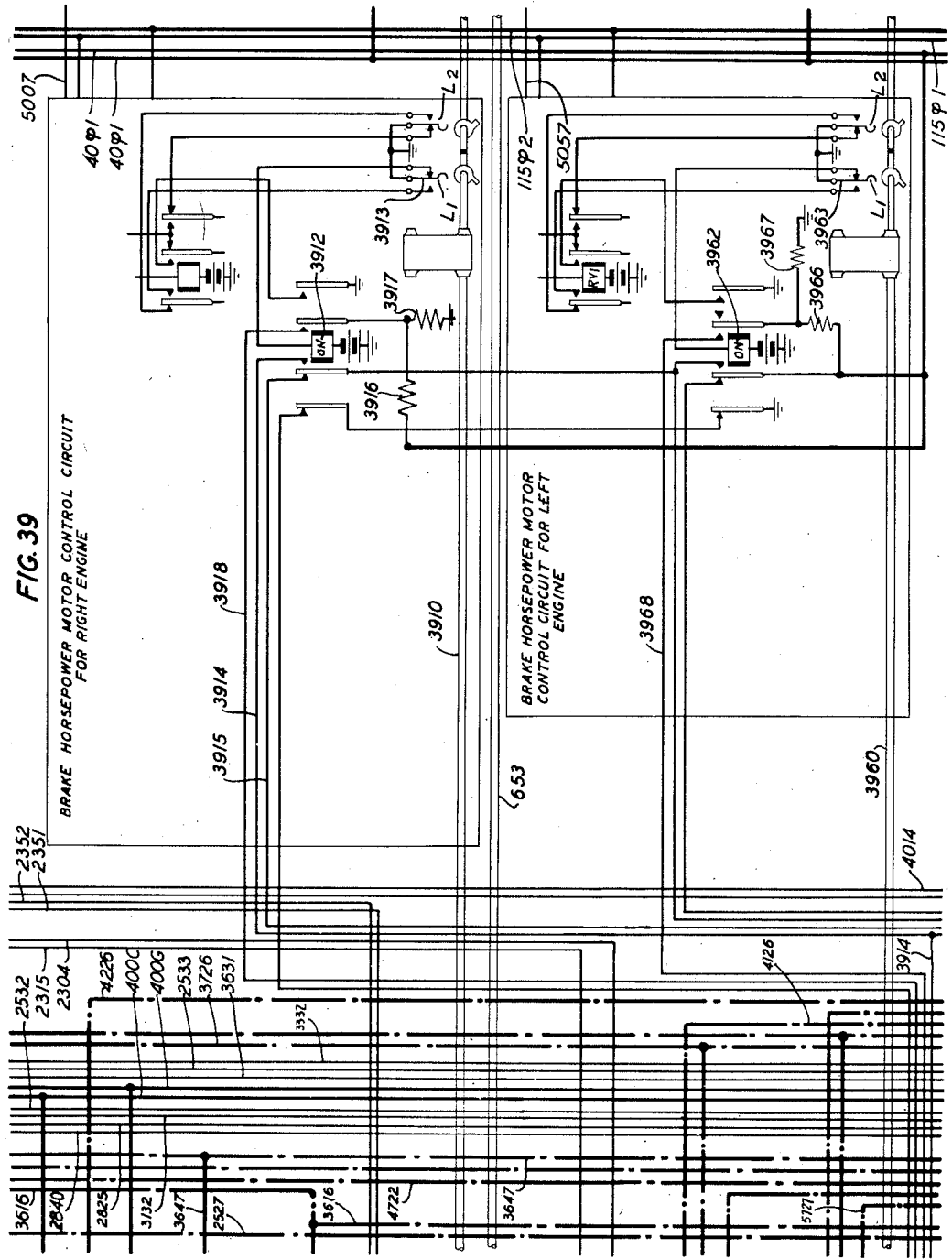

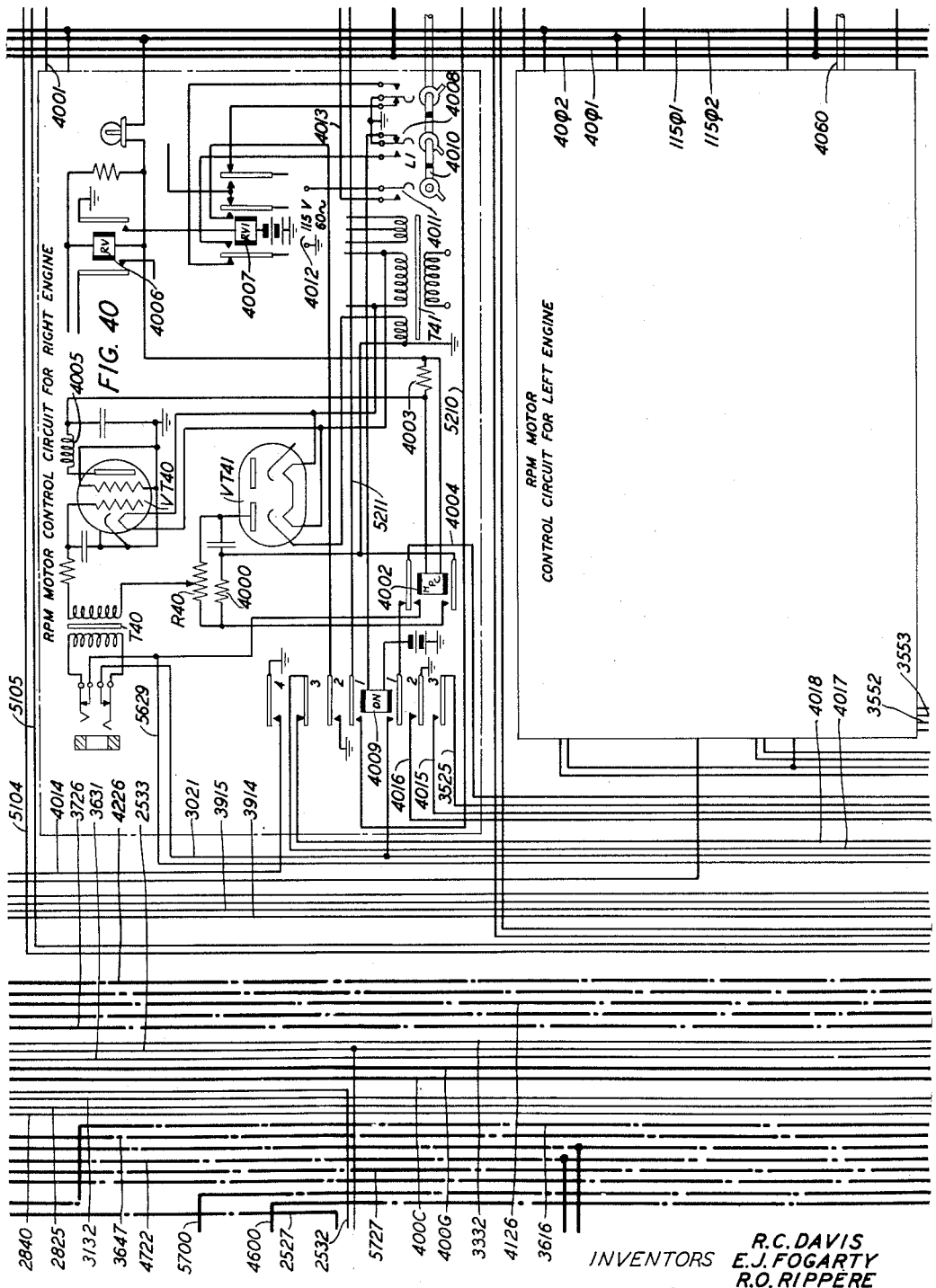

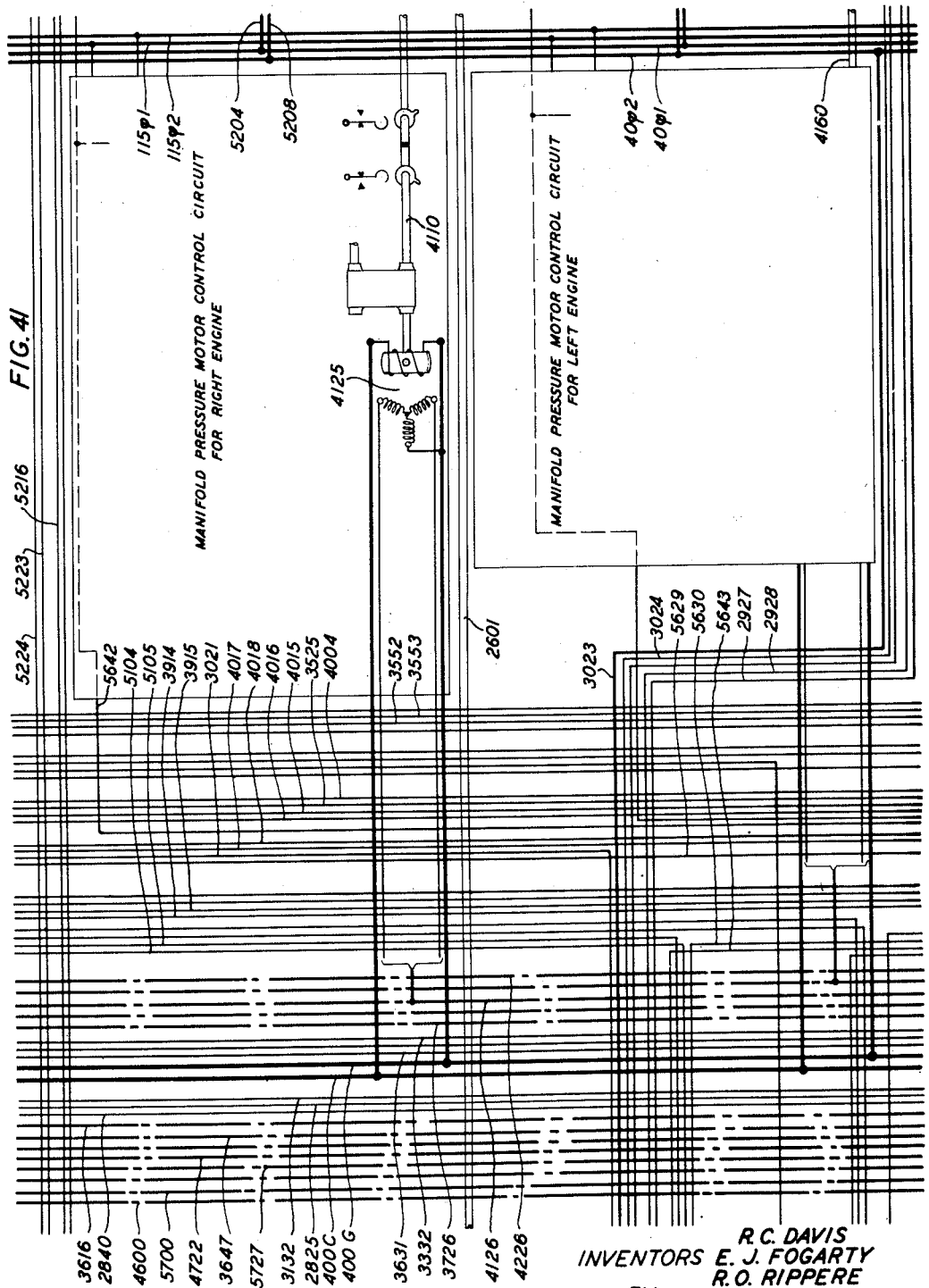

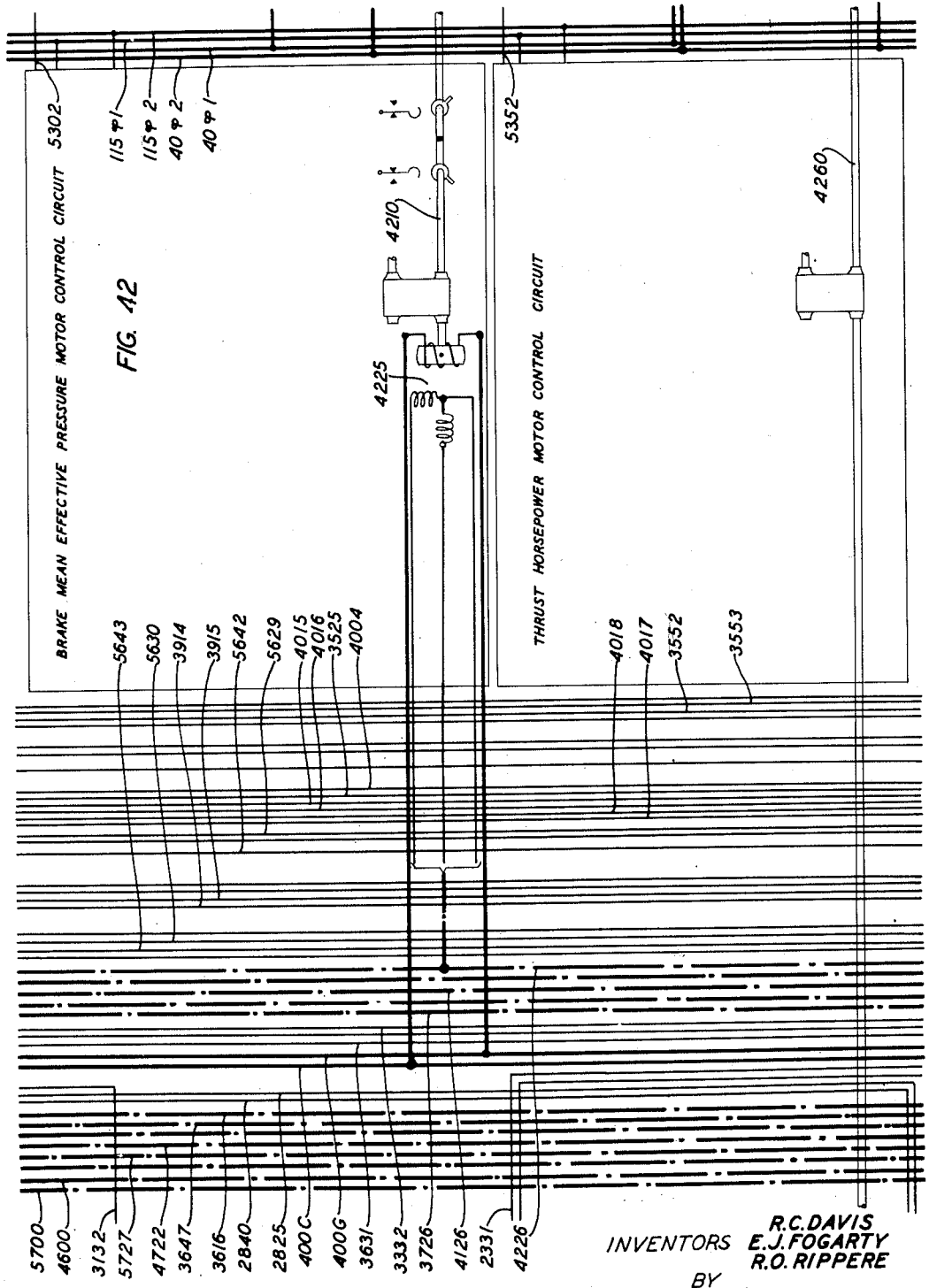

Feb. 5, 1952     R. C. DAVIS ET AL     2,584,261
GROUND TRAINER FOR AIRCRAFT CREW

Filed June 30, 1944     56 Sheets-Sheet 41

INVENTORS
R. C. DAVIS
E. J. FOGARTY
R. O. RIPPERE

BY P. C. Smith

ATTORNEY

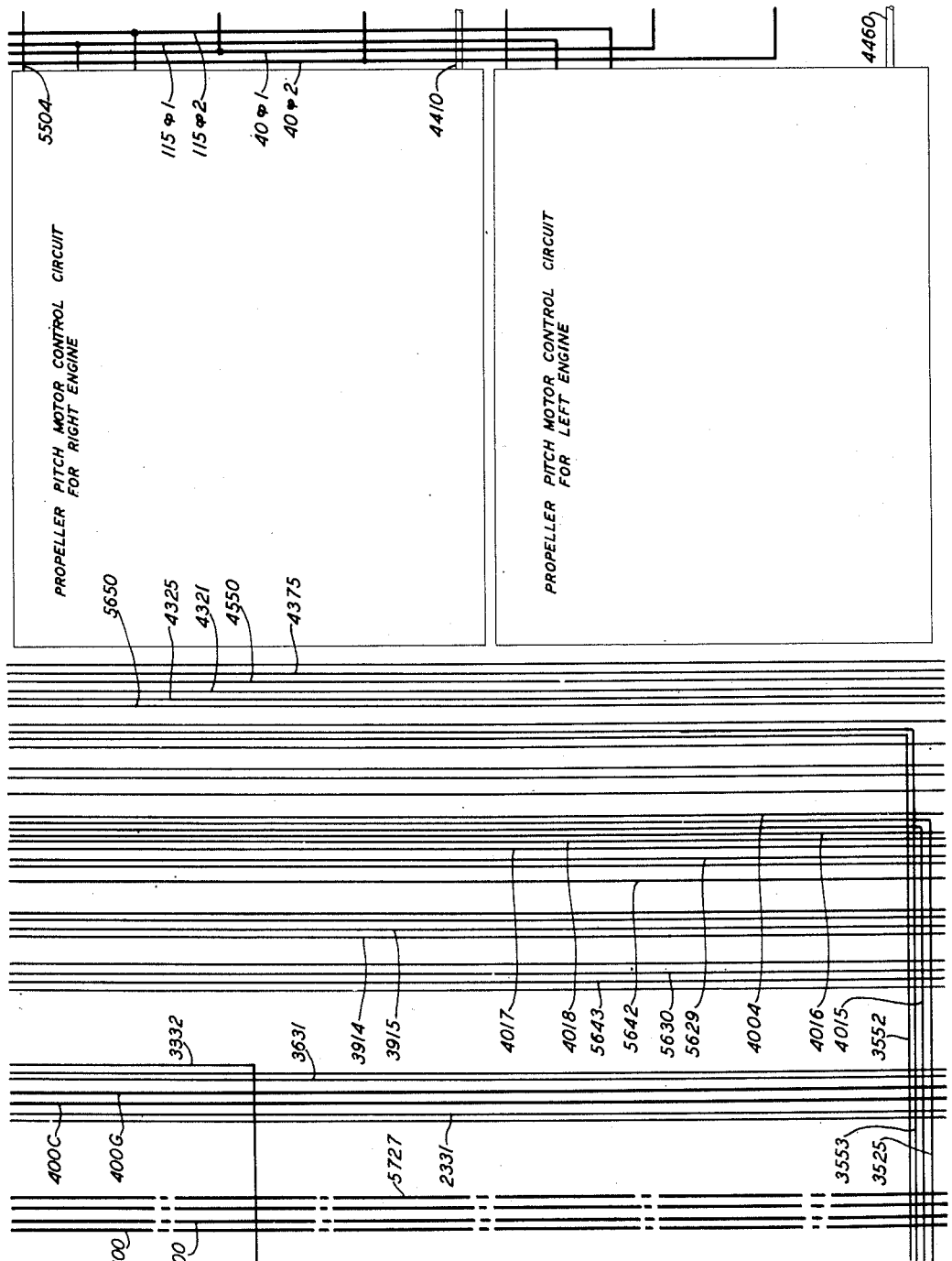

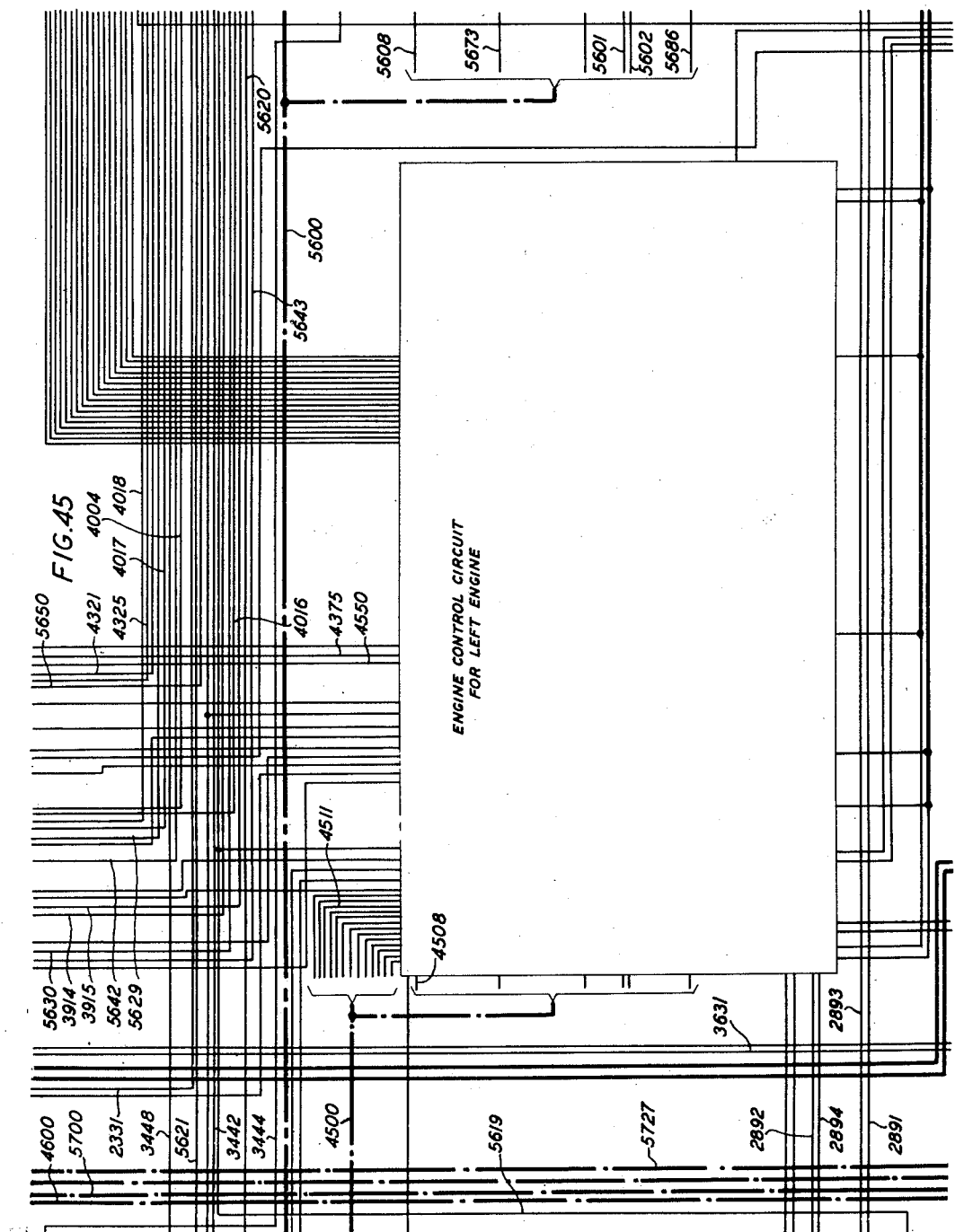

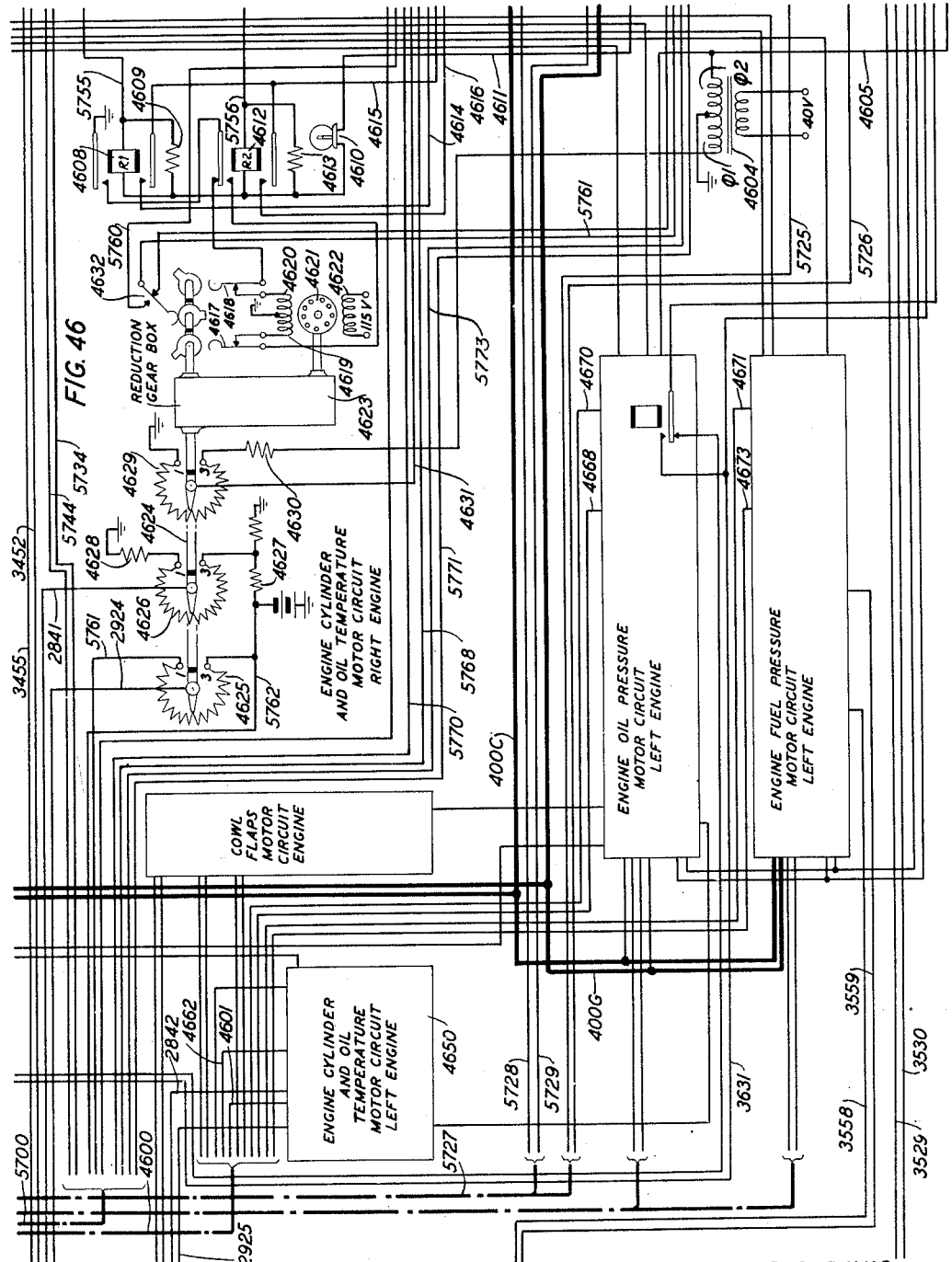

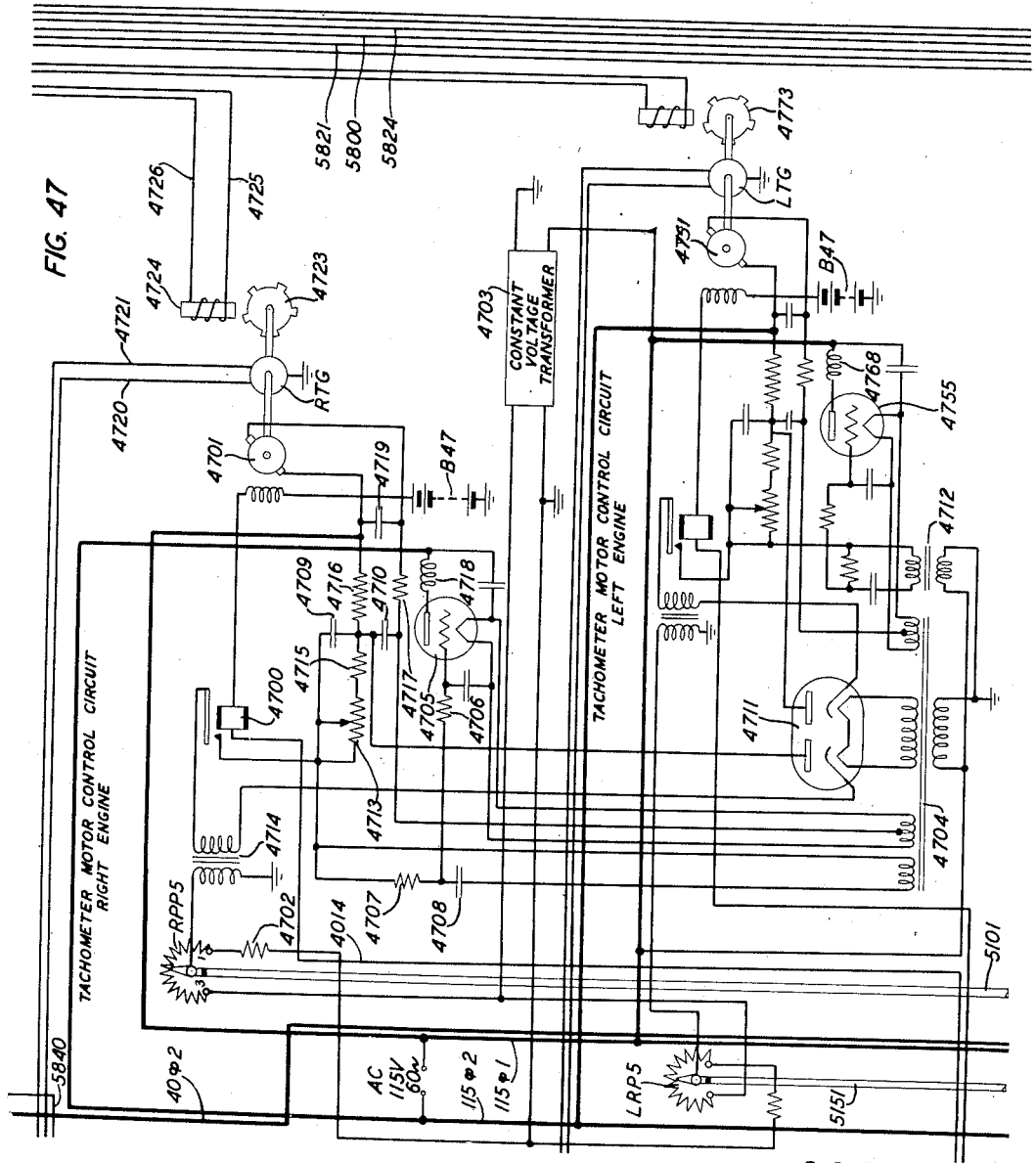

Feb. 5, 1952   R. C. DAVIS ET AL   2,584,261
GROUND TRAINER FOR AIRCRAFT CREW
Filed June 30, 1944   56 Sheets-Sheet 46

INVENTORS R. C. DAVIS
E. J. FOGARTY
R. O. RIPPERE
BY P. C. Smith
ATTORNEY

R.C. DAVIS
INVENTORS E.J. FOGARTY
R.O. RIPPERE
BY
P. C. Smith
ATTORNEY

Feb. 5, 1952  R. C. DAVIS ET AL  2,584,261
GROUND TRAINER FOR AIRCRAFT CREW
Filed June 30, 1944  56 Sheets-Sheet 54

INVENTORS
R. C. DAVIS
E. J. FOGARTY
R. O. RIPPERE
BY
P. C. Smith
ATTORNEY

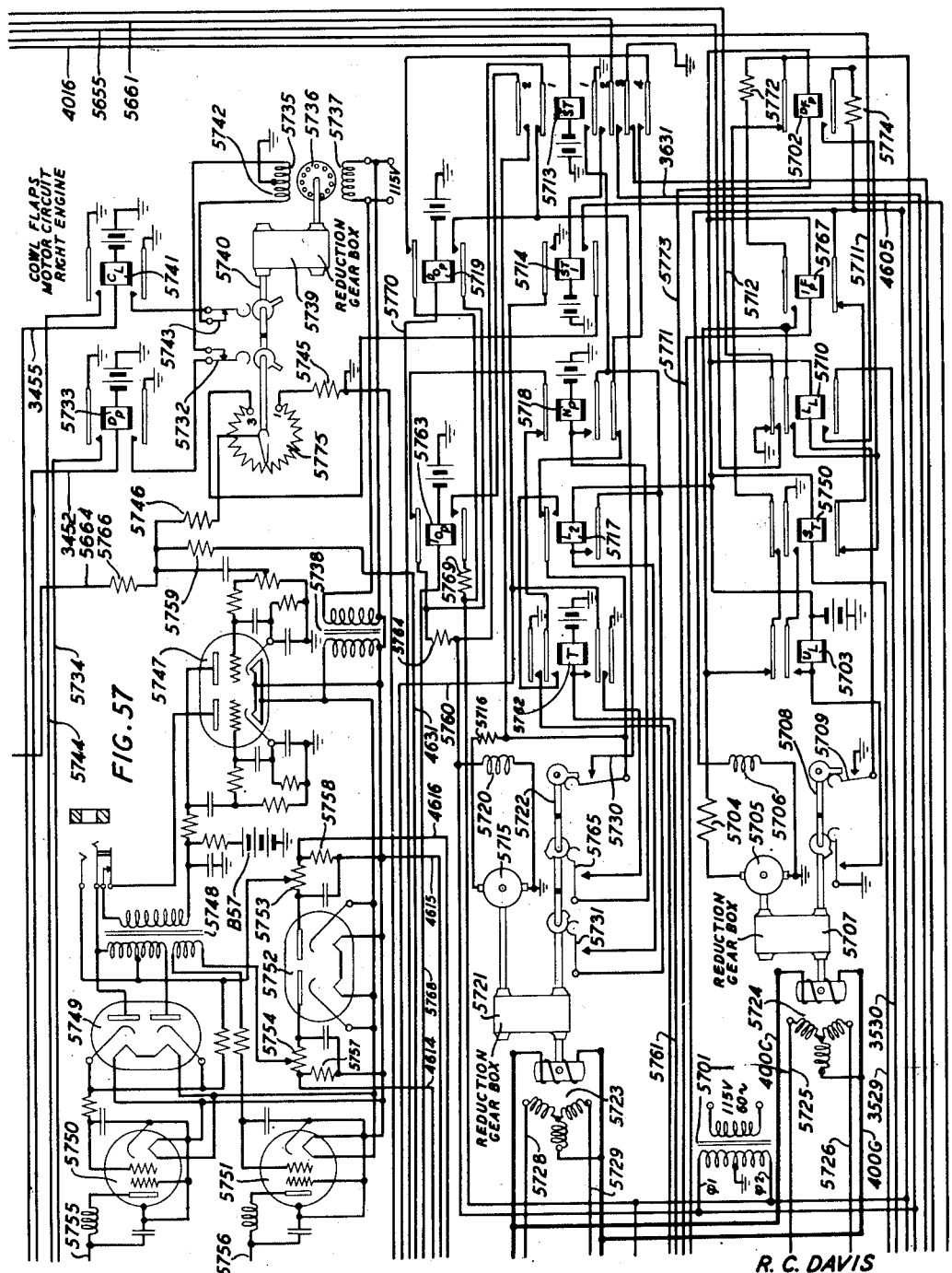

Feb. 5, 1952     R. C. DAVIS ET AL     2,584,261
GROUND TRAINER FOR AIRCRAFT CREW

Filed June 30, 1944     56 Sheets-Sheet 56

INVENTORS
R. C. DAVIS
E. J. FOGARTY
R. O. RIPPERE
BY
ATTORNEY

Patented Feb. 5, 1952

2,584,261

UNITED STATES PATENT OFFICE 2,584,261

GROUND TRAINER FOR AIRCRAFT CREW

Richard C. Davis, Great Neck, N. Y., Edward J. Fogarty, Rutherford, N. J., and Robert O. Rippere, Massapequa, N. Y., assignors to Bell Telephone Laboratories, Incorporated, New York, N. Y., a corporation of New York Application June 30, 1944, Serial No. 542,986

41 Claims. (Cl. 35—12)

This invention relates to an aircraft trainer in which the operation of controls similar to those of a standard aircraft by the pilot, copilot, navigator or flight engineer, causes the operation of instruments on the pilot's, navigator's and engineer's instrument panels and of instruments at an instructor's desk to simulate the instrument operations of an actual aircraft in flight, whereby an aircraft crew may be given ground training to enable the crew members to coordinate their efforts to insure efficient aircraft operation under actual flying conditions in a regular aircraft.

In the training of aircraft personnel it has been the practice heretofore to give pilots basic training in aircraft of the trainer type and to give flight engineers and navigators ground training with the actual equipment of aircraft. Following such basic training it has then been the practice to form crews from such basically trained personnel and to give such crews coordinated training in the flight of actual aircraft which they will later be assigned to fly in combat duty.

The larger aircraft, particularly the multi-engined bomber airplanes, are costly to build, to fly and to maintain and the use of such airplanes for extended training purposes with crews who may have had little or no experience in their operation introduces a great hazard both to the equipment and to the operating personnel during the training period and obviously withdraws such airplanes from their more valuable use in actual combat service.

Since the members of a crew have all had basic training in flying and in the operation of equipment of airplanes, the actual flying hours in the type of airplane which they will ultimately be assigned to fly may be materially reduced through the use of a ground trainer designed to simulate all of the flight and operational functions of the type of airplane to which they will later be assigned. After coordinated training in such a ground trainer, the crew training may then be completed within a comparatively few hours of flying in an actual airplane.

It is therefore an object of the present invention to provide a ground trainer in which an airplane crew may be trained to perform all of the flight and operational functions which would be required to actually fly an airplane which the trainer is designed to simulate.

It is a further object of the invention to provide a ground trainer which simulates in every detail the flight and operational controls of an actual airplane whereby the crew personnel under training therein may, under controls exercised by an instructor, be subjected to any condition of flight which might later be experienced in the flight of a similar aircraft.

One feature of the invention is the provision of a bank circuit which is responsive to the aileron and rudder controls of the trainer, to the true air speed and ball circuits of the trainer and to rough air and lateral center of gravity unbalance, that is, right or left wing heavy conditions imposed by the instructor, which bank circuit is instrumental in controlling an associated bank motor control circuit to control other control circuits of the trainer and to control the operation of the bank indicator of the artificial horizon instruments on the pilot's, copilot's and instructor's instrument panels.

A further feature of the invention is the provision of a ball circuit which is responsive to the bank, rate of turn and true air speed circuits of the trainer for controlling an associated ball motor circuit to control other control circuits of the trainer and to control the operation of the ball indicator of the turn and bank instruments on the pilot's, copilot's and instructor's instrument panels.

A further feature of the invention is the provision of a rate of turn circuit which is responsive to the right and left engine brake horsepower, bank and ball circuits of the trainer and to rough air conditions imposed by the instructor to control other control circuits of the trainer and to control the rate of turn indicator of the turn and bank instruments on the pilot's, copilot's and instructor's instrument panels.

A further feature of the invention is the provision of a compass circuit which is responsive to the rate of turn circuit of the trainer for controlling the directional gyro instrument on the pilot's and instructor's instrument panels, the magnetic compass on the navigator's instrument panel and the remote indicating compasses on the pilot's, copilot's and instructor's instrument panels and in conjunction with the true air speed circuit of the trainer and the wind velocity and direction controls interposed by the instructor for controlling the speed and orientation of a flight recorder at the instructor's desk.

A further feature of the invention is the provision of a rate of climb circuit which is responsive to the weight, bank, angle of attack, wing flaps and indicated air speed circuits of the trainer for controlling other control circuits of the trainer and for controlling the rate of climb instruments on the pilot's, copilot's and instructor's instrument panels.

A further feature of the invention is the provision of a weight circuit which is responsive to control from the instructor's desk whereby the instructor at any time may introduce a change in the weight of the airplane simulated by the trainer as for example the loss of weight due to the consumption of oil and fuel or the expenditure of ammunition and bomb load, or the increase in weight due to the accumulation of ice.

A further feature of the invention is the provision of a wing flaps circuit which is responsive to control from the pilot's pedestal for introducing into other control circuits of the trainer the effect of moving the wing flaps up or down and for controlling instruments on the copilot's and instructor's instrument panels for indicating whether the wing flaps have been moved up or down.

A further feature of the invention is the provision of an angle of attack circuit which is responsive to the wing flaps, thrust horsepower and indicated air speed circuits of the trainer and to rough air and longitudinal center of gravity unbalance conditions imposed by the instructor and to the yoke control operated by either the pilot or copilot for controlling other control circuits of the trainer.

A further feature of the invention is the provision of an indicated air speed circuit which is responsive to the weight, wing flaps, true air speed, angle of attack, rate of climb and thrust horsepower circuits of the trainer and to the yoke control operated by either the pilot or copilot for controlling other control circuits of the trainer and for controlling the indicated air speed indicating instruments on the pilot's, copilot's, navigator's and instructor's instrument panels.

A further feature of the invention is the provision of a pitch bar circuit which is responsive to the rate of climb and angle of attack circuits of the trainer for controlling the pitch bar of the artificial horizon instruments on the pilot's and instructor's instrument panels.

A further feature of the invention is the provision of an altimeter circuit which is responsive to the rate of climb circuit of the trainer for controlling other control circuits of the trainer and for controlling the altimeters on the pilot's, copilot's, navigator's and instructor's instrument panels.

A further feature of the invention is the provision of a true air speed circuit which is responsive to the indicated air speed circuit of the trainer for controlling other control circuits of the trainer.

Other features of the invention will become apparent upon the consideration of the following detailed description of the invention when read in connection wtih the accompanying drawings in which.

Figure 3:
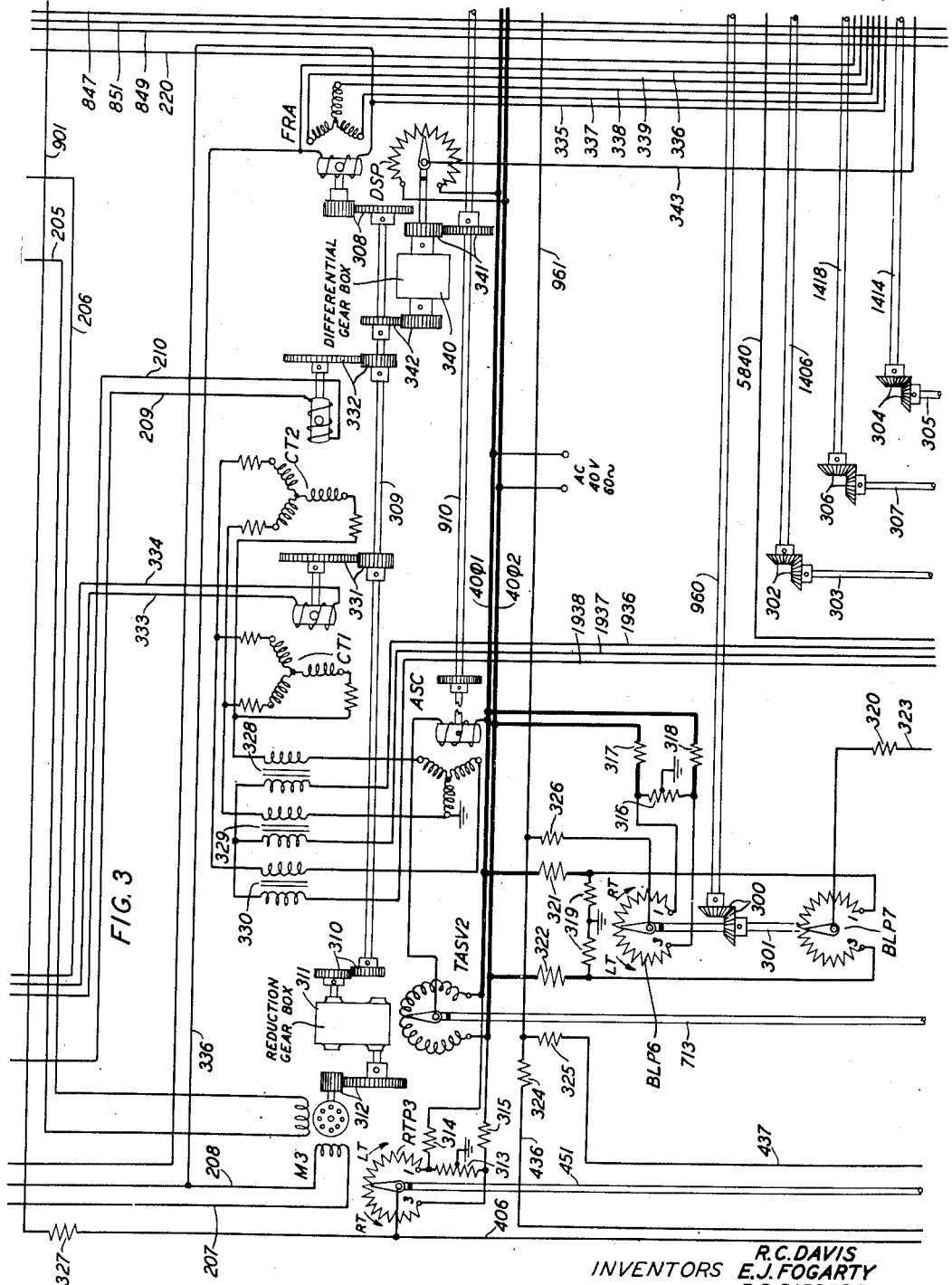
Figure 4:
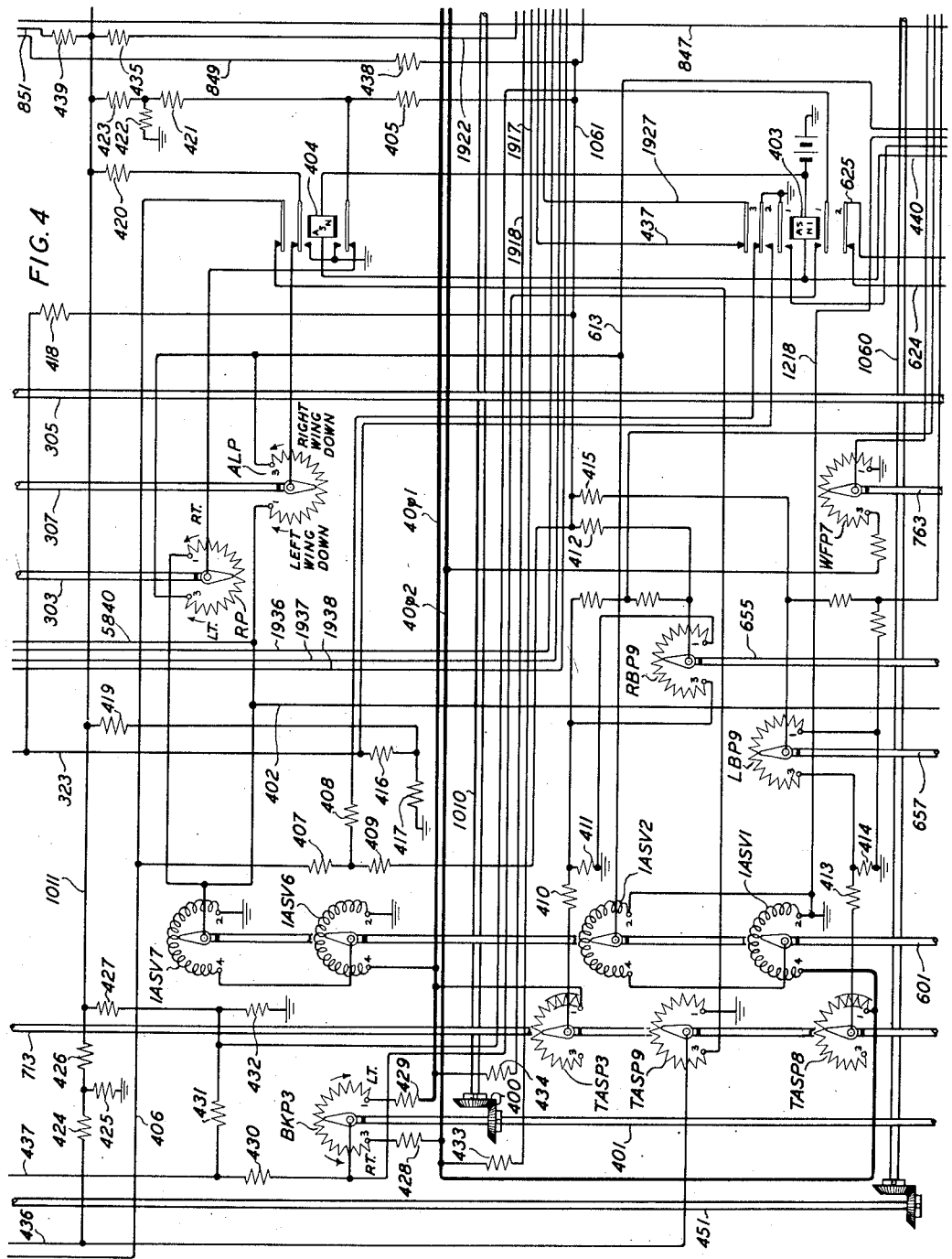
Figure 5:
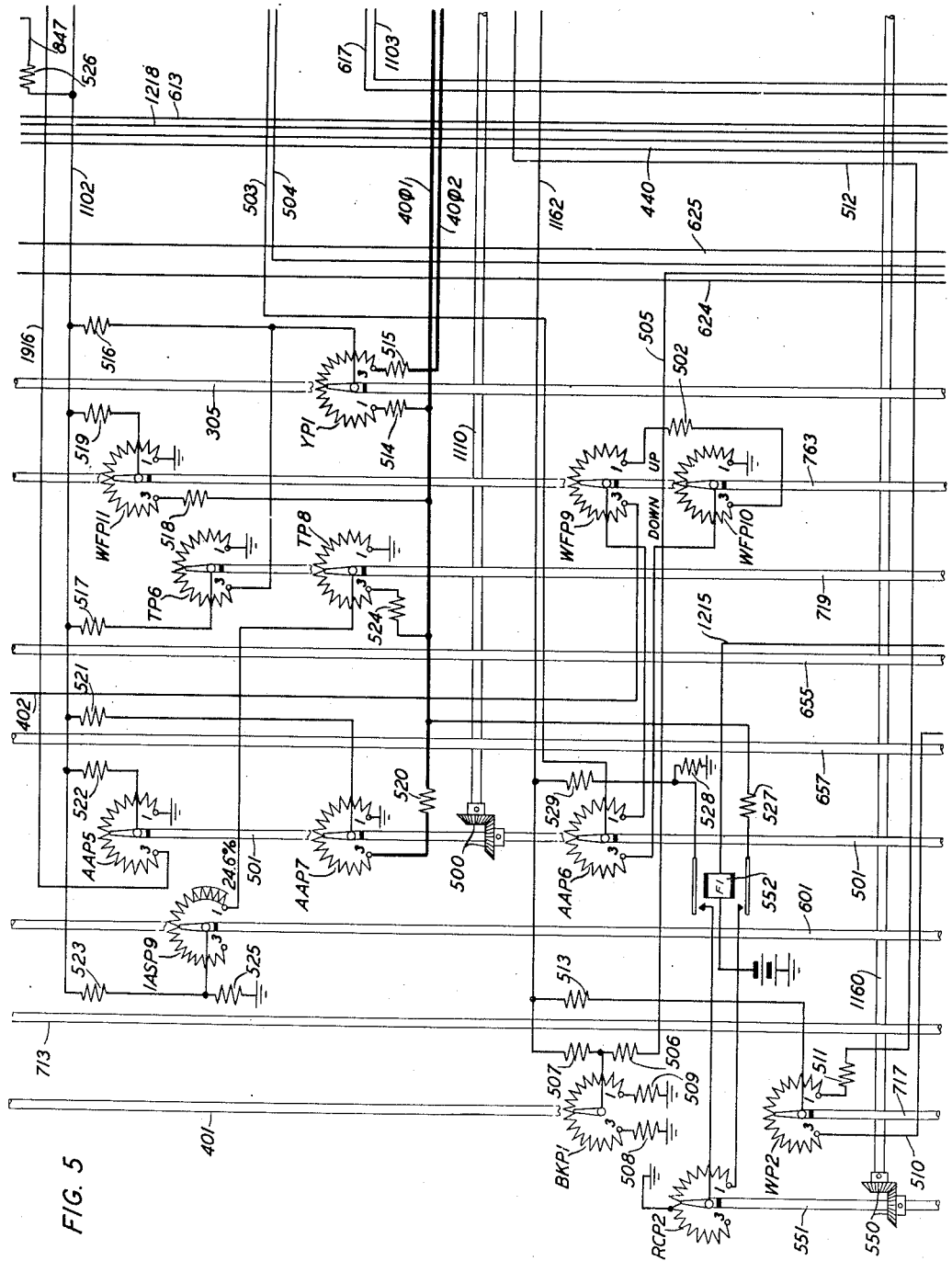
Figure 6:
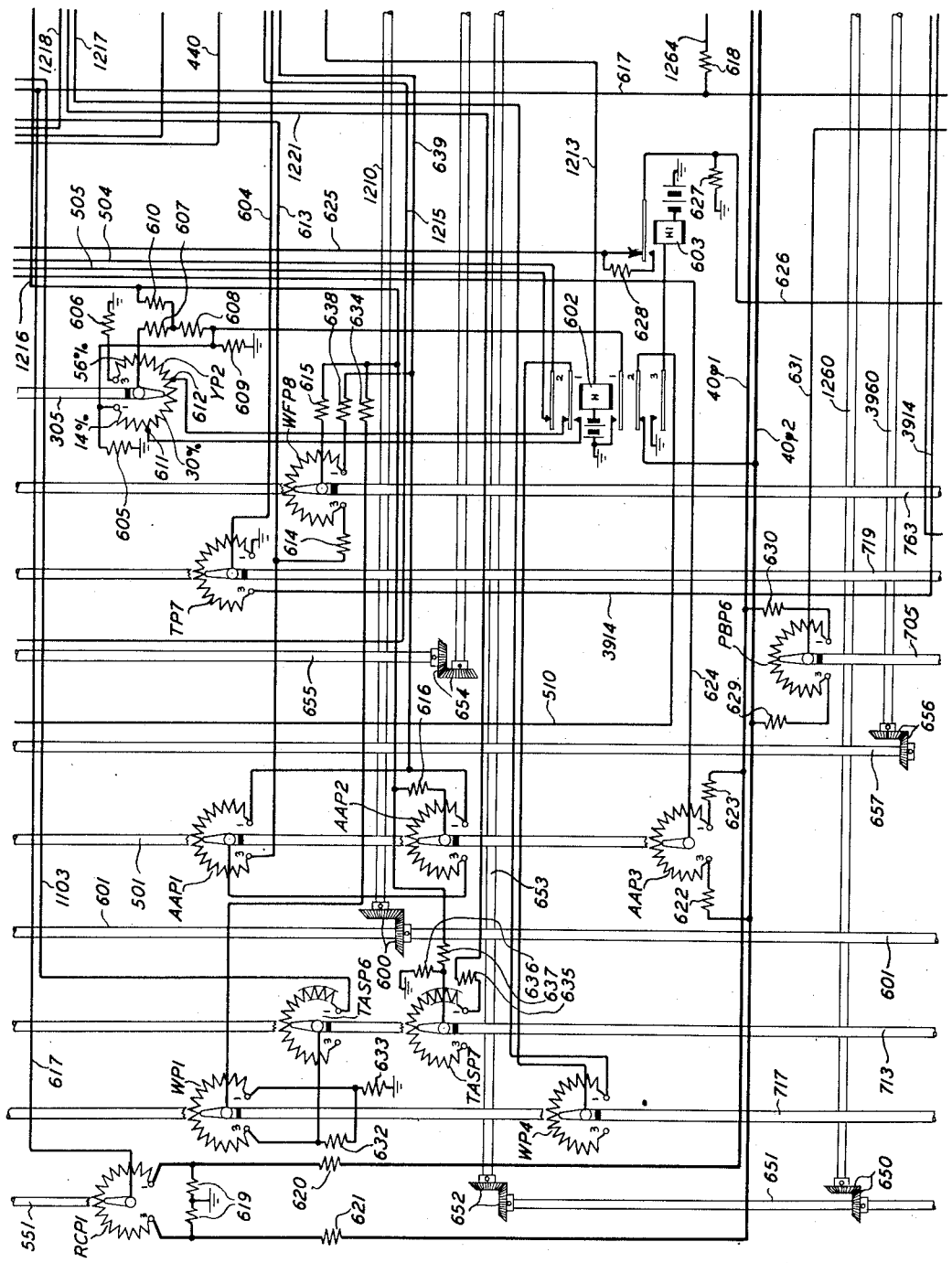
Figure 23:
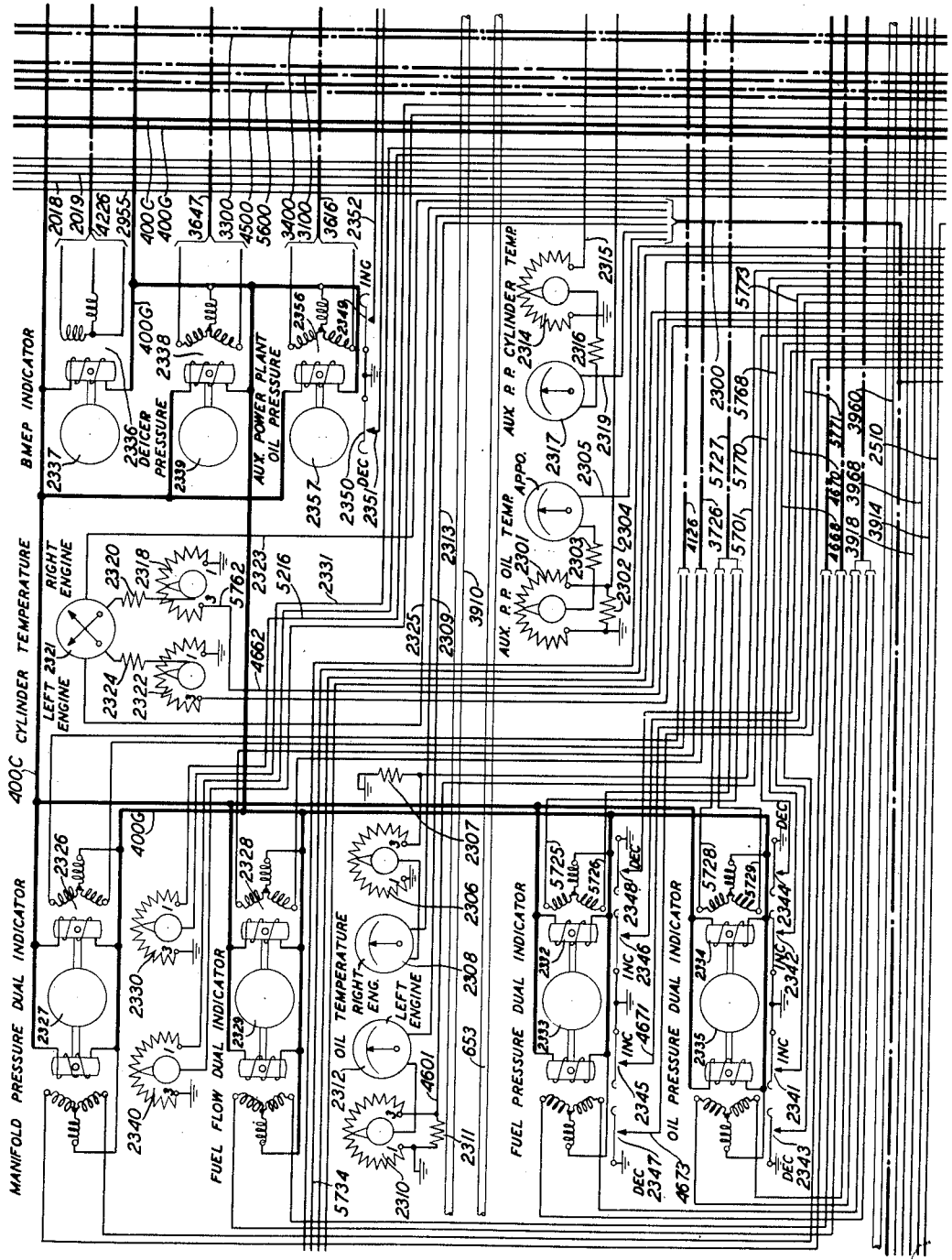
Figure 36:
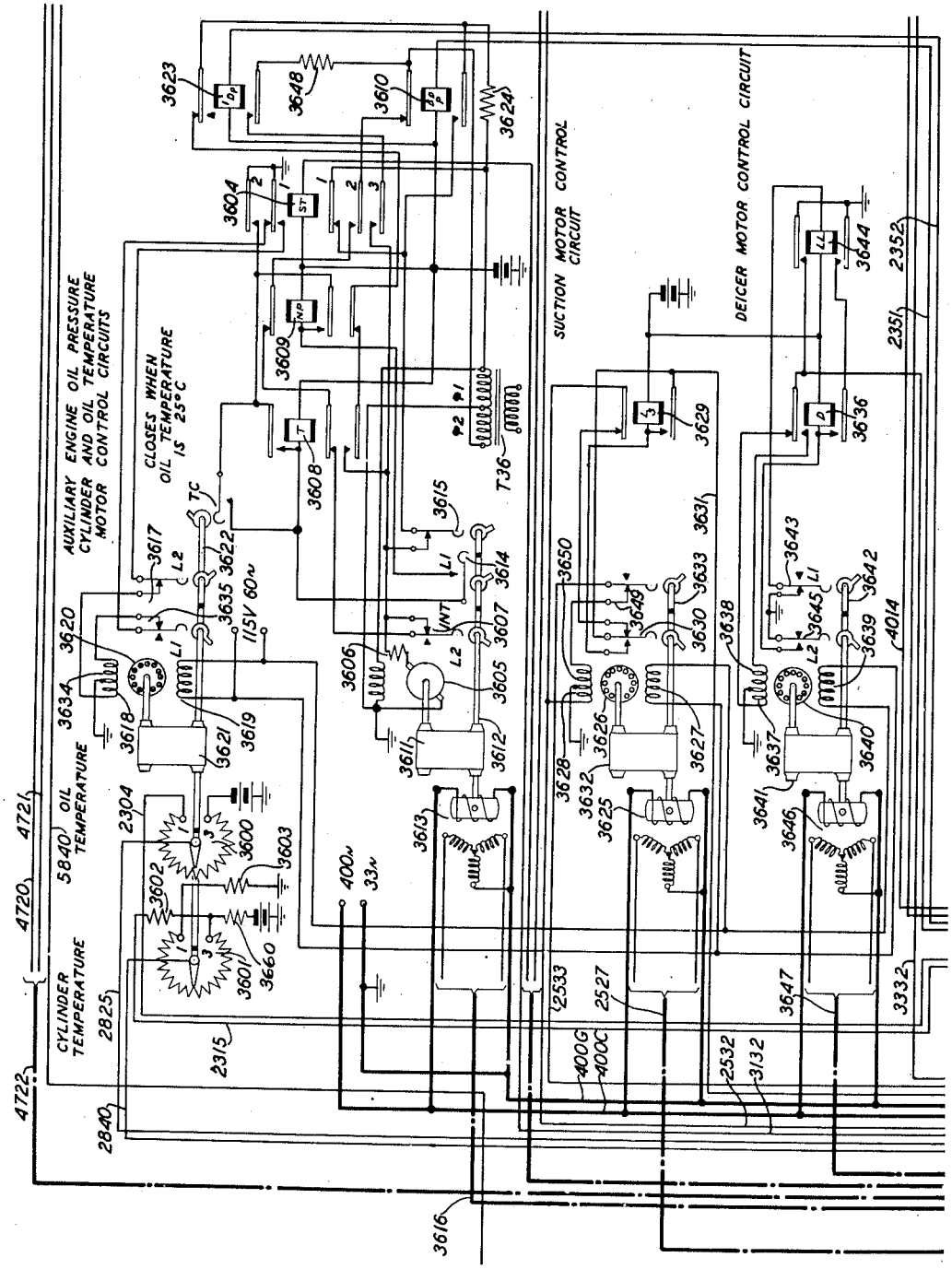
Figure 48:
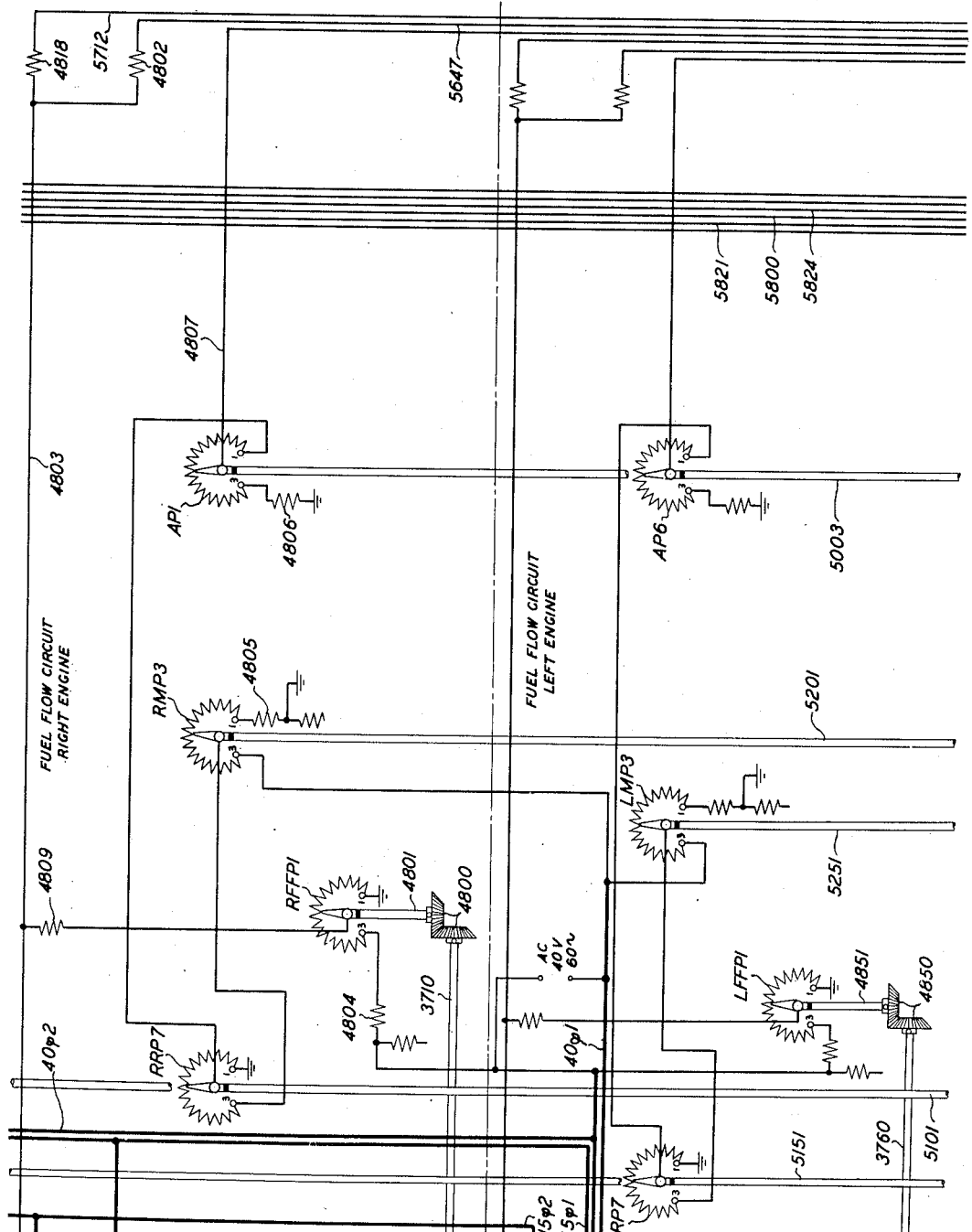
Figure 49:
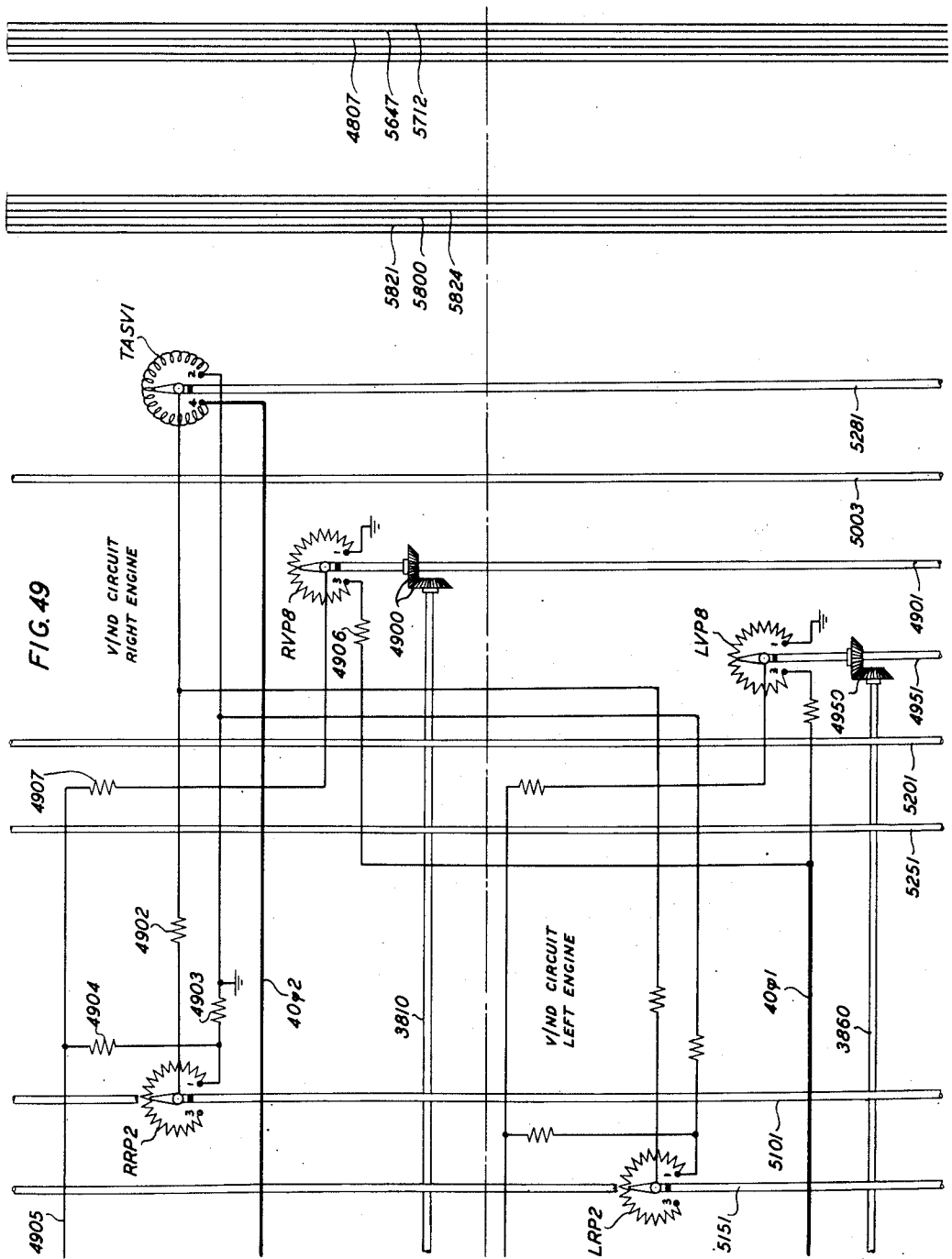
Figure 50:
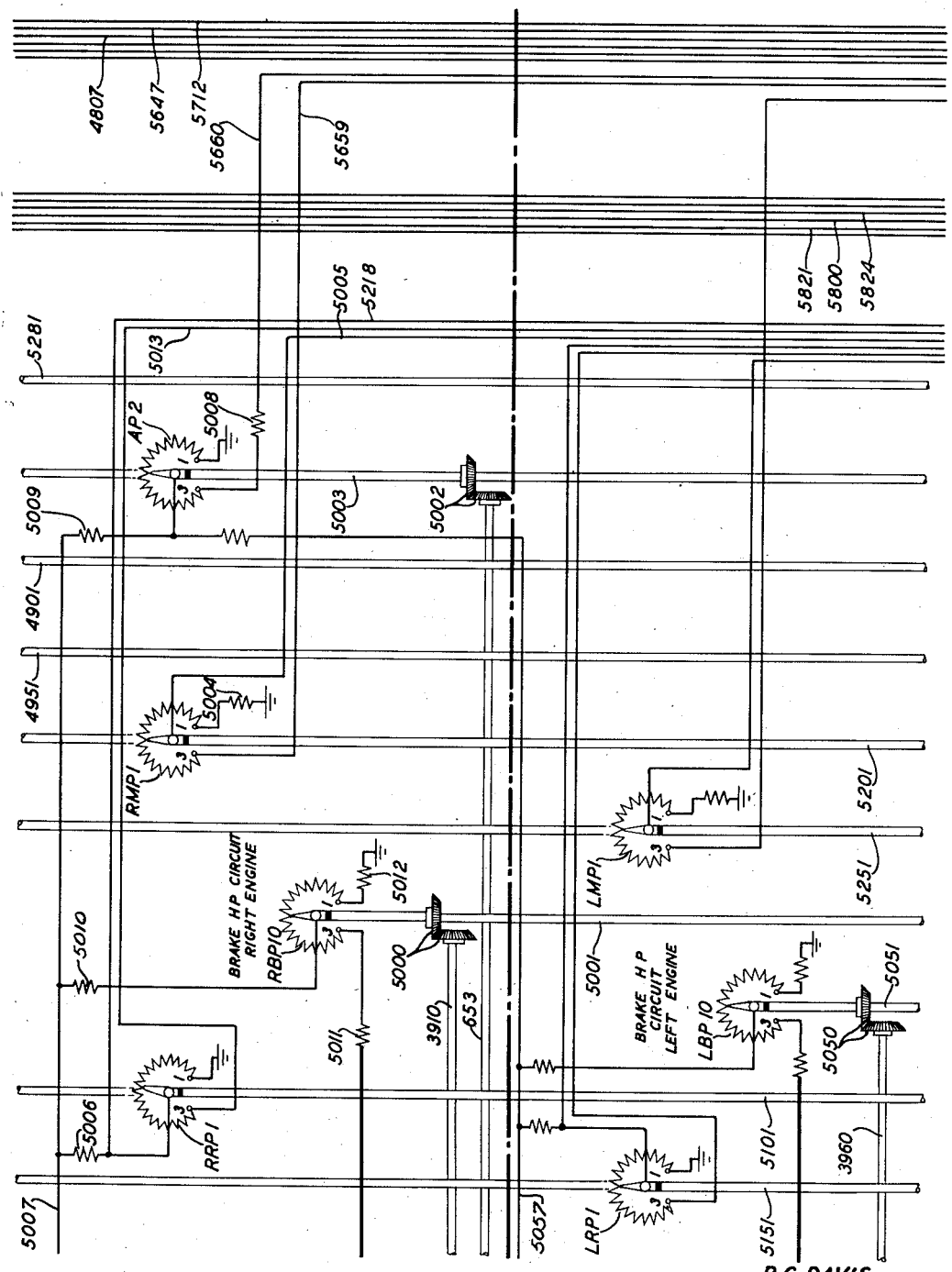
Figure 51:
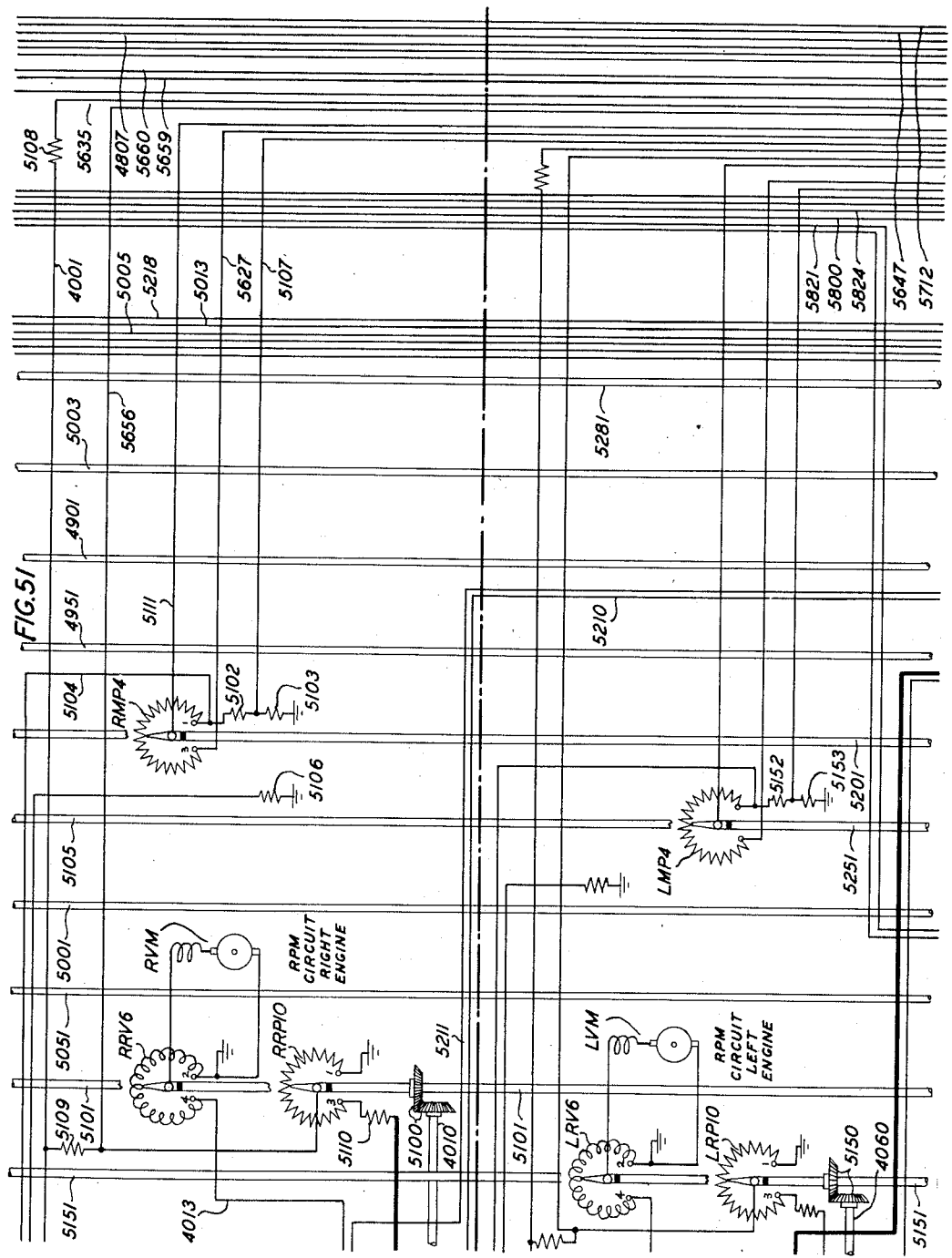
Figure 52:
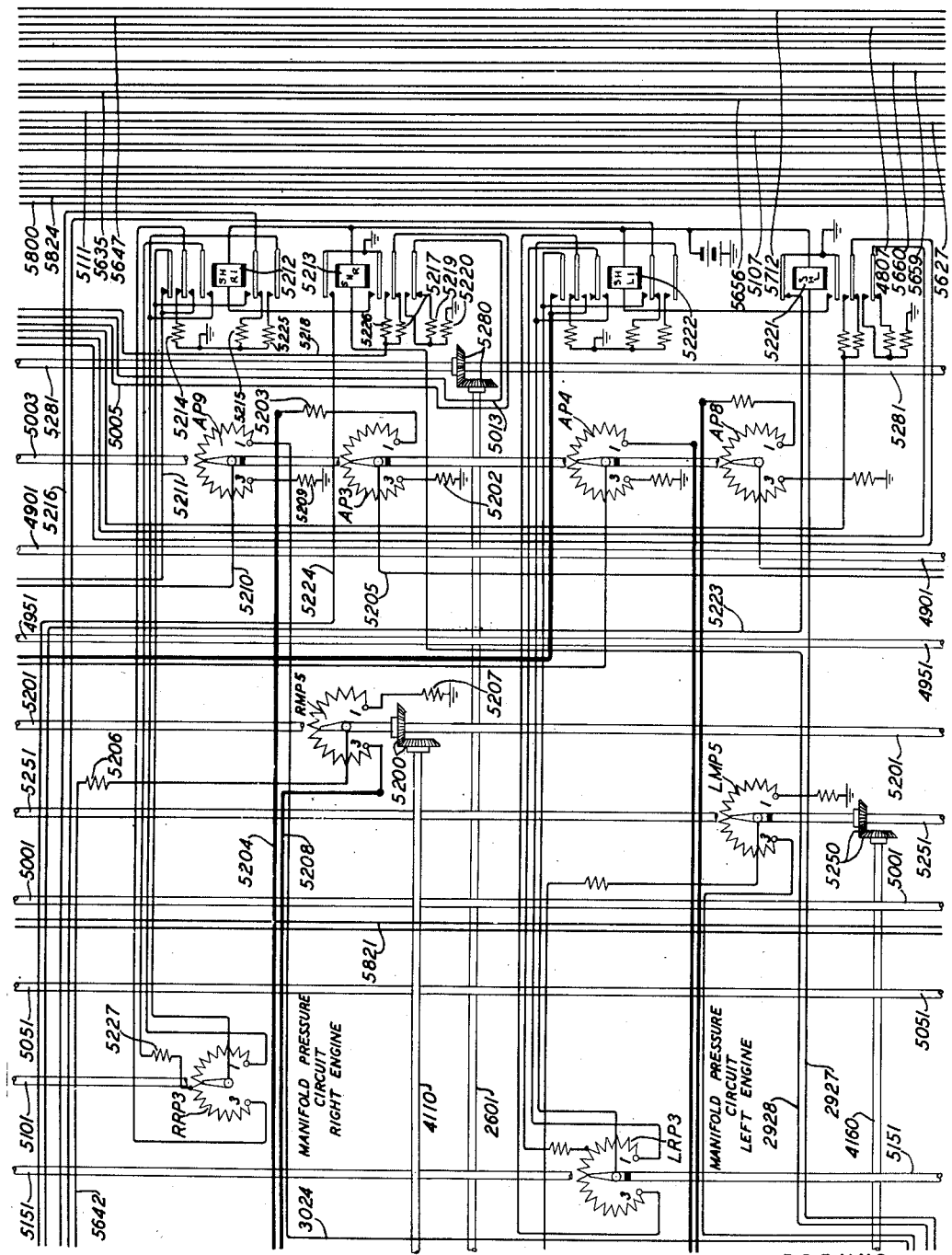
Figure 53:
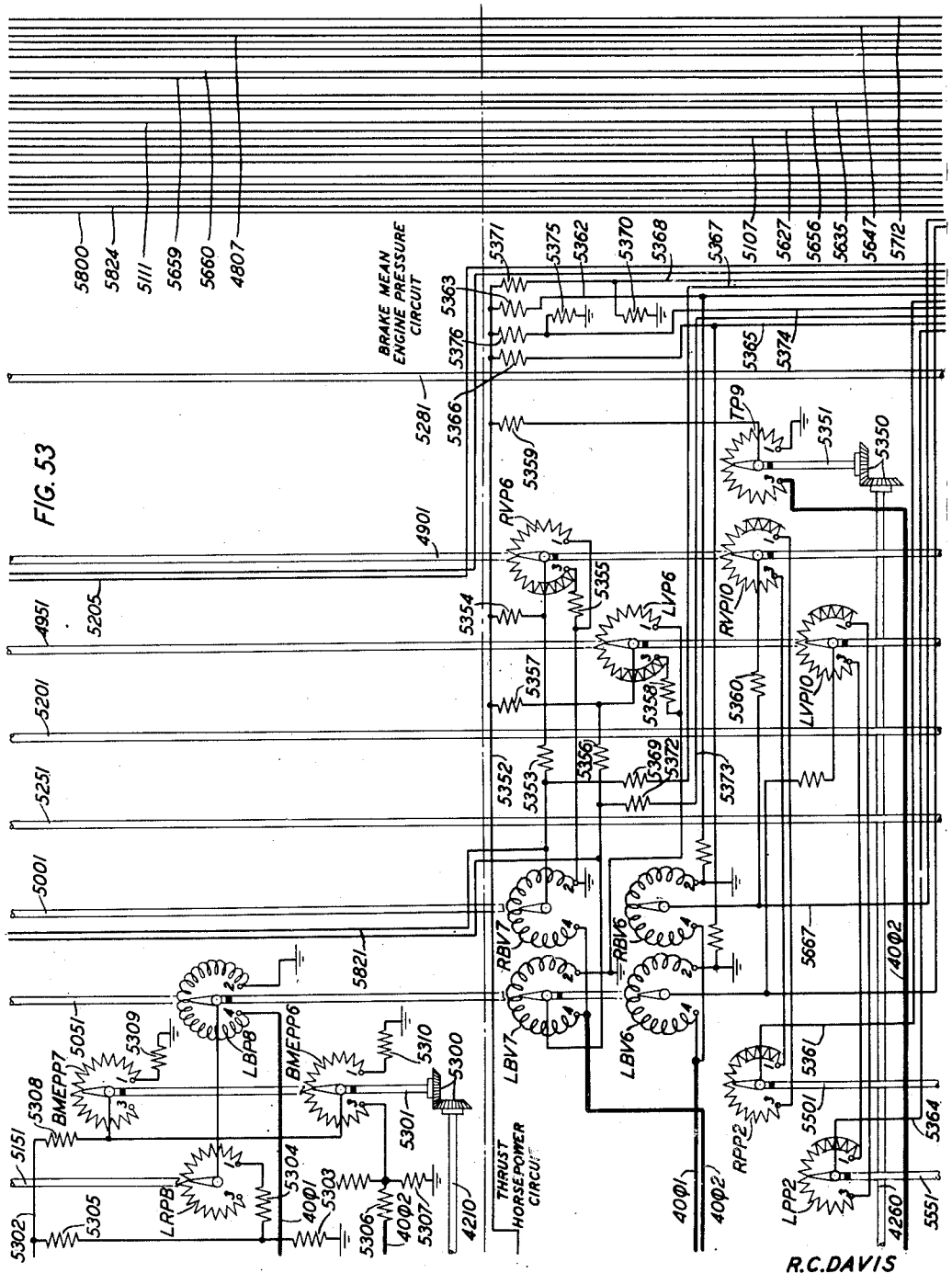
Figure 54:
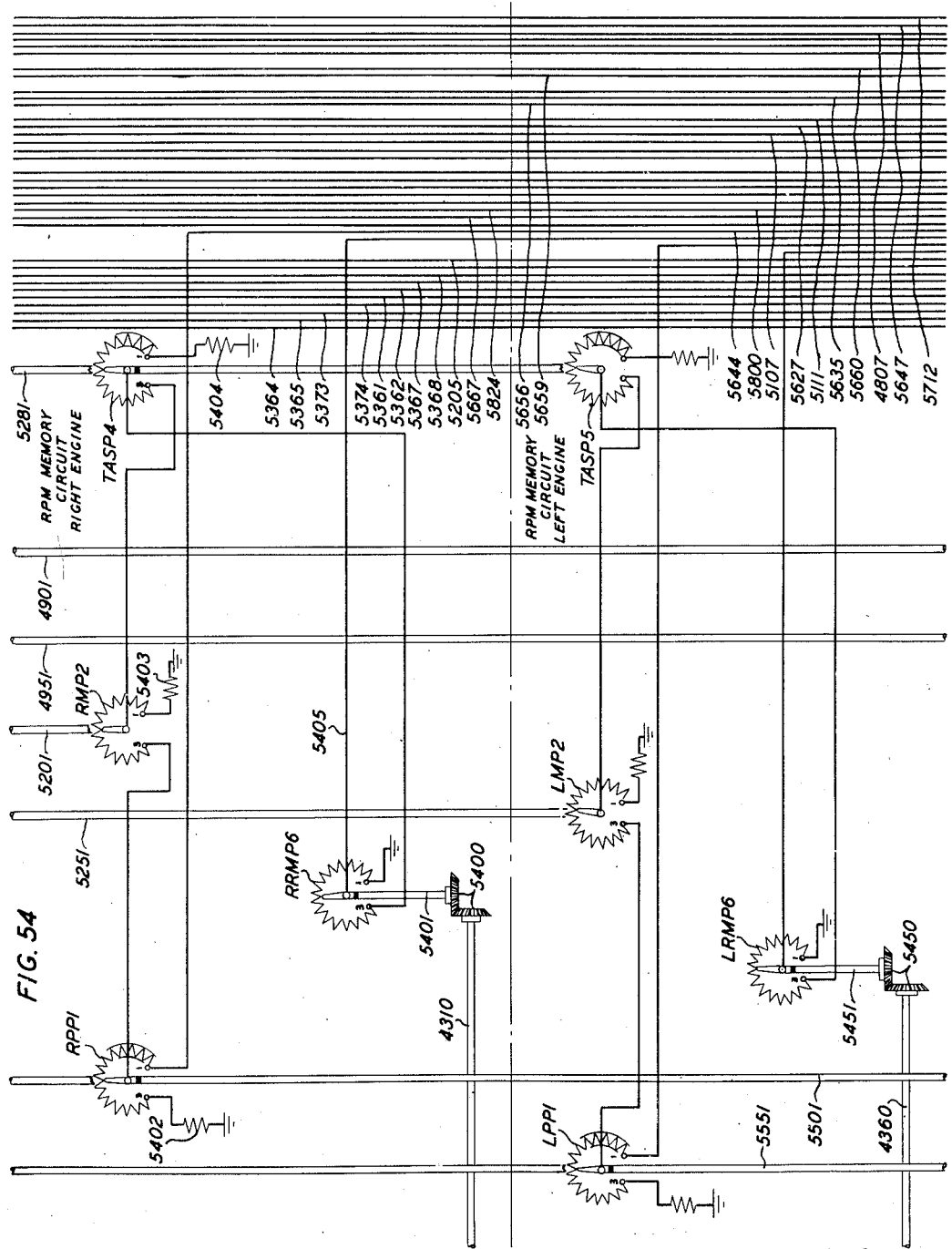
Figure 55:
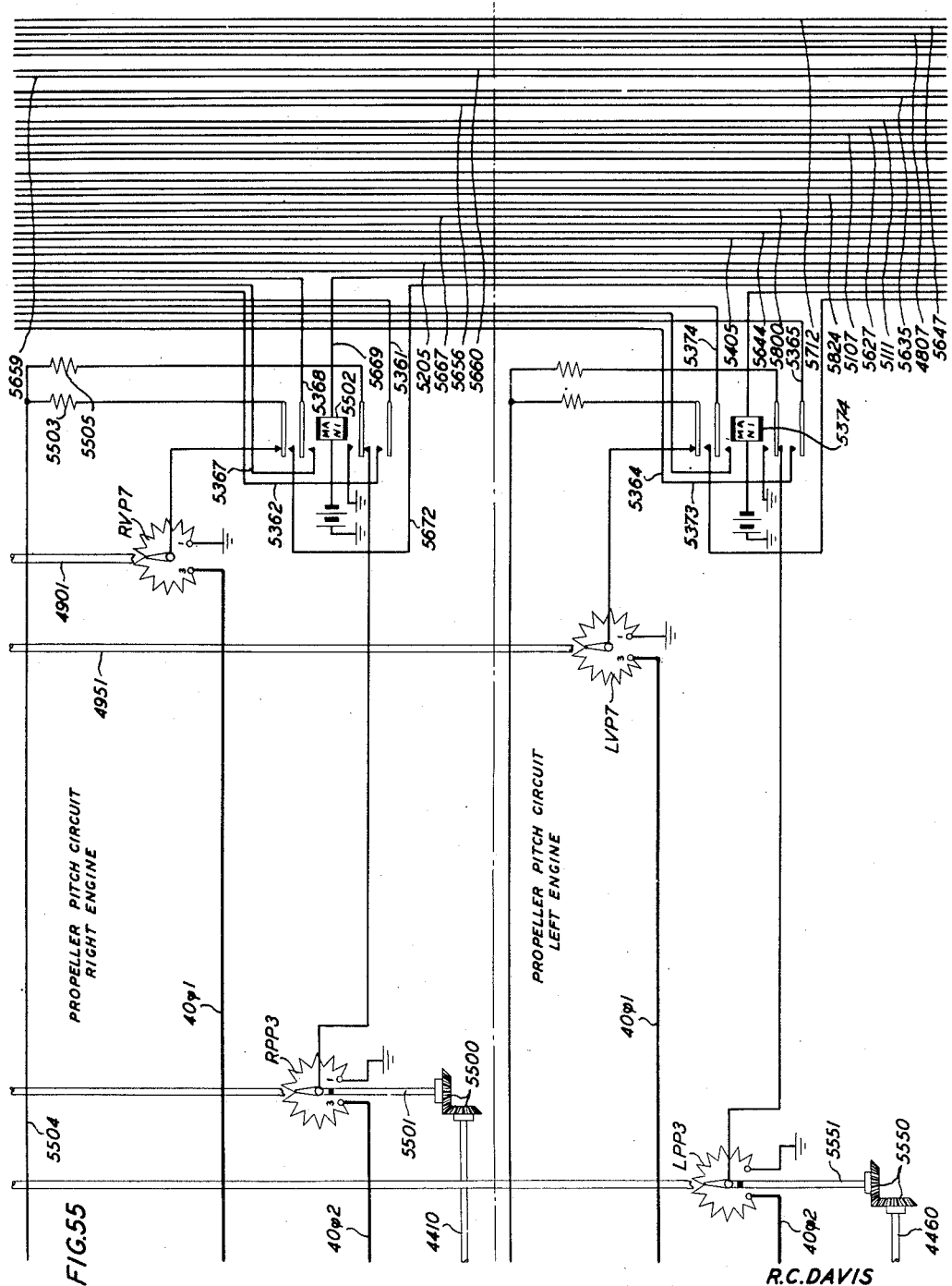
Figure 56:
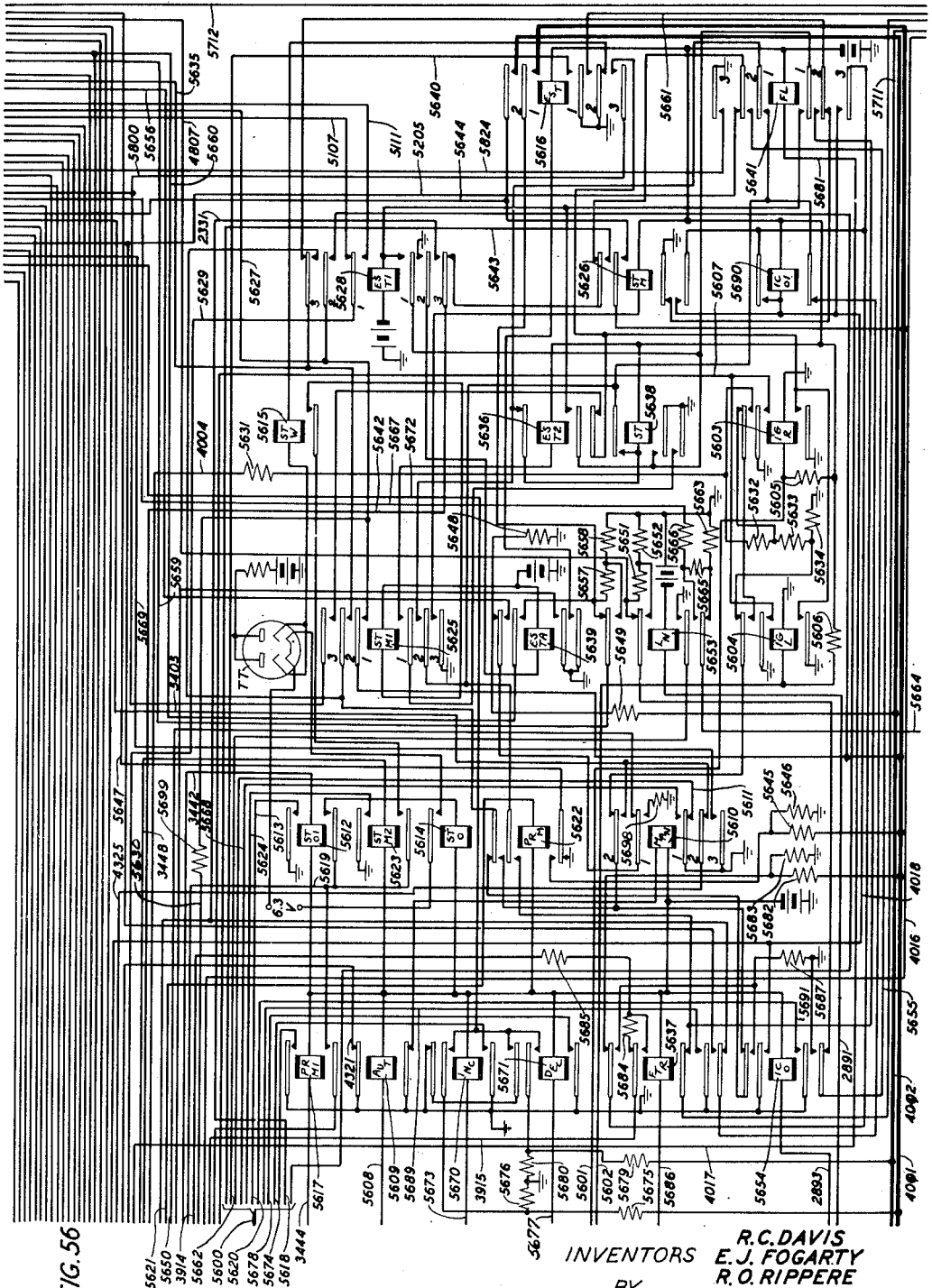

Figs. 3 to 13, inclusive show interacting circuits which are responsive to the yoke, aileron and rudder controls at the pilot's and copilot's stations disclosed in Figs. 14 and 15 and to controls at the instructor's desk. Of these figures, Figs. 3 and 9 show in the upper portions thereof the compass and compass motor control circuits and in the lower portions thereof the ball and ball motor control circuits; Figs. 4 and 10 show in the upper portions thereof the bank and bank motor control circuits and in the lower portions thereof the rate-of-turn and rate-of-turn motor control circuits; Figs. 5 and 11 show in the upper portions thereof the angle-of-attack and angle-of-attack motor control circuits and in the lower portions thereof the rate-of-climb and rate-of-climb motor control circuits; Figs. 6 and 12 show in the upper portions thereof the indicated-airspeed and the indicated-air-speed motor control circuits and in the lower portions thereof the altimeter and altimeter motor control circuits, and Figs. 7 and 13 show in the upper portions of Fig. 13, the pitch-bar and pitch-bar motor control circuits, in the upper right portion of Fig. 7 the wing flaps motor circuit, in the lower portion of Fig. 7 the true-air-speed and true-air-speed motor control circuits, and in the lower portion of Fig. 13 the weight motor control circuit;

Fig. 8 shows the rough air circuit which is controllable from controls shown in Fig. 19 located at the instructor's desk;

Fig. 14 shows in the upper portion thereof the flight instruments of the pilot's instrument panel and in the lower portion thereof the schematic representation of the pilot's yoke, aileron and rudder controls;

Fig. 15 shows in the upper portion thereof the flight instruments of the copilot's instrument panel, in the lower left portion thereof the schematic representation of the elevator, aileron and rudder trimming wheels, in the central lower portion thereof the schematic representation of the copilot's yoke, ailerons and rudder controls and in the lower right portion thereof boxes representing the elevator, aileron and rudder trimming mechanism;

Fig. 16 shows boxes representing the elevator, aileron and rudder trimming motor control circuits and the circuit for controlling the motor which tensions the loading springs of the trimming mechanisms disclosed in Fig. 15;

Figs. 17 and 18 taken together disclose instruments and controls mounted on a pedestal located between the pilot's and copilot's stations and beneath their instrument panels;

Figs. 19 to 26, inclusive, disclose instruments, signal lamps and controls located on the instructor's desk;

Fig. 27 shows apparatus located at the navigator's station including apparatus for simulating the functions of a drift sight and such flight instruments as are required for observation by the navigator;

Figs. 28 to 35, inclusive, disclose instruments, signals and controls mounted on the flight engineer's instrument and control panels together with relays and other equipment controlled thereby;

Figs. 36 to 57, inclusive, disclose the interacting circuits which are responsive to the engine and propeller controls operable by the pilots or by the flight engineer. Of these circuits Fig. 36 shows the simulated auxiliary engine oil pressure, cylinder and oil temperature motor control circuits, the suction motor control circuit and the de-icer motor control circuit; Fig. 47 shows the tachometer motor control circuits for both the simulated right and left main engines; Figs. 37 and 48 show the fuel-flow motor control and fuel flow circuits for the two simulated main engines; Figs. 38 and 49 show the $$\frac{V}{ND}$$

motor control and $$\frac{V}{ND}$$

circuits for the two simulated main engines; Figs. 39 and 50 show the brake-horsepower motor control and brake-horsepower circuits for the two simulated main engines; Figs. 40 and 51 show the R. P. M. motor control and R. P. M. circuits for the two simulated main engines; Figs. 41 and 52 show the manifold-pressure motor control and manifold-pressure circuits for the two simulated main engines; Figs. 42 and 53 show in the upper portions thereof the brake-mean-effective-pressure motor control and brake-mean-effective-pressure circuits and in the lower portions thereof the thrust-horsepower motor control and thrust-horsepower circuits; Figs. 43 and 54 show the R. P. M.-memory motor control and R. P. M.-memory circuits for the two simulated main engines; Figs. 44 and 55 show the propeller-pitch motor control and propeller-pitch circuits for the two simulated main engines; Fig. 56 shows the control circuits for the simulated right engine; Fig. 45 shows a box representing the control circuits of the simulated left engine similar to the circuits of Fig. 56; Fig. 57 shows the oil pressure, fuel pressure and cowl flaps motor circuits for the simulated right engine and in the upper left corner and the upper right corner of Fig. 46 the cylinder and oil temperature motor circuit for the simulated right engine; and Fig. 46 shows boxes representing similar oil pressure, fuel pressure, cowl flaps, cylinder and oil temperature motor circuits for the simulated left engine.

Fig. 58 shows in the upper portion thereof circuits for simulating the sounds produced in starting and operating the right main engine and in the lower portion thereof a box representing similar circuits for simulating the sounds produced in starting and operating the left main engine;

Fig. 59 discloses lamps for lighting the instrument panels and station of the radio operator; and Fig. 60 is a diagram illustrating how the several figures of the drawing should be assembled to completely disclose the invention.

The invention has been illustrated as applied to a two-engine patrol bomber of the seaplane type and more particularly to a Navy seaplane known as the PBM3. It is, of course, to be understood that the general principles embodied in the invention are equally applicable to trainers which might be designed for training crews of one or more members in the operation of other types of land or seaplanes having one, two or more engines.

Figure 1:
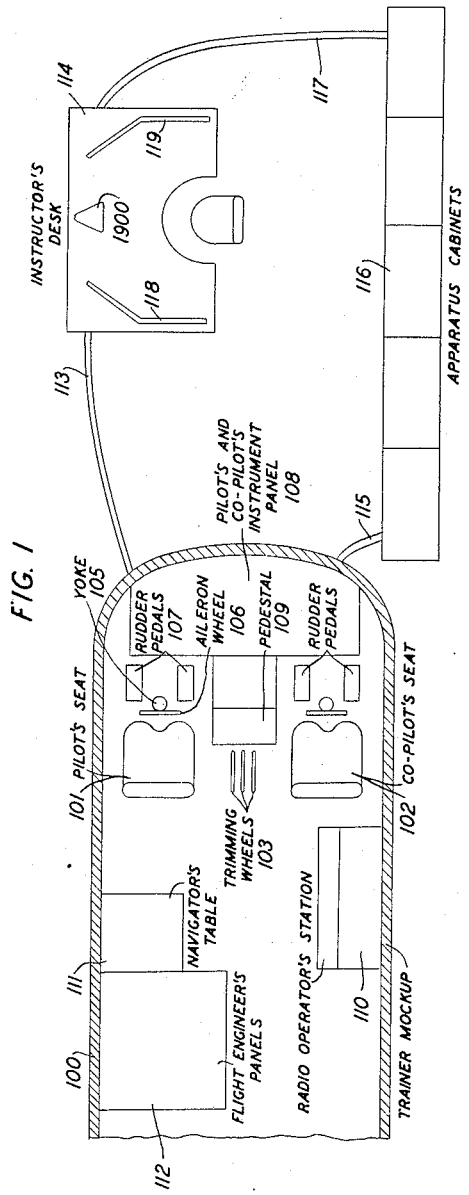
Fig. 1 is a schematic representation of the essential elements of the trainer including a "mock-up" of the fuselage of the airplane which the trainer is designed to simulate, instructor's desk and apparatus cabinets interconnected by suitable cables of control conductors.

Referring first to Fig. 1, the equipment of the trainer is disclosed schematically and comprises a mock-up 100 of the fuselage of the airplane so constructed as to closely resemble in size, arrangement and appearance the fuselage of the actual airplane which the trainer is designed to simulate. The pilot's and copilot's seats 101 and 102 are positioned side by side near the forward end of the fuselage with a set of trimming wheels 103 positioned between the seats and within easy reach of both the pilot and copilot. Positioned in front of the pilot's seat is a control yoke 105 and associated aileron control wheel 106 and a pair of rudder control pedals 107. Similar controls are positioned in front of the copilot's seat 102.

Extending across the front of the fuselage and beneath the windshield is an instrument panel 108 in which instruments for observation by the pilot, other instruments for observation by the copilot and instruments for observation by both pilots are mounted. Also positioned beneath the instrument panel 108 and between the pilot's and copilot's seats is a pedestal 109 on the top and front face of which other instruments and control switches are mounted for the common use of both pilots.

Immediately back of the copilot's seat 102 and positioned against the side wall of the fuselage is the table and the radio panels 110 of the radio operator's station and back of the pilot's seat 101 and positioned against the other side wall of the fuselage is the navigator's table 111. Also back of the navigator's table are the control and instrument panels 112 of the flight engineer's station. The apparatus disclosed in Figs. 14 to 18, 27 to 35, and 59 is mounted in the mock-up 100.

The mock-up 100 is connected by a cable 113 of control conductors with the instructor's desk 114 and by cable 115 with the apparatus cabinets 116 which cabinets are also connected by cable 117 with the instructor's desk 114. Positioned on the desk 114 are instrument control and signal panels 118 and 119 and positioned on the top of the desk is a flight recorder 1900 which is operable to plot on a chart over which it moves the ground speed and course of the simulated flight flown by the crew under training. Other controls for the use of the instructor are positioned in drawers of the desk. The apparatus associated with the instructor's desk is disclosed in Figs. 19 to 26, inclusive.

The apparatus disclosed in Figs. 2 to 13 and 36 to 58 together with power supply and switching equipment (not shown) is mounted in the apparatus cabinets 116.

Figure 2:
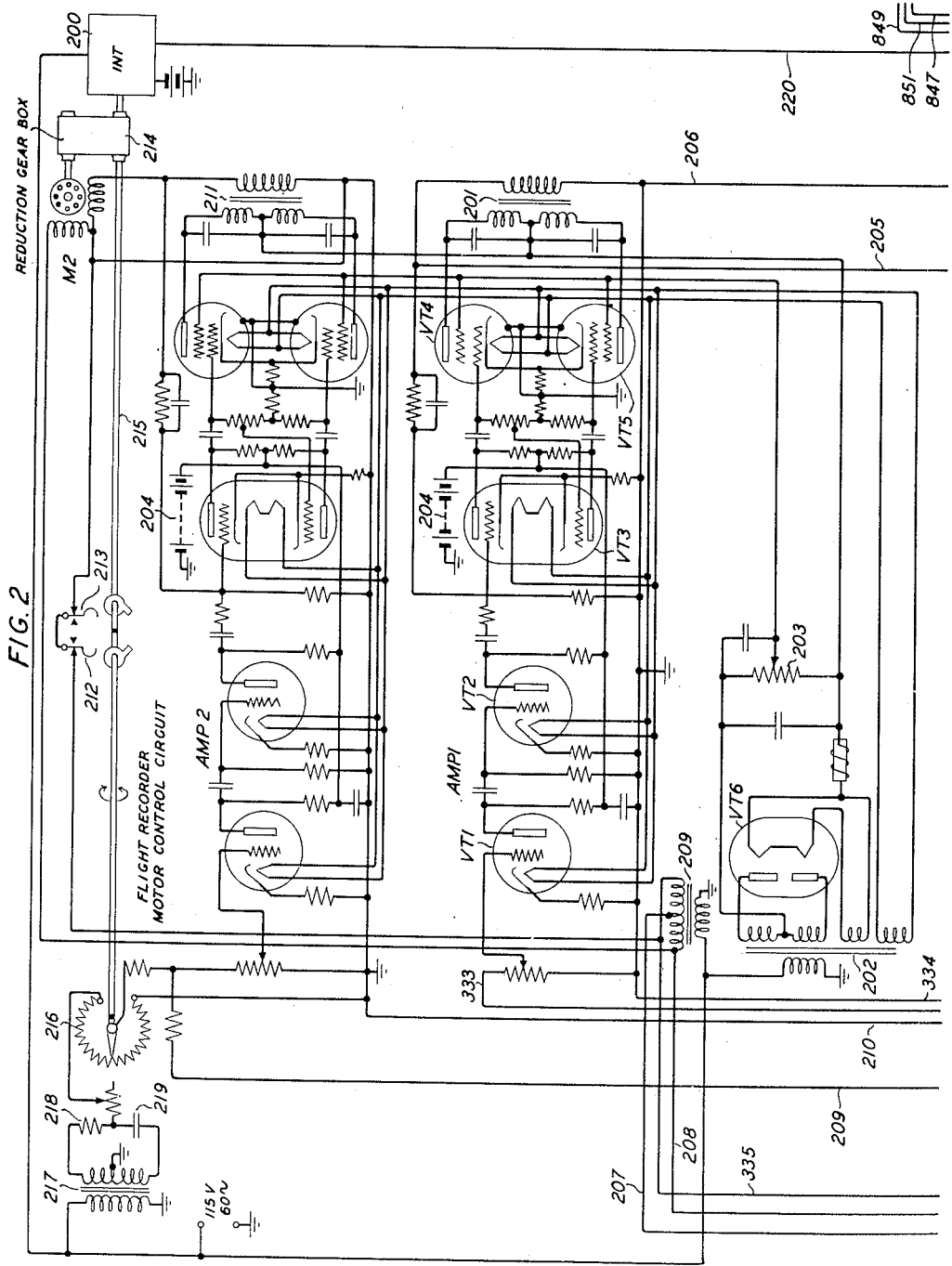
Fig. 2 shows the flight recorder control circuit for controlling the operation of the flight recorder located on the instructor's desk and disclosed in Fig. 19.

The motor control circuits are in general assembled in pairs, for example, the compass motor control circuit disclosed in Figs. 3 and 9 and the flight recorder motor control circuit disclosed in Fig. 2 constitute one assembly, the ball motor control circuit shown in Fig. 9 and the bank motor control circuit shown in Fig. 10 constitute another assembly, etc. Each motor control circuit comprises a direct current reversible motor which through a reduction gear box drives a main driving shaft which in turn may drive one or more synchronous transmitters of the so-called "autosyn" or "magnesyn" type for controlling instruments remotely mounted on instrument panels of the trainer or on the instructor's desk, may drive potentiometers or variable autotransformers of the so-called "variac" type for controlling other motor control circuits of the trainer and in most cases drives limit switches to insure that the driving motor will be arrested before the brushes of potentiometers or variacs are driven beyond the ends of the windings with which they are associated. This equipment may be mounted on a suitable mounting plate and the relays, condensers, resistances, control rheostats, testing jacks and electronic devices associated with the equipment mounted on the motor plate may be mounted on an apparatus mounting rack positioned above and secured to the motor plate. Several of these motor plates and mounting rack assemblies may be mounted one above the other in the apparatus cabinets 116 of Fig. 1.

Each of the motor control circuits, for example the circuit disclosed in Fig. 9, is of the type disclosed and fully described in the application of Albert et al., Serial No. 502,484, filed September 15, 1943. This application has matured into Patent No. 2,428,767, dated October 14, 1947. In general the circuit for controlling the motor M9 comprises a dual triode amplifier tube 900 which receives a signal incoming on conductor 901, amplifies it and applies it through the step-up transformer 902 to the anodes of the dual diode rectifying tube 903. The tube 903 serves as a full-wave rectifier to rectify the input potential from the tube 900 and to apply it as a positive potential to the grid of gas-filled tube 905. The output potential from tube 900 is also applied through the lower secondary winding of transformer 902 to the control grid of the gas-filled tube 904. Direct current for furnishing grid bias to the control grids of tubes 904 and 905 is supplied from the right secondary winding of power transformer 909 through the dual diode rectifier tube 906 under the control of the grid biasing control rheostats 907 and 908. Filament heating current for all of the tubes is supplied from the other secondary windings of power transformer 909. Anode potential is applied to the anodes of amplifier tube 900 from the anode battery B9 and 60-cycle anode potentials 180 degrees apart in phase are applied to the anodes of tubes 904 and 905, the potential of phase φ1 being applied from the phase φ1 115-volt bus bar 115φ1 through the winding of anode relay RV to the anode of tube 904 and potential of phase φ2 being applied from the phase φ2 115-volt bus bar 115φ2 to the anode of tube 905.

The motor M9 is of the direct current reversible type whose stator circuit is energized by current from the direct current source B9 under the control of reversing relay RV1 which is in turn under the control of the anode relay RV associated with the gas-filled tube 904, and whose rotor winding is energized by positive impulses of current transmitted therethrough by the firing of the gas-filled tube 905. When the input potential applied to conductor 901 is in phase with the potential of phase φ1 applied to the anode of tube 904 and out of phase with the potential of phase φ2 applied to the anode of tube 905, relays RV and RV1 will not operate and motor M9 will be operated in response to the incoming signal in one direction of rotation and, when the input potential is out of phase with the potential of phase φ1 applied to the anode of tube 904 and in phase with the potential of phase φ2 applied to the anode of tube 905, relays RV and RV1 will operate and motor M9 will be operated in response to the incoming signal in the reverse direction.

Potentiometers and variacs which are driven by a motor control circuit may enter into the control of several other motor control circuits of the trainer, for example, as is the case of the true-air-speed motor control circuit disclosed in Fig. 7 which has a variac TASV2 shown in Fig. 3 associated with the synchronous generator SG driven by the shaft 910 of the compass motor control circuit of Fig. 9, three potentiometers TASP3, TASP8 and TASP9 associated with the rate of turn circuit, two potentiometers TASP6 and TASP7 associated with the indicated air speed circuit of Fig. 6, balancing potentiometer TASP10 associated with its own circuit of Fig. 7, variac TASV1 associated with the $$\frac{V}{ND}$$

circuit of Fig. 49 and potentiometers TASP4 and TASP5 associated with the R. P. M. memory circuit of Fig. 54.

As previously stated these variacs and potentiometers would all be mounted on the motor plate of the true-air-speed motor control circuit and conductors would be extended from such variacs and potentiometers to the various parts of the trainer where their controls are to be exercised. However, for the purpose of simplifying the disclosure so that all variacs or potentiometers which enter into the control of any one motor control circuit may be shown grouped together adjacent to such motor control circuit, the driving shaft of each motor control circuit has been schematically illustrated as extending across the several circuits over which the variacs and potentiometers which it drives exercise control.

Reverting to the true-air-speed motor control circuit previously taken as an example, it will be noted that the driving shaft 710 thereof is connected by the unity ratio bevel gears 712 with the shaft 713 upon which the brushes of variac TASV2 and of potentiometers TASP3 and TASP6 to TASP10, inclusive are mounted and the shaft 713 is further connected through the unity ratio bevel gears 714, shaft 715, the unity ratio bevel gears 2400, shaft 2401, unit ratio bevel gears 2600, shaft 2601 and unity ratio bevel gears 5280 to the shaft 5281 on which the brushes of the variacs TASV1 and the brushes of the potentiometers TASP4 and TASP5 are mounted.

The control yokes 1411 and 1511, the aileron control wheels 1415 and 1515, and the pairs of rudder pedals 1400 and 1401 and 1500 and 1501 at the pilot's and copilot's stations are schematically illustrative of the similar controls of an actual airplane. The yokes 1411 and 1511 for the purposes of this disclosure have been illustrated as oscillatable at their lower ends on the shaft 1418 and provided with segment gears 1412 and 1512 at their lower ends, meshed with gears 1413 and 1513 on the shaft 1414 whereby when the pilot or copilot pushes his yoke away from him to simulate a dive or pulls the yoke toward him to simulate a climb the shaft 1414 is rotated in one or the other direction and through the unity ratio bevel gears 304 and the shaft 305 rotates the brushes of the potentiometers YP1 and YP2 mounted on the shaft 305.

The aileron control wheels 1415 and 1515 for the purposes of this disclosure have been illustrated as oscillatable on axes at right angles to the axes of the yokes 1411 and 1511 and by sprocket wheels (not shown) and the sprocket chains 1416 and 1516 drive the sprocket wheels 1433 and 1533 to transmit their oscillations into an oscillatory movement of shaft 1418 whereby when the pilot or copilot rotates the aileron wheels 1415 or 1515 in simulation of the operation of the aileron wheel of an aircraft, the shaft 1418 is rotated in one or the other direction and through the unity ratio bevel gears 306 and the shaft 307 rotates the brush of the potentiometer ALP. This is the aileron wheel control employed in aircraft of the type which the trainer of this invention simulates.

The rudder control pedals 1400 and 1401 at the pilot's station are pivoted on shafts 1402 and 1407 and are connected by the rocker arms 1403, 1405, 1408 and 1410 and the links 1404 and 1409 to the shaft 1406. The rocker arms 1405 and 1410 are positioned to extend in opposite directions with respect to the shaft 1406 so that when the right pedal 1401 is depressed to simulate the movement of the rudder of an airplane for executing a right turn the shaft 1406 is rotated in one direction and when the left pedal 1400 is depressed to simulate the movement of the rudder of an airplane for executing a left turn, the shaft 1406 is rotated in the opposite direction. The rudder control pedals 1500 and 1501 at the copilot's station are similarly pivoted on shafts 1502 and 1507 and connected by the rocker arms 1503, 1505, 1508 and 1510 and the links 1504 and 1509 to the shaft 1406 so that the depression of pedal 1500 rotates shaft 1406 in one direction and the depression of pedal 1501 rotates shaft 1406 in the opposite direction. The rotation of shaft 1406 is communicated through unity ratio bevel gears 302 to shaft 303 for rotating the brush of potentiometer RP.

For applying loading to the controls for simulating the resistance to the operation of the controls which a pilot would encounter in the operation of the controls of an actual aircraft and for simulating the effect on the controls in response to the operation of the elevator, aileron and rudder trimming wheels ET, AT, RT and elevator, aileron and rudder trimming mechanisms illustrated by the boxes 1517, 1518 and 1519 are provided controllable by the elevator, aileron and rudder trimming motor control circuits illustrated by the boxes 1600, 1601 and 1602 of Fig. 16. These loading mechanisms and control circuits therefor are of the type fully disclosed in the application of Bohman el at., Serial No. 542,984 filed concurrently herewith. This application has matured into Patent No. 2,519,233 dated August 15, 1950. The loading springs of such trimming mechanisms are tensioned by cables 1605, 1606 and 1607 secured to the drum 1604 which is rotatable by the spring tensioning motor of the spring tensioning motor control circuit illustrated by the box 1603 of Fig. 16. This control circuit is also fully illustrated in the Bohman et al. application above referred to.

Each of the trimming wheels ET, AT and RT has a rheostat associated therewith, brushes of which are rotatable in response to the rotation of the associated trimming wheels. These rheostats ETR, ATR and RTR are effective to control the elevator, aileron and rudder trimming motor control circuits.

The flight recorder motor control circuit of Fig. 2 in conjunction with the compass motor control circuit of Figs. 3 and 9 controls the flight recorder 1900 positioned on the instructor's desk. The speed at which the flight recorder is advanced to record the actual ground speed of the simulated flight is under the control of the interrupter illustrated by the box 200 of Fig. 2 driven by motor M2 of the flight recorder motor control circuit of Fig. 2 and the orientation of the flight recorder to record the direction of the simulated flight course is under the control of the synchronous generator FRA driven through the gears 308, shaft 309, gears 310, reduction gear box 311 and gears 312 by motor M3 of the flight recorder control circuit of Fig. 2. For a complete disclosure of the flight recorder 1900 and the manner in which it is controlled, reference may be had to the application of W. H. T. Holden, Serial No. 621,691, filed October 11, 1945. This application has matured into Patent No. 2,486,784, dated November 1, 1949.

For simulating the effect which the encountering of rough air has upon the control of an airplane and the instruments thereof, the rough air circuit of Fig. 8 is provided. For a complete description of the apparatus of this circuit and the operation thereof, reference may be had to the application of C. E. Germanton, Serial No. 542,982 filed concurrently herewith. This application has matured into Patent No. 2,460,743, dated February 1, 1949.

The instruments on the pilot's and copilot's instrument panels illustrated in Figs. 14, 15 and 17, the instruments on the navigator's table, Fig. 27, and the instruments on the flight engineer's instrument panel are identical in appearance to the instruments which would be found on the corresponding instrument panels on an actual airplane. However, these instruments some of which in an actual airplane are constructed to be operated pneumatically are all constructed to be operated electrically. The instruments on the pilot's and copilot's panels, Figs. 14 and 15, are driven by synchronous receivers of the "autosyn" type associated therewith by which they are remotely controlled from synchronous generators or transmitters associated with motor control circuits. Some of the instruments such as, for example, the gyro or artificial horizon, have two driving autosyn receivers associated therewith, in the case of the artificial horizon instrument one of the receivers being operable from the bank motor control circuit to tip the artificial horizon bar and to operate a pointer to indicate the angle of bank simulated in the flight being conducted in the trainer and the other receiver being operable from the pitch bar motor control circuit to raise or lower the artificial horizon bar to indicate whether a level, diving or climbing flight is being simulated. An instrument of this type is fully disclosed in the Patent No. 2,381,872, granted August 14, 1945 to C. I. Baker. The instruments shown in the upper portion of Fig. 19 and certain of the instruments disclosed in Fig. 23 and mounted on the instrument panels of the instructor's desk and certain of the instruments disclosed in Fig. 28 and mounted on the flight engineer's instrument panel are also of the synchronous receiver driven type.

The apparatus employed in carrying out the invention having now been fully described, the operation of the apparatus for crew training will now be discussed.

*Preparing the trainer for operation*

Figure 26:
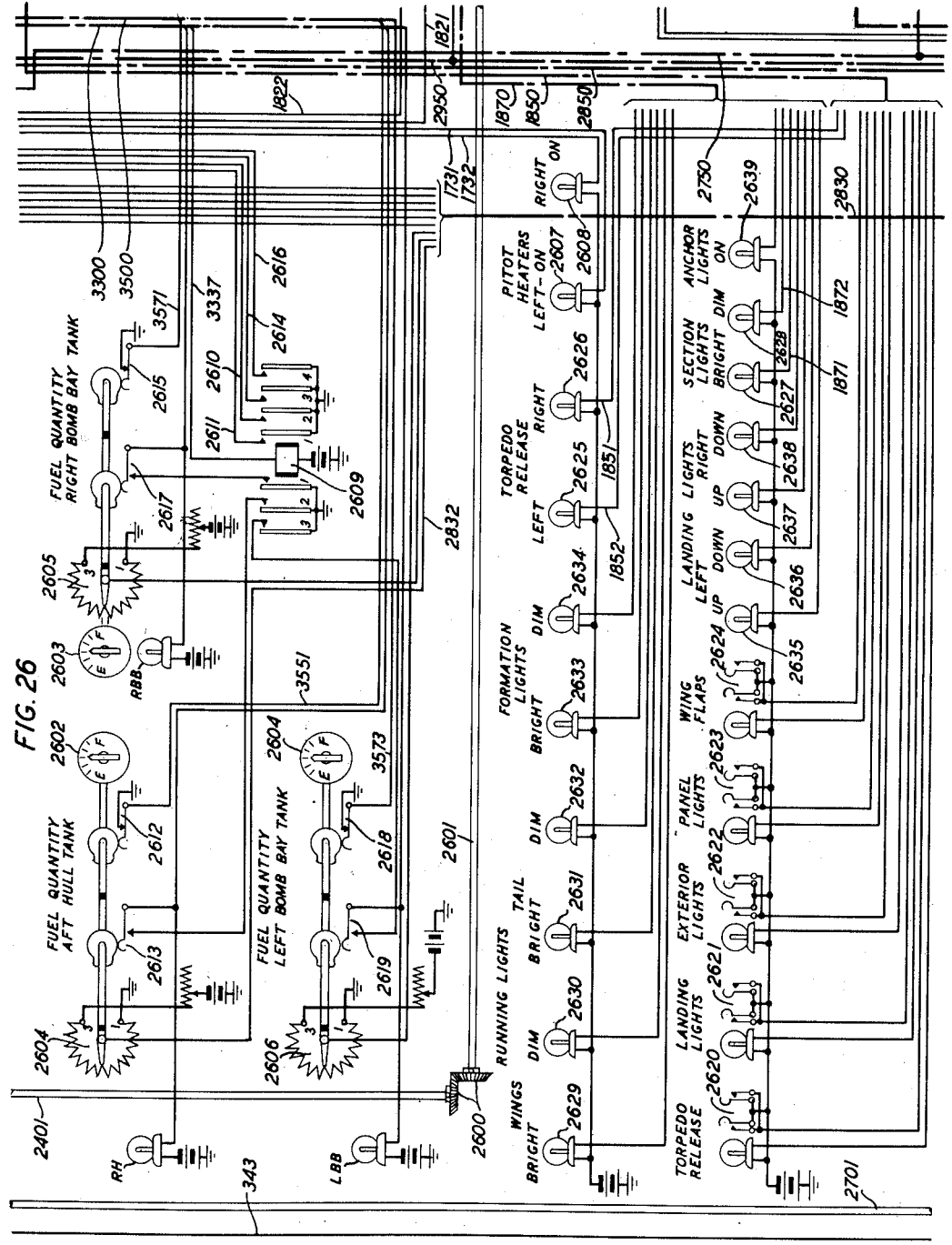

To start an operational test of the trainer with the members of the crew at their stations and the instructor at his desk, the instructor sets all controls and keys at the "off" or normal position with the following exceptions: The outside air temperature rheostat OTR is adjusted for an outside air temperature of +15° C.; the seven fuel quantity control knobs 2404 to 2407, inclusive, of Fig. 24 and 2602, 2603 and 2604 of Fig. 26 are moved to the positions in which the brushes of the rheostats controlled thereby will be set to the positions indicative of full fuel tanks; the two oil quantity controls for the right and left engines, 2408 and 2409 of Fig. 24, are moved to indicate readings of 75 at which time the brushes of the rheostats controlled thereby will be set towards their No. 3 terminals; the weight control rheostat WCR of Fig. 19 is adjusted until its associated pointer indicates a weight of 45,000 pounds for the airplane and its load; the lateral center of gravity control rheostat LCGR of Fig. 19 is adjusted until the associated pointer is at the center point of its scale; the longitudinal center of gravity control rheostat LoCGR of Fig. 19 is set at the 33 per cent point of its scale; the wind velocity control of Fig. 19 is adjusted to the zero setting on its scale at which time the brushes of the associated rheostats WVR1 and WVR2 will be set to the No. 4 terminals of their windings; the switches for disabling the right and left engines 2500R and 2500L of Fig. 25 are set in their "on" or closed positions; auxiliary power plant generator switch 2200, left generator switch 2201, right generator switch 2202, storage battery switch 2203, inverter switch 2204 of Fig. 22 are operated to their "on" or closed positions and a piece of vellum paper is placed over the chart on the top of the instructor's desk and the flight recorder 1900 of Fig. 19 is placed on the paper.

At the flight engineer's station the flight engineer closes all of the circuit breakers shown at the extreme left of Figs. 31, 32, 33 and 34 thereby closing obvious circuits for the associated relays. For example, with the battery circuit breaker 3101 closed (BS) relay 3102 is operated and establishes a circuit from ground over its inner lower front contact and conductor 3103 of cable 3100 to battery through the power battery lamp 2100, Fig. 21, at the instructor's desk, whereupon lamp 2100 lights to indicate that the battery power is on at the trainer. With the battery switch 2203 at the instructor's desk closed, a circuit is established from ground over the contacts of the switch, conductor 3104 of cable 3100, to battery through the winding of battery relay 3105 which upon operating connects ground over its lower contacts and the upper front contact of relay 3102 to the ground bus bar GB.

With ground connected to the ground bus bar GB, power on (PO) relay 3106 operates, closes an obvious circuit for power on lamp 3107 on the flight engineer's control panel and establishes a circuit from ground over its upper contacts and conductor 3108 of cable 3100 to battery through the battery lamp 2205 at the instructor's desk to indicate that battery power has been switched on.

Figure 34:
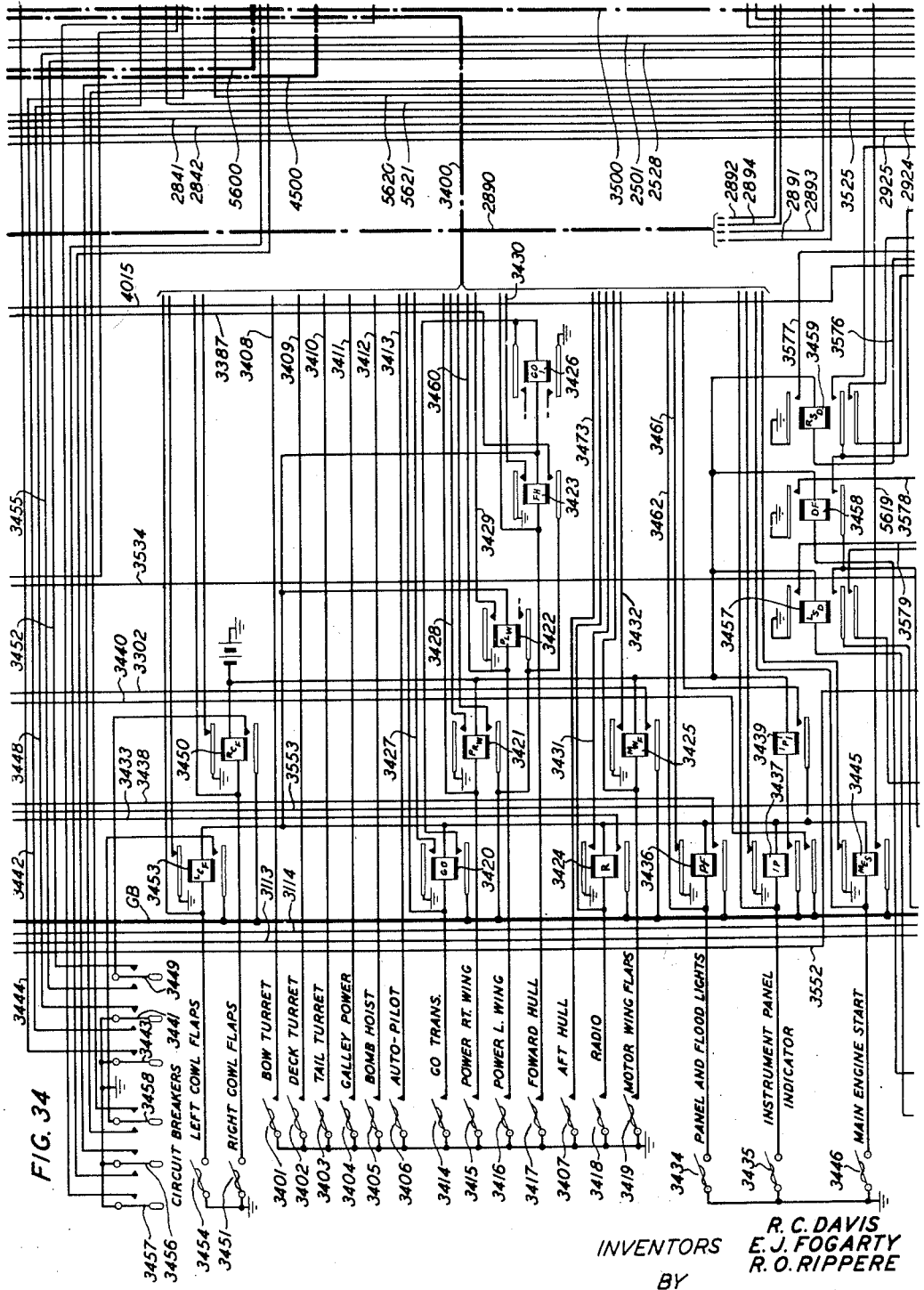

In response to the closure of circuit breakers 3401 to 3407, inclusive, of Fig. 34, circuits are established over conductors 3408 to 3413, inclusive, and 3473 of cable 3400 and thence to battery through lamps 2000 to 2005, inclusive, and lamp 2101 at the instructor's desk and these lamps light indicative of the fact that the flight engineer has operated circuit breakers which in an actual airplane would supply power to those parts of the airplane indicated by the captions applied above such lamps.

In response to the closure of circuit breakers 3414 to 3419, inclusive, relays 3420 to 3425, inclusive, are operated in turn establishing circuits from ground over the upper contacts thereof and over conductors 3427 to 3432, inclusive, of cable 3400 and thence to battery through lamps 2102, 2103, 2006, 2008, 2104 and 2105, respectively, at the instructor's desk and these lamps light indicative of the fact that the flight engineer has operated circuit breakers which in an actual airplane would supply power to those parts of the airplane indicated by the captions applied above such lamps.

GO relay 3420 in operating also causes the operation of GO1 relay 3426 which controls the application of power to the inter-communication system (not disclosed) of the trainer. Power right wing and power left wing relays 3421 and 3422 over their lower contacts control the application of power to the bombardier's station of the trainer (not disclosed). Forward hull relay 3423 over its lower contacts connects operating ground from the bus bar GB, over conductor 3387 of cable 3380 to the armatures of relays 1800, 1802 and 1803 associated with the pilot's pedestal equipment disclosed in Figs. 17 and 18. Radio relay 3424 over its lower contacts establishes a circuit from ground on bus bar GB, over conductor 3433 to battery through the winding of relay 2901 of Fig. 29 whereupon relay 2901 operates and connects battery from the battery bus bar 2902 over conductors of cable 2900 through the rheostats 5900, 5901 and 5902 to ground through the radio unit lamps 5903, the table lamp 5904 and the floor lamp 5905 at the radio operator's station on Fig. 59. Motor wing flaps relay 3425 over its lower contacts connects operating ground from bus bar GB, over conductor 3302 of cable 3380 to the lower armature of wing flaps relay 1804 at the pilot's pedestal.

In response to the closure of circuit breakers 3434 and 3435 panel and flood lights and instrument panel relays 3436 and 3437 of Fig. 34 are operated. Relay 3436 upon operating connects ground from bus bar GB over its lower contacts, conductor 3438, and to battery through the winding of relay 2903 of Fig. 29 which operates to establish circuits from battery at the battery bus bar 2902, through rheostat 2904, over the lower contacts of relay 2903 and to ground through the lights 2905 on the instrument panel of the flight engineer's station, to establish circuits from battery at the bus bar 2902 through the rheostat 2907 and over upper contacts of relay 2903 to ground through the lights 2906 on the control panels of the flight engineer's station, and to establish a circuit from battery at the bus bar 2902, through rheostat 2908 and over the uppermost contacts of relay 2903 to ground through the flood light 2909 at the flight engineer's station. The flight engineer adjusts the rheostats 2904, 2907 and 2908 until the lights attain a desired brilliancy. Relay 3437 upon operating establishes an obvious circuit for relay 3439 and connects ground from bus bar GB over its lower contacts and conductor 3440 to keys 2800 to 2803, inclusive, on the flight engineer's instrument panel, Fig. 28.

In response to the closure of circuit breaker 3201, the navigator's station relay 3202 operates in turn operating relay 3203 which in turn establishes a circuit from battery on battery bus bar 2902, over conductor 2910, over the contacts of relay 3203, conductor 3351 of cable 3350, through the rheostat 2702 and to ground through the compass lamp 2703 and through the rheostat 2704 and to ground through the instrument panel lamp 2705 for lighting these lamps at the navigator's station. In response to the closure of circuit breaker 3305 flight deck relay 3308 operates in turn operating relay 3309 which establishes a circuit from battery on battery bus bar 2902, over conductor 2911, the lower contacts of relay 3309, conductors 3352 and 3353 of cable 3350 to ground through the table lamp 2706 and to ground through the floor light 2707 and rheostat 2708 at the navigator's station. Relay 3309 also connects battery on conductor 2910 over its upper contacts and conductors 3310 and 3311 to the flight deck dome lights 3204 which light when the light switch 3205 is closed.

When state room lights relay 3312 operates in response to the closure of circuit breaker 3307, relay 3313 operates and connects battery from battery bus bar 2902, over conductor 2912, contacts of relay 3313, conductor 3314, and through passageway light 3206 which is thereupon lighted.

At the pilot's pedestal the pilot or copilot pushes in the circuit breaker buttons 1805 to 1809, inclusive, until he hears them click in the closed and locked positions and relays 1800 to 1804 are operated to prepare circuits under the control of the pilot. One of these circuits extends from ground applied as previously described to conductor 3307, thence over the front contact of relay 1803, conductor 2951 of cable 2950 and to battery through the winding of relay 2913. Relay 2913 thereupon operates and connects battery from the battery bus bar 2902, over conductors 2952 and 2953 of cable 2950, through rheostats 1701 and 1702 to ground through the panel and pedestal lights 1703 and 1704 for lighting such lights, and over conductor 2954 of cable 2950 to switches 1705 and 1706 whereby the pilot or copilot may control the lighting of their respective spotlights 1707 and 1708. The brightness of the panel lights 1703 and 1704 may be adjusted to the desired brightness by the rheostats 1701 and 1702. All lights for lighting instrument panels and stations of the trainer have now been lighted or prepared for lighting when they may be required.

The flight engineer may now operate the self-locking inverter switch 3207 thereby causing the operation of inverter relay 3208 over a circuit from battery through its winding, over the contacts of key 3207, conductor 3209 of cable 3200, to ground over the normally closed contacts of inverter key 2204 at the instructor's desk, Fig. 22. Relay 3208 upon operating establishes a circuit from ground over its upper contacts and conductor 3210 of cable 3200 through inverter lamp 2205 associated with key 2204, to battery and lamp 2206 lights to indicate to the instructor that the inverter key at the flight engineer's station has been operated. Relay 3208 at its lower contacts establishes a circuit from ground on bus bar GB to battery through the winding of relays 3211 and 3212 in parallel and over conductor 2751 extending through cable 2750 to battery through the winding of relay 1419 at the pilot's station, Fig. 14.

At its upper No. 6 contacts relay 3212 completes the connection of the source of 400-cycle 33-volt current of source 3213 to the bus bars 400C and 400G for supplying operating current to the instruments on the flight engineer's, pilot's, copilot's navigator's instrument panels. At the pilot's station the operation of relay 1419 connects the outside terminals of the stator windings of the "magnesyns" which operate the remote reading magnetic compasses 1428 and 1529, to the bus bars 400C and 400G. Over their other contacts, relays 3211 and 3212 associate the stator windings of the receiving autosyns which operate the instruments 2804 to 2811, inclusive, on the flight engineer's instrument panel, Fig. 28, with the stator windings of the transmitting autosyns associated with the motor control circuits disclosed in Figs. 36, 37, 41, 42, 46 and 57.

At this time all other lamps at the instructor's desk are unlighted since the closure of the other circuit breakers at the flight engineer's station, not hereinbefore specifically identified, has resulted in the operation of their associated relays and the opening of the lamp circuits at the instructor's desk controlled thereby. For example, the closure of circuit breaker 3303 of Fig. 33 caused the operation of the associated boarding and anchor lights relay 315 which at its upper back contact opens the circuit extending from ground thereover, over conductor 3316 of cable 3300 to battery through the boarding and anchor light 2106.

Fuel trunk selection

The flight engineer now closes switch 3501 simulating the opening of the cabin heater fuel supply valve on the fuel control panel, Fig. 35, thereby establishing a circuit from ground over conductor 3502 of cable 3500 to battery through the cabin heater fuel lamp 2409 at the instructor's desk, Fig. 24, thereby lighting such lamp. Switch 3503 is next closed to simulate the opening of the auxiliary power plant fuel supply valve thereby operating relay 3504 to establish a circuit over conductor 3505 of cable 3500 to battery through the auxiliary power plant fuel supply lamp 2410 at the instructor's desk, thereby lighting such lamp. Switches 3506 and 3507 are now moved to their ST positions to simulate the operation of the left and right engine fuel valves to control the initial supply of fuel to the main engines from the right and left wing or service tanks. With the switches in these positions LST and RST relays 3508 and 3509 are operated to connect ground to conductors 3510 and 3511 of cable 3500 thereby causing the lighting of lamps 2411 and 2412 at the instructor's desk to indicate that the left and right wing or service tanks are being used. In addition, relays 3508 and 3509 establish circuits for operating the right and left fuel relays 3519 and 3520. The circuit of relay 3519 may be traced from battery through its winding, over the inner lower contacts of relay 3509, over the normal contacts of RTP1 relay 3521, over the lower contacts of relay 3509 and conductor 3522 of cable 3500 to ground over the contacts of the right wing or service fuel quantity control switch 2416 at the instructor's desk. The circuit of relay 3520 may be traced from battery through its winding, over the inner lower contacts of relay 3508, over the normal contacts of LTP1 relay 3523, over the lower contacts of relay 3508 and conductor 3524 of cable 3500 to ground over contacts of the left wing or service fuel quantity control switch 2417 at the instructor's desk. Switches 2416 and 2417 are closed until the instructor decides to simulate the empty condition of the right and left wing or service tanks by turning the knobs 2405 and 2404.

With the left and right service tanks both full, LTP relay 3512 is operated over a circuit extending from battery through its winding over conductor 3535 of cable 3500, over closed contacts 2421 of the left wing or service fuel quantity control switch, over conductor 3534 of cable 3500, over the lower contacts of FT relay 3339, operated upon the previous closure of circuit breaker 3340, to ground on bus bar GB. A similar circuit is also closed for RTP relay 3513 extending from battery through its winding over conductor 3581 of cable 3500, over closed contacts 2422 of the right wing or service tank control switch, over conductor 3534 of cable 3500 and thence as traced to ground. Relays 3512 and 3513 both operate, relay 3512 upon operating opening at its back contact the circuit of the left fuel transfer pump dry lamp 3514 and relay 3513 upon operating opening at its back contact the circuit of the right fuel transfer pump dry lamp 3515. Over their upper front contacts relays 3512 and 3513 establish circuits for LTP1 relay 3523 and RTP1 relay 3521 extending over the inner upper front contacts of FH relay 3536 and the upper front contacts of FH1 relay 3536 to ground, as soon as FH relay 3536 operates as will be presently described. With relays 3521 and 3523 now operated, relays 3519 and 3520 are locked operated over the alternate contacts of relays 3521 and 3523 independent of the control switches at the instructor's desk.

Switch 3516 is now moved to its FH position to simulate the operation of the hull tank selector valve to select the forward hull tank whereupon relay 3536 is operated to connect ground to conductor 3537 of cable 3500 thereby causing the lighting of lamp 2423 at the instructor's desk to indicate that the forward hull tank has been selected for use. Relay 3536 upon operating establishes a circuit from battery through the winding of FH1 relay 3547, over the lower contacts of relay 3536 and conductor 3546 of cable 3500 to ground over contact 2429 of the fuel quantity forward hull tank fuel quantity control switch at the instructor's desk, which contacts are closed so long as the forward hull tank is assumed to be full. With relay 3547 now operated the previously traced circuits for relays 3521 and 3523 are completed and locking circuits are closed for relays 3512 and 3513 extending from battery through the windings of relays 3512 and 3513, over the lower contacts of relay 3547 and over conductor 3534 to ground over the lower contacts of FT relay 3339 which operated upon the closure of circuit breaker 3340.

*Fuel mixture control*

The flight engineer next operates the switches on the engine control panel disclosed in the upper left portion of Fig. 29. For starting the main engines the carburetor control switches 2914 and 2915 are operated to their direct air positions thereby establishing circuits from ground over their lower contacts and conductors 2851 and 2852 of cable 2850 for the direct carburetor air temperature indicating lamps 2206 and 2207 at the instructor's desk, Fig. 22. Mixture control switches 2916 and 2917 on the flight engineer's instrument control panel are also operated to their lower or rich positions thereby establishing circuits from ground over the upper contacts of switches 2925 and 2926, over the lower contacts of switches 2916 and 2917 and conductors 2853 and 2854 of cable 2850 for the rich mixture control indicating lamps 2208 and 2209 at the instructor's desk. Supercharger speed switches 2918 and 2919 on the flight engineer's engine control panel are also operated to their low speed positions thereby establishing circuits from ground over their upper contacts and conductors 2855 and 2856 of cable 2850 for the low speed supercharger control indicating lamps 2210 and 2211 at the instructor's desk.

*Preparation of temperature indicating instruments*

The flight engineer now operates keys 2800 to 2803, inclusive, associated with the auxiliary power plant oil temperature, the outside air temperature and the left and right engine oil temperature indicating instruments, and with ground connected to conductor 3440, as previously described, circuits are established over the contacts of such keys and conductors 2819, 2820, 2821 and 2822 to battery through the windings of relays 2920, 2921 and 2922 and 2923, respectively.

It will be recalled that battery power was applied to the trainer in response to the closure of circuit breaker 3101. With the power on, control circuits are conditioned for operating the indicators 2812, 2813, 2817 and 2818 on the flight engineer's instrument panel, Fig. 28. A circuit is established from battery through the winding of rheostat OTR, Fig. 25, to ground, and in parallel therewith from battery, through resistance 2509, over conductor 2510, through the winding of altimeter potentiometer AP5 of the altimeter motor control circuit of Fig. 12 and through resistance 1262 to ground. A circuit is also established from ground through the winding of rheostat 2301 in parallel with resistance 2302 at the instructor's desk, Fig. 23, over conductor 2304, through the winding of the auxiliary power plant oil temperature rheostat 3600 to battery. A further circuit is established from ground through the winding of the right engine oil temperature rheostat 2306 in parallel with resistance 2307 over conductor 5761 of cable 5700 through the winding of the oil temperature potentiometer 4625 associated with the engine cylinder, oil and temperature motor circuit of Fig. 46 to battery. A further circuit is established from ground through the winding of the left engine oil temperature rheostat 2310 in parallel with resistance 2311, over conductor 4601 of cable 4600, through the winding of the oil temperature potentiometer associated with the left engine cylinder oil and temperature motor control circuit similar to that for the right engine and represented by the box 4650 of Fig. 46.

With the outside air temperature rheostat OTR of Fig. 25 at the instructor's desk set for an outside air temperature of +15° C. and the brush of the potentiometer AP5 of the altimeter motor control circuit of Fig. 12 positioned to indicate that the airplane has not yet left the water, current flows over the circuit extending from the brush of rheostat OTR of Fig. 25, over the rheostat AR, through the indicating meter OT, conductor 2301 of cables 2300 and 2850, over alternate contacts of relay 2921, conductor 2823, through the air temperature indicator 2813 on the flight engineer's instrument panel, conductor 2955 of cable 2950, normal contacts of relay 1521 at the co-pilot's station, through resistance 1522, over conductor 1523 and to the brush of altimeter potentiometer AP5, Fig. 12, resulting in the operation of the indicator OT at the instructor's desk and indicator 2813 at the flight engineer's instrument panel to indicate a temperature of +15° C.

With the rheostat 2301 set at normal, the operation of relay 2920 establishes a circuit from the brush of rheostat 2301, through resistance 2803, through the auxiliary power plant oil temperature indicator APPO, conductor 2305 of cables 2300 and 2850, over the alternate contacts of relay 2920, conductor 2824, through the auxiliary power plant oil temperature indicator 2812 on the flight engineer's instrument panel and over conductor 2825 to the brush of the auxiliary power plant oil temperature potentiometer 3600 in preparation for the operation of indicator APPO at the instructor's desk and indicator 2812 at the flight engineer's instrument panel to indicate the oil temperature.

With rheostat 2306 also set at normal, the operation of relay 2923 establishes a circuit from the brush of rheostat 2306, through the right engine oil temperature indicator 2308, over conductor 2309 of cables 2300 and 2850, through the right engine oil temperature indicator 2818 on the flight engineer's instrument panel, over conductor 2826, over the alternate contacts of relay 2923 and conductor 2924 to the brush of the right engine oil temperature potentiometer 4625 in preparation for the operation of indicator 2308 at the instructor's desk and indicator 2818 on the flight engineer's instrument panel to indicate the oil temperature.

With rheostat 2310 also set at normal, the operation of relay 2922 establishes a circuit from the brush of rheostat 2310, through the left engine oil temperature indicator 2312, over conductor 2313 of cables 2300 and 2850, through the left engine oil temperature indicator 2817 on the flight engineer's instrument panel, over conductor 2827, over the alternate contacts of relay 2922 and conductor 2925 to the brush of the left engine oil temperature potentiometer (not shown) but included in the apparatus represented by the box 4650, in preparation for the operation of indicator 2312 at the instructor's desk and indicator 2817 on the flight engineer's instrument panel to indicate the oil temperature.

The flight engineer now momentarily depresses the warning light test switch 3317 and since the circuit breaker 3318 has been previously closed resulting in the operation of fuel level warning relay 3319 a circuit is established from ground on bus bar GB, over the lower contacts of relay 3319, over contacts of key 3317 and through the winding of fuel test relay 3320 to battery. Relay 3320 upon operating establishes circuits over conductors of cable 3321 to battery through the seven low level indicating lamps of the group 2828, Fig. 28; in parallel therewith over conductors of cable 3300 to battery through the low fuel indicating lamps of the group 1810 at the pilot's pedestal and also in parallel therewith over conductors of cable 3300 to battery through lamps LW, RW, FH, CH, RH, RBB and LBB associated with the fuel quantity controls, Figs. 24 and 26, at the instructor's desk. These lamps at the flight engineer's station, pilot's station and at the instructor's desk are all momentarily lighted. With relay 3319 operated a circuit is also closed over conductor 3337 of cable 3300 through the winding of relay 2609 which operates to prepare circuits for low fuel lamps.

*Fuel and oil quantity check*

The flight engineer now checks the fuel quantity by operating the selector switch 2829 associated with the fuel quantity indicator 2831 mounted on the flight engineer's instrument panel. This indicator may be of the so-called "liquidometer" type. The operation of the switch 2829 connects the indicator successively with the conductors of cable 2830 extending to the fuel quantity controls, Figs. 24 and 26, at the instructor's desk. For example, when the selector is set upon the first terminal of its arc the indicator 2831 is connected over conductor 2832 of cable 2830 to the brush of the rheostat 2604. If the aft hull tank is full as it should be at the start of the flight the brush of rheostat 2604 will have been set to the full position through the operation of the setting knob 2602 by the instructor. The indicator 2831 should show each tank to be full as the selector switch 2829 is operated from position to position.

The flight engineer then proceeds to check the oil quantity by operating the oil quantity switch down and then up. In the down position a circuit is established from battery through resistance 2834, over contacts of switch 2849, through the oil quantity indicator 2833, over other contacts of switch 2849 and conductor 2836 of cable 2830 to the brush of rheostat 2414. If the oil tank for the right engine is full as it should be at the start of the flight, the brush of rheostat 2414 will have been set to the full position through the operation of the setting knob 2408 by the instructor. In the up position of the switch 2849 a circuit is established from battery through resistance 2835, over contacts of switch 2849, through the indicator 2833, over other contacts of switch 2849 and conductor 2837 of cable 2830 to the brush of rheostat 2415. If the oil tank for the left engine is full the brush of rheostat 2415 will have been set to the full position through the operation of the setting knob 2409 by the instructor.

*Cylinder temperature indicator check*

Figure 28:
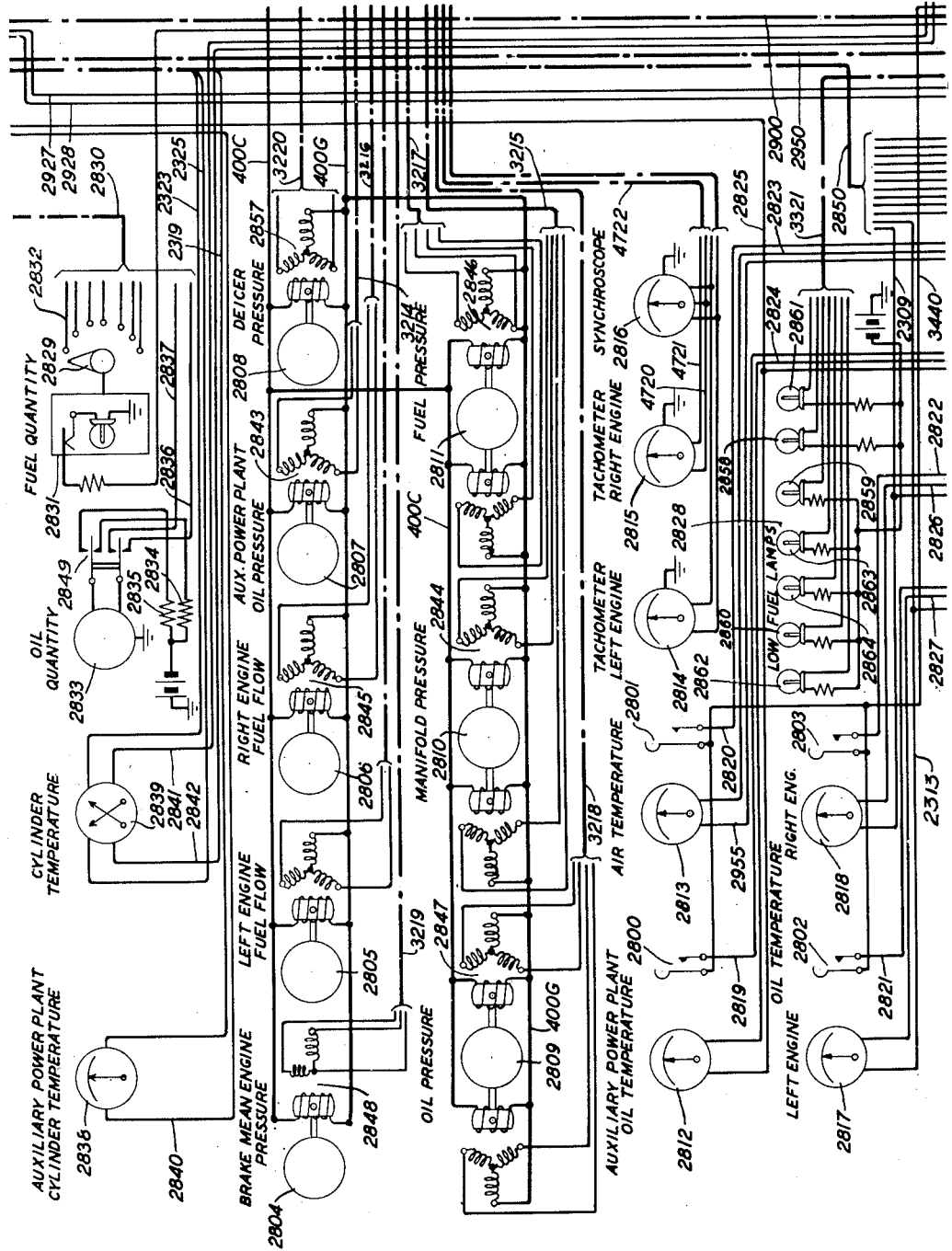
Figure 33:
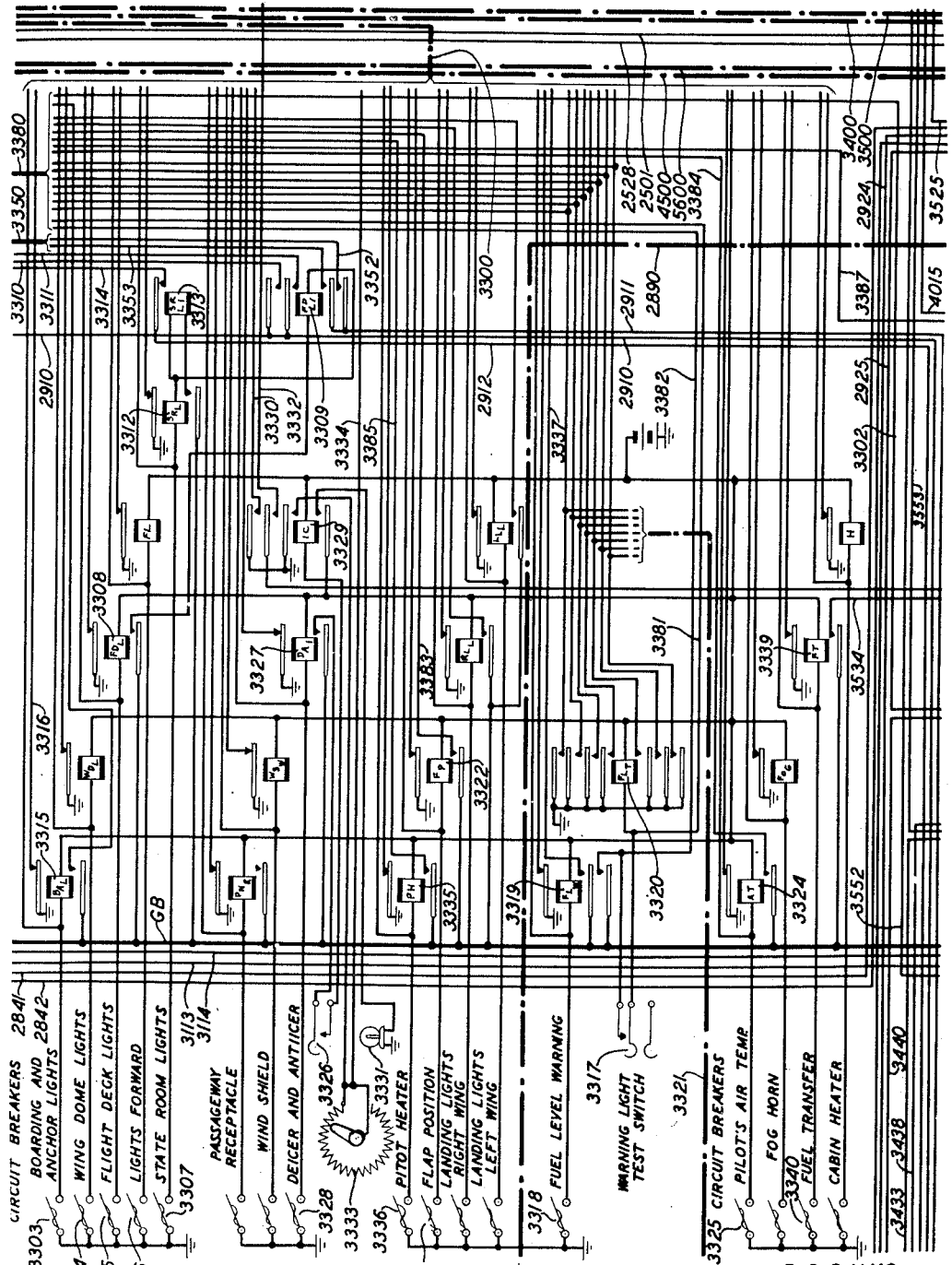

With battery power applied to the trainer in response to the closure of circuit breaker 3101 the auxiliary power plant cylinder temperature indicator 2838 and the dual indicator 2839 for indicating the cylinder temperatures of the main engines, disclosed in Fig. 28, are conditioned for operation. A circuit is established from ground through the winding of auxiliary power plant cylinder temperature rheostat 2314 at the instructor's desk, Fig. 23, over conductor 2315, through resistance 3602 and through the winding of potentiometer 3601 of the auxiliary power plant motor control circuit and through resistance 3603 to ground and through resistance 3660 to battery and ground. A circuit is also established from ground through the winding of the right engine cylinder temperature rheostat 2318 at the instructor's desk, Fig. 23, over conductor 5762 of cable 5700 to battery, and in parallel with the rheostat 2318 from ground through resistance 4628, through the winding of the right engine cylinder temperature rheostat 4626 and resistance 4627 at the right engine cylinder, oil and temperature motor control circuit of Fig. 46. A further circuit is also established from ground through the winding of left engine cylinder temperature rheostat 2322 at the instructor's desk, Fig. 23, over conductor 4662 of cable 4600, to battery at the left engine cylinder, oil and temperature motor control circuit represented by the box 4650, Fig. 46, and in parallel with the rheostat 2322 through the left engine cylinder temperature rheostat corresponding to rheostat 4626.

It being assumed that the cylinder temperature rheostats 2314, 2318 and 2322 are set at normal, a circuit is therefore effective from the brush of rheostat 2314, through resistance 2316, through the auxiliary power plant cylinder temperature indicator 2317, over conductor 2319 of cables 2300 and 2850, through the auxiliary power plant cylinder temperature indicator 2838 and over conductor 2840 to the brush of the auxiliary power plant cylinder temperature potentiometer 3601, Fig. 36, in preparation for the operation of the indicator 2317 at the instructor's desk and indicator 2838 on the flight engineer's instrument panel to indicate the cylinder temperature.

A circuit is also effective from the brush of rheostat 2318, through resistance 2320, through the right engine cylinder temperature indicator of the dual instrument 2321, over conductor 2323 of cables 2300 and 2850, through the right engine cylinder temperature indicator of dual instrument 2839 on the flight engineer's instrument panel and over conductor 2841 to the brush of the right engine cylinder temperature potentiometer 4626 of Fig. 46, and a circuit is effective from the brush of rheostat 2322, through resistance 2324, through the left engine cylinder temperature indicator of the dual instrument 2321, over conductor 2325 of cables 2300 and 2850, through the left engine cylinder temperature indicator of dual instrument 2839 and over conductor 2842 to the brush of the left engine cylinder temperature potentiometer corresponding to potentiometer 4626 and included in the apparatus indicated by the box 4650. As a result the dual indicator 2321 at the instructor's desk and the dual indicator 2839 on the flight engineer's instrument panel are prepared to indicate cylinder temperatures for the right and left engines.

*Starting the auxiliary power plant*

To start the auxiliary power plant the flight engineer first turns the voltmeter selector switch VMS, Fig. 31, to the APPG terminal thereby establishing a circuit from ground through the switch and the winding of VAPP relay 3109 to battery. Relay 3109 upon operating connects ground to conductor 3110 of cable 3100, through the auxiliary power plant voltmeter lamp 2212, Fig. 22, at the instructor's desk. The auxiliary power plant ignition switch 3111 is next operated, establishing a circuit from ground thereover, over conductor 3112 of cable 3100 to battery through the auxiliary power plant ignition-on lamp 2213, Fig. 22, at the instructor's desk. The flight engineer next operates the non-locking auxiliary power plant start key 3115 thereby operating STO1 relay 3116, which over its upper contacts establishes a circuit over conductor 3117 of cable 3100 to light the auxiliary power plant starter-on lamp 2214 at the instructor's desk, and with COAPP relay 3119 operated through the previous operation of circuit breaker 3118, to close the circuit of STO relay 3120. Relay 3120 over its upper contacts closes the heater circuit for timing tube 3121. If the flight engineer holds the start key 3115 closed for approximately 6 seconds or an interval which should be sufficient to start the auxiliary power plant, the filament of timing tube 3121 will become sufficiently heated to render the tube conducting to cause the operation of EST1 relay 3122 over its cathode-anode circuit. With relay 3122 operated a circuit is established from ground over the ignition key 3111, conductor 3113, over the lower contacts of previously operated APP relay 3504, conductor 3114, lower contacts of relay 3120, contacts of relay 3122 through the winding of EST relay 3123 to battery. Relay 3123 upon operating locks over its inner lower contacts to ground applied to conductor 3114 over the contacts of the ignition key 3111, connects ground over its inner upper contacts and conductor 3124 of cable 3100 through the auxiliary power plant starter-run lamp 2215 at the instructor's desk to indicate that the auxiliary power plant is running.

At its lower contacts relay 3123 establishes a circuit for APPG relay 3125 extending from battery through its winding, over the lower contacts of relay 3123 and over conductor 3126 of cable 3100 to ground over the contacts of auxiliary power plant generator key 2200 at the instructor's desk. With BS and VAPP relays 3102 and 3109 previously operated, relay 3125 establishes a circuit from battery through the voltmeter VM on the flight engineer's power control panel, Fig. 31, over the upper contacts of relay 3109, over the upper contacts of relay 3125, over the upper back contact of APPSW relay 3128 to ground over the inner upper contacts of relay 3125, and in parallel with voltmeter VM over conductors 3148 and 3149 of cable 3100 through voltmeter 2231 at the instructor's desk, resulting in the operation of voltmeters VM and 2231 to read 27 volts, or the potential being applied to the starter motor of the auxiliary power plant. A circuit is also closed from ground through the battery ammeter 3129 on the flight engineer's power control panel, through resistances 3134 and 3130, over conductor 3131 of cable 3100, through the battery ammeter 2216 at the instructor's desk, through rheostat 2217 and resistance 2218 to battery. These ammeters through the adjustment of the rheostat 2217 should read —25 amperes indicating that in the simulation of the starting of the auxiliary power plant a current of 25 amperes is being drawn from the storage battery by the starting motor.

The flight engineer also operates the auxiliary power plant generator key 3127 thereby causing the operation of APPSW relay 3128. Over its inner lower contacts relay 3128 establishes a circuit from ground on bus bar GB, over such contacts and conductor 3146 of cable 3100 to battery through the auxiliary power plant generator lamp 2229 at the instructor's desk. With relay 3128 operated the shunt of 100 ohms resistance 3133 is removed at its upper contacts whereby the circuit for voltmeter VM may be traced from battery therethrough over the upper contacts of relay 3109, the upper contacts of relay 3125, through resistance 3133 and the upper front contact of relay 3128 to ground on bus bar GB and in parallel with voltmeter VM over conductors 3148 and 3149 of cable 3100 through voltmeter 2231 at the instructor's desk. The voltmeter readings are now reduced to 24 volts indicating that the operation of the starting motor has reduced the storage battery voltage. Relay 3128 also establishes a shunt around resistance 3130 whereupon a circuit is effective from ground through the battery ammeter 3129, through resistance 3134, over the lower front contact of relay 3102, the lower front contact of relay 3128, the lower front contact of relay 3125, the upper front contact of relay 3105, and thence as traced through the battery ammeter 2216 and battery at the instructor's desk whereupon the ammeters 3129 and 2216 are now caused to read +13 amperes or the current input from the auxiliary power plant to the storage batery. Relay 3128 also establishes a circuit from ground over the inner upper contacts of relay 3128, through the auxiliary power plant generator ammeter 3135, inner lower contacts of relay 3125, conductor 3136 of cable 3100, through the auxiliary power plant generator ammeter 2297 at the instructor's desk, through resistances 2298 and 2219 and rheostat 2220 to battery, resulting in the operation of ammeters 3135 and 2217 to read +55 amperes or the simulated output of the auxiliary power plant generator.

Relay 3123 also at its upper contacts establishes a circuit from ground thereover, over conductor 3132 through the winding of start relay 3604 of the auxiliary engine oil pressure, cylinder and oil temperature motor control circuit of Fig. 36. The field winding of motor 3605 is energized by current impressed thereon from the phase $\varphi 1$ portion of secondary winding of the power transformer T36 and, with relay 3604 energized, the rotor circuit of motor 3605 is now energized over a circuit from ground through the rotor and resistance 3606, over the normally closed contacts of limit switch 3607, over the back contact of relay 3608, the upper back contact of relay 3609, the lower No. 2 contacts of relay 3604, over the back contact of DOP relay 3610 and through the left phase φ2 portion of the secondary winding of transformer T36. Motor 3605 now operates in such a direction as, through the reduction gear box 3611, to rotate the shaft 3612 in a counter-clockwise direction to rotate the rotor of the autosyn transmitter 3613 and the operating cams of the limit switch 3607 and 3615 and the cam of intermediate switch 3614. The stator of autosyn 3613 is energized from the 400-cycle 33-volt source of alternating current, two of the stator windings of which are coupled over the two conductors of cable 3616 with the stator winding of receiving autosyn 2356 at the instructor's desk and over a branch of such cable, the upper Nos. 2 and 3 contacts of relay 3212 and the conductors of cable 3214 with two of the stator windings of receiving autosyn 2843 at the flight engineer's station. The third windings of these autosyns are interconnected through their connection to the grounded supply leads from the 400-cycle source of current. The rotors of the receiving autosyns 2356 and 2843 are also energized as previously described from the 400-cycle bus bars 400C and 400G.

After an interval of approximately 8 seconds the rotor of transmitting autosyn 3613 will have rotated and caused the synchronous rotation of the rotors of receiving autosyns 2356 and 2843 to move the pointers of the associated oil pressure indicators 2357 and 2807 to indicate a simulated oil pressure of approximately 200 pounds at the auxiliary power plant.

Start relay 3604 upon operating also establishes a circuit from ground over its upper No. 1 part contact over the contacts of limit switch 3617 through the left shaded pole winding 3618 of motor 3620 to ground. Since the main stator winding 3619 of the motor is energized from the 115-volt, 60-cycle source, motor 3620 which is of the reversible shaded pole type, through the reduction gear box 3621, drives shaft 3622 in a clockwise direction thereby moving the brushes of rheostats 3600 and 3601 toward their No. 1 terminals. After an interval of approximately two minutes, the brushes will have been moved to an extent sufficient to increase the current flowing over conductor 2825 through the auxiliary power plant oil temperature indicator APPO at the instructor's desk and indicator 2812 at the engineer's instrument panel whereby such indicators indicate a rise in the oil temperature from +15° C. to +25° C. and to increase the current flowing over conductor 2840 through the auxiliary power plant cylinder temperature indicator 2317 at the instructor's desk and indicator 2838 at the engineer's instrument panel whereby such indicators indicate a rise in the cylinder temperature from +15° C. to +100° C. After the two-minute interval, the temperature switch TC closes to establish a circuit from ground over the upper No. 2 contacts of relay 3604, over the contacts of switch TC through the winding of T relay 3608 to battery. The motor 3620 continues in operation until the limit switch 3617 is operated by the cam on the shaft 3622 to open the circuit through the shaded pole winding 3618 whereupon the motor comes to rest.

Relay 3608 upon operating locks over its upper contacts to ground over the upper contacts of relay 3604, opens the rotor circuit previously traced for motor 3605 and establishes a new rotor circuit which may be traced from ground through the rotor, through the resistance 3606, the lower front contact of relay 3608, the lower back contact of NP relay 3609, the upper back contact of IOP relay 3623, through resistance 3624 and through the right phase φ1 portion of the secondary winding of transformer T36. Motor 3605 is now driven at a slower speed because of the inclusion of resistance 3624 in its rotor circuit and in the reverse direction whereupon the reverse operation of the rotor of autosyn transmitter 3613 causes the oil pressure indicators 2357 and 2807 at the instructor's desk and the engineer's instrument panel to indicate a decreasing oil pressure until after about two minutes such indicators will indicate an oil pressure of about 60 pounds. At this time intermediate switch 3614 is operated by the motor 3605 and, since at this time relay 3608 is operated, a circuit is established from ground over the upper contacts of relay 3604, over the upper contacts of relay 3608, over the contacts of switch 3614 and through the winding of normal pressure relay 3609 to battery. Relay 3609 upon operating locks over its lower front contact under the control of start relay 3604 and at its lower back contact opens the rotor circuit of motor 3605 which comes to rest. The simulated starting and running of the auxiliary power plant is now completed and the simulated oil pressure, oil temperature and cylinder temperature thereof under normal running conditions are indicated at both the instructor's desk and at the flight engineer's instrument panel.

*Starting the main engines*

The pilot preparatory to starting the main engines operates the instrument light switch 1711, Fig. 17, thereby operating relay 1712 to light the fluorescent instrument panel lights 1713 and operates the lower and upper panel light rheostats 1701 and 1702 to the "on" position and then adjusts them to light the lamps 1703 and 1704 to the desired brightness and then checks to see that all other light switches are in the "off" positions. The pilot then momentarily operates the fuel light test switch 1811 thereby establishing a circuit from battery through the winding of FLT relay 3320, over conductor 3381 of cable 3380, over the contacts of key 1811, conductor 3382 of cable 3380 and over the lower contacts of FLW relay 3319 to ground on bus bar GB. Relay 3320 thereupon operates and, in the manner previously described in connection with the operation of the flight engineer's warning light test switch 3317, lights all of the low level fuel lamps 1810 on the pilot's pedestal and the low fuel lamps 2828 at the flight engineer's station.

At the copilot's instrument panel the flap and air indicator keys 1714 and 1715 are operated to their "on" positions. The operation of key 1714 establishes a circuit from ground on bus bar GB, over the lower contacts of FP relay 3322 operated through the closure of circuit breaker 3323, conductor 3383 of cable 3380, contacts of key 1714 and over conductor 1716 through the winding of relay 1524 to battery for rendering the wing flaps indicator 1525 operable. The operation of key 1715 establishes a circuit from ground on bus bar GB, over the lower contacts of AT relay 3324 operated in response to the closure of circuit breaker 3325, over conductor 3384 of cable 3380, contacts of key 1715 and over conductor 1717 through the winding of relay 1521 to battery for connecting the pilot's air temperature indicator 1526 in place of resistance 1522 in the circuit previously traced.

Before simulating the starting of the main engines the pilot places the right and left propeller governor controls 3012 and 3013 of the overhead equipment adjacent the pilot's and copilot's stations, in the maximum R. P. M. increase positions thereby moving the similar overhead equipment (not shown) adjacent to the flight engineer's station into the same positions; pushes the ignition switch 3014 in; closes the right and left ignition keys 3015 and 3016 to the BOTH closed positions as indicated in Fig. 30; operates the right and left throttles to their extreme lower or closed positions in which the brushes of the rheostats 3017R, 3018R, 3019R controlled by the right engine throttle and the brushes of the rheostats 3017L, 3018L and 3019L controlled by the left engine throttle are all moved to the lower C terminals of their windings, and whereby the throttles (not shown) positioned adjacent to the flight engineer's station are simultaneously moved; checks to see that the right and left propeller control safety switches 1812 and 1813 are closed thereby operating the associated relays 1814 and 1815; operates the right and left propeller control switches 1816 and 1817 to their upper or automatic positions and checks to see that the switches 1818 and 1819 are in their "on" positions.

With the ignition key 3016 operated to the BOTH position, indicating that both the right and left magnetos are to be used in starting the right engine, circuits over conductors 5601 and 5602 of cable 5600 to the left terminals of the windings of the right and left ignition relays 5603 and 5604 associated with the right engine control circuit of Fig. 56 are opened thereby removing shunts from such relays which thereupon operate. Relay 5603 operates over a circuit from battery through resistance 5605 to ground through its winding and relay 5604 operates over a circuit from battery through resistance 5606 to ground through its winding. With these relays both operated a circuit is established from ground over their inner upper contacts, conductor 5607 of cable 5600 to battery through the right engine ignition lamp 2518 at the instructor's desk which thereupon lights to indicate that an ignition circuit has been established for the right engine. With ignition key 3015 operated to the BOTH position circuits are closed over conductors 4501 and 4502 of cable 4500 whereupon relays of the engine control circuit for the left engine corresponding to relays 5603 and 5604 are operated to in turn close a circuit over conductor 4507 of cable 4500 for lighting the left engine ignition lamp 2519 at the instructor's desk which thereupon lights to indicate that an ignition circuit has been established for the left engine.

With the right propeller control switch 1816 closed in its upper or automatic position a circuit is established from ground over conductor 3397, over the lower contacts of relay 1814, switch 1818, switch 1816, conductor 5608 of cable 5600 to battery through the winding of AUT relay 5609. Relay 5609 upon operating removes ground at its upper contact from conductor 4321 thereby releasing relay 4320 in the R. P. M. memory motor control circuit, Fig. 43, for the right engine for permitting the motor M43 of that circuit to be subsequently operated and at its lower back contact opens the circuit of relay 5610 which operated when battery power was connected to the trainer by the flight engineer, whereupon relay 5610 now releases and over its lower No. 1 back contact connects ground to conductor 5611 of cable 5600 thereby completing the circuit through the right propeller-automatic lamp 2107 at the instructor's desk, such lamp lighting to indicate that the propeller pitch control for the right engine has been placed on the automatic setting. With the left propeller control switch 1817 operated to the upper or automatic position relays similar to relays 5609 and 5610 are controlled in the engine control circuit for the left engine whereby the R. P. M. memory motor control circuit for the left engine is conditioned for operation and a circuit is established over conductor 4511 of cable 4500 for lighting the left propeller-automatic lamp 2007 at the instructor's desk, Fig. 20.

The flight engineer, to simulate the starting of the right engine, now operates the right engine start key 3441 to its left or "on" position for approximately twelve seconds thereby establishing a circuit from ground over the left contact of key 3441, conductor 3442 to battery through the winding of STO1 relay 5612. Relay 5612 thereupon operates establishing a circuit over its upper contacts and conductor 5613 of cable 5600 to battery through the right engine starter-on lamp 2221 at the instructor's desk which remains lighed so long as the key 3441 is held in the start position to indicate that the simulated inertia starter is being brought up to the required speed. Relay 5612 also establishes a circuit for STO relay 5614 which may be traced from battery through its winding over the lower contacts of relay 5612, conductor 5619, over the front contact of main engine start relay 3445 to ground on bus bar GB, relay 3445 being operated in response to the closure of circuit breaker 3446 by the flight engineer. Relay 5614 upon operating closes the filament heating circuit for the timing tube TT. After an interval of approximately twelve seconds the filament will become sufficiently heated to cause the tube TT to conduct and establish the circuit of STW relay 5615 over a circuit from anode battery over the anode-cathode path through the tube, through the winding of relay 5615 to ground at the back contact of EST relay 5616.

After the expiration of approximately twelve seconds the flight engineer operates the key 3441 to its right or mesh position and at the same time operates the right engine priming key 3443, it being assumed that the starting of a cold engine is being simulated. The operation of key 3443 establishes a circuit from ground thereover, over conductor 3444 and through the winding of PRM1 relay 5617. Relay 5617 upon operating establishes a circuit from ground over its upper contacts, conductor 5618 of cable 5600 to the right engine primer lamp 2222 to battery for indicating to the instructor that the primer switch for the right engine has been closed. Relay 5617 also establishes a circuit from ground over conductor 5619, over its lower contacts, over conductor 5620, the lower contacts of right fuel relay 3519 and over conductor 5621 through the winding of PRM relay 5622 to battery thereby operating relay 5622.

Relay 5622 upon operating establishes a control circuit for the right engine fuel flow motor control circuit of Fig. 37 since fuel will be consumed in priming the engine and in operating it under the control of the inertia starter. This circuit may be traced from a point between resistances 5645 and 5646, which are connected in series between the bus bar $40\varphi1$ and ground, over the lower front contact of PRM relay 5622, over conductor 5647, through resistance 4802 and conductor 4803 to the input of amplifier tube 3700 of the fuel flow motor control circuit. This potential is amplified by tube 3700, is rectified by tube 3703, and is impressed upon the control grids of tubes 3704 and 3705. As a result tube 3705 fires but tube 3704 does not and the RV and RV1 relays 3706 and 3707 do not operate and the motor M37 is operated to rotate shaft 3710 at a slow speed in one direction of rotation and through the unity ratio bevel gears 4800 to rotate the shaft 4801 in such a direction as to move the brush of the potentiometer RFFP1 associated with such shaft from the No. 1 toward the No. 3 terminal of its winding. As soon as the brush of the balancing potentiometer RFFP1 has moved to a position such that the potential of phase $\varphi2$ supplied thereover balances the control potential of phase $\varphi1$ the motor M37 comes to rest. Potential of phase $\varphi2$ is supplied from bus bar $40\varphi2$ over resistance 4804 through the winding of potentiometer RFFP1 to ground. The movement of shaft 3710 will be only slight at this time as the rate of fuel consumption until the engine starts running is at a very slow rate.

The shaft 3710 upon rotating rotates the rotor of transmitting autosyn 3725, the rotor winding of which is energized from the 400-cycle bus bars 400C and 400G and the stator windings of which are connected over conductors of cable 3726 with the stator windings of the receiving autosyn 2328 which drives the right unit of the dual fuel flow indicator 2329 at the instructor's desk. The rotor winding of the receiving autosyn is energized from the 400C and 400G bus bars. The stator windings of the transmitting autosyn 3725 are also connected over a branch of cable 3726, over the lower Nos. 2 and 3 contacts of relay 3212 and conductors of cable 3216 with the stator windings of the receiving autosyn 2845 which drives the fuel flow indicator 2806 mounted on the flight engineer's instrument panel, Fig. 28. The rotor winding of this autosyn is energized from the 400C and 400G bus bars. These indicators 2329 and 2806 now indicate the rate of fuel consumption during the time that the driving of the right engine by the inertia starter is being simulated.

With key 3441 in the mesh position a circuit is established from ground over the right contacts of key 3441, conductor 3448 and through the winding of STM2 relay 5623 to battery whereupon relay 5623 operates and connects ground over its upper contacts and conductor 5624 of cable 5600 to battery through the right engine starter mesh indicating lamp 2223 at the instructor's desk. With relay 5615 operated after the expiration of the twelve-second interval, relay 5623 also establishes a circuit for STM1 relay 5625 over a circuit from battery through its winding, over the contacts of relay 5615 and the lower contacts of relay 5623 to ground on conductor 5619. Upon the operation of key 3441 from the start position to the mesh position the circuit of STO1 relay 5612 is opened and this relay releases STO relay 5614. The release of relay 5614 opens the filament heating circuit of tube TT and after the expiration of approximately twenty seconds tube TT ceases to conduct and STW relay 5615 releases, if it has not previously released.

Relay 5625 establishes an obvious circuit over its lower No. 3 contacts for STM relay 5626. However, prior to its operation a circuit was effective for starting the motor of the manifold pressure motor control circuit of Fig. 41 extending from ground through resistance 5202, through potentiometer AP3 driven from the altimeter motor control circuit (the winding of which potentiometer is energized over a circuit from ground through resistance 5202, through resistance 5203 and conductor 5204 from the bus bar $40\varphi1$), thence over conductor 5205, over the upper No. 2 back contact of FL relay 5641, the upper back contact of STM relay 5626, the lower back contact of EST1 relay 5628 to the control conductor 5642 of the manifold pressure motor control circuit of Fig. 41. The potential applied to conductor 5642 is amplified by an amplifier tube (not shown) but similar to tube 900 of Fig. 9, is rectified by a tube (not shown) but similar to tube 903 of Fig. 9 and is impressed upon the control grids of motor control tubes (not shown) but similar to tubes 904 and 905 of Fig. 9. As a result the tube corresponding to tube 905 fires but the tube corresponding to tube 904 does not and the motor (not shown) is operated to rotate shaft 4110 at a slow speed in one direction of rotation and through the unity ratio bevel gears 5200 to rotate the shaft 5201 in such a direction as to move the brushes of the potentiometers controlled thereby from the No. 1 toward the No. 3 terminals of their windings. As soon as the brush of balancing potentiometer RMP5 has moved to a position such that the potential of phase $\varphi2$ applied through resistance 5206 to conductor 5642 from the brush of potentiometer RMP5 balances the control potential of phase $\varphi1$ applied to conductor 5642 the motor of the manifold pressure motor control circuit will stop. Potential of phase $\varphi2$ is applied to the winding of potentiometer RMP5 over a circuit from ground through resistance 5207 through the potentiometer winding and over conductor 5208 to the bus bar $40\varphi2$. The potentiometers controlled by shaft 5201 will now be adjusted to positions commensurate with the barometric pressure at sea level.

Rotation of shaft 4110 has also resulted in the movement of the rotor winding of the autosyn transmitter 4125, the rotor winding of which is energized from the 33-volt, 400-cycle source over the 400C and 400G bus bars and whose stator windings are connected over conductors of cable 4126 with the stator windings of the receiving autosyn 2326 associated with the dual manifold pressure indicator 2327 at the instructor's desk, the rotor winding of which is also energized from the bus bars 400C and 400G over another branch of cable 4126, over the lower Nos. 1 and 2 contacts of relay 3211, conductors of cable 3215, with the stator windings of the receiving autosyn 1725 associated with the dual manifold pressure indicator 1724 on the pilot's pedestal and with the stator windings of the receiving autosyn 2844 associated with the dual manifold pressure indicator 2810 on the flight engineer's instrument panel. The right portions of these dual indicators are thus operated to indicate a barometric sea level pressure of 30 inches of mercury.

As soon as the STM relay 5626 operates, the circuit previously traced for applying potential of phase $\varphi1$ to the control conductor 5642 of the manifold pressure motor control circuit is opened and a new circuit is established which extends from conductor 5642 over the lower No. 3 back contact of EST1 relay 5628, over the upper front contact of STM relay 5626, conductor 5643, over the throttle controlled rheostat 3018R to the $40\varphi1$ bus bar. The winding of rheostat 3018R is energized over a circuit extending from ground therethrough, through resistance 3022R and over conductor 3923 from the bus bar 40φ1. The potential now applied to conductor 5642 is somewhat less than formerly applied due to the fact that the engine is now assumed to be turning over under the control of the inertia starter and will therefore produce a suction on its manifold to reduce the manifold pressure slightly below the 30-inch barometric pressure. The amount of the reduction of the pressure will depend upon the setting of the throttle for the right engine.

When the MAN relay 5610 released as previously described in response to the setting of the propeller control for automatic operation, a circuit was established from a point between resistances 5648 and 5649, over the upper back contact of ESTA relay 5639, over the upper No. 1 back contact of MAN relay 5610, over conductor 5650 through resistance 5322 to control conductor 4323 of the R. P. M. memory motor control circuit for the right engine. Potential from the bus bar 40φ2 being supplied to the potential divider comprising resistances 5648 and 5649, potential of phase φ2 is applied to control conductor 4323 and as a consequence the motor M43 is operated to rotate shaft 4310 at a slow speed until the cam carried thereby operates the L1 limit switch 4311 to open the circuit of motor M43 at which time through the unity ratio bevel gears 5400 and shaft 5401 the brush of potentiometer RRMP6 associated therewith will be driven to the No. 1 terminal end of its winding.

The R. P. M. memory motor unit is a circuit arrangement whereby by means of the potentiometer RRMP6 controlled thereby the potential from the propeller potentiometer RPP1, manifold pressure potentiometer RMP2 and true air speed potentiometer TASP4 is maintained precisely equal to the potential in the R. P. M. balancing potentiometer RRP10 so that at the instant of throwover from automatic to manual control of the propeller the R. P. M. motor control circuit of Fig. 40 will not cause any change in the setting of its associated potentiometers. This simulates the action in an actual aircraft since at the instant of the throw-over the conditions affecting the R. P. M. are not changed and the R. P. M. remains the same. Subsequent changes in the propeller pitch, manifold pressure or true air speed of course will affect the R. P. M.

When relay 5626 later operates a circuit is established from the bus bar 40φ1, over its inner upper contacts, conductor 5644, through the winding of the right propeller pitch potentiometer RPP1 and resistance 5402 to ground. A potential derived therefrom is applied through the winding of the right engine manifold potentiometer RMP2 and resistance 5403 to ground. A further potential derived from the latter potentiometer is applied through the winding of the true air speed potentiometer TASP4 and through resistance 5404 to ground from which latter potentiometer a potential is derived and applied through the winding of the R. P. M. memory potentiometer RRMP6 and a potential derived from the latter potentiometer is applied over conductor 5405, over the lower No. 2 back contact of relay 5610, conductor 4325, through resistance 4324 to control conductor 4323 of the R. P. M. memory motor control circuit of Fig. 43. The motor control circuit is thus operated to rotate the shafts 4310 and 5401 until the brush of potentiometer RRMP6 is adjusted to render the potential of phase φ1 applied thereover, as just described, equal to the potential of phase φ2 applied to the control conductor 4323 over the brush of the balancing potentiometer RRP10 of the R. P. M. motor unit. This latter potential is applied from the brush of potentiometer RRP10, over conductor 5656, over the upper front contact of ESTA relay 5639, over the upper No. 1 back contact of MAN relay 5610, conductor 5650, through resistance 4322 to control conductor 4323.

Relay 5625 also upon operating connects 40-volt phase φ1 current from bus bar 40φ1 over its upper No. 1 contacts to conductor 5627, through the winding of manifold pressure potentiometer RMP4 of Fig. 51 and through resistances 5102 and 5103 in series to ground and in parallel with such resistances over conductor 5104, through the right engine throttle rheostat 3017R in the closed or low resistance position, Fig. 30, and over conductor 5105 through resistance 5106 to ground. From the junction point between resistances 5102 and 5103 of Fig. 51 conductor 5107 extends over the upper No. 1 back contact of EST1 relay 5628, over conductor 5629 to the upper terminal of the primary winding of transformer T40 of the R. P. M. motor control circuit of Fig. 40. Potential from the bus bar 40φ1 is also applied over the upper No. 1 contacts of relay 5625, through resistance 5630, through the winding of the right propeller governor rheostat 3012, Fig. 30, in the maximum R. P. M. or low resistance position and conductor 3021 to the lower terminal of the primary winding of transformer T40 of the R. P. M. motor control circuit of Fig. 40.

Potential of phase φ1 is therefore connected to both terminals of the primary winding of transformer T40 but these potentials being of different value will cause current to flow through the primary winding of transformer T40 with the result that during the positive half cycles of the current positive potential will be applied to the control grid of tube VT40. Biasing potential is applied to the control grid of tube VT40 over the secondary winding of transformer T40, through the bias adjusting rheostat R40 and through the diode rectifier tube VT41 and the left secondary winding of power transformer T41 to ground, rheostat R40 being connected through resistance 4000 in series with the left secondary winding of transformer T41 across the cathode-anode path through the tube VT41. The filaments of tubes VT40 and VT41 are heated by current applied from the middle secondary winding of transformer T41 and anode potential of phase φ1 is supplied through retard coil 4005 through the winding of the MPC relay 4002 in parallel with the resistance 4003 from 115-volt phase φ1 bus bar 115 φ1. With the control potential of phase φ1 applied to the primary winding of transformer T40, potential of phase φ1 is impressed upon the control grid of tube VT40 and with potential of the same phase φ1 applied to its anode, tube VT40 becomes conducting during each positive half cycle and operates relay 4002 to short-circuit resistance 4000 and to thereby increase the positive grid bias of tube VT40 to insure that relay 4002 will be held operated so long as tube VT40 continues to conduct in response to the control potential.

With relay 4002 operated potential of phase φ1 connected over the upper No. 1 contacts of relay 5625, conductor 5627, through the winding of manifold pressure potentiometer RMP4 of Fig. 51, through resistance 5102, conductor 5107, the upper No. 1 back contact of relay 5628 and conductor 5629 is further connected over the upper front contact of relay 4002, over conductor 4004, through resistance 5631 and resistances 5632, 5633 and 5634 in series to ground and in parallel with the latter resistances over the upper front contacts of IGR and IGL relays 5603 and 5604, over the upper No. 2 back contact of MAN relay 5610, the upper front contact of PRM relay 5622, over the upper No. 2 front contact of STM1 relay 5625, conductor 5635, through resistance 5108 and conductor 4001 to the R. P. M. motor control circuit for the right engine, Fig. 40.

In response to the potential of phase φ1 applied to conductor 4001, this potential is amplified by an amplifier tube (not shown) but similar to tube 900 of Fig. 9, is rectified by a tube (not shown) but similar to tube 903 of Fig. 9, and is impressed upon the control grids of motor control tubes (not shown) but similar to tubes 904 and 905 of Fig. 9. As a result the tube corresponding to tube 905 becomes conducting but the tube corresponding to tube 904 does not and the RV and RV1 relays 4006 and 4007 do not operate and the motor (not shown) is operated to rotate shaft 4010 at a slow speed in one direction of rotation and through the unity ratio bevel gears 5100 to rotate the shaft 5101 in such a direction as to move the brushes of the potentiometers from the No. 1 terminals of their windings towards the No. 3 terminals thereof. As soon as the brush of balancing potentiometer RRP10 has moved to a position such that the potential of phase φ2 applied therefrom to conductor 4001 through resistance 5109 as derived from the potentiometer, whose winding is connected in a circuit from ground through such winding and resistance 5110 to the 40-volt 60-cycle bus bar 40φ2, balances the signal potential of phase φ1 applied to conductor 4001 as previously described, the motor of the R. P. M. motor control circuit stops. The potentiometers controlled by shaft 5101 will now be adjusted to positions commensurate with the simulated speed at which the right engine is being turned over by the inertia starter.

As soon as shaft 4010 leaves its normal position the L1 limit switch 4008 closes its right contacts thereby causing the operation of ON relay 4009. Relay 4009 upon operating establishes a circuit from ground over its upper No. 4 contacts and conductor 4014 through the winding of relay 4700 and the field winding of motor 4701 of the tachometer motor control circuit of Fig. 47 to battery B47. The rotor of motor 4701 is energized by 230-volt current applied from bus bar 115φ1 through the rotor circuit, through resistance 4717, through the next to left secondary winding of transformer 4707, across the cathode-anode path through the gas-filled tube 4705 to the bus bar 115φ2. The tube 4705 rectifies this current so that in response to each firing of the tube a unidirectional impulse of current is transmitted through the rotor winding of the motor. The connections from the bus bars 115φ1 and 115φ2 to the lower rotor brush of motor 4701 and to the anode of tube 4705 are such that the motor will run in such a direction as to cause tachometer driven by the tachometer generator RTG coupled to the motor shaft of the motor 4701 to give positive indications.

For controlling the motor 4701 the gas-filled tube 4705 is provided, the filament of which is heated by alternating current supplied from the next to left secondary winding of power transformer 4704 and the anode of which is supplied with anode potential from the bus bar 115φ2 as previously described. Alternating current biasing potential is applied between the grid and cathode of tube 4705 over a circuit which extends from the grid through resistance 4706 and through resistance 4707 which has an alternating current potential with a leading phase angle impressed upon it by the condenser 4708, through the left secondary winding of transformer 4704, through condensers 4709 and 4710 to the midpoint of the next to left secondary winding of transformer 4704, thence through the filament of tube 4705 which serves as a cathode.

For producing the direct current potential which is superposed on the alternating biasing potential of tube 4705, the dual rectifier tube 4711 is provided having its filament heated by alternating current supplied from the next to right secondary winding of transformer 4704. The primary winding of transformer 4704 is energized from the bus bar 115φ1 in parallel with the primary winding of the biasing transformer 4712 for the tube 4755 of the left engine tachometer motor control circuit and in parallel with the primary winding of the constant voltage transformer 4703. The winding of potentiometer RPP5 is connected through resistance 4702 to the secondary winding of the constant voltage transformer 4703 and the brush of such potentiometer is connected through the primary winding of input transformer 4714 to ground whereby the movement of the brush of the potentiometer by the rotational movement of shaft 5101 driven by the motor of the R. P. M. motor control circuit is instrumental in deriving a potential from the potential impressed upon its winding and impressing such derived potential upon the primary winding of transformer 4714.

The secondary winding of transformer 4714 is connected over a circuit extending from the left cathode of rectifier tube 4711 through such secondary winding, over the contacts of relay 4700, through the right portion of the winding of rheostat 4713 and resistance 4715 in series to the left anode of tube 4711. Tube 4711 thus rectifies the input control potential. This rectified potential is regulated by the adjustment of the slider of rheostat 4713. A potential derived from this potential is superimposed upon the alternating current grid biasing potential and applied between the cathode and grid of tube 4705 over a path which may be traced from the grid of the tube, through resistances 4706 and 4707, through the right portion of the winding of rheostat 4713, through resistances 4715 and 4716, through the rotor circuit of motor 4701, through resistance 4717 to the mid-point of the next to left secondary winding of transformer 4704 and to the filament or cathode of tube 4705.

As the brush of potentiometer RRP5 moves in response to the motor of the R. P. M. motor control circuit a potential is impressed upon the secondary winding of transformer 4714. This potential is rectified by tube 4711 and impressed as a grid control potential between the grid and cathode of tube 4705 superimposed upon the alternating current biasing potential impressed between the grid and cathode of such tube. At the same time alternating current of phase φ2 is applied as an anode potential upon the anode of tube 4705 as previously described. The alternating current grid potential and the resultant alternating current grid biasing potential are opposite and leading in phase with respect to the anode potential. Thus during each positive half cycle of the anode potential the tube 4705 will fire when the resultant biasing potential rises to an amount which is equal to or slightly in excess of the critical grid potential.

Each time that the tube 4705 fires an impulse of current flows through the rotor circuit of motor 4701 over a path which may be traced from the lower brush of the motor to the bus bar 115φ1 returning over bus bar 115φ2 through choke coil 4718 across the anode-cathode path through tube 4705 to the mid-point of the next to left secondary winding of transformer 4704, thence through resistance 4717 to the other brush of the motor. With its stator winding energized from the direct current source B47 the motor in response to the impulses of current transmitted through its rotor winding by the repeated firing of tube 4705 rotates at an accelerating speed. During each interval that the tube 4705 is non-conducting motor 4701 is operating at a substantially uniform speed by reason of the discharge of condenser 4719 through its rotor winding and is thereby producing a counter-electromotive force which is proportional to the speed of the motor. This counter-electromotive force is applied between the grid and cathode of tube 4705 in opposition to the control potential produced in response to the incoming control potential as modified by the potentiometer RRP5 over a path which extends from the lower brush of motor 4701, through resistance 4716, resistance 4715, the right portion of the winding of rheostat 4713 and through resistances 4707 and 4706 to the grid of tube 4705 and from the filament of tube 4705 to the mid-point of the next to left secondary winding of transformer 4704 thence through the resistance 4717 to the upper brush of motor 4701. The effect of this counter-electromotive force is to tend to neutralize the impressed direct current grid component when the motor 4701 attains a speed commensurate with the setting of the brush of potentiometer RRP5. When this occurs firing of the tube 4705 is retarded to a point where the average current is just enough to keep the motor 4701 running at a speed corresponding to the input potential. For a more complete description of the operation of the tachometer motor control circuit reference may be had to the application of C. E. Germanton, Serial No. 542,983 filed concurrently herewith. This application has matured into Patent No. 2,493,064 dated January 3, 1950.

The tachometer motor control circuit disclosed in the lower portion of Fig. 47 is provided for operation in connection with the R. P. M. motor control circuit for the simulated left engine and functions with the right unit of the rectifier tube 4711. Since the engines of a two-engined aircraft rotate in opposite directions, the motor 4751 is arranged to rotate in the opposite direction from the motor 4701 by the connection of the anode of tube 4755 through the choke coil 4768 to the bus bar 115φ1 and the connection of the lower brush of the motor to the bus bar 115φ2. Thus the tachometer generators RTG and LTG driven by the motors 4701 and 4751 are driven in opposite directions to cause the tachometers at the instructor's desk and at the pilot's pedestal and on the flight engineer's instrument panel to be driven in opposite directions.

As the tachometer generator RTG rotates, through its coupling over conductors 4720 and 4721 of cable 4722 with the right engine tachometer 2522 at the instructor's desk and the right engine tachometer 1722 at the pilot's pedestal and over a branch of cable 4722 with the right engine tachometer 2815 on the flight engineer's instrument panel, the tachometers 1722, 2522 and 2815 are driven to indicate the speed of the simulated right engine in revolutions per minute.

Relay 5625 of Fig. 56 also upon operating establishes a circuit from ground over the lower front contacts of IGR and IGL relays 5603 and 5604, over the lower back contact of relay 5636, over the upper No. 3 contacts of relay 5525, over conductor 5800, through the winding of relay 5801 of the sound effects circuit of Fig. 58 provided for simulating the sounds due to the operation of the right engine whereby such sound effects circuit is rendered effective. The shaft of the tachometer motor 4701 also carries the toothed disc 4723 of a sound effects generator which revolves in the field 4724 of such generator and generates therein pulsations of current which are transmitted over conductors 4725 and 4726 through the primary winding of input transformer 5802.

The pulsations are impressed upon the input of the dual amplifier tube 5803, are amplified thereby and impressed through the volume regulating rheostat 5804 upon the control grid of the detector tube 5805, the cathode-anode path through which is connected in series with the primary winding of the output transformer 5806, the secondary winding of which transformer is connected through a power amplifier 5807 with one or more loud-speakers 5808 conveniently located in different parts of the trainer. Anode potential is applied from the source B58 through resistance 5809 to the anode bus bar 5810 and from this bus bar through resistances 5811, 5812 and 5813 to the anodes of tubes 5803 and 5805. Direct current bias is impressed upon the grid 5814 of tube 5805, through resistance 5815, across the cathode-anode path through the left unit of the dual rectifier tube 5816 and through the secondary winding of transformer 5817 to ground, this cathode-anode path being bridged across the secondary winding of transformer 5817 and energized by potential from the 40-volt, 60-cycle bus bar 40φ2, impressed through the rheostat 5818 and from the brush thereof through resistance 5819 and through the primary winding of transformer 5817, and by potential from the 40φ2 bus bar applied from the brake horsepower variac RBV7, over conductor 5821, through the winding of rheostat 5822 and from the brush thereof through resistance 5823 and the primary winding of transformer 5817. This latter potential increases as the brake-horsepower output of the engine increases thereby increasing the engine noise. The filaments of all of the tubes of both sound effects circuits are energized by 6.3-volt current obtained from the secondary winding of filament current transformer 5820.

With relay 5801 normally deenergized, the secondary winding of input transformer 5802 is short-circuited and no incoming signal from the sound effects generator 4723 is impressed upon the input circuit of tube 5803. As the generator 4723 rotates slowly while the starting of the right engine by the inertia starter is being simulated the pulses generated thereby are amplified and sounds are produced by the loud-speakers in simulation of the sound of firing explosions of an engine while it is being started.

With ON relay 4009 of the R. P. M. motor control circuit operated a circuit is also established from ground over the inner upper front contact of RF' relay 3519 at the flight engineer's fuel trunk panel, over conductor 3525, over the lower No. 3 contacts of relay 4009, conductor 4015 and through the winding of RFS relay 3526 to battery. Relay 3526 thereupon operates establishing an obvious circuit for RFS1 relay 3527 which thereupon locks over its inner upper contacts to ground on the back contact of RFS2 relay 3528. Relay 3527 upon operating connects ground over its inner lower contacts and conductor 3529 through the winding of start relay 5750 of the right engine fuel pressure circuit of Fig. 57. Relay 5750 thereupon operates and connects 57-volt, 60-cycle alternating current from the upper or phase φ1 portion of the secondary winding of power transformer 5701, over the back contact of DFP relay 5702, over the upper contacts of relay 5750, the back contact of UL relay 5703, through resistance 5704 and the rotor winding of motor 5705 to ground. The stator winding 5706 of this motor is energized in a circuit extending therethrough and through the lower or phase φ2 portion of the secondary winding of transformer 5701, whereupon the motor is started and through the reduction gear box 5707 drive shaft 5708 and the cams and the rotor of the transmitting autosyn 5724 mounted thereon in a counter-clockwise direction. As soon as the shaft moves off normal the contacts of switch 5709 close thereby establishing an obvious circuit for LL relay 5710.

The rotor winding of autosyn 5724 is energized by 400-cycle current from the bus bars 400C and 400G and its stator windings are connected over conductors 5725 and 5726 of cable 5727 with the stator windings of the receiving autosyn 2332, which drives the right unit of the dual fuel pressure indicator 2333 at the instructor's desk the rotor winding of which autosyn is energized from the bus bars 400C and 400G, and over a branch of cable 5727 over the upper Nos. 5 and 6 contacts of relay 3211 and conductors of cable 3217 with the stator windings of receiving autosyn 2846 which drives the right unit of the dual fuel pressure indicator 2811 on the flight engineer's instrument panel. The rotor winding of the latter autosyn is energized from the bus bars 400C and 400G. The indicators 2333 and 2811 now indicate the pressure of the fuel supply to the right engine which now rises to about 7 pounds.

Relay 5710 upon operating establishes a circuit which may be traced from ground over the inner upper contacts of ignition relays 5603 and 5604, over conductor 5607, the contacts of the right engine disabling key 2500R at the instructor's desk, over conductor 2501, the lower contacts of relay 3527, conductor 3530, over the lower contacts of relay 5710, conductor 5711, over the inner lower contacts of FTR relay 5637, over the inner upper contacts of PRRM relay 5622, over the lower No. 2 contacts of STM1 relay 5625, over the upper back contact of EST2 relay 5636 through the winding of ST relay 5638 to battery. Relay 5638 operates and locks over its upper contacts, over the lower No. 2 contacts of relay 5635, thence to ground as traced over the contacts of disabling key 2500R at the instructor's desk and establishes a circuit from ground over its lower contacts and the lower No. 1 contacts of STM1 relay 5625, through the winding of EST2 relay 5636 to battery. Relay 5636 thereupon operates opening at its upper back contact the initial operating circuit of ST relay 5638, opening at its lower back contact the circuit previously traced for enabling the sound effects circuit of Fig. 58 and establishes a circuit from ground over the inner lower contacts of ST relay 5638, over the front contacts of EST2 relay 5636 through the winding of EST1 relay 5628 to battery.

Relay 5628 upon operating locks over its lower No. 1 contacts to ground over the inner lower contacts of ST relay 5638, establishes bridges around the upper No. 1 and 2 contacts of STM1 relay 5625 over its upper Nos. 2 and 3 contacts for maintaining the continuity of the circuits extending thereover following the subsequent release of relay 5625, and over its lower No. 2 contacts establishes an obvious circuit for ESTA relay 5639. Relay 5639 upon operating closes an obvious circuit for EST relay 5616 which operates and opens the circuit of STW relay 5615 which may be traced over the cathode-anode path of tube TT thereby releasing relay 5615 and extinguishing the tube. Relay 5615 upon releasing in turn releases STM1 relay 5625 which in turn releases STM relay 5626 and EST2 relay 5636. At its lower No. 3 contacts relay 5616 establishes a circuit from ground over the lower contacts of relays 5603 and 5604, over the lower No. 3 contacts of relay 5616 and conductor 5800 for reconditioning the sound effects circuit and over its lower No. 1 contacts establishes a circuit from ground, over conductor 5640 of cable 5600, over the contacts of the right engine generator key 2202 at the instructor's desk, Fig. 22, over conductor 3137 of cable 3100 through the winding of RSG relay 3138 at the right engineer's power panel. Relay 3138 thereupon operates for a purpose to be presently described.

The EST1 relay 5628 upon operating modifies the circuit previously traced for controlling the R. P. M. motor control circuit of Fig. 40 to increase the potential applied to control conductor 4001 thereof. The modified control circuit may be traced from the bus bar 40φ1, over the upper No. 2 contacts of EST1 relay 5628, over conductor 5627, through the winding and over the brush of the manifold pressure potentiometer RMP4, over conductor 5111, over the upper No. 1 front contact of TEST1 relay 5628, over conductor 5629 and thence as traced to control conductor 4001. With the increase of potential thus resulting the motor of the R. P. M. motor control circuit is again started and advances the potentiometer brushes carried by the shaft 5101 further toward the No. 3 terminals of their windings until the motor is arrested when the brush of the balancing potentiometer RRP10 reaches a position to apply a potential from bus bar 40φ2 to control conductor 4001 which balances the control potential of phase φ1 applied to such conductor. Through the new setting of the brush of potentiometer RRP5, the tachometer motor 4701 is controlled to increase the speed of the tachometer generator RTG driven thereby so that the tachometer 1722 of the pilot's panel, the tachometer 2522 at the instructor's desk and the tachometer 2815 at the flight engineer's instrument panel are driven to indicate the simulated idling speed of the right engine of approximately 650 revolutions per minute.

The change in the speed of rotation of the tachometer motor 4701 and the consequent increase in speed of the sound effects generator 4723, with relay 5801 now reoperated, causes the sound effects circuit to produce sounds by the loud-speaker 5808 simulating the increased noise due to the increased speed of the started engine, the periodicity of the explosion noises produced by the loud-speaker increasing as the rotational speed of the engine increases and the intensity increasing as the brake-horsepower output of the engine increases.

When the shaft 410 of the R. P. M. motor control circuit has been rotated to a position corresponding to an R. P. M. speed of approximately 400 R. P. M., the contacts 4011 become closed to establish a circuit from the 115-volt supply 4012, over the contacts of switch 4011 and conductor 4013 through the winding of the variable autotransformer of "variac" RRV6 from which power is derived for driving the right vibrator motor RVM bolted to the right side of the trainer mock-up 100. The shaft of this motor carries an eccentrically mounted weight whereby the operation of the motor sets up a vibration in the right portion of the mock-up simulating the vibration due to the operation of the right engine and the vibration due to the right engine propeller. This vibration increases in intensity as the right engine speed increases.

Since the engine is now running at a higher speed the fuel consumption will be greater and therefore a new control circuit is established for the right engine fuel flow motor control circuit of Fig. 37. Potential of phase $\varphi 1$ is now applied from bus bar $40\varphi 1$, through the winding of the manifold pressure potentiometer RMP3 and through resistance 4805 from which a derived potential is applied through the winding of R. P. M. potentiometer RRP7. The potential derived from this potentiometer is applied through the winding of altimeter potentiometer AP1 and resistance 4806 to ground the resulting potential derived from the latter potentiometer is applied over conductor 4807 through resistances 5651 and 5652 to ground. From this latter potential divider a potential of phase $\varphi 1$ is applied over the inner upper back contact of LN relay 5653, over the lower back contact of ICO relay 5654, over conductor 5655, over the upper front contact of relay 5710, conductor 5712 and through resistance 4818 to control conductor 4803 of the fuel flow motor control circuit, Fig. 48.

The motor M37 of this circuit now positions the shaft 3710 until the balancing potentiometer RFFP1 assumes a position in which the potential of phase $\varphi 2$ applied thereover through resistance 4809 to the control conductor 4803 balances the potential of phase $\varphi 1$ on conductor 4803. When this balance is reached the motor M37 stops. The fuel flow indicators 2329 and 2806 at the instructor's desk and on the flight engineer's instrument panel will now indicate the fuel flow commensurate with the operation of the right engine at the idling speed of approximately 650 revolutions per minute. It will be noted that this fuel flow is dependent upon the manifold pressure, the R. P. M. and the altitude, and may be expressed by the equation as follows:

Fuel flow $=f(MP)\times f(R.\ P.\ M.)\times f(ALT)$

The R. P. M. potentiometer RRP7 has been set as previously described for an engine speed of 650 R. P. M., the brush of the altimeter potentiometer AP1 will at this time be adjacent its No. 1 winding terminal since the aircraft has not left the water and will therefore interpose no correction for the fuel flow measurement, and the manifold pressure potentiometer RMP3 will have been set to a position commensurate with the manifold pressure of approximately ten inches of mercury for the engine idling at the speed 650 revolutions per minute at sea level.

Following the operation of EST1 relay 5628 the manifold pressure motor control circuit is operated to adjust the potentiometers controlled thereby to settings corresponding to a manifold pressure of approximately ten inches. To accomplish this, potential of phase $\varphi 1$ is applied from bus bar $40\varphi 1$ over conductor 3023, through the winding of variac 3019R to ground and the potential derived therefrom is applied over conductor 3024, through the winding of altitude potentiometer AP9 and through resistance 5209 to ground. The potential derived from the latter potentiometer is applied over conductor 5210, over the upper No. 1 contacts of ON relay 4009, conductor 5211, over the upper back contact of SHR1 relay 5212 to the brush of the R. P. M. potentiometer RRP3, over the left portion of the winding of this potentiometer and the upper middle back contact of relay 5212, through resistance 5214 to ground and over resistance 5215, the inner lower back contact of relay 5212, conductor 5216, through the right engine manifold pressure rheostat 2330, conductor 2331, over the lower front contact of EST1 relay 5628 and to control conductor 5342 of the manifold pressure motor control circuit of Fig. 41. The motor of this circuit is thereupon controlled to rotate the shafts 4110 and 5201 to set the potentiometers controlled thereby to positions commensurate with the reduced manifold pressure resulting from the operation of the engine at the idling speed of 650 revolutions per minute. The shaft 4110 also through the autosyn 4125 operated thereby causes the operation of the manifold pressure indicator 2327 at the instructor's desk, the manifold pressure indicator 2810 at the flight engineer's instrument panel and the manifold pressure indicator 1724 at the pilot's panel.

It is to be noted that when the engine is running the manifold pressure varies with the altitude, with the R. P. M. and with the throttle opening and may be expressed by the equation $MP=f(ALT)\times f(R.\ P.\ M.)\times$ throttle and decreases as the altitude increases, increases as the R. P. M. increases and increases as the throttle opens. With the aircraft on the water and the brush of the altimeter potentiometer AP9 then near its No. 1 winding terminal, with the brush of manifold pressure rheostat 2330 at the instructor's desk adjacent the No. 1 terminal of its winding and the throttle variac 3019R set in the closed throttle position, the indicators 2327, 1724 and 2810 will indicate approximately ten inches of manifold pressure.

The ESTA relay 5639 upon operating connects control conductor 5650 extending to the R. P. M. memory motor control circuit of Fig. 43, over the upper No. 1 back contact of MAN relay 5610, the upper front contact of ESTA relay 5639, over conductor 5656 and thence through resistance 5109 to control conductor 4001 of the R. P. M. motor control circuit of Fig. 40 whereby the movement of the brush of the balancing potentiometer RRP10 of the R. P. M. circuit will apply potential of phase $\varphi 2$ from the bus bar $40\varphi 2$ to bring the shaft 5101 to rest when it has assumed a position commensurate with the idling speed of 650 revolutions per minute. The balancing potentiometer RRP10 also applies balancing potential to the control conductor 5650 of the R. P. M. memory motor control circuit to also bring the shaft 5401 thereof to rest in a similar position.

The EST relay 5616 upon operating establishes a circuit from bus bar 40φ1 over its upper No. 1 contacts, to a point in the potential divider extending from ground through resistances 5657 and 5658, over the upper back contact of LN relay 5653, over conductor 5659, through the winding of manifold pressure potentiometer RMP1 and resistance 5004 to ground. A potential determined by the position assumed by the brush of potentiometer RMP1 is applied over conductor 5005, over the middle back contact of SHR relay 5213, through resistance 5217 over conductor 5218 to the brush of the R. P. M. potentiometer RRP1, and over the potential divider extending from ground through the potentiometer winding, over conductor 5013, over the lower back contact of relay 5213, through resistances 5219 and 5220 to ground and, in parallel with the latter potential divider, through resistance 5006 to the control conductor 5007 of the brake horse-power motor control circuit of Fig. 39. Potential is also applied from the junction between the back contact of relay 5653 and resistance 5657, over the inner upper front contact of ESTA relay 5639, over conductor 5660, through resistance 5008, through the winding of altimeter potentiometer AP2 to ground and potential derived at the brush of this potentiometer is applied through resistance 5009 to the control conductor 5007.

The brake horse-power motor control circuit is thereby controlled to rotate the shaft 3910 and through the unity ratio bevel gears 5000 to rotate the shaft 5001 until the brush of the balancing potentiometer RBP10 reaches a position in which the potential of phase φ2 applied thereover, through resistance 5010 to control conductor 5007 equals the potential of phase φ1 applied to conductor 5007. When the state of balance is reached the rotation of shaft 5001 ceases. Potential of phase φ2 over the brush of potentiometer RBP10 is derived from the winding of the potentiometer which is energized in a circuit from bus bar 40φ2 through resistance 5011, through the winding of such potentiometer and through resistance 5012 to ground. The brake horse-power therefore varies in accordance with the equation $$BHP = [f(MP) \times f(R.P.M.) \times (\text{mixture})] + f(ALT) - F_{\text{engine}}$$

where the function $f(MP)$ is determined by the potentiometer RMP1, the function $f(R.P.M.)$ is determined by the potentiometer RRP1, the mixture function by the condition of LN relay 5653, the function $f(ALT)$ by the potentiometer AP2 and the function $F_{\text{engine}}$ by the condition of the supercharger relay SHR. When the R. P. M. passes a certain value the resistance network of the brake horse-power control circuit is so designed that a further increase in R. P. M. as indicated by the movement of the brush of potentiometer RRP1 then causes a decrease in brake horse-power as would be the case in an actual aircraft.

As a result of the movement of the shaft 5101 by the R. P. M. motor control circuit of Fig. 40, the potentiometer RRP2 is operated and potential is applied to the control circuit for the right engine V/ND motor control circuit, Fig. 38. The winding of variac TASV1 controlled by shaft 5281 which in turn is rotated by the motor of the true air speed motor control circuit of Fig. 7, is energized by potential of phase φ2 from the bus bar 40φ2 and a potential of phase φ2 derived therefrom is applied from the brush of this variac through resistance 4902, through the winding of the R. P. M. potentiometer RRP2, through resistance 4903 to ground and through resistance 4904 to control conductor 4905 extending to the V/ND motor control circuit. This potential will be negligible until the aircraft attains sufficient speed to cause the movement of the brush of the variac from the No. 2 terminal of its winding and consequently the motor of the motor control circuit will move the shaft 3810 and through the unity ratio bevel gears 4900 move the shaft 4901 to a very slight extent at this time. When the shaft 4901 has rotated to a position in which potential of phase φ1 derived from the winding of balancing potentiometer RVP8, through resistance 4907 to control conductor 4905 balances the potential of phase φ2 the motor of the V/ND motor control circuit stops. Potential of phase φ1 is applied to the winding of potentiometer RVP8 from bus bar 40φ1 through resistance 4906. The setting of the shaft 4901 is in accordance with the equation $$\frac{V}{ND} = \frac{Vt}{R.P.M.}$$

The term $V/ND$ means the velocity V divided by the number N of revolutions per minute of the propeller times the diameter D of the propeller. The position of the shaft 4901 represents the quotient of the true air speed by the R. P. M., the R. P. M. as previously stated, being a function of the propeller pitch. Since the diameter of the propeller is constant the $V/ND$ term increases directly with the true air speed as determined by the setting of variac TASV1 and inversely with the R. P. M. as determined by the setting of potentiometer RRP2. There is no instrument showing the value of $V/ND$.

In response to the rotation of the V/ND shaft 4901 and the consequent adjustment of the potentiometer RVP7 and, with MAN1 relay 5502 unoperated which is the condition when the propeller governor is set for automatic operation as previously assumed, potential of phase φ1 is applied to control conductor 5504 for the propeller pitch motor control circuit for the right engine, Fig. 44. For this purpose potential is applied from the bus bar 40φ1 through the winding of potentiometer RVP7 and potential derived therefrom is applied from the brush of this potentiometer over the upper back contact of relay 5502, through resistance 5503 to control conductor 5504. This potential will cause the operation of the motor of the propeller pitch motor control circuit of Fig. 44 to rotate the shaft 4410 and through the unity ratio bevel gears 5500 to rotate the shaft 5501 until the balancing potentiometer RRP3 whose winding is energized by potential of phase φ2 from the bus bar 40φ2 applies potential from its brush over the lower back contact of relay 5502, through resistance 5505 to conductor 5504 which balances the potential of phase φ1 applied to such conductor. When this condition of balance occurs the motor of the propeller pitch motor control circuit stops. The propeller pitch motor control circuit is thus controlled by the setting V/ND potentiometer RVP7 when the propeller governor is set for automatic operation and the MAN1 relay 5502 is deenergized but is controlled by the increase and decrease R. P. M. keys 1816 and 1817 on the pilot's pedestal when the MAN1 relay 5502 is energized as will be later described. There is no instrument showing the value of propeller pitch.

*Right engine oil pressure indications*

In response to the operation of the ON relay 4009 of the R. P. M. motor control circuit, Fig. 40, a circuit is established from ground over its lower No. 2 contact, conductor 4016 to battery through the winding of ST relay 5713 of the right engine oil pressure circuit of Fig. 57. With relay 5713 operated and the EST relay 5616 also operated a circuit is established over the lower No. 2 contacts of relay 5616, over conductor 5661, over the lower No. 2 contacts of relay 5713 to battery through the winding of ST1 relay 5714. Relay 5713 also establishes a circuit through the rotor circuit of motor 5715, through resistance 5716, over the back contact of L2 relay 5717, the lower back contact of NP relay 5718, over the lower No. 4 contacts of relay 5713, over the back contact of DOP relay 5719 and through the lower or phase φ2 portion of the secondary winding of power transformer 5701. At this time the field or stator winding 5720 of motor 5715 is energized from the upper or phase φ1 portion of the secondary winding of transformer 5701 and as a consequence the motor 5715 operates and through the reduction gear box 5721 rotates the shaft 5722, the cams and the rotor of the transmitting autosyn 5723 mounted thereon, in a counterclockwise direction.

The rotor winding of autosyn 5723 is energized by 400-cycle current from the bus bars 400C and 400G and its stator windings are connected over conductors 5728 and 5729 of cable 5727 with the stator windings of the receiving autosyn 2334 which drives the right unit of the dual oil pressure indicator 2335 at the instructor's desk. The rotor winding of the receiving autosyn is energized from the bus bars 400C and 400G. The stator windings of the transmitting autosyn 5723 are also connected over a branch of cable 5727, over the lower Nos. 3 and 4 contacts of relay 3212 and conductors of cable 3218 with the stator windings of receiving autosyn 2947 which drives the right unit of the dual oil pressure indicator 2899 on the flight engineer's instrument panel, the rotor winding of this receiving autosyn being energized from the bus bars 400C and 400G. The indicators 2335 and 2899 now indicate an oil pressure for the right engine which in eight seconds, with the engine starting cold, rises to about 200 pounds.

As soon as the shaft 5722 leaves normal, the off-normal contacts 5730 close thereby preparing a circuit for restoring the shaft to its normal position. When the shaft is rotated to the position commensurate to an oil pressure of 200 pounds, a circuit is established from battery through the winding of L2 relay 5717, over the contacts of switch 5731 to ground over the lower No. 1 contacts of ST relay 5713. Relay 5717 upon operating locks over its lower contacts to ground over the lower No. 1 contacts of relay 5713 and at its upper back contact opens the previously traced operating circuit for motor 5721 which now stops.

*Control of right engine cowl flaps*

In the meantime upon the operation of ST1 relay 5714 a circuit is established for controlling the right engine cylinder oil and temperature motor control circuit disclosed in the upper portion of Figs. 46 and 57. It will be assumed that the engine cowl flaps are open at which time the brush of the cowl flaps potentiometer 5775 would be at the No. 1 end of potentiometer winding and the limit switch 5732 would be open. To open the cowl flaps the flight engineer has operated the right engine cowl flaps control switch 3449 to the right end, with RCF relay 3450 operated under the control of the previously operated circuit breaker 3451, a circuit is established from ground on bus bar GB, over the lower contacts of relay 3450, over the right contact of switch 3449, conductor 3452 and through the winding of OP relay 5733 to battery. Relay 5733 upon operating closes a circuit from ground over its upper contacts and conductor 5734 of cable 5700 through the lamp 2224 to battery whereupon this lamp lights to indicate at the instructor's desk that the cowl flaps on the right engine have been opened. Relay 5733 over its lower contacts and the contacts of limit switch 5732 establishes a shunt of the right shaded pole winding 5735 of motor 5736 whereupon the motor is driven by its main stator winding 5737 which is energized from the 115-volt supply source, and through the reduction gear box 5739 drives the shaft 5740 in a counter-clockwise direction until the switch 5732 is opened by the associated cam carried by shaft 5740 and the motor 5736 is thereupon stopped.

Had the flight engineer desired to close the cowl flaps then he would have operated switch 3449 to the left and, with RCF relay 3450 operated through the prior closure of circuit breaker 3451, the operation of switch 3449 to the left would have established a circuit from ground on bus bar GB, over the lower contacts of relay 3450, over the contacts of switch 3449, over conductor 3455, through the winding of CL relay 5741 to battery. Relay 5741 upon operating closes a circuit from ground over its upper contacts and conductor 5744 of cable 5700 through lamp 2225 to battery, whereupon this lamp lights at the instructor's desk to indicate that the cowl flaps on the right engine have been closed. Relay 5741 over its lower contacts and the contacts of limit switch 5743, establishes a shunt of the left shaded pole winding 5742 of motor 5736 whereupon the motor is operated to drive the shaft 5740 and the brush of potentiometer 5775 in a clockwise direction until the switch 5743 is opened.

*Control of right engine cylinder oil and temperature motor control circuit*

Upon the operation of ST1 relay 5714 and with the engine cowl flaps assumed to be open and the brush of potentiometer 5775 adjacent its lower or No. 1 winding terminal, a circuit is established for applying potential of phase φ2 from the 40-volt phase φ2 right secondary winding of power transformer 4604, over conductor 4605, over the lower contacts of ST1 relay 5714, through the winding of potentiometer 5775 and through resistance 5745 to ground. Potential of phase φ2 is derived over the brush of this potentiometer from the potential divider extending from ground through resistance 5745, over the lower portion of the winding of potentiometer 5775 and the brush thereof through resistances 5746 and 5766, over conductor 5664, over the lower back contact of LN relay 5653 and through resistance 5683 to ground, is applied through resistance 5746 to the input of dual amplifier tube 5747, is amplified thereby and impressed upon the secondary windings of step-up transformer 5748. The potential impressed upon the upper divided secondary winding of transformer 5748 is rectified by the dual diode rectifier tube 5749 and is impressed as a positive biasing potential of phase φ2 upon the control grid of the gas-filled control tube 5750. The potential impressed upon the lower secondary winding of transformer 5748 is impressed as a positive potential of phase φ2 upon the control grid of gas-filled tube 5751. The dual diode rectifier tube 5752 serves to rectify potential received from the secondary winding of transformer 5738 and to apply it through the grid potential adjusting rheostats 5753 and 5754 to the control grids of tubes 5750 and 5751 to bias them to points just below their critical breakdown potentials.

Tubes 5747, 5749, 5750, 5751 and 5752 are supplied with filament heating current from the secondary winding of transformer 5738. Anode potential is applied to the anodes of amplifier tube 5747 from the battery B57 over obvious circuits. Anode potential of phase φ2 is applied to the anode of tube 5750, over conductor 5755, through the R1 anode relay 4608 in parallel with resistance 4609, through resistance lamp 4610 and over conductor 4611 through the lower phase φ2 portion of the secondary winding of transformer 5701, and anode potential of phase φ2 is applied to the anode of tube 5751, over conductor 5756, through the winding of the R2 anode relay 4612 in parallel with resistance 4613 and thence through the lower phase φ2 portion of the secondary winding of transformer 5701. With potential of phase φ2 applied to the input circuit of amplifier 5747 and anode potentials of phase φ2 applied to the anodes of tubes 5750 and 5751 through the windings of relays 4608 and 4612, both of these relays operate.

Relay 4608 upon operating establishes a shunt over its lower contacts and conductors 4614 and 4615 around resistance 5757 and relay 4609 establishes a shunt over its lower contacts and conductors 4615 and 4616 around resistance 5758 for increasing the grid biases of tubes 5750 and 5751 to insure that relays 4608 and 4609 will be held operated. With both relays 4608 and 4609 operated a circuit is also established from ground over the upper front contacts of such relays, over the limit switch contacts 4617 and through the left shaded pole winding 4619 of motor 4621 thereby shunting such winding and, since the main stator winding 4622 of the motor is energized from the 115-volt supply source, the motor operates and through the reduction gear box 4623 rotates the shaft 4624 in such a direction as to rotate the brushes of potentiometers 4625 and 4626 and the brush of the balancing potentiometer 4629 from the No. 1 terminals toward the No. 3 terminals of their respective windings.

The balancing potentiometer 4629 is energized from a source of current of phase φ1 connected thereto over a circuit from ground through such winding, through resistance 4636 and through the phase φ1 left portion of the secondary winding of transformer 4604 and a potential of phase φ1 derived therefrom is then applied from the potentiometer brush, over conductor 4631 and through resistance 5759 to the input circuit of the amplifier tube 5747. When this potential balances the potential of phase φ2 applied through resistance 5746 tubes 5750 and 5751 cease to conduct and relays 4608 and 4609 release and open the circuit of motor 4621 which thereupon comes to rest.

As a result of the movement of the brush of the oil temperature potentiometer 4625, the right engine oil temperature indicators 2308 and 2818 at the instructor's desk and on the flight engineer's instrument panel will be operated over the circuit previously traced to indicate after about two minutes a rise in the oil temperature to about 25° C. and also as the result of the movement of the brush of the cylinder temperature potentiometer 4626, the right engine cylinder temperature indicators 2321 and 2839 at the instructor's desk and on the flight engineer's instrument panel will be operated over the circuit previously traced to indicate after about two minutes a rise in the cylinder temperature to about 100° C.

After the shaft 4624 has rotated for two minutes the cam operated contacts 4632 become closed thereby completing a circuit from ground over the upper contacts of ST1 relay 5714, over conductor 5760, over the contacts 4632 and conductor 5761 through the winding of T relay 5762 to battery. Relay 5762 thereupon operates, locks to ground over its inner lower contacts and the upper contacts of relay 5714 and over its inner upper contacts establishes a new operating circuit for motor 5715 which way be traced from ground through the rotor circuit of such motor, through resistance 5716, over the upper front contact of L2 relay 5757, over the inner upper contacts of relay 5762, the upper back contact of NP relay 5718, over the upper back contact IOP relay 5763 and through resistance 5764 to the upper phase φ1 portion of the secondary winding of transformer 5701. Motor 5715 is now operated in the opposite direction of rotation and, due to the inclusion of resistance 5764 in the rotor circuit, at a lower speed than formerly. The rotor of transmitting autosyn 5723 is now rotated in the opposite direction resulting after the elapse of about two minutes in the reduction of the oil pressure indication given by the indicators 2335 and 2809 at the instructor's desk and on the flight engineer's instrument panel, from 200 pounds to 90 pounds.

At the expiration of the two-minute period the cam carried by the shaft 5722 and associated with the contacts 5765 operates such contacts thereby closing a circuit from ground over the lower contacts of relay 5762, over such cam-operated contacts and to battery through the winding of NP relay 5718. Relay 5718 thereupon operates, locks over its inner lower contacts to ground at the lower No. 1 contacts of ST relay 5713 and at its upper back contact opens the rotor circuit of motor 5715 whereby the motor is brought to rest.

It will be recalled that the flight engineer has operated the start key 3441 to the mesh position and has operated the primer key 3443. He will hold these keys closed until the engine starts as will be indicated by the sound effects, the vibration effects, the change in the observed manifold pressure of the indicator 2810 to 10 inches and the change in the observed R. P. M. indication of the tachometer 2815 to approximately 650 revolutions per minute.

During the starting of the right engine, the voltmeter selector switch VMS, Fig. 31, has been positioned on the RG terminal thereby resulting in the operation of VRE relay 3144 and the release of VAPP relay 3109. The release of relay 3109 opens the circuit of lamp 2212 at the instructor's desk and the operation of relay 3144 establishes a circuit over conductor 3145 of cable 3100 to cause the lighting of lamp 2230 to indicate that the voltmeter 2231 is to be read in connection with the starting of the right engine. With relay 3138 previously operated, a circuit is established from battery through voltmeter VM on the flight engineer's power control panel, Fig. 31, over the upper contacts of relay 3144, over the upper contacts of relay 3138, over the upper back contact of relay 3140 to ground over the upper inner contacts of relay 3138 and in parallel therewith over conductors 3148 and 3149 of cable 3100 through the voltmeter 2231 at the instructor's desk resulting in the operation of voltmeters VM and 2231 to read 27 volts as the potential being applied to the inertia starter motor for starting the right engine.

Following the restoration of the start key 3441 and the primer key 3443, the flight engineer operates the right engine generator switch 3139. With switch 3139 operated, an obvious circuit is established for RES relay 3140 which establishes a circuit from ground over its inner lower contacts and conductor 3141 of cable 3100 to battery through the right engine generator lamp 2226 at the instructor's desk which lamp lights to indicate that the flight engineer is making a check on the right engine generator. With relay 3138 operated, a circuit is now established from ground on bus bar GB, over the inner upper contacts of relay 3140, through the right engine generator ammeter 3142, over the inner lower contacts of REG relay 3138, over conductor 3143 of cable 3100 through the right engine generator ammeter 2227 at the instructor's desk and thence through resistances 2228 and 2219 and rheostat 2220 to battery. The ammeters 3142 and 2227 now indicate the current output of the right engine generator which should be 40 amperes.

Relay 3140 at its upper back contact now removes the shunt from resistance 3150 whereupon a circuit is established from battery through the voltmeter VM, over the upper contacts of relay 3144, the upper contacts of relay 3138, through resistance 3150 and over the upper contacts of relay 3140 to ground on bus bar GB, and in parallel with voltmeter VM over conductors 3148 and 3149 of cable 3100 through the voltmeter 2231 at the instructor's desk resulting in the operation of these voltmeters to read 24 volts indicating that the operation of the starter motor has reduced the storage battery voltage.

*Starting the left engine*

The flight engineer now simulates the starting of the left engine by first operating the start key 3456 first to the left or start position, holding it there about 12 seconds and then operating it to the right or mesh position simultaneously with the operation of the primer key 3457. The engine control circuit indicated by the box in Fig. 45 now functions in the manner previously described in connection with the engine control circuit of Fig. 56. The simulated starting of the left engine has caused the rotation of the shafts 3760 and 4851 driven by the fuel flow motor control circuit for the left engine, the rotation of the shafts 3960 and 5051 driven by the brake horse-power motor control circuit for the left engine, the rotation of the shafts 4060 and 5151 driven by the R. P. M. motor control circuit for the left engine, the rotation of the shafts 4160 and 5251 driven by the manifold pressure motor control circuit for the left engine, the rotation of the shafts 4360 and 5451 driven by the R. P. M. memory motor control circuit for the left engine, the rotation of the shafts 3860 and 4951 driven by the V/ND motor control circuit for the left engine and the rotation of shafts 4460 and 5551 driven by the propeller pitch motor control circuit for the left engine in the manner previously described in connection with similar circuits for simulating the functioning of the right engine.

The operation of the shafts 4060 and 5151 of the R. P. M. motor control circuit has also resulted in the operation of the motor 4751 of the tachometer motor control circuit for the left engine, the operation of the tachometer generator LTG driven thereby and the operation of the sound effects generator 4773 resulting in the operation of the left engine tachometers at the flight engineer's, pilot's and instructor's stations as previously described to indicate the rotational speed of the left engine and in the operation of the vibrator motor LVM located in the left portion of the trainer mock-up to simulate the vibrations set up due to the operation of the left engine. The operation of the sound effects generator 4773 is instrumental in controlling the sound effects circuit indicated by the box in the lower portion of Fig. 58 to simulate the sounds incident to the operation of the left engine.

In response to the starting of the left engine, the left unit of the manifold pressure indicator 2810, the left engine fuel flow indicator 2805, the left engine tachometer 2814, the left unit of the oil pressure indicator 2809, the left unit of the fuel pressure indicator 2811, the left engine oil temperature indicator 2817 and the left unit of the cylinder temperature indicator 2839 on the flight engineer's instrument panel are operated. Also, the left unit of the manifold pressure indicator 2327, the left unit of the fuel flow indicator 2329, the left engine tachometer 2523, the left unit of the oil pressure indicator 2335, the left unit of the fuel pressure indicator 2333, the left engine oil temperature indicator 2312 and the left unit of the cylinder temperature indicator 2321 at the instructor's desk are operated. Also, the left engine tachometer 1723 and the left unit of the manifold pressure indicator 1724 on the pilot's panel are operated. The operations of these instruments give the flight engineer, the instructor and the pilots information concerning the starting and operation of the left engine.

In addition, starter on lamp 2232, starter mesh lamp 2233, primer lamp 2234 and either the cowl flaps open lamp 2235 or cowl flaps closed lamp 2236 at the instructor's desk and relating to the left engine are lighted to indicate the performance of acts necessary to the starting of the left engine. To determine the ammeter and voltmeter readings in connection with the starting and operation of the left engine, the voltmeter selector switch VMS of Fig. 31 is moved to the LG terminal and the left engine generator switch 3151 at the flight engineer's power panel is operated resulting in the operation of VLE relay 3152, the operation of LES relay 3153, the establishment of circuits for the voltmeter VM on the flight engineer's power panel and voltmeter 2231 at the instructor's desk, the establishment of circuits for the left engine ammeter 3154 at the flight engineer's panel and the left engine ammeter 2237 at the instructor's desk and the lighting of the left generator switch position lamp 2238 and left generator voltmeter selection lamp 2239 at the instructor's desk. This apparatus is controlled in the manner fully described in connection with the operation of similar apparatus for indicating the steps in starting the right engine.

Upon the starting of the left engine, potential of phase $\varphi 1$ is connected to the control conductor 5302 of the brake mean effective pressure motor control circuit of Fig. 42. For this purpose potential of phase $\varphi 1$ is applied from bus bar 40$\varphi 1$ to the winding of variac LBP8, the brush of which is mounted on the shaft 5051 rotated by the motor of the brake horse-power motor control circuit for the left engine and from which brush potential is applied over the brush and through the winding of potentiometer LRP8 through resistance 5304 and thence through resistance 5303 to ground and in parallel with resistance 5303 through resistance 5305 to control conductor 5302. The application of potential to conductor 5302 causes the motor of the brake mean effective pressure circuit of Fig. 42 to rotate shaft 4210 and through the unity ratio bevel gears 5300 to rotate shaft 5301 until the balancing potentiometers BMEPP6 and BMEPP7 attain settings in which potential of phase $\varphi 2$ applied therethrough to conductor 5302 balances the potential of phase $\varphi 1$ applied to conductor 5302. Potential of phase $\varphi 2$ is applied from bus bar 40$\varphi 2$ through resistance 5306 and through the winding of potentiometer BMEPP6 and resistance 5310 to ground and in parallel through resistance 5307 to ground and the potential derived at the brush of this potentiometer is applied through resistance 5308 to conductor 5302 but is further attenuated through the potentiometer BMEPP7 and resistance 5309 to ground. When the potential of phase $\varphi 2$ applied balances the potential of phase $\varphi 1$ applied to conductor 5302 the motor of the control circuit arrests the further rotation of shafts 4210 and 5301.

It is to be noted that the position which the shafts 4210 and 5301 assume is a function of the brake horse-power and the R. P. M. The brake mean effective pressure is decreased as the R. P. M. is increased and the brake horse-power maintained constant. The shaft 4210 drives the rotor of the transmitting autosyn 4225 the rotor winding of which is energized from the 400C and 400G bus bars. The stator windings of the autosyn are connected over conductors of cable 4226 with the stator windings of the receiving autosyn 2336 which drives the BMEP indicator 2337 at the instructor's desk and over a branch of cable 4226, over the lower Nos. 4, 5 and 6 contacts of relay 3212 and over the conductors of cable 3219 with the stator winding of receiving autosyn 2848 which drives the BMEP indicator 2804 on the flight engineer's panel. Rotors of autosyns 2336 and 2848 are energized from the 400C and 400G bus bars. The BMEP indicators 2337 and 2804 indicate the efficiency of operation of the left engine. No similar instruments are provided for indicating the efficiency of the right engine.

With both engines now functioning the thrust horse-power motor control circuit of Fig. 42 is operated to cause the rotation of shaft 4260 and through the unity ratio bevel gears 5350 to cause a rotation of shaft 5351 to a degree commensurate with the aggregate thrust horse-power of the two propellers driven by the engines. To control the thrust horse-power motor control circuit a potential of phase $\varphi 1$ is applied to control conductor 5352 under the control of the brake horse-power variac RBV7 and the V/ND potentiometer RVP6 for the right engine and a potential of phase $\varphi 1$ is applied to conductor 5352 under the control of the brake horse-power variac LBV7 and the V/ND potentiometer LVP6 for the left engine. To accomplish this, potential from bus bar 40$\varphi 1$ is applied through the winding of variac RBV7 and the potential derived therefrom through the setting of its brush is applied through resistance 5353 and through resistance 5354 to conductor 5352 and in parallel with resistance 5353 through the winding of potentiometer RVP6 shunted by resistance 5355 to ground. Similarly, potential from bus bar 40$\varphi 1$ is applied through the winding of variac LBV7 and the potential derived therefrom through the setting of its brush is applied through resistance 5356 and resistance 5357 to conductor 5352 and in parallel with resistance 5356 through the winding of potentiometer LVP6 shunted by resistance 5358 to ground. Thus with both propellers functioning on automatic operation the thrust horse-power developed by the two propellers may be expressed by the following equation $$THP = \left[ BHP \times f\left(\frac{V}{ND}\right) \right]_{LE} + \left[ BHP \times f\left(\frac{V}{ND}\right) \right]_{RE}$$

As soon as the motor of the thrust horse-power motor control circuit has rotated shafts 4260 and 5351 to a position in which the potential of phase $\varphi 2$ derived from the winding of the balancing potentiometer TP9 and applied through resistance 5339 to conductor 5352 equals the combined potentials of phase $\varphi 1$ previously applied to conductor 5352, the motor of the thrust horse-power circuit stops and the further rotation of shafts 4260 and 5351 is arrested. The rotation of shaft 4260 through the gears 2700, shaft 2701, gears 2402, shaft 2403 and gears 718 has also rotated shaft 719 to an amount commensurate with the rotation of shaft 4260 and the combined thrust horse-power of the two propellers.

*Preparation by the pilot for take-off*

Preparatory to taking off the pilot checks to see that the suction indicator 1727 on his instrument panel, Fig. 17, reads seven pounds. This indicator and a similar indicator 2525 at the instructor's desk are driven by the receiving autosyns 1728 and 2526 whose rotor windings are energized from the 400C and 400G bus bars and whose stator windings are connected over the conductors of cable 2527 with the stator windings of the transmitting autosyn 3625 driven by the motor 3626 of the suction motor circuit of Fig. 36. The motor 3626 is of the shaded pole type. Its main stator winding 3627 is energized from the 115-volt, 60-cycle current supply of the trainer. When the main right engine is started a shunt is established around the left shaded pole winding 3628, over the upper back contact of LS relay 3629, over the normal contacts of limit switch 3630, over conductor 3631 and the lower No. 3 front contacts of ST relay 5113 of the oil pressure circuit for the right engine, Fig. 57, and thence to ground. Motor 3626 now operates and through the reduction gear box 3632 drives the shaft 3633 and the limit switch operating cam and rotor of autosyn 3625 mounted thereon. When the shaft 3633 has rotated to an extent sufficient to cause the autosyn 3625 to drive the receiving autosyns 1728 and 2526 to set the suction indicators 1727 and 2525 to indicate a suction of 7 pounds, the switch 3630 is moved to its alternate position, opening the shunt of the shaded pole winding 3628 to stop the motor and closing the circuit of relay 3629 which operates, locks over its lower contacts to ground on conductor 3631 and at its upper contacts further opens the shunt of shaded pole winding 3628. If the indicators 1727 and 2525 indicate a suction of 7 pounds the pilot knows that there is sufficient suction to operate such instruments on his instrument panel as would in an actual aircraft require air suction for their operation.

With the propeller governor controls of the overhead equipment set in their MAX—R. P. M. positions in which the brushes of rheostats 3012 and 3013 of Fig. 30 are moved to the lower terminals of their windings, the two throttles are moved together to move the brushes of the throttle rheostats, Fig. 30, toward their upper or open positions. In response to this movement of the throttles the manifold pressure motor control circuits of Fig. 41 are controlled to rotate the shafts 5201 and 5251 to new positions thereby readjusting the potentiometers RMP4 and LMP4 to control the R. P. M. motor control circuits of Fig. 40 to rotate the shafts 5101 and 5151 to new positions. With the readjustment of the potentiometers RRP5 and LRP5 the tachometer motor control circuits of Fig. 47 are operated to increase the speed of the tachometer generators RTG and LTG resulting in the tachometers on the pilot's, flight engineer's and instructor's desk instrument panels indicating an increase of engine speed. The throttles are thus operated until engine speeds of 1900 revolutions per minute are indicated.

To determine if both of the magnetos associated with the right engine are functioning, the pilot first turns the right engine ignition key 3016, Fig. 30, to the position in which ground is removed from the R terminal, but remains connected to the L terminal. This causes the shunting down of the IGL relay 5604 of Fig. 56, resulting in the removal of resistances 5632 and 5633 from the potential divider including resistances 5632, 5633 and 5634, connected into the previously traced control circuit for the right engine R. P. M. motor control circuit of Fig. 40, resulting in a readjustment of the potentiometers controlled thereby whereby the right engine tachometer generator RTG is slowed down to cause the tachometers to indicate a right engine speed of 1800 or 1850 revolutions per minute. The right engine ignition key is now turned to the position in which ground is removed from the L terminal but is connected to the R terminal. This causes the shunting down of the IGR relay 5603 of Fig. 56 resulting in the removal of resistance 5632 from the potential divider including resistances 5632, 5633 and 5634 connected into the control circuit for the right engine R. P. M. motor control circuit. No change in the indicated R. P. M. will be noted if both magnetos are functioning. The ignition key is then moved to the both position in which the IGR and IGL relays 5603 and 5604 are both operated resulting in the return of the R. P. M. indicators to read 1900 R. P. M. These operations are then repeated with the left engine ignition key 3015.

In the pilot's pedestal, Fig. 18, the wing flaps key 1820 is moved to the down position whereupon shunting ground from conductor 3302 connected over the lower contacts of WF relay 1804, over the contacts of key 1820, conductor 1821, over the normal contacts of limit switch 764, over the left back contact of relay 765, is connected to the left shaded pole winding 766 of motor 769. The main stator winding 767 of this motor is energized from the 115-volt, 60-cycle supply source of the trainer and with the left shaded pole winding shunted, the motor 769 through the reduction gear box 768 drives the shaft 760 in a clockwise direction. The rotation of shaft 760 through the unity ratio bevel gears 762 has also rotated the shaft 763 to move the brushes of the potentiometers WFP6 to WFP11, inclusive, controlled thereby toward the No. 3 terminals of their windings.

The pilot holds the key 1820 in its down position until the wing flaps indicator 1525 on the copilot's instrument panel indicates a wing flap deflection of about 20 degrees when he will open the key thereby removing the shunting ground from conductor 1821 to stop the wing flaps motor 769. The indicator 1525 is controlled by a magnesyn receiver 1527, the junction points between the stator windings of which are connected over contacts of the previously operated relay 1524 and conductors 1528, 1529 and 1530 with the junction points of the continuous winding of potentiometer WFP6 driven by shaft 760 of the wing flaps motor control circuit. The diametrically positioned brushes of this potentiometer are connected to battery and ground respectively.

Branches of conductors 1528, 1529 and 1530 are also connected to the junction points between the winding of the magnesyn receiver 1910, the rotor of which is connected to the wing flaps position indicator 1911 mounted on the instructor's instrument panel, Fig. 19, whereby the indicator 1911 is also controlled by the potentiometer WFP6 to indicate the position into which the pilot has set the wing flaps preparatory to the take-off.

The pilot now gradually moves both throttles of the overhead equipment forward whereby the brushes of variacs 3019R and 3019L included in the control circuits of Fig. 52 of the manifold pressure motor control circuits, Fig. 41, previously traced, are moved towards their upper or open throttle positions. As a result the shafts 4110, 5201 and 4160, 5251 of the manifold pressure motor units assume new positions resulting in the readjustment of the RMP4 and LMP4 potentiometers included in the control circuits of the R. P. M. motor control circuits of Fig. 40. The shafts 5101 and 5151 of the R. P. M. motor units now assume new positions resulting in the readjustment of the potentiometers controlled thereby including the potentiometers RRP5 and LRP5. The readjustment of the latter potentiometers results in an increase in speed of the tachometer generators RTG and LTG. The movement of the shafts 4110 and 4160 operates the transmitting autosyns driven thereby whereby the manifold pressure indicators 1724, 2327 and 2810 on the pilot's panel, Fig. 17, at the instructor's desk, Fig. 23, and on the flight engineer's instrument panel, Fig. 28, are driven by their associated autosyn receivers to indicate an increase of manifold pressure for each engine to about 44 inches of mercury.

The propeller governor controls of the overhead equipment are now adjusted thereby adjusting the associated rheostats 3012 and 3013, Fig. 30, included in the previously traced control circuits for the R. P. M. motor control circuits until the two engines are running at substantially the same speed of 2650 R. P. M. as will be indicated by the similar readings of the right and left engine tachometers 1722 and 1723 at the pilot's instrument panel. The right and left engine tachometers 2522 and 2523 at the instructor's desk and the right and left engine tachometers 2815 and 2814 on the flight engineer's instrument panel will read similarly. The associated synchroscopes 1726, 2524 and 2816 will revolve as little as possible when the engines are substantially synchronized.

As the R. P. M. motor control circuits set the shafts 4010 and 4060 in the new positions commensurate with the increased engine speeds, the sound effects circuits are controlled to produce the increased noise of the engines, the speeds of the vibrator motors are increased, and new positions are given to the fuel flow shafts 4801 and 4851, to the V/ND shafts 4901 and 4951, to the brake horse-power shafts 5001, and 5051, to the R. P. M. memory shafts 5401 and 5451, to the propeller pitch shafts 5501 and 5551, to the brake mean effective pressure shaft 5301 and to the thrust horse-power shafts 5351 and 719 in the manner previously described.

The pilot now pulls the yoke 1411 towards him nearly as far as it will move since this is necessary in an actual aircraft to cause the nose of the aircraft to lift in order to assist it to rise up on the step. Until it is riding on the step the water drag would hold the air speed down too low for the aircraft to become air borne. Moving the yoke back rotates the shafts 1414 and 305 and thereby moves the brush of yoke potentiometer YP2 toward the junction point 611 of its winding. The pilot may if he wishes attain the same result by turning the elevator trim wheel ET thereby adjusting rheostat ETR which controls the elevator trimming motor control circuit 1600 of Fig. 16 to operate the elevator trimming mechanism 1517 in the manner fully described in the Bohman el al. Patent 2,519,233. The trimming mechanism 1517 in turn will cause the yokes 1411 and 1511 to move toward the pilots' seats.

The trainer is now simulating an aircraft moving over the water at an indicated air speed of approximately 30 knots as will be indicated by the indicated air speed indicators 1431 and 1531 on the pilot's and copilot's instrument panels. A similar air speed indicator 1931 at the instructor's desk and a similar air speed indicator 2731 at the navigator's station, Fig. 27, will also be operated to indicate an air speed of 30 knots. These indicators are driven by associated autosyn receivers 1432, 1532, 1932 and 2732, the rotor windings of autosyns 1432 and 1532 being energized by 400-cycle current from the bus bars 400C and 400G over the inner back contacts of relay 1430 and the rotor winding of autosyn 1932 being energized from bus bars 400C and 400G. The rotor winding of autosyn 2732 is energized in parallel with the rotor winding of autosyns 1432 and 1532, over conductors 1428 and 1429 and conductors 2752 and 2753 of cable 2750. The receiving autosyns are driven by the transmitting autosyn 1225, the rotor winding of which is energized from the 400C and 400G bus bars and the stator windings of which are connected with the stator windings of the receiving autosyns 1432, 1532 and 2732 over conductors 1226 and 1227 and over the back contacts of relay 1430 and are connected with the stator windings of the receiving autosyn 1932 over branches of conductors 1226 and 1227.

Until the simulated speed of take-off exceeds 30 knots the switch 1212 of the indicated air speed motor control circuit of Fig. 12 is maintained closed thereby establishing a circuit from ground thereover, over conductor 1213 and through the winding of the H (hump) relay 602 to battery, which relay upon operating causes the operation of H1 relay 603. With the simulated aircraft on the water the potentiometer brushes driven by the altimeter motor control circuit will be adjacent the No. 1 terminals of their windings, the limit switch 1263 will be operated to its alternate position and when the altimeters register zero altitude, the switch 1268 will be in its alternate position, and therefore relay 1241 will be operated over a circuit extending from ground over the alternate contacts of switches 1263 and 1268, through the winding F relay 1241, which operates, in turn closing a circuit from ground over its outer right front contact, conductor 1215 and through the winding of F1 relay 552 associated with the rate of climb circuit, Fig. 5.

With relays 602 and 1241 both operated, potential is applied to the control conductor 1216 which approximates the effective thrust during the simulated take-off run. This potential is applied from the bus bar 40φ1, over the left front contact of BHP—ON relay 3962 of Fig. 39 which operated when the lower limit switch 3963 closed its right contact when the shaft 3960 was moved from its normal position by the operation of the left engine BHP motor control circuit, Fig. 39, over the left front contact of BHP—ON relay 3912 which operated when the lower limit switch 3913 closed its right contact when the shaft 3910 was moved from its normal position by the operation of the right engine BHP motor control circuit, thence over conductor 3914 and through the winding of the thrust horse-power potentiometer TP7 to ground. From the brush of this potentiometer a potential is derived which is applied over conductor 604, over the left No. 2 front contact of F relay 1241, over conductor 1217, through the weight potentiometer WP4, over the upper No. 1 front contact of H relay 602 to the junction point 611 on the yoke potentiometer YP2, thence over the left or 14 per cent portion of the potentiometer winding and through resistance 605 to ground and in parallel through the remaining 86 per cent of the potentiometer winding and through resistance 606 to ground. The brush of this potentiometer derives a potential which is applied through resistance 607, resistance 608 and over the lower No. 1 contacts of H relay 602 to ground, and in parallel with resistance 608, through resistance 610 to control conductor 1216. It is to be noted that this potential is made dependent upon the weight potentiometer WP4, upon the thrust horse-power output of the two propellers as indicated by the thrust horse-power potentiometer TP7 and upon the position of the yokes 1411 and 1511 which determine the setting of the brush of yoke potentiometer YP2.

The weight potentiometer WP4 has been adjusted by the shaft 717 through the unity ratio bevel gears 716 from the shaft 1360 driven by the motor of the weight motor control circuit, Fig. 13, which circuit is controlled over control conductor 1362, through resistance 1363, conductor 1364 to the brush of the weight rheostat WCR at the instructor's desk which it will be recalled has been set for an assumed weight of the aircraft of 45,000 pounds. For applying potential over the circuit just traced, the winding of rheostat WCR is energized over a circuit from ground through the potentiometer winding in parallel with resistance 1912, through resistance 1913 to the 40φ1 bus bar whereby potential of phase φ1 is applied to the control conductor 1362. When the shaft 717 has positioned the brushes of the potentiometers associated therewith in a rotational position corresponding to the assumed weight of 45,000 pounds, the brush of balancing potentiometer WP3 will apply potential of phase φ2 through resistance 720 to control conductor 1362 whereupon the motor of the weight motor control circuit will stop the rotation of shaft 717. Potential of phase φ2 impressed upon the brush of potentiometer WP3 is derived from the winding of such potentiometer which is energized over a circuit from ground through its winding in parallel with resistance 721 to the 40φ2 bus bar.

The thrust horse-power potentiometer TP7 has been adjusted as previously described by the movement of shaft 719 in accordance with the thrust horse-power developed by both propellers.

As the shaft 601 is rotated by the motor M12 of the indicated air speed motor control circuit to a degree commensurate with the simulated instant speed at which the aircraft is moving in the water, a potential of phase φ2 is applied to the control conductor 1216 under the control of the variacs IASV1 and IASV2 in an attempt to balance the potential of phase φ1 which has been applied under the control of the yoke potentiometer YP2. As the condition of balance is approached the motor M12 slows down. To attain the condition of balance potential of phase φ2 is applied from bus bar 40φ2 through the winding of variac IASV1, a potential derived therefrom is applied across the winding of variac IASV2 and the potential derived at the brush of the latter variac is applied over conductor 613, through the winding of potentiometer AAP1, over the brush of potentiometer AAP2 which is at this time at the No. 1 terminal of its windings through resistance 616 to control conductor 1216. Potential of phase φ2 is also derived from the variacs and applied over conductor 613, through resistance 614, through the winding of wing flaps potentiometer WFP8, over the brush of such potentiometer and resistance 615 to control conductor 1216. Since the F relay 1214 is at this time operated, no ground potential is applied to the No. 1 terminals of potentiometers AAP1, AAP2 and WFP8 and since the brushes thereof are at the No. 1 ends of their windings, these potentiometers have no potentiometer action at this time but serve only to introduce resistance into the balancing circuits just traced. Therefore the brushes of the indicated air speed variacs serve to control the increase of the phase φ2 balancing potential.

As soon as a simulated speed of substantially 28 knots is reached, at which speed an aircraft should be riding on the step, the cam operated contacts 1212 will open thereby releasing the H relay 602 and the H1 relay 603. With H relay 602 now released the circuit previously traced from the brush of the weight potentiometer WP4, over which potential of phase φ1 was applied to control circuit 1216 of the indicated air speed motor control circuit, is transferred over the upper No. 1 back contact of relay 602 to the junction point 612 of the yoke potentiometer YP2 and thence as traced through 44 per cent of the winding of this potentiometer and resistance 605 to ground and in parallel through 56 per cent of the winding and resistance 606 to ground. The brush of this potentiometer is now connected through both resistances 608 and 609 to ground and also through resistance 610 to control conductor 1216. With relay 602 released the shunt of resistance 609 is removed so that now the leak resistance from the brush of potentiometer YP2 is increased and consequently the potential of phase φ1 applied from the brush through resistance 610 to control conductor 1216 is maintained at substantially the value it was prior to the release of relay 602 and the transfer of the input potential from the junction point 611 to the junction point 612 on the winding of potentiometer YP2.

The pilot now pushes the yoke 1411 away from him gradually or causes the yoke to so move by the adjustment of the elevator trim wheel ET whereupon the brush of potentiometer YP2 moves slowly from the junction point 611 toward the junction point 612 and the potential of phase φ1 applied to the control conductor 1216 is gradually increased. The motor M12 of the indicated air speed motor control circuit will thereupon again rotate the shafts 1210 and 601 until the air speed indicators 1431 and 1531 on the pilot's and copilot's instrument panels indicate an air speed of 85 knots or more. Similar instruments 1731 and 1931 on the navigator's and instructor's instrument panels will similarly indicate an air speed of 85 knots or more.

In response to the movement of the indicated air speed shaft 601, the brush of potentiometer IASP4 is adjusted thereby to control the true air speed motor control circuit of Fig. 7. This circuit is controlled by a potential representing the solution of the indicated air speed and the altitude and converts the indicated air speed to true air speed. This is necessary since various equations relating to the operation and flight of an aircraft are based upon true air speed rather than upon indicated air speed. The true air speed becomes greater than the indicated air speed with an increase of altitude in conformity with the reduced atmospheric pressure. Although there are no instruments showing the true air speed, the potentiometers driven by the true air speed motor control circuit serve to modify the potentials introduced into other associated control circuits such as the angle of attack, ball, bank, manifold pressure, compass, brake horse-power, and the flight recorder control circuits. The true air speed $V_T$ may be expressed in terms of the indicated air speed $V_I$ when the altitude air density is $\rho a$ and the sea level density is $\rho 0$ by the following equation:

$$V_T\sqrt{\frac{\rho a}{\rho 0}}=V_I$$

To control the true air speed motor control circuit, potential of phase φ1 is applied from bus bar 40φ1 through resistance 725, through the winding of the indicated air speed potentiometer IASP4 to ground and a potential derived therefrom is applied through resistance 726 to control conductor 728 of the true air speed motor control circuit. In response to this potential the motor of this circuit rotates the shaft 710 and, through the unity ratio bevel gears 712, rotates the shaft 713 until the brush of balancing potentiometer TASP10 is so positioned that potential of phase φ2 applied over its brush and through resistance 724 to control conductor 728 balances the potential of phase φ1 whereupon the rotation of shafts 710 and 713 is arrested. The potential of phase φ2 is made dependent on the setting of the altitude potentiometer AP7 and for this purpose potential from bus bar 40φ2 is applied across the winding of potentiometer AP7 and through resistance 722 and the potential derived from the brush of this potentiometer, which potential will thus vary in accordance with the altitude, is applied through resistance 723 across the winding of potentiometer TASP10 from the brush of which potential is derived and applied to control conductor 728.

When an indicated air speed of about 85 knots is reached the pilot slowly pulls back the yoke 1411 or causes it to move back through the adjustment of the elevator trim wheel ET thereby causing the movement of the brushes of the yoke potentiometers YP1 and YP2 towards the No. 3 terminals of their windings until the rate of climb indicators 1441 and 1541 on the pilot's and copilot's instrument panels show an up indication that the aircraft is leaving the water and is becoming air-borne. The rate of climb indicator 1941 on the instructor's instrument panel is similarly operated. These indicators are driven by the associated receiving autosyns 1442, 1542 and 1942, the rotor windings of which are energized from the 400C and 400G bus bars. The stator windings of the autosyns 1442 and 1452 are connected over conductors 1436 and 1437 with the stator windings of the transmitting autosyn 1161 driven by shaft 1160 of the rate of climb motor control circuit of Fig. 11, the rotor of autosyn 1161 being energized from the 400C and 400G bus bars.

The movement of the yoke 1411 causes the adjustment of the yoke potentiometer YP1 which is instrumental in controlling the angle of attack motor control circuit of Fig. 11. The angle of attack of an aircraft is the angle which the chord line of the wings makes with the flight path of the aircraft. The angle of attack circuit of the trainer is based on a consideration of the various moments tending to make an aircraft nose up or nose down. There are three of these moments, the wing, tail and thrust moments. These moments may be expressed by the following equations:

(A)
$$\frac{\text{Tail moment}}{V_I^2} = K_1 - K_2 C_L - K_3 \text{ (elevator deflection)}$$

(B)
$$\frac{\text{Wing moment}}{V_I^2} = K_3 C_L \text{ (horizontal distance to the center gravity)}$$

(C)
$$\frac{\text{Thrust moment}}{V_I^2} = K_4 \frac{\text{Thrust horse-power}}{V_T V_I^2}$$

In these equations $V_I$ represents the indicated air speed, $V_T$ represents the true air speed and $C_L$ represents the coefficient of lift. The circuit disclosed in the upper portion of Fig. 5 represents the sum of the three Equations A, B and C with a slip stream effect added to the elevator or yoke element of the circuit in the form of a thrust horse-power potentiometer TP6.

The elements $K_1$ and $K_3$ of Equation A are added together and represented by the resistances 514 and 515 connected between the 40φ1 and 40φ2 bus bars which supply potential across the windings of the yoke potentiometer YP1, the potential derived at the brush of such potentiometer as determined by the movement of the yoke being applied through resistance 516 to control conductor 1102 of the angle of attack motor control circuit. Potential from the brush of potentiometer YP1 is also applied through the winding of thrust horse-power potentiometer TP6, the potential derived from the brush of which is applied through resistance 517 to the control conductor to supply the slip stream effect above referred to.

The element $K_2 C_L$ is represented by the potential of phase φ1 applied through resistance 518 and winding of the wing flaps potentiometer WFP11 from the brush of which a derived potential dependent upon the position of the wing flaps is applied through the resistance 519 to control conductor 1102 and is also represented by the potential of phase φ1 which is applied through resistance 520 and through the angle of attack potentiometer AAP7 from the brush of which a derived potential is applied through resistance 521 to control conductor 1102.

The element $K_3 C_L$ (horizontal distance to the center of gravity) is represented by the potential applied through resistance 522 to control conductor 1102. To secure this potential the terminals of the longitudinal center of gravity rheostat LoCGR at the instructor's desk are connected through resistances 1914 and 1915 with the 40φ1 and 40φ2 bus bars and the potential derived at the brush of this rheostat is applied over conductor 1916 through the winding of the angle of attack potentiometer AAP5, the potential derived at the brush of which is applied through resistance 522 to conductor 1102.

The element $$K_4 \frac{\text{Thrust horse-power}}{V_T V_I^2}$$

is represented by the potential applied through resistance 523 to conductor 1102. To secure this potential, the potential of phase φ1 is applied from bus bar 40φ1 through resistance 524 and through the winding of thrust horse-power potentiometer TP8 and the potential derived from the brush thereof is applied through the winding and over the brush of the indicated air speed potentiometer ISAP9 and through resistance 523 to conductor 1102, a part of this potential being dissipated through the leak resistance 525 to ground. With the yoke pulled back a potential of phase φ2 derived at the brush of yoke potentiometer YP1, the winding of which is bridged through resistances 514 and 515 across the 40φ1 and 40φ2 bus bars, is applied through resistance 516 to the control conductor 1102.

In response to the sum of the potentials applied to conductor 1102, potential of phase φ2 predominating at this time, the motor of the angle of attack motor control circuit is operated to rotate the shaft 1110 and through the unity ratio gears 500 to rotate the shaft 501 until the brushes of potentiometers AAP5 and AAP7 assume positions in which the potential of phase φ1 applied thereover balances the potential of phase φ2. When this condition is attained the motor stops and the shafts 1110 and 501 will have been set into positions commensurate with the angle of attack. No instruments are directly controlled by the shaft 1110 but potentiometers operated by the shaft 501 are instrumental in controlling the bank, rate of climb and indicated air speed motor control circuits. Potential of phase φ1 is applied from the 40φ1 bus bar through resistance 520 and the winding of potentiometer AAP7 and potential derived at the brush of this potentiometer is applied through resistance 521 to control conductor 1102. Potential of phase φ1 is also derived from the brush of potentiometer AAP5 and applied through resistance 522 to control conductor 1102. The winding of potentiometer AAP5 is connected over conductor 1916 with the brush of the longitudinal center of gravity rheostat LoCGR at the instructor's desk, the winding of which rheostat is bridged through resistances 1914 and 1915 between the 40φ1 and 40φ2 bus bars. Since it has been assumed that the instructor has set the slider of this rheostat to a thirty-three per cent position from the No. 3 terminal of the winding, potential of phase φ1 will be applied over the slider and conductor 1916 to the winding of potentiometer AAP5.

The pilot will note that to pull the yoke 1411 back considerable pressure has been required due to the loading applied by the elevator trimming mechanism 1517 in simulation of the resistance which would be encountered in an actual aircraft in the operation of the yoke to execute a climbing maneuver. This loading will increase as the air speed increases. For the purpose of increasing the loading as the air speed increases potential of phase φ1 from bus bar 40φ1 is applied through resistance 1219 and the winding of the indicated air speed potentiometer IASP3 and the potential derived from the brush thereof is applied over conductor 1229 and through resistance 1608 to the control conductor of the spring tensioning motor control circuit 1603. The motor of this control circuit in response to the potential rotates the drum 1604 and through the cables 1605, 1606 and 1607 increases the tension of the loading springs of the loading mechanisms 1517, 1518 and 1519 in a manner fully disclosed in the application of Bohman et al. hereinbefore referred to.

The rate of climb motor control circuit is controlled by a potential representing the solution for the vertical accelerating force. In the trainer this is assumed to be the difference between the vertical component of the lift force (which is perpendicular to the wing axis of the aircraft) and the weight. Thus the circuit represents equation $$RC = \int (L \cos B - W) dt$$

or $$RC = \int \left( \frac{\rho 0}{2} SC_L V_I^2 \cos B - W \right) dt$$

where $\rho 0$ is the sea level air density, S is the wing area in square feet, $C_L$ is the coefficient of lift, B is the angle of bank and W is the weight of the aircraft in pounds. To this is added a waterborne effect in the form of the potentiometer RCP2 on the rate of climb shaft 551 to prevent the indication of a high rate of descent when the altimeter reads 0. The effect of wing ice may be imparted by the wing ice rheostat WIR at the instructor's desk as though the weight of the aircraft were increased. Full wing ice-on has the same effect as the addition of 60,000 pounds of weight. The network representing cosine B is an approximation.

As soon as the air speed increases to 28 knots and H relay 602 has therefore released, potential of phase φ1 is applied to the control conductor 1162 of the rate of climb motor control circuit. To accomplish this, potential of phase φ1 is applied across the winding of the indicated air speed variac IASV6 and a potential derived therefrom is applied across the winding of indicated air speed variac IASV7 from the brush of which potential is applied over conductor 492 through the winding of wing flaps potentiometer WFP9, resistance 502 and the winding of wing flaps potentiometer WFP10 to ground. The potentials derived at the brushes of the latter potentiometers are applied across the winding of the angle of attack potentiometer APP6. The potential derived from the brush of potentiometer APP6 is applied over conductor 503, over the No. 2 left back contact of S (stall) relay 1101 associated with the angle of attack motor control circuit, over conductor 504, over the upper No. 2 back contact of H relay 602, over conductor 505, through resistances 506 and 507 to control conductor 1162 whereby a potential of phase φ1 is applied to conductor 1162 which increases with the increase of the indicated air speed, which varies with the position of the wing flaps and varies with the angle of attack. The potential applied over conductor 504 through resistance 506 is also applied to the brush of the bank potentiometer BKP1 the winding of which is connected at one terminal through resistance 508 to ground and at the other terminal through resistance 509 to ground. Thus the potentiometer BKP1 serves to leak off a certain portion of the potential applied at the junction of resistances 506 and 507 and this leak off potential is made dependent upon the banking of the simulated flight as will be later described.

At the same time a potential of phase φ2 is applied to control conductor 1162 under the control of the weight potentiometer WP2 and the wing ice rheostat WIR at the instructor's desk. For this purpose potential of phase φ2 is applied from the bus bar 40φ2, over the lower No. 2 back contact of H relay 602, over conductor 510, through the winding of weight potentiometer WP2, through resistance 511, over conductor 512 and through the rheostat WIR at the instructor's desk to ground. The potential of phase φ2 derived from potentiometer WP2 is applied from its brush through resistance 513 to control conductor 1162 and is in opposition to the potential of phase φ1 applied through resistance 507 as previously described and may be varied in accordance with the setting of the weight potentiometer WP2 as adjusted in accordance with the setting of the weight rheostat WRC at the instructor's desk and may be increased to add the effect of wing ice through the setting of the wing ice rheostat WIR at the instructor's desk.

In response to the difference of phase φ1 and phase φ2 potentials the motor of the rate of climb motor control circuit of Fig. 11 will rotate shaft 1160 and through the unity ratio bevel gears 550 will rotate shaft 551. The motor will continue to operate and rotate the shafts at a slow speed so long as the lift force factor represented by the potential of phase φ1 exceeds the down force factor of weight represented by the potential of phase φ2. It will be noted that the indicated air speed variacs IASV6 and IASV7 determine a potential proportial to $V_I^2$, the angle of attack potentiometer APP6 modifies this potential in accordance with the angle of attack and that the weight potentiometer WP2 subtracts from this potential in accordance with the assumed value of the term W of the equation hereinbefore stated for expressing the rate of climb.

The brushes of the rate of climb potentiometers RCP1 and RCP2 are normally positioned at the center of their windings and when the brush of potentiometer RCP1 moves toward its No. 3 terminal in response to the simulated climbing a potential of phase φ2 is applied to control conductor 1264 of the altimeter motor control circuit of Fig. 12 from the brush of potentiometer RCP1, over conductor 617 and through resistance 618. This potential is derived from the winding of the potentiometer which is bridged by resistance 619, the mid-point of which is grounded, and which winding is connected at one terminal through resistance 620 to the 40φ1 bus bar and at the other terminal through resistance 621 to the 40φ2 bus bar. The altimeter motor control circuit integrates the rate of climb indication. When the rate of climb indication shows a climb of 1000 feet per minute, for example, the altitude motor will drive the shaft 1260 and through the unity ratio bevel gears 650 will drive the shaft 651 at a rate to increase the altimeter reading 1000 feet per minute. On a negative rate of climb (dive) when the brush of potentiometer RCP1 is moving toward the No. 1 terminal of its winding, and potential of phase φ1 is applied to control conductor 1264, the altimeter motor reverses its direction of rotation and revolves at a rate corresponding to the rate of climb indication. The rotation of shaft 651 through the gears 652, shaft 653 and gears 5002, rotates the shaft 5003 as previously described.

The rotation of shaft 1260 also adjusts the altimeter potentiometer AP5 which, as previously described, affects the reading of the outside air temperature indicator OT at the instructor's desk, 2813 on the flight engineer's instrument panel and 1526 on the copilot's instrument panel to indicate a lowering air temperature as the altitude increases. Shaft 1260 also drives the rotor of the transmitting magnesyn 1265, the outside terminals of the stator windings of which are connected to the 400C and 400G bus bars and the junction points between the windings of which are connected over conductors 1266 and 1267 to the junction points between the stator windings of the receiving magnesyns 1452 and 1552 which drive the altimeters on the pilot's and copilot's instrument panels. Branches of conductors 1266 and 1267 are connected to the junction points between the stator windings of the receiving magnesyn 1952 which drives the altimeter 1951 at the instructor's desk and over conductors 2756 and 2757 of cable 2750 are connected to the junction points between the stator windings of the receiving magnesyn 2752 which drives the altimeter 2751 at the navigator's station. The outside terminals of the stator windings of these receiving magnesyns are connected to the 400C and 400G bus bars. Thus the operation of the altimeter motor control circuit of Fig. 12 controls the readings of the altimeters.

The potential of phase $\varphi 1$ which is applied to conductor 617 for controlling the altimeter motor control circuit is also applied through resistance 729 to control conductor 1311 of the pitch bar motor control circuit. The pitch bar is the horizon of the artificial horizon instrument. Pitch is indicated by the displacement of this bar in a direction perpendicular to itself. A true equation for pitch is Pitch = angle of climb × angle of attack
                   × cosine (bank angle)

This equation is approximately by assuming that the angle of climb is proportional to the rate of climb (the proportionality factor being based on the average air speed); and by assuming that cosine (bank angle) is equal to 1. Thus the equation becomes Pitch = $K$ × rate of climb + angle of attack When the trainer is simulating the on-the-water condition the effect of the angle of attack is halved to provide a somewhat closer simulation of a water-borne condition.

The potential of phase $\varphi 1$ applied through resistance 729 is supplied through the rate of climb potentiometer RCP1 and therefore this potential supplies the rate of climb element of the pitch equation. For supplying a potential which varies with the angle of attack and in accordance with whether the trainer is simulating an on-the-water or air-borne condition of flight, potential from the $40\varphi 1$ and $40\varphi 2$ bus bars applied through resistances 622 and 623 across the winding of the angle of attack potentiometer AAP3, is applied from the brush of such potentiometer over conductor 624, over the back contact of ASN1, relay 403, over conductor 625, through resistance 628, over the front contact of H1 relay 603 and through resistance 626 to ground. Potential derived at the junction between resistances 627 and 628 is applied over conductor 627 and through resistance 730 to control conductor 1311 of the pitch bar motor control circuit until the aircraft has left the water. As soon, however, as the airborne condition is simulated and H1 relay 603 is released, this potential is increased.

In response to potential applied to control conductor 1311 the pitch bar motor control circuit causes the motor thereof to rotate the shaft 1310, and, through the unity ratio bevel gears 704, to rotate the shaft 705 in directions indicative of the fact that the trainer is executing a climbing or nosing up maneuver. As a result of the rotation of shaft 705 the pitch bar balancing potentiometer PBP6 is adjusted until the potential derived at its brush from its winding, which is bridged through resistances 629 and 630 between the $40\varphi 1$ and $40\varphi 2$ bus bars, and applied over conductor 631 and through resistance 731 to control conductor 1311, balances the sum of the potentials applied to conductor 1311 through resistances 729 and 730. When this condition of balance is attained the motor of the pitch bar motor control circuits stops. The shaft 1310 has now rotated the rotor of transmitting autosyn 1325 to a position indicative of the position of the nose of the aircraft with respect to the horizon. The rotor of autosyn 1325 is energized from the 400C and 400G bus bars and the stator windings are connected over conductors 1326 and 1327 with the stator windings of the horizon bar receiving autosyn 1462 which drives the horizon bar of the artificial horizon instrument 1461 which is mounted on the pilot's instrument panel. The rotor winding of this autosyn is energized from the 400C and 400G bus bars. At this time the receiving autosyn 1462 is so operated as to depress the horizon bar indicating that a climbing maneuver is being executed. The stator windings of the transmitting autosyn are also connected over branches of conductors 1326 and 1327 with the stator windings of the horizon bar receiving autosyn 1962 which drives the horizon bar of the artificial horizon instrument 1961 at the instructor's desk. These instruments 1461 and 1961 may be of the type disclosed in the Patent No. 2,381,872 granted to C. I. Baker on August 14, 1945.

In an actual aircraft on a climbing maneuver as the rate of climb increases the air speed decreases causing a temporary loss of lift, making the flight path curve toward the horizon again, and this change in the flight path means a change in the angle of attack and the aircraft noses down until it has recovered cruising speed. By this time the nose has already gone down below the cruising altitude so that the flight path is nearly leveled off. This results in a change in the angle of attack thus causing the nose to come up again and the aircraft will again climb. This cycle will continue to repeat itself unless there is a change in the applied power. These oscillations are known as phugoid oscillations.

In the trainer the angle of attack, rate of climb and indicated air speed circuits are so interrelated that these oscillations are simulated. As the rate of climb slowly goes up and the shaft 551 rotates the brush of potentiometer RCP1 toward the No. 3 terminal of its winding, potential of phase $\varphi 2$ is applied from the brush thereof, over conductor 617, over the No. 4 right back contact of S relay 1101, over conductor 1103, through the thrust horse-power potentiometer TASP6 and through the winding of weight potentiometer WP1 and resistance 632 in parallel, through resistance 633 to ground. The potential of phase $\varphi2$ derived at the brush of potentiometer WP1 is applied through resistance 634 to control conductor 1216 of the indicated air speed motor control circuit. This potential opposes the potential of phase $\varphi1$ which is derived from the winding of the brake horse-power potentiometer TP7 and applied over conductor 804, the No. 3 left back contacts of F relay 1241, which releases as soon as the leaving-the-water position of the aircraft was simulated, over conductor 1221, through resistance 635, over the true air speed potentiometer TASP7 and resistance 636 to ground, a derived potential being taken off between the winding of potentiometer TASP7 and resistance 636 and applied through resistance 637 to control conductor 1216. As the rate of climb increases the potential of phase $\varphi2$ overbalances the potential of phase $\varphi1$ and the indicated air speed motor control circuit is controlled to cause a reversal of the direction of rotation of shafts 1210 and 601 controlled thereby resulting in the reduction of the indicated air speed readings on the air speed indicators.

With a slow reduction of the indicated air speed the brush of potentiometer IASP9 is moved toward the No. 1 winding terminal thereby increasing the potential of phase $\varphi1$ applied from the brush thereof through resistance 523 to control conductor 1102 of the angle of attack motor control circuit, until a condition of balance with respect to the potential of phase $\varphi2$ applied by the yoke potentiometer YP1 is reached at which time the rotation of shafts 1110 and 501 ceases.

With potential of phase $\varphi1$ increased above the potential of phase $\varphi2$ applied by the yoke potentiometer YP1, the angle of attack motor control circuit is operated to rotate the shafts 1110 and 501 in a direction indicative of the reduction of the angle of attack until a balance of the potentials applied to control conductor 1102 is obtained. As a further result of the decrease in air speed, the movement of the brushes of the indicated air speed variacs IASP9 and IASP7 toward the No. 2 terminals of their windings decreases the potential of phase $\varphi1$ applied from the brush of variac IASP7 over the circuit previously traced through the winding of angle attack potentiometer APP6 and to control conductor 1162 of the rate of climb motor control circuit. This potential is further slightly reduced by the potentiometer APP6 due to the reduction of the angle of attack. Thus this potential is reduced slowly as the indicated air speed and the angle of attack decrease until such potential equals the potential of phase $\varphi2$ applied to control conductor 1162 through resistance 513 under the control of the weight potentiometer WP2, indicative of a condition where the lift equals the drag and the climbing of an actual aircraft would cease. When this condition is attained the motor of the rate of climb motor control circuit ceases to operate and the shafts 1160 and 551 controlled thereby cease their rotation.

The indicated air speed may indeed decrease to such an extent that the potential of phase $\varphi1$ indicative of the lift becomes less than the potential of phase $\varphi2$ indicative of the drag whereupon the motor of the rate of climb motor control circuit will be operated in the opposite direction thereby operating the rate of climb indicators to show a decrease in the rate of climb. In response to the operation of the rate of climb motor control circuit the brush of the rate of climb potentiometer RCP1 is moved back toward the No. 1 terminal of its winding thereby decreasing the potential of phase $\varphi2$ applied over such brush and as previously stated through resistance 634 to control conductor 1216 of the indicated air speed motor control circuit. The potential of phase $\varphi1$ applied from the brush of thrust horsepower potentiometer TP7, over the circuit traced through resistance 637 to control conductor 1216, now overbalances the potential of phase $\varphi2$ and the motor of the indicated air speed motor control circuit thereupon operates to rotate shafts 1210 and 601 in directions indicative of an increase in air speed, whereupon the indicated air speed indicators will show an increase in air speed.

With an increase in the indicated air speed, potential of phase $\varphi1$ applied over the indicated air speed potentiometer IASP9 and through resistance 523 to the control conductor 1102 of the angle of attack circuit, is decreased whereupon the potential of phase $\varphi2$ applied over the yoke potentiometer YP1 overbalances the potential of phase $\varphi1$ and the angle of attack motor control circuit is operated to indicate an increase in the angle of attack. Thereupon the movement of brushes AAP1 and AAP2 towards the No. 3 terminals of their windings increases the potential of phase $\varphi2$ applied from the brush of indicated air speed variac IASV2, thence as stated from the brush of potentiometer AAP2, through resistance 616 to control conductor 1216 of the indicated air speed motor control circuit. As the indicated air speed increases and the angle of attack increases, the potential of phase $\varphi2$ applied to conductor 1216 increases until it balances the potential of phase $\varphi1$ applied to control conductor 1216 whereupon the motor of the indicated air speed motor control circuit arrests the rotation of shafts 1210 and 601 and the indicated air speed indicators cease to show an increasing air speed.

In response to the increase in air speed and increase in the angle of attack, the lift potential of phase $\varphi1$ applied from the brush of indicated air speed variac IASV7 over the circuit traced over the brush of angle of attack potentiometer APP6 and through resistance 507 to control conductor 1162 of the rate of climb motor control circuit, becomes greater than the potential of phase $\varphi2$ under control of the weight drag imposed by the weight potentiometer WP2 and the motor of the rate of climb motor control circuit is operated to rotate shafts 1160 and 551 in directions indicative of an increase in the rate of climb whereupon the rate of climb instruments now indicate an increase in the rate of climb. Again, as previously described, the movement of the brush of rate of climb potentiometer RCP1 will apply more potential of phase $\varphi2$ to the control conductor 1216 of the indicated air speed motor control circuit until the potential of phase $\varphi2$ again overbalances the potential of phase $\varphi1$ on such conductor and the motor of the indicated air speed motor control circuit is again operated in a direction to indicate a reduction of air speed.

The cycle of operations of the indicated air speed, angle of attack and rate of climb motor control circuit continues to simulate the climbing of an actual aircraft in phugoid oscillations until the yoke potentiometer YP1 is moved forward to level off the simulated flight.

As soon as the air-borne condition of the flight is simulated, relay 1241 associated with the indicated air speed motor control circuit is released by the opening of the left contact of the contact set 1263 operated by a cam driven by the altimeter shaft 1260 through the gears 1264. Relay 1241 upon releasing establishes a circuit from ground over its No. 2 right back contact, over conductor 5681 of cable 5600, through the winding of FL relay 5641, Fig. 56, to battery and ground, relay 5641 remaining operated so long as an air-borne or flight condition of a flight is being simulated. With relay 5641 operated, the operation of the sound effects circuit of Fig. 58 is modified to simulate the change in the sounds which the pilot hears when an aircraft takes to the air.

For this purpose relay 5641 establishes a circuit which may be traced from ground over its upper No. 3 contacts, over conductor 5824 and through the enabling relay 5825 of the sound effects circuit to battery and ground. Relay 5825 upon operating removes a short circuit from across the input circuit of the dual amplifier tube 5826. For simulating the wind noise of an aircraft in flight, the oscillator tube 5827, the dual amplifier tube 5826 and the detector tube 5828 are provided. The oscillator tube 5827 functions with the condenser 5829 to generate a sawtooth wave which, when relay 5825 is energized, is impressed upon the input circuit of the dual amplifier tube 5826, is amplified thereby and impressed through the volume regulating rheostat 5830 upon the control grid of the detector tube 5828, the cathode-anode path through which is connected in series with the primary winding of output transformer 5806. Anode potential is applied from the source B58, through resistance 5809 to the anode bus bar 5831 and from this bus-bar through resistances 5832, 5833 and 5834 to the anodes of tubes 5826 and 5827. Direct current bias is impressed upon the grid 5835 of tube 5828 through resistance 5836 across the cathode-anode path through the right unit of the dual rectifier tube 5816 and through the secondary winding of transformer 5837 to ground, this cathode-anode path being bridged across the secondary winding of transformer 5837 and energized by potential from the 40 $\varphi 2$ bus-bar impressed through the rheostat 5838 and from the brush thereof through resistance 5839 and through the primary winding of transformer 5837.

A potential of phase $\varphi 2$ is also applied from the brush of indicated air speed variac IASV7, over conductor 5840, through the winding of rheostat 5841 and from the brush thereof through resistance 5842 and through the primary winding of transformer 5837. The filaments of tubes 5826, 5827 and 5828 are energized from the filament current transformer 5820.

The output from the oscillator tube 5827, as amplified by the tube 5826 and detected by the tube 5828 and impressed upon the output of transformer 5807, simulates the rushing sound of the air when an aircraft is in flight which is varied in intensity by the indicated air speed variac IASV7 as the air speed increases and which rushing sound is superposed on the engine explosion noise impressed upon the output transformer 5806 by the detector tube 5805.

The pilot now operates the aileron and rudder trim wheels AT and RT thereby operating the associated rheostats ATR and RTR which control the aileron trimming motor control circuit 1601 and the rudder trimming motor control circuit 1602 to in turn control the aileron and rudder trimming mechanisms 1518 and 1519 so that the indicators of the trainer show that there is no tendency to indicate a bank or turn in the simulated flight. This trimming is produced in the manner fully set forth in the application of Bohman-Davis-Germanton hereinbefore referred to. The pilot will note that if trimming is produced by the operation of the trim wheels the neutral positions of the aileron control wheels 1415 and 1515 and of the rudder control pedals 1400, 1401 and 1500, 1501 will be changed.

The pilot next operates the wing flaps key 1820 to its up position whereupon a circuit is established from ground over conductor 3302, over the lower contacts of WF relay 1804, through the contacts of key 1820, over conductor 1822, over the normal contacts of limit switch 771 of the wing flaps motor control circuit of Fig. 7, over the right back contact of relay 765 and through the right shaded pole winding 770 of motor 769 to ground thereby shunting such winding and causing the motor 769 to operate and through the reduction gear box 768 to rotate the shaft 760 in a counterclockwise direction thereby moving the brushes of the potentiometers WFP6 to WFP11, inclusive, toward the No. 1 terminals of their windings. The pilot holds the key 1820 in its up position until the wing flaps indicator 1525 on the pilot's instrument panel indicates a zero reading when he will open the key thereby removing the shunting ground from conductor 1822 to stop the wing flaps motor 769. The wing flaps position indicator 1911 mounted on the instructor's desk will also indicate the zero position of the wing flaps.

When the altimeter reads an altitude of 1000 feet the governor controls of the overhead equipment are adjusted until the right and left engine tachometers 1722 and 1723 on the pilot's instrument panel indicate engine speeds of 1800 revolutions per minute and the synchroscope 1726 indicates that the engines are synchronized at that speed. The tachometers 2522, 2523 and the synchroscope 2524 at the instructor's desk and the tachometers 2814 and 2815 and synchroscope 2816 on the flight engineer's instrument panel will now show similar readings. The throttles of the overhead equipment are then moved back until the manifold pressure indicator 1724 on the pilot's instrument panel indicates a manifold pressure of each engine of 27.5 inches of mercury at which time the manifold pressure indicators 2327 and 2810 at the instructor's desk and on the flight engineer's instrument panel will indicate the same pressures. The manner in which the manifold pressure, R. P. M. and other motor control circuits respond to these controls has been previously described.

To simulate leveling off the flight at 1000 feet altitude the yoke 1411 is pushed forward until the rate of climb indicators 1441 and 1541 indicate a zero rate of climb, or this may be accomplished through the operation of the elevator trim wheel ET until no pressure is exerted on the yoke. If necessary, the aileron and rudder trim wheels AT and RT are operated further until there is no tendency for the instruments of the trainer to indicate a banking or turn in the simulated flight, when no pressure is exerted on the aileron or rudder controls. Moving the yoke forward moves the brush of yoke potentiometer YP1 toward the No. 3 terminal of its winding thereby reducing the potential of phase $\varphi 2$ which has been applied over such brush to control conductor 1102 of the angle of attack motor control circuit, to cause the motor of such circuit to operate in the reverse direction thereby moving the brush of angle of attack potentiometer AAP6 towards the No. 1 terminal of its winding to reduce the potential of phase φ1 applied to the control conductor 1162 of the rate of climb motor control circuit. This reduction of potential is instrumental in causing the motor of such circuit to rotate the shaft 1160 in such a direction as to cause the rate of climb indicator pointers to move back toward their zero positions.

*Changing mixture to cruising lean*

At the flight engineer's station the mixture control switches 2916 and 2917 are now operated into engagement with their upper or cruising lean mixture contacts. With switches 2916 and 2917 thus set circuits are established from ground over the upper contacts of switches 2925 and 2926, over the upper contacts of switches 2916 and 2917, conductors 2891 and 2892 of cable 2890, to battery through the winding of the LN relay 5653 of the right engine control circuit, Fig. 56, and to battery through the winding of the similar LN relay of the left engine control circuit of Fig. 45. The operation of the switches opens the previously traced circuits for the rich mixture lamps 2208 and 2209 at the instructor's desk and the operation of the LN relays establishes circuits for the lean mixture lamps 2240 and 2241. The circuit of lamp 2241 may be traced from battery through such lamp, over conductor 5662 of cable 5600 and over the inner lower contacts of LN relay 5653 to ground. A similar circuit is established for lamp 2241, over conductor 4562 of cable 4500 to ground over a contact of the LN relay (not shown) of Fig. 45. The instructor is thus informed of the fact that the flight engineer has changed the engine mixtures from rich to cruising lean.

With the mixture thus changed the operation of LN relay 5653 for the right engine connects resistance 5665 in series with resistance 5663 in the potential divider extending over conductor 5664, through resistances 5766 and 5746, through the winding of potentiometer 5775 and resistance 5745 to ground, whereby the potential applied to the input of the control circuit of the cylinder and oil temperature motor control circuit is decreased to cause the right engine oil temperature indicator 2308 and the right engine unit of the cylinder temperature indicator 2321 at the instructor's desk and the right engine oil temperature indicator 2818 and the right engine unit of the cylinder temperature indicator 2839 on the flight engineer's instrument panel to show decreased temperature readings. The operation of the corresponding LN relay of the left engine control circuit of Fig. 45 likewise causes the left engine oil temperature indicator 2312 and the left engine unit of the cylinder temperature indicator 2321 at the instructor's desk and the left engine oil temperature indicator 2817 and left engine unit of the cylinder temperature indicator 2839 on the flight engineer's instrument panel to show decreased temperature readings.

At its inner transfer contacts LN relay 5653 removes the 6000-ohm resistance 5651 from its series connection with resistance 5652 and connects resistance 5651 in series between the brush of altimeter potentiometer AP1 and the control conductor 4803 of the right engine fuel flow motor control circuit whereupon this control circuit is controlled to operate the transmitting autosyn 3725 driven by its shaft 3710 to cause the right unit of the fuel flow indicator 2329 at the instructor's desk and the right engine fuel flow indicator 2806 on the flight engineer's instrument panel to indicate a reduction in the fuel flow to 950 pounds per hour. The corresponding LN relay of Fig. 45 similarly controls the left engine fuel flow motor control circuit whereby, the left unit of the indicator 2329 at the instructor's desk and the left engine fuel flow indicator 2805 at the flight engineer's instrument panel indicate a fuel flow of 950 pounds per hour.

At its upper transfer contacts LN relay 5653 removes the 45-ohm resistance 5657 from its series connection with resistance 5658 to ground and connects resistance 5657 in series in the connection from the 40φ1 bus-bar, over the upper No. 1 contacts of EST relay 5616, through resistance 5657, over the upper front contacts of relay 5653, thence over conductor 5659 through the winding of the potentiometer RMP1 in the control circuit of the right engine brake horsepower motor control circuit thereby causing the motor of the brake horse-power motor control circuit to operate the shafts 3910 and 5001 to adjust the potentiometers controlled thereby in a direction indicative of a reduction in the brake horse-power output of the right engine. The corresponding LN relay of the left engine control circuit of Fig. 45 similarly controls the left engine brake horse-power motor control circuit to operate shafts 3960 and 5051 to adjust the potentiometers controlled thereby in a direction indicative of a reduction in the brake horse-power output of the left engine.

*Stopping the auxiliary power plant*

The engines should now be operating at their best efficiency for the selected speed. Since the engines, through the generators driven thereby, are supplying the power for operating all of the auxiliary apparatus of the simulated aircraft, the operation of the auxiliary power plant is no longer necessary and the flight engineer may now stop the auxiliary power plane by opening the auxiliary power plane ignition key 3111 thereby opening the locking circuit of EST relay 3123 which releases and removes ground from conductor 3112 of cable 3100 to extinguish the auxiliary power plant ignition-on lamp 2213 at the instructor's desk. Relay 3123 upon releasing removes ground from conductor 3124 of cable 3100 thereby extinguishing the auxiliary power plant starter-run lamp 2215, opens the circuit of APPG relay 3125 which releases, opening the previously traced circuit through the auxiliary generator ammeter 3135 on the flight engineer's power panel and through the ammeter 2297 at the instructor's desk and opening the circuit extending over conductor 3132, through the winding of ST relay 3604 of the auxiliary engine oil and cylinder temperature motor control circuit of Fig. 36.

Relay 3604 upon releasing establishes over its upper No. 1 back contact a shunt of the shaded pole winding 3634 of the oil temperature motor 3620, such circuit extending over the normal contact of the L1 limit switch 3635. The motor 3620 thereupon operates to rotate the shaft 3622 in such a direction as to return the brushes of potentiometers 3600 and 3601 towards the No. 1 terminals of their windings. When the brushes reach the No. 1 terminals the limit switch 3635 operates to open the shunt of winding 3634 whereupon the motor 3620 stops. In the normal position of shaft 3622 the L2 limit switch contacts 3617 are again closed. The movement of the brushes of potentiometers 3600 and 3601 causes the auxiliary power plant oil temperature and cylinder temperature indicators APPO and 2317 at the instructor's desk and the oil temperature and cylinder temperature indicators 2812 and 2838 at the flight engineer's instrument panel to return to normal.

Relay 3604 upon releasing also releases the T relay 3608 and the NP relay 3609 whereupon potential of phase $\varphi 1$ is applied from the right portion of the secondary winding of transformer T36, over the lower No. 1 back contact of relay 3604, over the L1 limit switch 3615, through resistance 3606 and the rotor circuit of motor 3605 whereupon the motor is operated to rotate shaft 3612 back to its normal position in which the cam carried by such shaft will open the L1 limit switch contacts 3615 to stop the motor. The return of shaft 3612 to normal permits the L2 limit switch contacts 3607 to close and rotates the rotor of the transmitting autosyn 3613 to its normal position whereupon the auxiliary power plant oil pressure indicator 2357 at the instructor's desk and the corresponding oil pressure indicator 2807 on the flight engineer's instrument panel return to normal.

*Simulation of a correctly executed turn to the right*

Preparatory to executing a turn the pilot sets the gyro directional compass 1471 to agree with the remote reading magnetic or steering compass 1420. At the instructor's desk the directional gyro 1971 is also set to agree with the remote reading magnetic or steering compass 1920. The gyro directional compasses 1471 and 1971 used in the trainer may be of the type disclosed in Patent No. 2,379,869 granted to C. I. Baker on July 10, 1945. The pilot now pushes the right rudder pedal 1401 forward and rotates the aileron control wheel 1415 in a clockwise direction. As a result of the depression of the right rudder pedal 1401, the shaft 1406 is rotated thereby causing the rotation of shaft 303 and the movement of the brush of the rudder potentiometer RP toward the No. 1 terminal of its winding. As a result of the movement of the aileron wheel 1415 the shaft 1416 is rotated causing the rotation of shaft 307 and the movement of the brush of the aileron potentiometer ALP toward the No. 3 terminal of its winding.

The turning circuits, that is, the rate of turn, bank and ball motor control circuits of Figs. 3, 4, 9 and 10 interact with each other in accordance with the various turning movements resulting from the manipulation of the rudder and aileron controls. In addition the circuits are affected by the difference in thrust between the right and left engines. The rate of turn motor control circuit of Fig. 10 is controlled by potential applied to control conductor 1061. For this purpose potential of phase $\varphi 1$ derived in accordance with the function $V_{r}^{2}$ or the square of the air speed, from the indicated air speed variacs IASV6 and IASV7 is applied from the brush of variac IASV7 to the No. 1 terminals of the windings of rudder potentiometer RP and aileron potentiometer ALP and potential of phase $\varphi 2$ derived in accordance with the function $V_{r}^{2}$ from the indicated air speed variac IASV1 and IASV2 is applied from the brush of variac IASV2 to the No. 3 terminals of the windings of potentiometers RP and ALP. Normally the brushes of the latter potentiometers stand at the center points of their windings and no potential is therefore derived from the brushes thereof. However, with the brush of potentiometer RP assumed to have been moved toward the No. 3 terminal of its winding, a potential of phase $\varphi 2$ will be applied over the brush of such potentiometer and the lower back contact of ASN relay 404, which is unenergized when the aircraft is in motion, thence through resistances 421 and 422 to ground. From this potential divider at a point ahead of resistances 421 and 422 potential is applied through resistance 405 to control conductor 1061.

Opposing the turning effect, potential is applied from the brush of the rate of turn potentiometer RTP3, over conductor 406, through the potential divider comprising resistances 407 and 408 to ground over the upper No. 2 back contact of ASN1 relay. The potential derived from the junction point between resistances 407 and 408 is applied through resistance 409 to control conductor 1061. The winding of potentiometer RTP3 is shunted by resistance 313, the mid-point of which is grounded and is bridged through resistances 314 and 315 between the 40$\varphi 1$ and 40$\varphi 2$ bus-bars. If potential of phase $\varphi 2$ is applied to control conductor 1061 under the control of the rudder potentiometer RP and the motor of the rate of turn circuit of Fig. 11 is operated to turn shafts 1069 and 451 in a direction indicative of the turn to starboard and therefore the brush of the rate of turn potentiometer RTP3 is operated toward the No. 3 terminal winding, the potential of phase $\varphi 1$ will be applied from the brush of this potentiometer to oppose the turning effect.

If both engines are so operating as to deliver the same horse-power they will not affect the turning effect. If it be assumed, however, that the left engine is delivering more power than the right engine this engine will cause the turning effect toward the right to be augmented and this augmented effect will increase as the air speed increases. To produce this effect on the rate of turn motor control circuit, potential of phase $\varphi 1$ is applied from the bus-bar 40$\varphi 1$, through the true air speed potentiometer TASP3 and resistance 410 and thence in parallel through resistance 411 and the winding of brake horse-power potentiometer RBP9 to ground, and the potential of phase $\varphi 1$ derived at the brush of potentiometer RBP9 is applied through resistance 412 to control conductor 1061. At the same time potential of phase $\varphi 2$ is applied from the bus-bar 40$\varphi 2$ through the true air speed potentiometer TASP8, through resistance 413 and thence in parallel through resistance 414 and the winding of brake horse-power potentiometer LBP9 to ground and the potential of phase $\varphi 2$ derived at the brush of potentiometer LBP9 is applied through resistance 415 to control conductor 1061. With both engines delivering the same power these phase $\varphi 1$ and phase $\varphi 2$ potentials will balance but if, as assumed, the left engine is delivering more power than the right engine, the potential of phase $\varphi 2$ will be greater than the potential of phase $\varphi 1$ thereby augmenting the potential of phase $\varphi 2$ assumed to have been applied to control conductor 1061 by the operation of the right rudder pedal.

Another factor which affects the turning effect is due to skidding or a turn executed with insufficient bank or due to side slipping or a turn executed with too much bank either of which in an actual aircraft would cause a displacement of the ball indicator. This factor is expressed as a potential of either phase $\varphi 1$ or phase $\varphi 2$ applied to control conductor 1061 from the brush of the ball potentiometer BLP7. The winding of this potentiometer is bridged by resistance 319, the midpoint of which is grounded, and is bridged across the $40\varphi 1$ and $40\varphi 2$ bus-bars through resistances 321 and 322 and the potential derived at its brush when the brush moves from its normal central position is applied through resistances 320, over conductor 323 and through resistances 416 and 417 to ground. From the point on this potential divider between resistances 320 and 416, potential is applied through resistance 418 to control conductor 1061. If the turn has been executed properly no potential will be applied from the brush of potentiometer BLP7 to conductor 1061 since the brush will not have been moved by the bank motor control circuit from its normal central position with respect to the winding. If it be assumed, however, that the turn is being executed with insufficient bank then the brushes of ball potentiometers BLP6 and BLP7 will have been moved toward the No. 1 terminals of their windings to indicate a skid on a right turn and therefore potential of phase $\varphi 1$ would be applied to conductor 1061 to oppose the turning effect. On the other hand, if it were assumed that the turn is being executed with too much bank then the brushes of ball potentiometers BLP6 and BLP7 will have been moved toward the No. 3 terminals of their windings to indicate a side slip on a right turn and therefore potential of phase $\varphi 2$ would be applied to conductor 1061 to augment the turning effect.

In response to the sum of the potentials applied to control conductor 1061, the rate of turn motor control circuit is operated to cause the rotation of shafts 1060 and 451 and the rotation of the rotor of the transmitting autosyn 1062. The rotor of this autosyn is energized from the 400C and 400G bus-bars and the stator windings are connected over conductors 1063 and 1064 with the stator windings of the receiving autosyns 1482 and 1582 which drive the rate of turn indicators of the turn and bank instruments 1481 and 1581 on the pilot's and co-pilot's instrument panels and over branches of conductors 1063 and 1064 with the stator windings of the receiving autosyn 1982 which drives the rate of turn indicator of the turn and bank instrument 1981 at the instructor's desk. The rotor windings of the receiving autosyns 1481, 1582 and 1982 are energized from bus-bars 400C and 400G.

In response to the movement of the brush of the rate of turn potentiometer RTP3 toward the No. 3 terminal of its winding in response to a turn to the right, potential of phase $\varphi 2$ applied to control conductor 1061 increases until it balances the potential of phase $\varphi 1$ applied under the control of the rudder potentiometer RP through resistance 405 to such control conductor, whereupon the motor of the rate of turn motor control circuit will arrest the rotation of the shafts 1060 and 451 and the further advance of the pointers of the rate of turn indicators which will now indicate the rate of turn on a turn to the right.

In response to the operation of the aileron wheel 1415 for a right wing down to execute a turn to the right, the potential applied from the $40\varphi 1$ and $40\varphi 2$ bus-bars across the winding of the aileron potentiometer ALP under the control of the indicated air speed variacs IASV1, IASV2, IASV6, IASV7 is applied as a potential of phase $\varphi 2$ from the brush of potentiometer ALP, over the the inner upper back contact of ASN relay 404, and through resistance 420 to control conductor 1011 of the bank motor control circuit. With the right rudder pedal depressed and the brush of rudder potentiometer RP moved toward the No. 1 terminal of its winding, potential of phase $\varphi 1$ is derived therefrom and applied over the lower back contact of ASN relay 404 and through the potential divider comprising resistances 421 and 422 to ground and, from a point between resistances 421 and 422, potential is derived and applied as a potential of phase $\varphi 1$ through resistance 423 to control conductor 1011, opposing the banking effect.

If the bank is being executed properly, the brush of the ball potentiometers BLP6 and BLP7, will not be moved from the center position with respect to their windings and consequently with the winding of potentiometer BLP7 bridged across the $40\varphi 1$ and $40\varphi 2$ bus-bars as previously described, no potential will be applied from the brush thereof through the potential divider comprising resistances 320, 416 and 417, and therefore, no potential will be applied through resistance 419 to control conductor 1011. If the brush of potentiometer BLP7 has moved towards the No. 1 terminal of its winding indicating a skid on a right turn, then potential of phase $\varphi 1$ will be applied from a point between resistances 416 and 417 through resistance 419 to control conductor 1011, or if the brush of potentiometer BLP7 has moved toward the No. 3 terminal of its winding indicating a side-slip on a right turn, then potential of phase $\varphi 2$ will be applied from a point between resistances 416 and 417 through resistance 419 to the control conductor 1011.

It will be noted that on a skid the potential of phase $\varphi 1$ will oppose the potential of phase $\varphi 2$, applied through the aileron potentiometer ALP to reduce the amount of indicated bank and that on a side-slip the potential of phase $\varphi 2$ will augment the potential of phase $\varphi 2$ applied through the aileron potentiometer ALP to increase the amount of the indicated bank.

A further effect is introduced on the bank which results from the rate of turn. This effect is produced by the application of potential appearing at the brush of rate of turn potentiometer RTP3, and which on a right turn will be a potential phase $\varphi 2$, over conductor 406, over the upper back contact of ASN relay 404, through the winding of true air speed potentiometer TASP9 to ground, the potential derived at the brush of potentiometer TASP9 being applied through the potential divider comprising resistances 424 and 425 to ground and the potential derived at the junction between resistances 424 and 425 being applied through resistance 426 to control conductor 1011. It will be noted that this potential augments the potential tending to increase the bank effect and increases with the rate of turn and with the true air speed.

The sum of the potentials applied to control conductor 1011 controls the motor of the bank motor control circuit to rotate the shaft 1010 and through unity ratio bevel gears 400 to rotate the shaft 401 to a degree commensurate with the bank effect. As the shaft 401 rotates, the brush of potentiometer BKP3 is rotated into a position into which the potential applied from it through resistance 427 to control conductor 1011 balances the potentials applied to conductor 1011 as previously described. To supply this balancing potential, the winding of potentiometer BKP3 is bridged through resistances 428 and 429 between the $40\varphi 1$ and $40\varphi 2$ bus bars and the potential derived at the potentiometer brush is applied over the potential divider comprising resistance 430, 431 and 432 to ground, from a point between resistances 431 and 432 of which potential divider, potential is applied through resistance 427 to control conductor 1011. When the potentials of phases $\varphi 1$ and $\varphi 2$ applied to control conductor 1011 balance, the motor of the bank motor control circuit arrests the rotation of shafts 1010 and 401. These shafts have now been rotated to an amount commensurate with the angle of bank.

Shaft 1010 drives the rotor of transmitting autosyn 1025, the rotor winding of which is energized from the 400C and 400G bus bars and the stator windings of which are connected over conductors 1026 and 1027 with the stator windings of the receiving autosyn 1463 which controls the tipping of the horizon bar of the artificial horizon instrument on the pilot's instrument panel and which indicates the amount of the bank. The stator windings of transmitting autosyn 1025 are also connected over branches of conductor 1026 and 1027 with the stator windings of the receiving autosyn 1963 which controls the tipping of the horizon bar of the artificial horizon instrument 1961 at the instructor's desk and indicates the amount of bank. The rotor windings of the receiving autosyns 1463 and 1963 are energized from the 400C and 400G bus bars.

The instructor may alter the response to the aileron and rudder controls to simulate right or left wing heavy conditions, which would result from a consumption of fuel from the wing tanks or loss of an engine, by the operation of the lateral center of gravity rheostat LCGR. The winding of this rheostat is energized over conductors 1917 and 1918 and resistances 433 and 434 from the $40\varphi 1$ and $40\varphi 2$ bus bars and the brush is connected over conductor 1922 and through resistance 435 with control conductor 1011 of the bank motor control circuit. For example, if the brush or rheostat LCGR is moved toward the No. 1 terminal of its winding, indicating a right wing heavy condition which would result through the loss of the left engine, potential of phase $\varphi 2$ would be applied from the brush over the circuit traced to control conductor 1011 whereas if the brush is moved toward the No. 3 terminal, indicating a left wing heavy condition, potential of phase $\varphi 1$ would be applied to control conductor 1011. This potential unless the pilot takes steps to balance it out will affect the amount of bank which results from the operation of the aileron and rudder controls as previously described.

As a result of the operation of the rate of turn and bank motor control circuits, a control is exercised over the ball motor control circuit. For this purpose in response to the movement of the brush of rate of turn potentiometer RTP3, potential derived therefrom in accordance with the direction and rate of turn, modified in accordance with the true air speed by the potentiometer TASP9 and applied through the potential divider comprising resistances 424 and 425, is applied from the brush of potentiometer TASP9, over conductor 436, through resistance 324 to control conductor 961 of the ball motor circuit. Under the conditions previously assumed that a turn to the right is being executed, the brush of rate of turn potentiometer RTP3 will have been moved toward the No. 3 terminal of its winding to thus apply potential of phase $\varphi 2$ to control conductor 961.

Also in response to the movement of the brush of bank potentiometer BKP3 toward the No. 3 terminal of its winding, in response to a bank for a turn to the right, potential of phase $\varphi 1$ will be applied from a point between resistances 430 and 431 of the potential divider including resistances 430, 431 and 432, over conductor 437 and through resistance 325 to control conductor 961. If the potential applied to conductor 961 by the rate of turn circuit and the potential applied to conductor 961 by the bank circuit are maintained equal and opposite during the turning maneuver, then the motor of the ball circuit is not operated and the brushes of the ball potentiometers BLP6 and BLP7 will not move from the center positions of their windings and the rotor of the transmitting autosyn 962 driven by the ball motor shaft 969 will not leave its zero position. However, should the turning maneuver be incorrectly executed so that these potentials do not balance, then the motor of the ball motor control circuit will be operated to move the brushes of the ball potentiometers towards the No. 1 terminals of their windings if a skid results or to move the brushes toward the No. 3 terminals if a side-slip results. The movement of the brush of potentiometer BLP7 is effective to affect the bank and rate of turn motor control circuits as previously described and the movement of the brush of potentiometer BLP6 is effective to apply a potential derived from the winding of such potentiometer which is connected in parallel with resistance 316, the midpoint of which is grounded, through resistances 317 and 318 between the $40\varphi 1$ and $40\varphi 2$ bus bars, through resistance 326 to control conductor 961 of the ball motor control circuit, of such phase as to balance the sum of the potentials applied to such conductor through the operation of the rate of turn and bank motor control circuits. When this balance is obtained, the motor of the ball motor control circuit will stop and the rotor of the transmitting autosyn 962 will be stopped in a position indicative of a skid or a side-slip.

The rotor winding of the autosyn 962 is energized from the 400C and 400G bus bars and the stator windings are connected over conductors 963 and 964 with the stator windings of the receiving autosyns 1483 and 1583 which control the movement of those portions of the turn and bank indicators on the pilot's and co-pilot's instrument panels which simulate the movement of the balls. The stator windings of the transmitting autosyn 962 are also connected over branches of conductors 963 and 964 with the stator windings of the receiving autosyn 1983 which controls the movement of that portion of the turn and bank indicator at the instructor's desk which simulates the movement of the ball.

Also in response to the movement of the brush of rate of turn potentiometer RTP3, potential is applied from the brush thereof through resistance 327 to control conductor 901 of the compass motor control circuit. The application of potential of phase $\varphi 1$ or phase $\varphi 2$ is in accordance with the direction of the turn simulated and at a rate which is integrated from the rate of turn with respect to time. A rate of turn to the left or right causes the compass motor unit to turn and drive the autosyn compass indicators of the trainer in the corresponding direction. A standard turn is one in which the complete circuit is made in two minutes. Under this condition the compass indicators will make a complete revolution in two minutes.

For operating the remote reading compasses 1420, 1520 and 1920, located in the pilot's and co-pilot's instrument panels and at the instructor's desk, the rotor of the transmitting magnesyn 912 is driven through gearing from the shaft 910. The outside terminals of the stator windings of the magnesyn are connected to the 400C and 400G bus bars and the junction points between the windings are connected over conductors 913 and 914 and over front contacts of relay 1419 with the junction points between the windings of the receiving magnesyns 1421 and 1521, which drive the remote reading compasses 1420 and 1520 on the pilot's and co-pilot's instrument panels. Branches of conductors 913 and 914 are also connected to the junction points between the windings of the receiving magnesyn 1921 which drives the remote reading compass 1920 at the instructor's desk. The stator windings of magnesyns 1421, 1521 and 1921 are energized from the 400C and 400G bus bars.

For operating the magnetic compass 2720, at the navigator's station, a transmitting autosyn 915 is provided, the rotor of which is operated through gearing from the shaft 910 of the compass motor control circuit. The rotor winding of this autosyn is energized from the 400C and 400G bus bars and the stator windings are connected over conductors 2758 and 2759 of cable 2750 with the stator windings of the receiving autosyn 2721 which drives the compass 2720. The rotor winding of autosyn 2721 is energized from the 400C and 400G bus bars.

The gyro compass or directional gyro 1471 on the pilot's instrument panel is driven by the receiving autosyn 1472, the stator windings of which are connected by conductors 916 and 917 with the stator windings of the transmitting autosyn 918. The stator windings of the transmitting autosyn 918 are also connected over branches of conductors 916 and 917 with the stator windings of the receiving autosyn 1972 which drives the directional gyro 1971 at the instructor's desk. The rotor windings of the receiving autosyns 1472 and 1972 and of the transmitting autosyn 918 are energized from the 400C and 400G bus bars.

The rotor of the transmitting autosyn 918 is driven through gears 919 from the output shaft of differential gear box 920, one input shaft of which is driven through gears 921 from the shaft 910 of the compass circuit and the other input shaft of which is driven through gears 922 from the continuously rotating motor 923. Thus with a constant heading of the simulated flight (no rate of turn), the motor 923 will cause the directional gyro compasses to rotate six degrees every fifteen minutes for the purpose of simulating the action of the gyro compasses which require that the pilot reset them with the magnetic compasses.

The compass motor control circuit in cooperation with the true air speed variac TASV2 controls the flight recorder motor control circuit of Fig. 2 to in turn control the flight recorder 1900 at the instructor's desk and, in cooperation with the flight recorder motor control circuit, controls the drift sight at the navigator's station as will later be described.

*Resumption of straight line flight*

To resume straight line flight, the pilot operates the left rudder pedal 1400 to thereby rotate the brush of rudder potentiometer RP toward the No. 3 terminal of its winding and operates the aileron wheel 1415 to rotate the brush of aileron potentiometer ALP toward the No. 1 terminal of its winding. As a result of the movement of the brush of potentiometer RP, potential of phase $\varphi 2$ applied from its brush, over the lower back contact of ASN relay 404 and through resistance 405 to control conductor 1061 of the rate of turn motor control circuit is reduced to a value less than that of potential of phase $\varphi 1$ applied to such conductor and as a result the motor of the rate of turn motor control circuit is operated to rotate the shafts 1060 and 451 controlled thereby in a direction indicative of a reduction of the rate of turn. At the same time the movement of the brush of aileron potentiometer ALP toward the No. 1 terminal of its winding results in the reduction of the value of the potential of phase $\varphi 1$ applied from its brush over the inner upper back contact of ASN relay 404 and through resistance 420 to control conductor 1011 of the bank motor control circuit to a value less than that of the potential of phase $\varphi 2$ applied to such conductor. As a result, the motor of the bank motor control circuit is operated to rotate the shafts 1010 and 401 controlled thereby in directions indicative of a reduction of the bank. When the shafts of these motor control circuits rotate, potentiometers RTP3 and BKP3 are made effective so that when the rate of turn indicators and bank indicators show a zero rate of turn and a zero bank, the potentials applied to control conductor 1051 of the rate of turn motor control circuit and to control conductor 1011 of the bank motor control circuit will be balanced. If the return to level flight condition is executed correctly the ball motor control circuit will be unaffected and the turn and bank indicators will show no movement of the balls thereof from their central positions. As a further result with the brush of the rate of turn potentiometer RTP3 now centered with respect to its winding, the condition of zero rate of turn, no potential is applied through resistance 327 to control conductor 901 of the compass motor control circuit and the remote indicating and magnetic compasses come to rest. A turn to the left would be executed in the manner previously described through the depression of the left rudder pedal 1400 and by turning the aileron wheel 1415 in a counter-clockwise direction.

If during level flight the instructor should operate the lateral center of gravity rheostat LCGR toward the No. 1 terminal of its winding, indicative of a right wing heavy condition as previously described, potential of phase $\varphi 2$ would be applied from its brush over the circuit traced to control conductor 1011 resulting in the operation of the bank motor control circuit until the bank potentiometer BKP3 driven thereby applies sufficient balancing potential of phase $\varphi 1$ to conductor 1011 to stop the motor of the bank motor control circuit. The bank indicators will now indicate a right bank. Potentiometer BKP3 will also apply potential of phase $\varphi 1$ over the circuit previously traced through resistance 325 to control conductor 961 of the ball motor control circuit thereby causing such circuit to rotate the brush of ball potentiometer BLP6 until sufficient potential of phase $\varphi 2$ has been applied to the control conductor 961 to balance the potential of phase $\varphi 1$ applied by bank potentiometer BKP3. Ball indicators will now be moved to the right through the operation of the ball motor control circuit. The movement of the brush of ball potentiometer BLP7 now applies potential of phase $\varphi_1$, through resistance 418 to control conductor 1061 of the rate of turn motor control circuit whereupon the motor thereof rotates the shafts 1060 and 451 in such a direction that the rate of turn indicators show a turn to the right. The motor of this circuit stops the rotation of the shafts when the brush of potentiometer RTP3 reaches a position in which the potential of phase $\varphi_2$ applied therefrom through resistance 409 to control conductor 1061 balances the potential of phase $\varphi_1$ applied to such conductor by the ball potentiometer BLP7.

To counteract this right wing down condition, the pilot moves the aileron control wheel 1415 in a counterclockwise direction and pushes down on the left rudder pedal 1400 thereby operating the aileron and rudder potentiometers ALP and RP in such directions as to apply potentials to control conductors 1011 and 1051 to cause the bank and rate of turn motor control circuit to return to positions in which the indicators controlled thereby will indicate zero bank and zero rate of turn. As a further result the ball motor control circuit is controlled to return the ball indicators to their neutral positions. To maintain the corrected level flight condition, the pilot may operate the aileron trim wheel AT and the rudder trim wheel RT to control the aileron and rudder trimming mechanisms 1518 and 1519 until no pressure is required to hold the left rudder pedal 1400 depressed and the aileron wheel 1415 turned in its operated position.

If a left wing heavy condition is simulated by the operation of the lateral center of gravity rheostat brush toward the No. 3 terminal of its winding, the bank, rate of turn and ball motor control circuits are similarly controlled but rotate their shafts in the opposite directions whereby the bank indicators show a left wing down condition, the rate of turn indicators show a turn to the left and the ball indicators move to the left. To counteract this condition, the pilot must depress the right rudder pedal 1401 and turn the aileron wheel 1415 clockwise. The position to which the pedal and wheel are moved may be maintained through the operation of the rudder and aileron trim wheels RT and AT in the proper direction to cause the trimming mechanisms 1518 and 1519 to apply the proper loadings.

When the wing heavy condition is removed at the instructor's desk by moving the slider of rheostat LCGR to its center position, the rate of turn, bank and ball circuits will reoperate since the aileron and rudder controls have been so operated as to correct the simulated flight to counteract such condition. It is then necessary for the pilot to reoperate the aileron and rudder controls or change the trimming until the rate of turn, bank and ball circuits operate the rate of turn, bank and ball indicators to indicate a corrected straight line flight condition.

*Change of longitudinal center of gravity*

As previously stated, one factor affecting the angle of attack of the simulated flight is the longitudinal center of gravity rheostat LoCGR at the instructor's desk. It has been assumed that the slider of this rheostat has been set by the instructor to a position 33 per cent from the No. 3 terminal of its winding, indicating the normal center of gravity of the aircraft the operation of which is being simulated. If, for example, the instructor should shift the slider to the 28 per cent position to simulate a change in the distribution of weight as would be occasioned by the moving of the crew from the rear, more potential of phase $\varphi_1$ would be applied from the slider of such rheostat through the winding of angle of attack potentiometer AAP5 and consequently, more potential of phase $\varphi_1$ would be applied from the brush of the latter potentiometer, through resistance 521 to control conductor 1102 of the angle of attack motor control circuit. As a consequence the motor of this control circuit is operated to rotate the shafts 1110 and 501 in directions indicative of a reduction in the angle of attack whereupon, potential of phase $\varphi_1$ applied over the brush of the angle of attack potentiometer AAP3, thence as traced through resistance 730 to control conductor 1311 of the pitch-bar motor control circuit is increased and the motor of the latter circuit is operated to rotate shafts 1310 and 705 in directions simulating the nosing down of an aircraft. In response to the rotation of shaft 1310, the autosyns 1325, 1462, 1562 and 1962 control the upward movements of the horizon bars of the artificial horizon instruments 1461, 1561 and 1961 to indicate a nosing down of the simulated flight. As before described, the motor of the pitch-bar motor control circuit is brought to rest by the movement of the brush of balancing potentiometer PBP6 in a direction to apply balancing potential of phase $\varphi_2$ to control conductor 1311.

To counteract this, the pilot pulls back on the yoke 1411 whereupon the brush of yoke potentiometer YP1 moves toward the No. 3 terminal of its winding and increases the potential of phase $\varphi_2$ on the control conductor 1102 of the angle of attack motor control circuit to cause the motor of such circuit to rotate the shafts 1100 and 501 in directions indicative of an increase of the angle of attack. Thereupon the potential applied over the brush of angle of attack potentiometer AAP3 to control conductor 1311 of the pitch-bar motor control circuit is so changed in value as to cause the motor of such circuit to rotate the shafts 1310 and 705 in directions to return the horizon bars of the artificial horizon instruments to their neutral or level flight positions.

Had the instructor shifted the slider of the longitudinal center of gravity rheostat LoCGR to the 38 per cent position to simulate a shift of the longitudinal center of gravity aft, then the angle of attack motor control circuit would have been operated in such manner as to indicate an increase in the angle of attack and the pitch-bar motor control circuit would have been controlled thereby to cause downward movements of the horizon bars of the artificial horizon instruments 1461, 1561 and 1961 indicative of a nosing up of the simulated flight. To counteract this the pilot pushes forward on the yoke 1411 whereupon the brush of yoke potentiometer YP1 moves toward the No. 3 terminal of its winding and applies a potential to the control conductor 1102 of the angle of attack motor control circuit to cause the motor thereof to rotate the shafts 1100 and 501 in directions indicative of a decrease of the angle of attack. Thereupon the potential applied over the brush of angle of attack potentiometer AAP3 to control conductor 1311 of the pitch-bar motor control circuit is so changed as to cause the motor of such circuit to return the horizon bars of the artificial horizon instruments to their neutral or level flight positions.

When the slider of the longitudinal center of gravity rheostat LoCGR is restored to its original 33 per cent position at the instructor's desk, the potential applied from the brush of such rheostat through the winding of the angle of attack potentiometer AAP5 is restored to the value which it had prior to the shift of the center of gravity and as a consequence the potential applied to the control conductor 1102 by the movement of the yoke 1411 by the pilot to overcome the nosing-down or nosing-up tendency imposed by the shift in the center of gravity, over-balances the potential applied through the angle of attack potentiometer AAP5 and the angle of attack and pitch-bar motor control circuits are again operated to cause the horizon bars of the artificial horizon instruments to show a nose-down condition if the pilot had corrected for a nose-up condition or to show a nose-up condition if the pilot had corrected for a nose-down condition. Noting the movement of the horizon bar, the pilot operates the yoke 1411 to control the angle of attack and pitch-bar motor control circuits in the manner previously described until the horizon bars again indicate a level flight condition.

*Change of weight*

It will be assumed that the instructor now moves the slider of the weight rheostat WCR in a direction to increase the weight from the assumed 45,000 pounds to 55,000 pounds. As a result, the potential of phase φ1 applied from the brush thereof over conductor 1364, through resistance 1363 to the control conductor 1362 of the weight motor control circuit is increased and in response thereto the motor of such circuit rotates the shafts 1360 and 717 to positions indicative of an increase in weight. The brush of weight potentiometer WP2 is therefore moved toward the No. 3 terminal of its winding thereby increasing the potential of phase φ2 applied through resistance 513 to control conductor 1162 of the rate of climb motor control circuit to a value greater than the lift potential of phase φ1 applied to conductor 1162 through resistance 507. Thereupon the motor of the rate of climb motor control circuit is operated to rotate the shafts 1160 and 551 in directions indicative of a reduction of the rate of climb, or a dive condition. In response to the rotation of shaft 1160, the rate of climb indicators 1441, 1541 and 1941 will show down indications.

As a result of the movement of the brush of the rate of climb potentiometer RCP1 toward the No. 1 terminal of its winding, potential of phase φ1 is applied over such brush and over the circuit previously traced through resistance 729 to control conductor 1311 of the pitch-bar motor control circuit, and in response thereto the motor of such circuit rotates the shafts 1310 and 705 in directions indicative of a nose-down condition which is indicated by the upward movements of the horizon bars of the artificial horizon instruments 1461, 1561 and 1961.

The pilot can correct this condition by applying more power by pushing the throttles of the overhead equipment forward until the artificial horizon instruments indicate a return to level flight. As the throttles are pushed forward, the brushes of the throttle variacs 3019L and 3019R are moved thereby changing the potentials in the control circuits of Fig. 52 of the manifold pressure motor control circuits of Fig. 41 as previously traced. As a result the shafts 4110, 5201 and 4160, 5251 of the manifold pressure motor control circuits assume new positions. The manifold pressure indicators 1724, 2327 and 2810 on the pilot's panel, Fig. 17, at the instructor's desk, Fig. 23, and on the flight engineer's instrument panel, Fig. 28, driven by the autosyns from the shafts 4110 and 4160, now show an increase in manifold pressure.

As previously described the readjustment of the RMP4 and LMP4 potentiometers included in the control circuits of the R. P. M. motor control circuits of Fig. 40, cause the shafts 5101 and 5151 of the R. P. M. units to assume new positions resulting in an increase in speed of the tachometer generators RTG and LTG and a consequent increase of the speed indications on the tachometers located on the instrument panels of the trainer. As the R. P. M. motor control circuits set the shafts 4010 and 4060 into new positions commensurate with the increase in the speed, the sound effects circuits are controlled to produce increased engine noises, new positions are given to the fuel flow shafts 4801 and 4851, to the V/ND shafts 4901 and 4951, to the brake horse power shafts 5001 and 5051, to the R. P. M. memory shafts 5401 and 5451, to the propeller pitch shafts 5501 and 5551, to the brake mean effective pressure shaft 5301 and to the thrust horsepower shafts 5351 and 719.

As a result of the movement of the thrust horsepower shaft 719, the brush of potentiometer TP7 is moved toward the No. 3 terminal of its winding thereby indicating an increase in thrust horsepower. This results in the application of more potential of phase φ1 over the circuit previously traced through resistance 637 to control conductor 1216 of the indicated air speed motor control circuit resulting in the operation of the motor thereof to rotate the shafts 1210 and 601 in directions indicative of an increase in air speed. With an increase in air speed the brushes of indicated air speed variacs IASV6 and IASV7 move toward the No. 4 terminals of their windings resulting in an increased potential of phase φ1 applied over the circuit previously traced through resistance 507 to control conductor 1162 of the rate of climb motor control circuit. The motor thereof now operates to rotate shafts 1160 and 551 in directions indicative of a climbing condition whereupon the movement of the brush of rate of climb potentiometer RCP1 toward the No. 3 terminal of its winding causes the reduction of potential of phase φ1, previously applied over its brush to the control conductor 1311 of the pitch-bar motor control circuit whereupon the motor of that circuit operates to return the horizon bars of the artificial horizon instruments to their neutral positions indicative of a return to level flight.

Had the slider of the weight rheostat WCR been moved in a direction to decrease the weight from an assumed 45,000 pounds to 35,000 pounds, the weight motor control circuit would have been controlled to rotate the shafts 1360 and 717 to positions indicative of a decrease in weight whereupon the movement of the brush of weight potentiometer WP2 toward the No. 1 terminal of its winding would have caused a decrease in the potential of phase φ2 applied to control conductor 1162 of the rate of climb motor control circuit. In response to this decrease in potential of phase φ2 the motor of this circuit rotates the shafts 1160 and 551 in directions indicative of an increase of the rate of climb to a climb condition which is so indicated on the rate of climb indicators. As a result of the movement of the brush of rate of climb potentiometer RCP1 toward the No. 3 terminal of its winding, potential of phase φ2 is applied over such brush to control conductor 1311 of the pitch-bar motor control circuit and in response thereto the motor of such circuit rotates shafts 1310 and 705 in directions indicative of a nose-up condition which is indicated by the upward movements of the horizon bars of the artificial horizon instruments.

The pilot can correct this condition by reducing the power through the pulling back of the throttles thereby reducing the speed of the engines and the thrust horsepower output thereof in the manner described. In this case the brush of the thrust horsepower potentiometer TP7 will be moved toward the No. 1 terminal of its winding thereby reducing the potential of phase $\varphi 2$ applied thereover to control conductor 1216 of the indicated air speed motor control circuit resulting in the operation of the motor of such circuit to rotate the shafts 1210 and 601 in directions indicative of a reduction in air speed. With a reduction in air speed the brushes of the indicated air speed variacs IASV6 and IASV7 move toward the No. 2 terminals of their windings resulting in a reduction of potential of phase $\varphi 1$ applied to control conductor 1162 of the rate of climb motor control circuit. The motor thereof now operates to rotate shafts 1160 and 551 in directions indicative of a diving condition whereupon the movement of the brush of rate of climb potentiometer RCP1 toward the No. 1 terminal of its winding causes a decrease of phase $\varphi 2$ potential previously applied over its brush to control conductor 1311 of the pitch-bar motor control circuit, whereupon the motor of that circuit operates to return the horizon bars of the artificial horizon instruments to their neutral positions indicative of a return to level flight. Under these conditions the manifold pressure motor control circuits will operate the manifold pressure indicators to show a decrease in manifold pressure due to the reduced throttles and the lower engine speeds.

Wing ice conditions

It will be assumed that the level flight condition which prevailed prior to the making of changes in weight by the instructor now prevails and that the instructor desires to simulate the condition of wing ice. He first turns the setting knob of the air temperature control rheostat OTR, shown in Fig. 25, in a counter-clockwise direction for an outside air temperature of $-10°$ C. The movement of the slider changes the value of the current flowing over the circuit from the slider of rheostat OTR, through rheostat AR, through the outside air temperature indicator OT at the instructor's desk, through the outside air temperature indicator 2813 at the flight engineer's instrument panel, Fig. 28, through the outside air temperature indicator 1526 at the co-pilot's instrument panel and thence to the brush of the altimeter potentiometer AP5. As a result of the change in current flow the indicators move their pointers from their former positions indicating an outside air temperature of $+15°$ C. to positions indicating a temperature of $-10°$ C.

The instructor then moves the slider of the wing ice rheostat WIR to approximately the midpoint of its winding thereupon increasing the resistance in the circuit previously traced through the winding of weight potentiometer WP2 over which potential of phase $\varphi 2$ is applied. As a result the potential of phase $\varphi 2$ applied from the brush of potentiometer WP2 to control conductor 1162 of the rate of climb motor control circuit is increased and the rate of climb and pitch-bar motor control circuits function in the manner previously described in connection with the simulation of an increase in weight and the operation of the brush of weight rheostat WP2. The rate of climb indicators controlled by the rate of climb motor control circuit now show a down indication and the horizon bars of the artificial horizon instruments are raised by the pitch-bar motor control circuit to show a nose-down condition.

The pilot observing the nosing down and down rate of climb indications proceeds to remove the drag imposed by the simulated nosing down condition by moving the throttles forward to secure more power. The apparatus functions in response to the throttle control in exactly the same manner as previously described in connection with the simulated addition of weight.

Simulated operation of de-icer

To simulate the operation of de-icing equipment to remove or prevent the formation of ice on the wings of an aircraft, the de-icer motor control circuit of Fig. 36 is provided. The motor of this circuit rotates first in one direction and then in the other between limit switches to cause the de-icer indicators to oscillate from minimum to maximum. To control the motor circuit the flight engineer operates the de-icer key 3326 and, with DAI relay 3327 previously operated by the closure of circuit breaker 3328, a circuit is established for the IC relay 3329 which may be traced from ground on bus-bar GB, over the lower contacts of relay 3327, over the contacts of key 3326 and through the winding of relay 3329. Relay 3329 upon operating establishes a circuit from ground over its upper contacts, over conductor 3333 of cable 3300 to battery through lamp 2262 at the instructor's desk to indicate that the de-icer has been started. Relay 3329 over its lower contacts establishes an obvious circuit for de-icer lamp 3331 on the flight engineer's control panel to indicate that the de-icer is operating and establishes a circuit from ground over its middle upper contacts and start conductor 3332, over the upper back contact of D relay 3636 of de-icer motor control circuit, Fig. 36, and through the left shaded pole winding 3637 of the motor 3640 to ground thus short-circuiting such winding. With the main stator winding 3639 energized from the source of 115-volt 60-cycle alternating current, the motor 3640 operates and through the reduction gear box 3641 rotates the shaft 3642 in a direction to permit the L1 limit switch contacts 3643 to close thereby closing an obvious circuit for LL relay 3644. Relay 3644 upon operating connects ground over its upper contacts to start conductor 3332 to insure that the motor 3640 will return shaft 3642 to its normal position even though the flight engineer should release the de-icer key 3326, and over its lower contacts prepares a locking circuit for D relay 3636.

After an interval simulating the time required for the de-icing equipment of an aircraft to build up a pressure of seven pounds, the L2 limit switch contacts 3645 close thereby establishing an obvious circuit for relay 3636 which operates and locks over its lower contacts under the control of relay 3644 and at its upper transfer contacts opens the previously traced shunt of the left shaded pole winding 3637 of motor 3640 and closes a shunt around the right shaded pole winding 3638. The motor 3640 now rotates in the opposite direction opening at the L2 limit switch contacts 3645 the operating circuit for relay 3636 and, after an interval simulating the time required for the de-icing equipment of an aircraft to reduce the pressure to zero, the Ll limit switch contacts 3643 are opened thereby releasing relay 3644 and in turn opening the locking circuit of relay 3636 which also releases. With relay 3636 released, the direction of rotation of motor 3640 is reversed and the motor circuit repeats the cycle of operations so long as the flight engineer maintains ground connected to start conductor 3332 by the operation of the de-icer key 3326.

In response to the movement of shaft 3642 the rotor of the transmitting autosyn 3646 is rotated first in one direction and then in the other. The rotor winding of this autosyn is energized from the 400C and 400G bus-bars and the stator windings thereof are connected over conductors of cable 3647 with the stator windings of the receiving autosyn 2338 which drives the de-icer pressure indicator 2339, Fig. 23, at the instructor's desk and over the upper No. 4 and No. 5 contacts of relay 3212 and over conductors of cable 3220 with the stator windings of the receiving autosyn 2857 which drives the de-icer pressure indicator 2808 on the flight engineer's instrument panel, Fig. 28. The rotor windings of these receiving autosyns are energized from the 400C and 400G bus-bars. Under the control of the transmitting autosyn 3646 the pointers of the de-icer pressure indicators 2339 and 2808 oscillate from a minimum pressure indication of zero pounds to a maximum pressure indication of seven pounds.

As a further result of the operation of IC relay 3329 in response to the operation of de-icer key 3326 a circuit is closed from ground over the inner upper contacts of relay 3329 and conductor 3334 of cable 3390 to battery through the anti-icer lamp 2263 at the instructor's desk. The rheostat 3333, which in an actual aircraft controls the anti-icer, is made ineffective in the trainer by a short circuit of its winding.

It will now be assumed that the ice condition is removed by the use of the de-icing mechanism and that therefore the instructor returns the slider of the wing-ice rheostat WIR to its normal position adjacent the No. 3 terminal of its winding. With the resistance of the rheostat removed from the previously traced circuit through the winding of weight potentiometer WP2, the potential of phase $\phi 2$ applied from its brush through resistance 513 to control conductor 1162 of the rate of climb motor control circuit is decreased and the motor of the rate of climb motor control circuit is now operated to rotate shafts 1160 and 551 in directions indicative of an up rate of climb which will now be indicated by the rate of climb indicators. As a further result of the rotation of shaft 551 the rate of climb potentiometer RCP1 is readjusted to control the application of potential to the control conductor 1311 of the pitch-bar motor control circuit whereupon the motor thereof rotates the shafts 1310 and 705 in directions indicative of a nose-up conditon of flight which is now indicated by the depression of the horizon bars of the artificial horizon instruments.

The pilot observing the nosing up and up rate of climb indications corrects this condition by reducing the power by pulling back the throttles of the overhead equipment thereby reducing the speed of the engines and the thrust horse-power. A reduction of the thrust horse-power results in the reduction of the air speed, in the reduction of the rate of climb to zero and in the return of the horizon bars of the artificial horizon instruments to their neutral positions indicative of level flight in the manner previously described in connection with the consideration of a change in the weight of the simulated aircraft. When a condition of level flight is indicated by the instruments the throttles are left in their adjusted positions at which time the manifold pressure indicators will indicate manifold pressures for both engines of 27.5 inches of mercury.

*Simulation of ice in the Pitot tube*

In an aircraft the air speed indicator is operated by a change in barometric pressure, pressure being supplied for operating it through a Pitot tube. If ice collects in the Pitot tube the indicator will cease to function accurately. To simulate this condition a Pitot ice key 1923 at the instructor's desk, Fig. 19, is operated to the "on" position establishing a circuit from ground over its contacts, over conductor 1924 to battery through the winding of relay 1430. With relay 1430 operated the receiving autosyns 1432, 1532 and 2732 are disconnected from the transmitting autosyn 1225 driven by the indicated air speed motor control circuit so that should the pilot push the yoke 1411 forward to simulate a descent the rate of climb, angle of attack, indicated air speed, altimeter and pitch-bar motor control circuits will function in the manner previously described in connection with the climbing maneuver but to control the indicators to indicate a down rate of climb indication, a decreasing altitude and an elevation of the horizon bars of the artificial horizon instruments to indicate a nose-down attitude. But with relay 1430 operated the air speed indicators 1431, 1531 and 2731 will show no increase in air speed which would result in response to the simulation of a diving maneuver. The fact that the air speed indicators do not function is indicative that ice has formed in the Pitot tubes. Upon observing this condition the pilot pulls the yoke 1411 back until level flight is again indicated.

To clear the ice from the Pitot tubes heaters are provided in an aircraft. The functioning of these heaters is simulated in the trainer. For this purpose the left and right Pitot switches 1729 and 1730 at the pilot's pedestal are operated to the "on" positions whereupon with PH relay 3335 operated by the previous closure of the circuit breaker 3336, a circuit is established from ground on bus bar GB, over the front contacts of relay 3335, over conductor 3385 of cable 3380, over the contacts of switches 1729 and 1730 and over conductors 1731 and 1732 to battery through the left and right Pitot heater on lamps 2607 and 2608 at the instructor's desk, Fig. 26. To discontinue the Pitot ice condition which would disappear in response to the operation of the Pitot heaters, the Pitot key 1923 is moved to the "off" position releasing relay 1430. If the yoke 1411 is now moved forward to cause the operation of the angle of attack, rate of climb, indicated air speed, altitude and pitch-bar motor control circuits in the manner previously described to simulate a diving maneuver the air speed indicators 1431, 1531 and 2731 will again be operated to show an increase in air speed indicating that the Pitot icing condition has been eliminated. The pilot will then restore the heater switches 1729 and 1730 to their "off" positions thereby extinguishing lamps 2607 and 2608. To simulate the rise in temperature which would eliminate the icing condition previously described the instructor may now restore the outside air temperature rheostat OTR to its former position whereupon the outside air temperature indicators OT at the instructor's desk, 1526 at the co-pilot's station and 2313 on the flight engineer's instrument panel, will change their readings from −10° C. to +15° C.

*Simulation of rough air conditions*

In flight through rough air the readings of the artificial horizon, altimeter, ball, rate of climb and rate of turn indicators will vary erratically and to simulate these conditions the circuits and apparatus disclosed in Fig. 8 have been supplied for the trainer. This apparatus and the manner in which it functions has been fully disclosed in the Germanton Patent 2,460,743, but a brief description thereof will be given herein. The apparatus comprises two motor driven sequence switches driven by the motors MR1 and MR2 of the shaded pole type. The sequence switches are of the general type disclosed in Patent No. 1,127,808, granted February 9, 1915, to J. N. Reynolds and C. F. Baldwin.

The motor MR1 has its main stator winding energized from the 115-volt source of supply and has its rotor geared through the reduction gear box 826 with the driving shaft 828 of a first sequence switch having the contact closing cams 805 to 824, inclusive. The motor MR2 has its main stator winding energized from the 115-volt source of supply and has its rotor geared through the reduction gear box 802 with the driving shaft 804 of a second sequence switch having the contact closing cams 829 to 843, inclusive. Each of the sequence switches has eighteen contact closing positions each of which positions may provide different circuit combinations. It can be designed to stop in any one of the positions. Cams 805 to 824, inclusive, and cams 839 to 843, inclusive, are so cut that in any contact closing position, indicated by the small numerals placed on either side of such cams, the contact becomes closed 5 degrees before the indicated position is reached and is again opened 5 degrees after the indicated position is left. For example, referring to cam 815, the position marked "1" becomes closed in position ¾ and becomes opened in position 1¼. Cam 829 is so cut that it is closed in all positions except when the switch is centered in any one of its regular stopping positions.

The rheostats 1924 and 1925 and start key 1926 at the instructor's desk, Fig. 19, control the value of potentials of phase φ1 and phase φ2 connected over conductors 1928 and 1929 and contacts of M relay 853 to cams 806 to 815, inclusive, and cams 816 to 824, inclusive.

When the instructor desires to introduce a rough air condition into the simulated flight to ascertain if the crew in training reacts correctly to the imposed condition, he operates the key 1926 thereby establishing a circuit from ground over its right contacts and conductor 1927, over the upper No. 3 back contact of ASN1 relay 403, over conductor 437 and through the winding of relay 853 to battery and ground. Relay 853 thereupon operates to short-circuit one of the shaded pole windings of motor MR1 whereupon such motor starts and through the gear box 826 rotates the cams 805 to 824, inclusive, of the first sequence switch. With key 1926 and relay 853 operated, potential of phase φ1, impressed from the 40φ1 bus bar through resistance 1933 and the winding of rheostat 1924, is applied from the slider of such rheostat over the middle contacts of key 1926, over conductor 1928, over the lower contacts of relay 853 and over the right contact of cam 815 to all cams of the group 806 to 815, inclusive, and potential of phase φ2 impressed from the 40φ2 bus bar through resistance 1934 and the winding of rheostat 1925, is applied from the slider of such rheostat over the left contacts of key 1926, over conductor 1929, over the inner lower contacts of relay 853 and over the upper right contact of cam 824 to all cams of the group 816 to 824, inclusive.

The cams of the sequence switches may be in any one of their eighteen contact closure positions at the time the motor MR1 is started into rotation but for clarifying the description it will be assumed that the cams of the upper sequence switch, which will be hereinafter identified by the motor designation MR1, are driven into the No. 1 contact position when the motor is started as just described and that the cams of the second sequence switch, which will hereinafter be identified by the motor designation MR2, are standing in the No. 1 contact position. As the switch MR1 passes through positions 1 and 2 a circuit is established from the φ2 source connected to cam 817, over its upper left contact closed in positions 1 and 2, over the lower left contact of cam 841, the right contact of cam 843, through resistance 846 to ground and a derived potential is applied over conductor 847 and through resistance 526 to control conductor 1102 of the angle of attack motor control circuit. The application of this potential causes the motor of the angle of attack motor control circuit to rotate the shafts 1110 and 501 in directions indicative of an increase in the angle of attack. As previously described the angle of attack motor control circuit affects the rate of climb, the altimeter, indicated air speed and the pitch-bar motor control circuits and therefore the rate of climb, altimeter, indicated air speed and the artificial horizon instruments are controlled to indicate the effect imposed by the rough air circuit.

As the switch MR1 passes through positions 1 and 2 a circuit is also established from the phase φ2 source connected to cam 824, over the upper left contact of cam 816, the lower contact of cam 831, the right contact of cam 834, through resistance 848 to ground and a derived potential is applied over conductor 849 and through resistance 438 to control conductor 1061 of the rate of turn motor control circuit whereupon the motor of this circuit rotates the shafts 1060 and 451 in directions indicative of a tendency to turn to the left or reduce the rate of turn to the right. This tendency will appear as a change in the readings of the rate of turn indicators.

As the switch MR1 passes through positions 1 to 3½, inclusive, a circuit is also established from the phase φ1 source connected to cam 815, over the upper left contact of cam 809, over the lower left contact to cam 837, the lower right contact to cam 836, through resistance 850 to ground and a derived potential is applied over conductor 851 and through resistance 439 to control conductor 1011 of the bank motor control circuit whereupon the motor of that circuit rotates the shafts 1010 and 401 in directions indicative of a tendency to bank for a turn to the left. This tendency will appear as a change in the reading of the artificial horizon instruments and through the control of the ball motor control circuit will cause the balls of the ball indicators to move.

As the switch MR1 passes through positions 13 to 14½, inclusive, a circuit is established from the phase φ1 source connected to cam 815, over the upper left contact of cam 807, over the lower left contact of cam 831, over the right contact of cam 834, through resistance 848, to ground and over conductor 849 to control conductor 1061 of the rate of turn motor control circuit. Since potential of phase φ1 is now applied the rate of turn motor control circuit is operated in the opposite direction of rotation from that previously described to cause reverse settings of the rate of turn indicators.

As the switch MR1 passes through positions 15 to 17½, inclusive, a circuit is established from the phase φ2 source of current connected to cam 824, over the upper right contact of cam 816, over the lower left contact of cam 831, the right contact of cam 834, through resistance 848 and over conductor 849 to control conductor 1061 of the rate of turn motor control circuit. Since potential of phase φ2 is now applied to the control conductor the motor of the rate of turn motor control circuit is controlled to operate in the opposite direction of rotation to that just described resulting in reverse settings of the rate of turn indicators.

As the switch MR1 passes through positions 15 to 18, inclusive, a circuit is established from the phase φ1 source connected to cam 815, over the lower left contact of cam 810, over the lower left contact of cam 841, over the right contact of cam 843, through resistance 846 and over conductor 847 to the control conductor 1102 of the angle of attack motor control circuit. Since potential of phase φ1 is now applied the motor thereof is controlled to operate in the opposite direction of rotation from that previously described resulting in reverse settings of the rate of climb, altimeter, indicated air speed and the artificial horizon instruments.

As the switch MR1 passes through position 17 a circuit is established from ground over the lower left and upper right contacts of cam 805, through the winding of relay 852 to battery and ground whereupon relay 852 operates and locks in a circuit through its winding, over its upper contacts, over the right contact of cam 830 of sequence switch MR2, closed in position 1, to ground over the lower contact of cam 829 until switch MR2 has been advanced out of position 1. Relay 852 also establishes a circuit from ground over the lower contact of cam 829, over the left contact of cam 830, the upper left and lower right contacts of cam 805, over the lower contacts of relay 852 and through the left shaded pole winding of motor MR2. Motor MR2 now operates when switch MR1 passes through position 18¾ and through the reduction gear box 802 rotates shaft 804 and the cams 829 to 843, inclusive, of the second sequence switch from position 1 into position 2. As the cam 829 rotates it closes a circuit from ground over the contacts thereof and through the shaded pole winding of motor MR2 until cam 829 has moved to a position indicative that the cams of the switch driven by motor MR2 have been centered in the stopping position 2. Motor MR2 then stops and relay 852 releases.

With switch MR2 now in position 2 the rotation of switch MR1 through another complete revolution again establishes circuits from the phase φ1 and phase φ2 sources to conductors 847, 849 and 851 and when it again reaches position 17 relay 852 is again operated followed, when switch MR1 reaches position 18¾, by the operation of motor MR2 and the advance of switch MR2 into position 3 in the manner just described. In this manner switch MR1 makes successive revolutions and switch MR2 is advanced from position to position so long as the instructor maintains key 1926 operated.

The control exercised over the angle of attack, ball, rate of climb, pitch-bar rate of turn and bank motor control circuits during one complete cycling of the switches MR1 and MR2 is fully set forth in the application of Germanton, Serial No. 542,982 hereinbefore referred to. While the effects of the rough air circuit upon the elevator, aileron and rudder trimming mechanisms 1517, 1518 and 1519 by which loading is applied to the yoke, aileron and rudder controls is not illustrated, such effects may be applied as are disclosed in the Germanton application. It is to be noted that the intensity of the rough air effects may be controlled by the adjustment of the sliders of the rheostats 1924 and 1925. The pilot in response to the instrument indications will attempt to counteract the conditions imposed by the rough air circuits by the operation of the yoke, aileron and rudder controls. When the key 1926 is released, the rough air circuit ceases to function following the release of relay 853 and the irregular movements of the indicators cease.

*Operation of the flight recorder*

For the purpose of recording the simulated flight which is conducted in response to directions given by the instructor, a flight recorder 1900 is provided at the instructor's desk which is capable of movement over a chart placed on the upper surface of the desk. To start the flight recorder, the instructor operates switch 1935 forming a part of the recorder 1900.

The ground speed of an aircraft in flight is determined by the true air speed as modified by the effect of the wind velocity and the direction of the actual track of the aircraft is determined by the bearing of the aircraft as modified by the wind direction. In the trainer the true air speed of the simulated flight is determined by the true air speed motor control circuit of Fig. 7 as previously described, which is instrumental in positioning the shaft 713 and thus adjusting variac TASV2 in accordance with the true air speed. The bearing of the simulated flight as determined by the steering controls of the trainer, is determined by the compass motor control circuit of Fig. 9 which is instrumental in positioning the shaft 910 and through gears in positioning the rotor of the transmitting autosyn ASC. The winding of variac TASV2 is connected between the 40 φ1 and 40 φ2 bus bars and potential of either phase φ1 or phase φ2 derived at the brush of such variac is applied through the rotor winding of the autosyn ASC. The rotation of the rotor of this autosyn by the compass motor control circuit causes the variation of potentials induced into its three stator windings in a measure proportional to the rate of change of the compass bearing and causes the strength of such potentials to be varied proportionally to the change in the true air speed.

Since the track of the simulated flight is determined not only by the air speed and flight bearing but also by the wind velocity and direction, provision is also made for introducing these factors into the control of the flight recorder. For this purpose two variacs WVV1 and WVV2, the sliders of which are adjustable in accordance with the assumed wind velocity, and a transmitting autosyn DWA, the rotor of which is rotatable in accordance with the assumed wind direction, are provided at the instructor's desk. Potential of phase φ1 is applied across the winding of variac WVV1, a potential derived from the slider thereof is applied across the winding of variac WVV2 and potential derived from the slider of the latter variac is applied through the rotor winding of autosyn WDA. The adjustment of the sliders of the variacs and the rotation of the rotor of the autosyn causes the variation of the potentials induced into the three windings of the stator of autosyn WDA in a measure proportional to the change of wind direction and causes a change of the strength of such potentials proportionally to the change in the wind velocity.

The stator windings of autosyn WDA are connected over conductors 1936, 1937 and 1938 with the left windings of transformers 328, 329 and 330, the right windings of which transformers are connected between the stator windings of autosyn ASC and the corresponding stator windings of the control transformers CT1 and CT2 whereby the potentials in the corresponding windings of the transmitting autosyns ASC and WDA are added and applied to the windings of the control transformers. The rotors of the control transformers are driven through gears 331 and 332 from the shaft 309 which is driven through gears 310, the reduction gear box 311 and the gears 312 by the servo-motor M3. The gear trains 331 and 332 have the same ratio and therefore the rotors are driven at the same speed but they are positioned in quadrature with respect to each other.

The potential induced into the rotor winding of the control transformer CT1 is applied over conductors 333 and 334 to the input circuit of the amplifier circuit AMP1 comprising the two voltage amplifier tubes VT1 and VT2 connected in cascade, a dual triode tube VT3, one unit of which serves to invert a portion of the output of the other unit thereof and two amplifier tubes VT4 and VT5 connected in push-pull relationship between the output circuits of the tube VT3 and the primary windings of the output transformer 201. Filament heating current is supplied to the tubes of amplifier circuits AMP1 and to the corresponding tubes of amplifier circuit AMP2 from the lower secondary winding of power transformer 202. Anode potentials for the voltage amplifier tubes VT1 and VT2 and the corresponding tubes of amplifier circuit AMP2 are supplied from the upper secondary winding of transformer 202 through the rectifier tube VT6, and screen grid potential is supplied to the tubes VT4 and VT5 and to the corresponding tubes of amplifier circuit AMP2 through the rectifier tube VT6 and the rheostat 203. The filaments of the rectifier tube VT6 are heated by current supplied through the middle secondary winding of transformer 202. Anode potential for tubes VT1, VT2 and VT3 and the corresponding tubes of amplifier circuit AMP2 is supplied from the plate battery 204.

The potential amplified by the amplifier circuit AMP1 and impressed upon the primary windings of output transformer 201 is applied from the secondary winding of such transformer over conductors 205 and 206, across the control phase winding of the stator of servo-motor M3, the other stator winding of which is energized over conductors 207 and 208 from the left secondary winding of power transformer 209. So long as there is an output potential from the amplifier circuit AMP1, both phase windings of motor M3 will be energized and the motor will operate rotating the shaft 309 at a slow speed in one direction or the other dependent upon the polarity of the potential received from the rotor winding of the control transformer CT1 with respect to the instant polarity of the potential applied to the other phase winding of motor M3. The rotation of shaft 309 results in the rotation of the rotor of control transformer CT1 until it assumes a position in which the potential induced into its winding becomes zero at which time the control phase winding of motor M3 receives no potential and the motor comes to rest.

The rotation of shaft 309 in addition to rotating the rotors of control transformers CT1 and CT2, also, through the gears 308 rotates the rotor of transmitting autosyn FRA for controlling the orientation of the flight recorder 1900 of Fig. 19. The rotor winding of this autosyn is connected over conductors 335 and 336 and over terminals on the cross-connecting rack 1936 with the rotor winding of the receiving autosyn (not shown) of the flight recorder, these windings both being energized by current from the secondary winding of power transformer 209. The stator windings of the transmitting autosyn are connected over conductors 337, 338 and 339 and over other terminals on the cross-connecting rack 1936 with the stator windings of the receiving autosyn of the flight recorder. This receiving autosyn is thus controlled by the transmitting autosyn FRA to orient the steering wheels of the flight recorder in accordance with the true track of the simulated flight course. The flight recorder is disclosed and described in more detail in the Holden Patent 2,486,784.

At the time the rotor of control transformer CT1 is rotating to a position in which the potential induced into its winding is reduced to zero, the rotor of control transformer CT2, being mounted in quadrature with respect to the rotor of transformer CT1, receives an increasing induced potential from its associated stator windings. This potential is applied over conductors 209 and 210 across the input side of the amplifier circuit AMP2, is amplified thereby and impressed through the output transformer 211 across the control phase stator winding of the servo-motor M2, the other phase stator winding of which is supplied with potential from the secondary winding of the power transformer 209 over the normally closed contacts of the limit switches 212 and 213. The motor M2 therefore operates and through the reduction gear box 214 rotates the shaft 215.

The motor M2 will rotate the shaft 215 in one direction or the other dependent upon the polarity of the potential received from the rotor winding of control transformer CT2, as amplified by the amplifier circuit AMP2, and impressed upon the control phase winding of motor M2 with respect to the instant polarity of the potential applied to the other phase winding of the motor from the transformer 209. This polarity difference will in turn depend upon whether the summation of the movements of the rotors of autosyns ASC and WDA is in one or the other sense.

As the shaft 215 rotates it moves the brush of potentiometer 216, the winding of which is energized by potential applied thereto from the source of supply through the windings of transformer 217. This potential, because of the association of resistance 218 and condenser 219 with the windings of transformer 217, is displaced 180 degrees in phase with respect to the phase of the potential impressed from the winding of the rotor of control transformer CT2 upon the input side of the amplifier circuit AMP2 and consequently the potential derived from potentiometer 216 through the adjustment of its brush by motor M2 and applied to the input side of the amplifier circuit tends to gradually balance the potential applied from the rotor winding of control transformer CT2 and to cause the speed of motor M2 to become gradually reduced until the rotor of control transformer CT2 comes to rest at such time as the potential induced into its winding and applied to the input side of the amplifier circuit AMP2 will be completely balanced by the potential applied through potentiometer 216. No potential will therefore be effective in the input side of the amplifier circuit and consequently motor M2 will come to rest.

The potential induced into the rotor winding of control transformer CT2 being a summation of the potentials impressed upon the windings of the rotors of autosyns ASC and WDA incident to changes in the true air speed of the simulated flight and in the wind velocity the amount of rotation of shaft 215 by the motor M2 under the control of the control transformer CT2, is a measure of the change in the actual speed of the simulated flight. This rotation of shaft 215 is employed to control the interrupter 230 which is of the manner disclosed in full in the Holden Patent 2,486,784. This interrupter transmits impulses which vary in accordance with the ground speed of the simulated flight. These impulses are transmitted over conductor 220 and a terminal on the cross-connecting rack 1936 to the tractor motor which drives the tractor wheel of the flight recorder.

If, for example, a flight having an indicated air speed of 120 knots and on a course 240 degrees is being simulated and the instructor has set the wind velocity variac for a wind velocity of 30 knots from a direction 90 degrees or east, then the course traced by the flight recorder on the chart would be 346 degrees.

*Drift sight operations*

For enabling the navigator to secure practice in taking drift sights by which the effect of the wind in deflecting the aircraft from its intended line of flight may be determined in order that adequate correction may be made in the heading of the aircraft to compensate for the wind, the trainer is provided with the drift sight mechanism disclosed in Fig. 27. A common type of drift sight used on aircraft comprises a sight tube rotatable about its axis the amount of rotation being readable by a pointer carried thereby movable over an azimuth scale. The sight tube is provided with a set of sighting hairs. Ordinarily this drift sight is mounted on the windward side of the aircraft and is sighted on an object directly beneath the aircraft and while the object is going outboard and aft the navigator maintains a steady compass bearing and speed. The observer follows the object with the sight tube during its apparent movement and notes on the scale its relative bearing after thirty or forty seconds of flight.

For simulating these conditions a drift sight of this general character has been modified for use in the trainer and is schematically disclosed in Fig. 27. This drift sight comprises a sight tube 2790 rotatable about its axis and having cross hairs lighted by the lamp 2791 to a desired intensity by current supplied through the right secondary winding of power transformer 2792, over contacts of the switch 2793 and through the regulating rheostat 2794. Since in the simulated flight the trainer does not move, movement with respect to terrain is simulated by a rotatable drum 2795 having a landscape and a seascape depicted on its outer peripheral surface which may be viewed through the sight tube. The drum is rotatable by the motor 2736 so that the land or the seascape passes beneath the sight tube at a speed commensurate with the air speed of the simulated flight. This motor is driven by power supplied from the right secondary winding of transformer 2792 through switch 2793. Either the land or seascape may be selected for observation by movement of the drum axially along its axis of rotation. The drum 2795 is provided with small perforations therethrough through which light from the lamp 2799 may shine in simulation of light which might appear on land or on ships or lighthouses at sea if viewed during a night flight.

For illuminating the outer surface of drum 2795 if a daylight flight is being simulated the lamp 2798 is provided. Either the lamp 2798 or the lamp 2799 may be lighted dependent upon whether the simulated flight is assumed to be made during daylight or at night by the operation of switch 2769 which connects either lamp circuit with rheostat 2797 over the contacts of switch 2793 and through the right secondary winding of power transformer 2792. The brilliancy of illumination may be adjusted by the rheostat 2797.

For orienting the drum 2795 about a vertical axis, motor 2761 of the shaded pole type is provided, the rotor shaft of which is connected through the reduction gear box 2762 and the gears 2763, 2764, 2765 and 2766, with the shaft upon which the frame supporting the drum 2795 is mounted whereby the drum may be oriented at a very slow speed in either direction. The motor also drives the brush of balancing potentiometer 2767 through the gears 2768 and 2769. The winding of this potentiometer is energized from the secondary winding of the transformer 2770 the mid-point of which is grounded whereby potential of phase $\varphi 1$ is applied to one terminal of the potentiometer winding and potential of the other phase $\varphi 2$ is applied to the other terminal of such winding.

For controlling the motor 2761 two gas-filled tubes 2771 and 2772 are provided. The control grids of these tubes are connected to an input circuit extending through the secondary winding of the input transformer 2773. Anode potential of phase $\varphi 1$ is supplied to the anode of tube 2771 over the right portion of the secondary winding of transformer 2792, through resistance lamp 2774 and choke coil 2775 and potential of the other phase $\varphi 2$ is supplied over the left portion of the secondary winding of transformer 2792, through resistance lamp 2776 and choke coil 2777 to the anode of tube 2772. Potential of phase $\varphi 1$ is also impressed upon the primary winding of transformer 2778 and applied from the secondary winding thereof to the filament heating circuit of tubes 2771, 2772 and 2779 and in a circuit through the winding of bias adjusting rheostat 2780 and across the anode-cathode path through rectifier tube 2779. Grid biasing potential derived from the rheostat 2780 is applied through the secondary winding of input transformer 2773 to the control grids of tubes 2771 and 2772.

The main stator winding 2783 of motor 2761 is energized from the right or phase φ1 portion of the secondary winding of transformer 2792 and the shaded pole windings 2781 and 2782 are connected in series between the grounded mid-point of the secondary winding of transformer 2792 and the cathodes of tubes 2771 and 2772 whereby, when tube 2771 is conducting, the circuit through the shaded pole windings of motor 2761 is completed over the cathode-anode path through tube 2771 and thence as traced through the right portion or phase φ1 portion of the secondary winding of transformer 2792 and, when tube 2772 is conducting, the circuit is completed over the cathode-anode path through tube 2772 and thence as traced through the left or phase φ2 portion of the secondary winding of transformer 2792. Thus if tube 2771 is conducting the motor 2761 will rotate in one direction and if tube 2772 is conducting the motor will rotate in the opposite direction.

Potential is impressed upon the primary winding of the input transformer 2773 under the control of drift sight control potentiometer DSP, Fig. 3, which is driven through the differential gear box 340, one input shaft of which is driven through gears 341 from shaft 910 driven by the motor M9 of the compass motor control circuit and the other input shaft of which is driven through gears 342 from the shaft 309 driven by the motor M3 of the flight recorder motor control circuit. The winding of potentiometer DSP is bridged across the 40φ1 and 40φ2 bus bars and the brush of such potentiometer is connected over conductor 343, through the primary winding of transformer 2773, to the brush of balancing potentiometer 2767.

To enable the navigator to determine the amount of the wind drift through the use of the wind drift sight apparatus, which drift is determined by the wind direction and velocity factors which the instructor has introduced by the operation of the wind direction autosyn WDA and the wind velocity variacs WVV1 and WVV2, it is necessary to subtract the compass heading of the simulated flight which is indicated by the rotational position of shaft 910 in response to the compass motor control circuit, from the true flight heading of the simulated flight which is indicated by the rotational position of shaft 309 and by which shaft the autosyn transmitter FRA is driven to orient the flight recorder. This is accomplished by the differential gear box 340.

When the wind drift control circuit of Fig. 27 is in balance potential applied from the brush of potentiometer DSP over conductor 343 to the upper terminal of the primary winding of input transformer 2773 and potential applied from the brush of balancing potentiometer 2757 will be opposite in phase but of the same potential value and consequently no current will flow through the primary winding of transformer 2773 and no control potential will therefore be impressed upon the control grids of tubes 2771 and 2772.

It will be assumed that the brush of potentiometer DSP is moved in a clockwise direction whereby the potential of phase φ1 applied to the upper terminal of the primary winding of transformer 2773 is increased and the potential of phase φ2 applied to such terminal is decreased. As the result of the predomination of potential phase φ1, current flows through the winding of transformer 2773 and potential of phase φ2 is impressed upon the control grids of tubes 2771 and 2772. At the same instant potential of phase φ1 is impressed upon the anode of tube 2771 and potential of phase φ2 is impressed upon the anode of tube 2772 from the secondary winding of transformer 2792. The signaling potential during each positive half cycle thereof makes the potential on the grids of tubes 2771 and 2772 less negative or more positive with respect to the cathode whereby these tubes become prepared for firing, but at that instant the anode of tube 2771 will be negative since it has potential of phase φ1 impressed thereon, which is 180 degrees out of phase with the signaling potential impressed upon the grid, and tube 2771 will not therefore fire. However, at the same instant the anode of tube 2772 will be positive since it has potential of phase φ2 impressed thereon which is in phase with the signal potential impressed upon the grid and consequently tube 2772 will fire.

With tube 2772 now conducting alternating current of phase φ2 is applied through the shaded pole windings 2781 and 2782 of the motor 2761 and since the main stator winding 2783 is energized by current of phase φ1 over the right portion of the secondary winding of transformer 2792 the motor turns in a direction determined by the phase displacement of the main stator winding and the shaded pole windings and through the gearing, previously described, orients the drum 2795. The motor also through the gears 2768 and 2769 causes the movement of the brush of balancing potentiometer 2767 in such a direction as to tend to balance the control circuit.

It will be assumed that the brush of potentiometer 2767 is driven in a clockwise direction to increase the potential of phase φ1 supplied to the lower terminal of the primary winding of transformer 2773 and to decrease the potential of phase φ2 applied to such terminal. As the predominance of potential of phase φ1 applied to the lower terminal of transformer 2773 increases as the brush of potentiometer 2767 moves, the current flowing through the primary winding of such transformer decreases and the signaling potential applied to the grids of tubes 2771 and 2772 decreases until when the brush of potentiometer 2767 has moved until the predominant potential of phase φ1 applied from the brush of potentiometer 2767 balances the potential of phase φ1 applied from the brush of potentiometer DSA, no current flows in the primary winding of transformer 2773 and no signaling potential is applied to the grids of tubes 2771 and 2772. Tube 2772 now ceases to fire and the motor 2761 comes to rest. The drum 2795 has now been oriented to an angular position indicative of the wind drift. As the simulated flight proceeds the drift angle is corrected in accordance with the changes in the compass heading of the flight and the true flight heading.

To take a wind drift sight the navigator closes the switch 2793 and operates the switch 2760 to either its upper or lower position depending upon whether a day or a night flight is being simulated. Closure of switch 2793 causes the motor 2796 to rotate the drum 2795. The navigator then rotates the sight tube 2799 until a spot on the landscape or seascape appears to move parallel to the sight hairs, the angular movement of the sight tube determining the wind drift which may be read from the position of the index pointer carried by the sight tube with respect to the fixed azimuth scale. Under the flight conditions previously assumed which caused the flight recorder 1900 to trace a course 346 degrees, the wind drift should be +14 degrees (left).

It will now be assumed that the pilot is directed to simulate a flight at an altitude of 7000 feet. In response to such instructions the pilot pushes both throttles forward until the manifold pressure indicators read 35 inches mercury. This will result in the manner previously described in an increase of the simulated engine speeds as indicated by the tachometers and the readjustment of the thrust horse-power shaft 719 indicative of an increase in thrust horse-power. The pilot will then pull the yoke 1411 back for climbing until the altimeters indicate that an altitude of 7000 feet has been attained when he will push the yoke 1411 forward until level flight is attained as indicated by the zero readings of the rate of climb indicators.

The repositioning of the shaft 1260 of the altimeter motor control circuit has now caused the movement of the brush of potentiometer AP5 in such a direction as to reduce the current flowing in the circuit previously traced from the brush of such potentiometer, through the outside air temperature indicator 1526 on the copilot's instrument panel, through the outside air temperature indicator 2813 on the flight engineer's instrument panel and through the outside air temperature indicator OT at the instructor's desk, to the slider of rheostat OTR whereupon these indicators will show an air temperature of +1 degree C.

To simulate the high speed operation of the supercharge blowers which would be required for a higher altitude flight of an aircraft, the flight engineer now operates the supercharger switches 2918 and 2919, Fig. 29, from their low to their high speed settings thereby establishing circuits from ground over the lower contacts of these switches, over conductors 2927 and 2928 to battery and ground through the windings of SHL (supercharger high speed relay for the left engine) 5221 and the SHR (supercharger high speed relay for the right engine) 5213. Relay 5221 upon operating closes an obvious circuit for SHL1 relay 5222 and relay 5213 closes an obvious circuit for SHR1 relay 5212. Over their upper front contacts relays 5221 and 5213 also establish circuits extending from ground over such contacts, over conductors 5223 and 5224 and to battery and ground through the lamps 2242 and 2243 at the instructor's desk, indicating that the superchargers for the left and right engine have been set for high speed operation. The low speed lamps 2210 and 2211 become extinguished when the switches 2918 and 2919 were operated to disengage their upper contacts.

SHR1 and SHL1 relays 5212 and 5222 also affect the manifold pressure motor control circuits to cause an increase of the indicated manifold pressure for the respective engines to simulate the increase in manifold pressure which would result in an aircraft by increasing the speed of the supercharger blowers. A higher potential of phase $\varphi_1$ is now applied to control conductor 5642 of the manifold pressure motor control circuit for the right engine. To derive this potential, potential of phase $\varphi_1$ is applied from bus bar 40$\varphi_1$ over conductor 3022 through the winding of throttle variac 3019R to ground and the potential derived therefrom is applied over conductor 3024 through the winding of altitude potentiometer AP9 and through resistance 5209 to ground. The potential derived from the latter potentiometer is applied over conductor 5212, over the upper No. 1 contacts of ON relay 4909, conductor 5211, over the middle upper front contact of relay 5212, through the winding of the R. P. M. potentiometer RRP3, over the lower front contact of relay 5212 and through resistance 5225 to ground. With relay 5212 operated the right half of the winding of potentiometer RRP3 is bridged over the inner upper contacts of relay 5212 through resistance 5227. From the brush of potentiometer RRP3 the derived potential of phase $\varphi_1$ is applied over the inner lower contacts of relay 5212, over conductor 5216, through the right engine manifold pressure rheostat 2330, conductor 2331, over the lower front contact of EST1 relay 5028 and to control conductor 5642. The change in the resistance network caused by the operation of relay 5212 is effective to cause an increase of the potential applied to conductor 5642 over the potential applied to conductor 5642 prior to the operation of relay 5212. Similarly the potential of phase $\varphi_1$ applied to the control conductor of the manifold pressure motor control circuit for the left engine is increased.

It will be noted that with relay 5212 operated the right half of the winding of R. P. M. potentiometer RRP3 is shunted by resistance 5227. This is to cause the manifold pressure to increase at one rate at lower engine speeds when the brush is engaging with the shunted half of the potentiometer winding, and to increase at a higher rate when the brush is engaging the unshunted half of the winding, in simulation of the manner in which the manifold pressure varies in accordance with R. P. M. when the supercharger is being operated at high speed. Relay 5222 similarly controls R. P. M. potentiometer LRP3.

The manifold pressure motor control circuits are thereupon operated to cause the rotation of the shafts driven thereby indicative of an increase in manifold pressures and to cause the manifold pressure indicators to show such increases in manifold pressures. The manifold pressures are now varied with the altitude, increasing as the throttles open and increasing as the R. P. M. increases.

As a further result of the operation of the SHR and SHL relays 5213 and 5221, the circuits previously traced for applying potentials of phase $\varphi_1$ to the control conductors of the brake horsepower motor control circuits of Fig. 39 are changed to simulate the reduction of the brake horsepower outputs of the engines of an aircraft due to the extra power consumed in running the supercharger blowers at higher speeds. For example, with relay 5213 now operated, potential of phase $\varphi_1$ is now applied from the brush of manifold pressure potentiometer RMP1, over conductor 5605, over the middle lower front contact of relay 5213, through resistance 5226, over conductor 5218 to the brush of the R. P. M. potentiometer RRP1 and over the potential divider extending from ground through the RRP1 potentiometer winding, over conductor 5013, over the lower front contact of relay 5213 and through resistance 5220 to ground, and from a point between resistance 5226 and this potential divider, through resistance 5006 to the control conductor 5007 of the brake horsepower motor control circuit for the right engine. A similar circuit is established to control conductor 5057 of the brake horse-power motor control circuit for the left engine by the operation of SHL relay 5221. These motor control circuits are now controlled by the manifold pressure potentiometers RMP1 and LMP1 and the R. P. M. potentiometers RRP1 and LRP1 to show increases in the brake horse-power as the manifold pressures increase and increases in the brake horse-power as the R. P. M. increases but, as the R. P. M. increases above a certain amount, the resistance networks cause the brake horse-powers to fall off as would be the case in an actual aircraft.

As a result of the increase in manifold pressures due to the simulation of the increased speed of the supercharger blowers and the increase in the simulated brake horse-power outputs of the engines, the thrust horse-power motor control circuit of Fig. 42 is controlled to rotate its shaft 4260 and the shaft 719 into positions indicative of an increase in thrust horse-power, thereby in the manner previously described, causing the indicated air speed motor control circuit of Fig. 12 to operate the shafts 1210 and 601 in directions indicative of an increase in air speed. This in turn results in the control of the rate of climb motor control circuit to operate the shafts 1160 and 551 in directions indicative of an increase in the rate of climb which the pilot will note from the rate of climb indicator. The pilot may now resume level flight by pulling back both throttles to reduce the manifold pressures and thus the speeds of the engines, the thrust horse-power and the indicated air speed until the rate of climb motor control circuit controls the rate of climb indicators to indicate a zero rate of climb. Level flight is thus resumed without changing the position of the yoke 1411.

Manual propeller control

It will now be assumed that the right and left propeller control switches 1816 and 1817 on the pilot's pedestal, Fig. 18, are operated from their upper or automatic positions to their normally open or manual positions thereby opening the circuit of the AUT relay 5609 at the right engine control circuit, Fig. 56, and the circuit of the corresponding relay at the left engine control circuit, Fig. 45. These relays thereupon release in turn establishing the circuits of the MAN relays, such as 5610, at each control circuit. Relay 5609 upon releasing also establishes the circuit previously traced over conductor 4321 for relay 4320 of the R. P. M. memory motor control circuit for the right engine which relay, upon operating, opens the circuit of motor M43 to prevent further operation of such motor control circuit. The R. P. M. memory motor control circuit for the left engine is similarly controlled from the left engine control circuit of Fig. 45.

Relay 5610 upon operating disconnects ground from conductor 5611 of cable 5600 to extinguish the automatic propeller pitch lamp 2107 and over its lower No. 1 front contact connects ground to conductor 5668 of cable 5600 for lighting the manual propeller pitch lamp 2109 at the instructor's desk. The MAN relay of the engine control circuit of Fig. 45 similarly causes lamp 2007 to become extinguished and lamp 2009 to become lighted at the instructor's desk. Relay 5610 at its upper No. 1 and lower No. 2 contacts open the circuits previously traced over conductors 5650 and 4325 to the control conductor 4323 of the R. P. M. memory motor control circuit for the right engine and the MAN relay of the engine control circuit of Fig. 45 opens similar circuits over conductors 4550 and 4375 to the control conductor 4373 of the R. P. M. memory motor control circuit of the left engine. At its lower No. 3 contacts relay 5610 establishes a circuit from ground over such contacts, over conductor 5669 through the winding of MAN1 relay 5502 associated with the propeller pitch motor control circuit for the right engine. A similar circuit is established by the MAN relay of Fig. 45 for the MAN1 relay 5552 associated with the propeller pitch motor control circuit for the left engine. Relay 5610 also connects ground through resistance 5693 over its upper No. 1 front contact, over the upper front contact of ESTA relay 5639 and conductor 5656 to the junction point between the brush of potentiometer RRP10 and resistance 5109 to replace the resistance 4322 previously connected over conductor 5650 and the upper No. 1 back contact of relay 5610 to such junction point so that the R. P. M. motor control circuit of Fig. 40 will not react to the operation of relay 5610. The corresponding MAN relay of Fig. 45 performs a similar function with respect to the R. P. M. motor control circuit for the left engine.

With relay 5502 operated, direct ground is applied over its inner lower front contact, through resistance 5505 to control conductor 5504 of the propeller pitch motor control circuit for the right engine and ground is applied over the upper back contact of INC relay 5670, over the upper back contact of DEC relay 5671, over conductor 5672, over the upper contacts of relay 5502 and through resistance 5503 to control conductor 5504. At the same time connections to the brushes of potentiometers RVP7 and RPP3 are opened whereby the propeller pitch motor control circuit is rendered unresponsive and the shaft 4410 controlled thereby is maintained in its previously adjusted position. Relay 5502 over its lower contacts connects the brush of propeller pitch potentiometer RPP2 over conductors 5361 and 5362 and through resistance 5363 to control conductor 5352 of the thrust horse-power motor control circuit and similarly relay 5552, over its lower contacts, connects the brush of propeller pitch potentiometer LPP2 over conductors 5364 and 5365 and through resistance 5366 to control conductor 5352 of the thrust horse-power motor control circuit whereby the latter circuit is now placed under the control of the propeller pitch potentiometers RPP2 and LPP2. Relay 5502 over its inner upper contacts also connects the brush of brake horse-power variac RBV7 through resistance 5369 and over conductors 5367 and 5368 to ground through resistance 5370 and, through resistance 5371 to control conductor 5352 of the thrust horse-power motor control circuit, and similarly relay 5552, over its inner upper contacts, also connects the brush of brake horse-power variac LBV7 through resistance 5372 and over conductors 5373 and 5374 to ground through resistance 5375 and, through resistance 5376 to control conductor 5352 of the thrust horse-power motor control circuit whereby the control of the thrust horse-power motor control circuit by the brake horse-power motor control circuits is not altered. These changes do not affect the thrust horse-power positions of the shafts 4260 and 719 controlled by the thrust horse-power motor control circuit and the rate of climb indicators will still indicate a zero rate of climb. This simulates the condition which would exist in an actual aircraft when the propeller control is shifted from automatic to manual.

Decrease of propeller pitch

The simulation of the decrease of propeller pitch under manual control is controlled by the movement of the propeller control switches 1816 and 1817 to their middle positions. With the switch 1816 in its middle position ground on conductor 3387 is connected over the front contact of PR relay 1814, through switch 1813, over switch 1816 and conductor 5673 of cable 5600 and through the winding of INC relay 5670 to battery ground. Relay 5670 upon operating establishes a circuit from ground over its lower contacts and conductor 5674 of cable 5600 to battery through the propeller pitch R. P. M. increase lamp 2110 for the right engine to light such lamp at the instructor's desk indicating that the propeller R. P. M. has been increased. At its back contact, relay 5670 removes ground from conductor 5672 and over its upper front contact supplies potential of phase φ1 from the potential divider extending from the 40φ1 bus bar through resistances 5675 and 5676, over conductor 5672 and thence as traced over the upper front contact of MAN1 relay 5502 and through resistance 5503 to the propeller pitch motor control circuit. The propeller pitch motor control circuit is now operated to rotate shaft 4410 in a direction indicative of a decrease of propeller pitch so long as the switch 1816 is held in the propeller R. P. M. increase position. The rotation of shaft 4410 rotates the brushes of the propeller pitch potentiometers toward the No. 1 terminals of their windings. The adjustment of potentiometer RPP2 is effective to control the thrust horse-power motor control circuit over the circuit as modified by the operation of MAN1 relay 5502 to operate the shafts controlled by the thrust horse-power motor control circuit in directions indicative of a decrease in thrust horse-power.

The propeller pitch potentiometer RPP1 is effective at this time to control the R. P. M. motor control circuit. For this purpose potential of phase φ2 applied over conductor 5644 through the winding of potentiometer RPP1, as modified by the manifold pressure potentiometer RMP2, as further modified by the true air speed potentiometer TASP4 and the R. P. M. potentiometer RRMP3, is applied over conductor 5405, over the upper No. 2 front contact of MAN relay 5610, over the upper back contact of relay 5654, the upper back contact of PRM relay 5622, over the upper No. 3 front contact of EST1 relay 5626, over conductor 5635 and through resistance 5108 to control conductor 4001 of the R. P. M. motor control circuit for the right engine. This motor control circuit is controlled to rotate the shafts 4010 and 5101 controlled thereby in directions indicative of an increase in the R. P. M. whereupon the potentiometer RPP5 driven from shaft 5101 is adjusted to increase the speed of rotation of the right engine tachometer generator RTG, Fig. 47, to cause the right engine tachometers on the instrument panels to show an increasing engine speed. When the tachometers indicate a right engine speed of, for example, 2400 R. P. M., the switch 1816 is moved to the open position. INC relay 5670 thereupon releases opening the circuit for controlling the propeller pitch motor control circuit whereupon the motor thereof comes to rest. Relay 5670 also opens the circuit of the increase of R. P. M. propeller pitch lamp 2110 for the right engine which becomes extinguished.

The movement of switch 1817 to its middle position causes similar operations in connection with the left engine control circuit of Fig. 45 and the associated motor control circuits for the left engine. The fact that the switch 1817 has thus been operated is indicated at the instructor's desk by the lighting of lamp 2010.

*Increase of propeller pitch*

The simulation of the increase of propeller pitch under manual control is controlled by the movement of the propeller pitch switches 1816 and 1817 to their lower positions. With switch 1816 in its lower position a circuit is established from ground thereover, over conductor 5677 of cable 5600 and to battery through the winding of DEC relay 5671, Fig. 56. Relay 5671 upon operating establishes a circuit from ground over its lower contacts and conductor 5678 of cable 5600 to battery through the propeller pitch decrease R. P. M. lamp 2111 for the right engine to light such lamp at the instructor's desk indicating that the propeller R. P. M. has been decreased, at its back contact removes ground from conductor 5672 and over its upper front contact applies potential of phase φ2 from the potential divider extending from the 40φ2 bus bar through resistances 5679 and 5680 and conductor 5672, and thence as traced over the upper front contact of MAN1 relay 5502 and through resistance 5503 to the propeller pitch motor control circuit. The propeller pitch motor control circuit is now operated to rotate shaft 4410 in a direction indicative of an increase of propeller pitch so long as the switch 1816 is held in the propeller R. P. M. decrease position. The rotation of shaft 4410 rotates the brushes of the propeller pitch potentiometers towards the No. 3 terminals of their windings. The adjustment of potentiometer RPP2 is effective to control the thrust horse-power motor control circuit as previously described to cause an increase in thrust horse-power.

The propeller pitch potentiometer RPP1 is effective at this time to control the R. P. M. motor control circuit over the circuits previously traced in connection with the discussion of decreasing the propeller pitch whereby the shafts 4010 and 5101 are rotated in directions indicative of a decrease in R. P. M. whereupon the potentiometer RPP5 driven from the shaft 5101 is adjusted to decrease the speed of operation of the right engine tachometer generator RTG to cause the right engine tachometers on the instrument panels to show a decreasing engine speed. When the tachometers indicate a right engine speed of, for example, 2000 revolutions per minute, switch 1816 is moved to the open position. DEC relay 5671 thereupon releases opening the circuit for controlling the propeller pitch motor control circuit whereupon the motor thereof comes to rest. Relay 5671 also opens the circuit of decrease R. P. M. propeller pitch lamp 2111 for the right engine which thereupon becomes extinguished.

The movement of switch 1817 to its lower position causes similar operations in connection with the left engine control circuit of Fig. 45 and the propeller pitch and R. P. M. motor control circuits for the left engine. The fact that the switch 1817 has been operated is indicated at the instructor's desk by the lighting of lamp 2011.

The right and left propeller control switches are now returned to their upper or automatic positions causing the reoperation of AUT relay 5609 and the release of MAN relay 5610 and MAN1 relay 5502 of the right engine control circuit and the similar relays of the left engine control circuit. With the circuits restored to the condition previously described when functioning on automatic propeller controls and the throttle settings unchanged, the tachometers for both engines will indicate about 1800 R. P. M.

*Disabling the right engine*

It will now be assumed that the instructor, to simulate the disabling of the right engine of an aircraft, operates the right engine disabling key 2500R to the "off" position thereby opening the locking circuit of ST relay 5638 of the right engine motor control circuit, Fig. 56. Relay 5638 thereupon releases in turn releasing EST1 relay 5628, ESTA relay 5639 and EST relay 5616. Relay 5628 upon releasing modifies the circuit previously traced over which potential of phase $\varphi 1$ was applied to control conductor 4001 of the R. P. M. motor control circuit of Fig. 40, so that this motor control circuit operates the shafts 4010 and 5101 controlled thereby in directions indicative of a reduction in the speed of the right engine. FL relay 5641 will at this time be operated since a simulated flight altitude of 7000 feet has been assumed. Upon the release of relay 5628 with FL relay 5641 operated, potential of phase $\varphi 1$ is applied from the 40$\varphi 1$ bus bar through the potential divider comprising resistances 5682 and 5683 to ground, and potential of phase $\varphi 1$ derived at the junction point between the resistances is applied over the upper back contact of FTR relay 5637, over the lower No. 2 front contact of FL relay 5641, over the upper No 3 back contact of EST1 relay 5628, conductor 5686 and through resistance 5108 to control conductor 4001 of the R. P. M. motor control circuit. This potential being substantially less than that of phase $\varphi 1$ applied over the previously traced circuit prior to the release of relay 5628, the motor of the R. P. M. motor control circuit is operated to rotate the shafts controlled thereby to positions indicative of a reduction of engine speed to about 800 R. P. M. In response to the repositioning of R. P. M. potentiometer RPP5 the right engine tachometer generator RTG is now rotated at a reduced speed whereby the right engine tachometers on the instrument panels indicate a right engine speed of about 800 R. P. M. Because of the reduced speed of the tachometer generator RTG the sound effects circuit of the right engine, Fig. 58, is also controlled to produce a greatly reduced simulated engine noise.

As a result of the further reduction in the right engine speed and the operation of the brush of R. P. M. potentiometer RRP3 toward the No. 3 terminal of its winding, the potential of phase $\varphi 1$ applied to control conductor 5642 of the right engine manifold pressure control circuit is reduced whereby the motor of such circuit rotates the shafts 4110 and 5201 in directions indicative of a reduction in manifold pressure which will be indicated by the right engine manifold pressure indicators on the instrument panels. The movement of R. P. M. potentiometer brush RRP7 towards the No. 1 terminal of its winding reduces the potential of phase $\varphi 1$ applied to the control conductor 4303 of the right engine fuel flow motor control circuit whereby the motor of such circuit rotates the shafts 3710 and 4301 in directions indicative of a lower fuel consumption for the right engine which will be indicated by the right engine fuel flow indicators on the instrument panels.

With ESTA relay 5639 released, a potential of phase $\varphi 2$ applied from the 40$\varphi 2$ bus bar through resistances 5649 and 5648 to ground, is applied from a point between resistances 5648 and 5649, over the back contact of relay 5639, over the upper No. 1 back contact of MAN relay 5610, over conductor 5658 through resistance 4322 to control conductor 4323 of the R. P. M. memory motor control circuit for the right engine whereby the motor M43 of such circuit drives the shafts 4310 and 5431 to return the brush RRMP6 to the normal or No. 1 terminal of its winding, at which time the L1 limit switch 4311 opens the circuit of motor M43.

The release of relay EST 5616 opens at its upper No. 1 contacts the circuit previously traced over which potential of phase $\varphi 1$ was applied to control conductor 5007 of the brake horse-power motor control circuit for the right engine whereupon potential of phase $\varphi 2$ applied over the balancing potentiometer RBP10 is effective to cause the motor of the brake horse-power circuit to drive the shafts 3910, 5001 and 655 into their normal positions or until the L1 limit switch 3913 is operated to open the circuit of ON relay 3912 which, upon releasing, opens the circuit of the motor of the control circuit at which time the brushes of the brake horse-power potentiometers will be at the No. 1 terminals of their windings. With the brake horse-power output potential supplied through brake horse-power variac RBV7 to control conductor 5352 of the thrust horse-power motor control circuit reduced to zero, such motor control circuit is controlled to rotate shafts 4260, 5351 and 719 in directions indicative of a reduction in thrust horse-power to the amount delivered through the operation of the left engine only.

With ON relay 3912 released and ON relay 3962 associated with the left engine motor control circuit still operated, potential of phase $\varphi 1$ is applied from the 40$\varphi 1$ bus bar, over the left front contact of ON relay 3962, over the inner left back contact of ON relay 3912, over conductor 3915, over the inner upper back contact of FTR relay 5637, through resistance 5684, through resistance 5685 and over conductor 3914 and thence through the winding of thrust horse-power potentiometer TP7 associated with the indicated air speed motor control circuit of Fig. 12. The release of ON relay 3912 has resulted in the series inclusion of 150 ohms of resistance in series with the winding of potentiometer TP7 thereby resulting in the decrease of potential of phase $\varphi 1$ applied to the control conductor 1216 of the indicated air speed motor control circuit to an amount simulating the drag imposed by the windmilling of the right engine propeller after such engine has been disabled. The potential of phase $\varphi 1$ is also reduced by the movement of brush of potentiometer TP7 towards the No. 1 terminal of its winding resulting from the fact that only the left engine is now delivering power.

In the manner previously described the indicated air speed motor control circuit of Fig. 12 is so controlled as to operate the shafts 1210 and 601 in directions indicative of a decrease in air speed. As a result, the angle of attack and rate of climb motor control circuits cause the rate of climb indicators to indicate a reduction in the rate of climb, the indicated air speed indicators to show a reduction in air speed and the pitch bar motor control circuit is controlled to elevate the horizon bars of the artificial horizon instruments to indicate a nose down position, all in the manner previously described.

It will be recalled that in the discussion of the flight circuits it was stated that in the event the left engine should deliver more power than the right engine, which would, of course, be the case should the right engine be disabled, as just described, then the left engine would cause the turning of the simulated flight to the right which turning would be indicated by the sharp movement of the pointers of the rate of turn indicators on the pilot's, copilot's and instructor's instrument panels toward the right. As previously described, the rate of turn potentiometer RTP3 controls the application of potential to the control conductors 961 and 1011 of the ball and bank motor control circuits which thereupon respond to rotate the shafts 960, 301 and 1010, 401 controlled thereby, in directions indicative of a right wing down condition. In response to the movement of shaft 1010 the horizon bars of the artificial horizon instruments are tipped to indicate a right wing down condition and the movement of shaft 960 is effective to cause the balls of the balls of the turn and bank indicators to move toward the left.

To counteract the nosing down and yawing effects the pilot pushes down on the left rudder pedal 1400, turns the aileron control wheel 1450 in a counter-clockwise direction, pulls back on the yoke 1411 and opens the left engine throttle to increase the power output of the left engine. In response to the operation of these controls and in the manner previously described the simulated flight will return to a straight level flight condition which, when it is obtained, will be indicated by the level neutral positions of the horizon bars of the artificial horizon instruments, the return of the balls of the turn and bank indicators to their central or normal positions and the return to zero of the rate of climb indicators. The pilot may then operate the trim wheels ET, AT and RT to maintain the compensating positions of the yoke, aileron and rudder controls.

To remove the drag imposed by the windmilling of the disabled engine propeller, the pilot closes the propeller feathering switch 1823 on the pilot's pedestal thereby establishing a circuit from ground over conductor 3387, over the lower contacts of PR relay 1814, over the contacts of switch 1823 and conductor 5686 of cable 5600 to battery and ground through the winding of FTR relay 5637 of the right engine control circuit, Fig. 56. At its middle lower front contact relay 5637 establishes a circuit from ground over such contact and conductor 5689 of cable 5600 through feather propeller lamp 2112 at the instructor's desk to battery and ground to inform the instructor that the feathering of the right propeller by the pilot has been simulated. At its upper transfer contacts relay 5637 disconnects potential of phase $\varphi 1$ applied from the potential divider comprising resistances 5682 and 5683, from the circuit previously traced over conductor 5635 and through resistance 5108 to control conductor 4001 of the right engine R. P. M. motor control circuit and connects the 10,000-ohm resistance 5687 to control conductor 4001. Potential of phase $\varphi 2$ applied through balancing potentiometer RPP10 and resistance 5109 is now effective to control the R. P. M. motor control circuit to rotate the shafts 4010 and 5101 controlled thereby into their normal positions in which the L1 limit switch 4008 will open the circuit of ON relay 4009 and the circuit of the driving motor of the motor control circuit will be opened to stop further rotation of the shafts. The return of potentiometers RRP5 to its No. 1 terminal, slows down the motor 4701 of the tachometer motor control circuit of Fig. 47 until when the ON relay 4009 releases, relay 4700 of the right engine tachometer motor control circuit is opened to stop the motor 4701. The tachometer generator RTG being now stopped the right engine tachometers on the instrument panels will return to zero indicating that the right engine has ceased to rotate. As a further result of the movement of the brush of R. P. M. variac RRV6 towards the No. 2 terminal of its winding, the vibration motor RVM slows down to decrease the simulated right engine vibration until when the shaft 4010 reaches its normal position the cam operated contacts 4011 will open to stop the vibration motor.

With ON relay 4009 released, the circuit previously traced over the upper No. 1 contacts thereof whereby the manifold pressure motor control circuit was controlled to change the reading of the right engine manifold pressure indicators in accordance with the throttle opening, as indicated by the setting of the throttle variac 3019R, in accordance with the altitude as determined by the setting of the altitude potentiometer AP9, by the condition of the supercharger speed relay SHR1, by the R. P. M. potentiometer RRP3 now having its brush at the No. 1 terminal of its winding, and by the propeller governor rheostat 3012, is opened and the manifold pressure motor control circuit is now controlled in accordance with the barometric pressure at the altitude at which the simulated flight is being flown. This control circuit may be traced from the brush of altitude potentiometer AP3, the winding of which is supplied with potential of phase $\varphi 1$ as previously described, over conductor 5205, the lower front contact of FTR relay 5637, the upper No. 2 front contact of FL relay 5641, the upper back contact of STM relay 5626, the lower No. 3 back contact of EST1 relay 5628 to control conductor 5642 of the manifold pressure motor control circuit for the right engine, whereupon the manifold pressure control circuit for the right engine positions the shafts 4110 and 5201 to positions commensurate with the barometric pressure at the altitude determined by the adjustment of the altitude potentiometer AP3. The pressure is now indicated by the right engine manifold pressure indicators on the instrument panels.

As a further result of the release of ON relay 4009, the circuit of ST relay 5713 of the right engine oil pressure circuit of Fig. 57 is opened at the lower No. 2 contacts of relay 4009 and relay 5713 releases followed by the release of ST1 relay 5714, L2 relay 5717 and NP relay 5718. Potential of phase $\varphi 1$ is now applied through the rotor circuit of motor 5715, through resistance 5716, over the contacts of cam operated switch 5730, over the upper No. 1 back contact of ST relay 5713 and the upper phase $\varphi 1$ portion of the secondary winding of power transformer 5701, whereupon motor 5715 operates in such a direction as to move shaft 5722 back to its normal position in which the switch contacts 5730 open to stop the motor. The rotation of shaft 5722 has through the transmitting autosyn 5723 operated the right engine oil pressure indicators on the flight engineer's and instructor's instrument panels to indicate zero oil pressure for the right engine. ST1 relay 5714 upon releasing removes potential of phase $\varphi 2$ from the winding of cowl flaps potentiometer 5775 whereupon the engine cylinder and oil temperature motor control circuit is operated under the control of its balancing potentiometer 4629 to return shaft 4624 slowly toward its normal position whereby the engine oil temperature and cylinder temperature indicators for the right engine mounted on the flight engineer's and instructor's instrument panels are slowly operated to indicate the cooling of the oil and of the engine cylinders.

Relay 4009 also opens at its lower No. 3 contacts the previously traced circuit for RFS relay 3526, Fig. 35, which relay upon releasing, with RSF1 relay 3527 locked operated under the control of RFS2 relay 3528, establishes a filament heating circuit for timing tube 3531. After about ten seconds delay tube 3531 becomes conducting and relay 3528 operates over the cathode-anode path therethrough and opens the locking circuit of relay 3527 which, upon releasing, opens the circuit of ST relay 5750 of the fuel pressure motor control circuit, Fig. 57, which latter relay upon releasing in turn releases UL relay 5703. A circuit is now established from the phase $\varphi 2$ portion of the secondary winding of power transformer 5701, over the back contact of IFP relay 5767, over the back contact of ST relay 5750, over the inner upper front contact of LL relay 5710, through resistance 5704 and the rotor winding of motor 5705 to ground, whereupon the motor rotates shaft 5708 back to its normal position in which the cam operated contacts 5709 open to release LL relay 5710 and to thereby stop the motor. The rotation of shaft 5708, through the autosyn 5724, has returned the right engine fuel pressure indicators on the flight engineer's and instructor's instrument panels to read zero fuel pressure.

Relay 5710 upon releasing, at its upper transfer contacts, substitutes a direct ground for resistance ground connected to conductor 5712 and thence through resistance 4808 to control conductor 4803 of the right engine fuel flow motor control circuit and such circuit is now controlled by phase $\varphi 2$ potential supplied to control conductor 4803 over the brush of the balancing potentiometer RFFP1 to drive the shafts 3710 and 4801 in directions indicative of a reduction of the fuel flow. When the shaft reaches its normal position in which the brush of potentiometer RFFP1 is at the No. 1 terminal of its winding, the L1 switch 3708 operates to open the circuit of motor M37. Through the rotation of shaft 3710 the transmitting autosyn 3725 has controlled the right engine fuel flow indicators on the flight engineer's and instructor's instrument panels to indicate a reduction of the fuel flow to the right engine to the zero rate.

FTR relay 5637 at its inner lower back contact opens a point in the circuit of start relay 5638 of the right engine control circuit and at its inner upper transfer contacts removes the 60-ohm resistance 5634 from the circuit previously traced through the winding of thrust horse-power potentiometer TP7, over which potentiometer potential of phase $\varphi 1$ is applied to control conductor 1216 of the indicated air speed motor control circuit. Potential of phase $\varphi 1$ is thus increased and the air speed motor control circuit now functions to cause a resetting of the shafts 1210 and 601 driven thereby indicative of the increase in air speed which would result through the feathering of the propeller driven by the disabled engine. This increase in indicated air speed is indicated by the indicated air speed indicators on the instrument panels and would also become apparent to the pilot by a yawing of the simulated flight toward the right. Since the pilot has previously operated the trim wheels to offset the yawing effect due to the disabled engine when it was still windmilling, he now reoperates the trim wheels ET, AT and RT until a straight level flight path is again indicated by the instruments.

The left engine could be disabled in a similar manner by the operation of the left engine disabling key 2500L. In this case, however, the left engine control circuit of Fig. 45 and the motor control circuits appertaining to the left engine would function and the flight conditions which would result would be in the opposite directions to those previously described in connection with the disabling of the right engine. When the left engine propeller feathering relay similar to relay 5637 is operated, the circuit of propeller feather lamp 2012 is controlled over conductor 4589 of cable 4500 to indicate to the instructor that the pilot has closed the feathering switch 1824 on the pilot's pedestal.

*Restarting the right engine*

To simulate the starting of the right engine while it is still being driven by the windmilling of its propeller it is only necessary to reclose the disabling key 2500R. With the engine still rotating, the ON relay 4009 of the R. P. M. motor control circuit is still operated and consequently the circuit changes just described which would result from its release have not taken place and FTR relay 5637 of Fig. 56 has not been operated. With key 2500R released the circuit of ST relay 5638 is now established from ground over the inner upper contacts of relays 5603 and 5604, conductor 5607, the contacts of key 2500R at the instructor's desk, over conductor 2501, the lower contacts of relay 3527, conductor 3530, over the lower contacts of relay 5710, conductor 5711, over the inner lower contacts of FTR relay 5637, over the back contact of ICO1 relay 5690, over the upper No. 1 contacts of FL relay 5641 and over the upper back contact of relay 5636 through the winding of ST relay 5638 to battery and ground. Relay 5638 thereupon operates, locks over its inner upper front contact and over the back contact of relay 5690 to the start conductor and establishes the circuit of EST1 relay 5628 from ground over its inner lower contacts and over the lower No. 1 contacts of FL relay 5641 to battery and ground through the winding of relay 5628. Relay 5628 upon operating locks directly under control of relay 5638 and establishes the previously traced circuit for ESTA relay 5639 which in turn establishes the previously traced circuit for EST relay 5616. From this point the simulated operation of the right engine proceeds in the manner previously described, the sound effects circuit of Fig. 58 again functioning to simulate the sound of the engine as it picks up speed, the speed of the tachometer generator RTG increasing to control the tachometers to indicate the increasing engine speed which, with the previous throttle opening, will increase to the indicated speed of 1800 revolutions per minute, the manifold pressure motor control circuit functioning to control the right engine manifold pressure indicators to show an increase in the indicated manifold pressure and the flight circuits being controlled as a result of the returning power delivered by the right engine. With the right engine delivering power a yawing of the simulated flight to the left and nosing up will be indicated by the flight instruments since the pilot has previously operated the trimming wheels to offset the nosing down and yawing to the right condition due to the disabled right engine. The pilot will therefore readjust the left engine throttle until both engines are operating at the same speed of, for example, 1800 revolutions per minute and will reoperate the ET, AT and RT trim wheels until a straight level flight course is again simulated as indicated by the flight instruments.

Disabling both engines while in flight

Both engines may be disabled at the same time by pulling out the main ignition switch 3014, Fig. 30, thereby connecting ground to conductors 5601 and 5602 extending through cable 5600 to the junction points between the windings of IGR and IGL relays 5603 and 5604 and resistances 5605 and 5606, whereupon relays 5603 and 5604 become shunted and released, and at the same time connecting ground to conductors 4501 and 4502 extending through cable 4500 to the left engine control circuit of Fig. 45 whereby the corresponding ignition relays therein also release. Relays 5603 and 5604 upon releasing open the previously traced holding circuit for ST relay 5638 whereupon relay 5638 releases followed by the release of EST1 relay 5628, the release of ESTA relay 5639 and the release of EST relay 5616. With these relays released the right engine slows down to the speed at which it is driven by the windmilling propeller or to about 800 revolutions per minute as indicated by the right engine tachometers. The manifold pressure of such engine as indicated by the right engine manifold pressure indicators is reduced, the fuel flow to the right engine as indicated by the right engine fuel flow indicators is reduced, the vibration motor RVM, which simulates the vibration incident to the operation of the right engine, becomes slowed down, and the sound effects produced by the circuits of Fig. 58 with respect to the right engine are greatly reduced in volume, all in the manner previously described in connection with the disabling of the right engine. At the same time through the release of the relays of the left engine control circuit corresponding to relays 5603, 5604, 5638, 5628, 5639 and 5616 the left engine slows down to the speed at which it is driven by the windmilling of its propeller or about 800 revolutions per minute as indicated by the left engine tachometers. The manifold pressure of such engine as indicated by the left engine manifold pressure indicators is reduced, the fuel flow to the left engine as indicated by the left engine fuel flow indicators is reduced, the vibration motor LVM, which simulates the vibration resultant from the operation of the left engine, becomes slowed down, and the sound effects produced by the circuits of Fig. 58 with respect to the left engine are greatly reduced in volume.

The brake horse-power motor control circuits of Fig. 39 for both engines are now controlled in the manner previously described indicative of a reduction in brake horse-power thereby causing the thrust horse-power motor control circuit of Fig. 42 to be controlled in the manner previously described indicative of a reduction in the thrust horse-power output of the engines. Since the two engines are operating at the same reduced speed no yawing tendency is introduced in the control of the rate of turn motor control circuit of Fig. 10 by the settings of the brake horsepower potentiometers RBP9 and LBP9 and consequently the rate of turn, bank and ball motor control circuits are not affected to indicate any yawing of the flight course on the rate of turn, artificial horizon and ball indicators.

Since, however, the reduction of the thrust horse-power has resulted in the rotation of the brush of thrust horse-power potentiometer TP7 towards the No. 1 terminal of its winding, the potential of phase φ1 applied through such potentiometer to control conductor 1216 of the indicated air speed motor control circuit will be reduced resulting in the operation of such circuit in such a manner as to control the air speed indicators to indicate a reduction in air speed. Also, as a result of the reduction of air speed the angle of attack, rate of climb and pitch bar motor control circuits are controlled in the manner previously described whereby the horizon bars of the artificial horizon instruments are elevated to show a nose down condition. As a further result of the reduction of air speed the sound effects circuit of Fig. 58 is controlled to produce a decrease in the rushing sound incident to the simulated movement of the aircraft through the air.

To maintain a simulated air speed of at least 110 knots, the pilot pushes the yoke 1411 forward and thereby, in the manner previously described, causes the angle of attack, rate of climb, indicated air speed and pitch bar motor control circuits to function to simulate a nose down condition as indicated by the rate of climb indicators and the elevation of the horizon bars of the artificial horizon instruments. When the air speed increases above 150 knots, the pilot pulls the yoke 1411 back. In addition the pilot operates the propeller feathering switches 1823 and 1824 to their "on" positions, whereupon the engine control circuits function in the manner previously described in connection with the disabling of the right engine and the R. P. M. indications of both engines are reduced to zero. With the propeller feathering switches operated, the automatic propeller control lamps 2007 and 2107 at the instructor's desk are extinguished and the propeller feathering lamps 2012 and 2112 are lighted.

If the yoke 1411 is pulled back until the indicated air speed becomes 80 knots or less (assumed to be the stalling conditions) the angle of attack motor control circuit will be so controlled that the shaft 1110 thereof will be rotated until the upper L2 limit switch 1104 is operated to stop the motor M11 and to establish the circuits of the S (stall) relay 1101. Relay 1101, upon operating closes the circuit of relay 1105 which operates to open the rotor circuit of the motor M4 and at its left No. 2 contacts opens the circuit by which the lift potential of phase φ1 was applied to control conductor 1162 of the rate of climb motor control circuit, whereupon the drag potential of phase φ2 applied to the control conductor 1162 under the control of the weight potentiometer WP2 becomes effective to rotate the shafts 1160 and 551 in directions indicative of a driving condition which will be indicated on the rate of climb indicators as a descent at the rate of 1600 feet per minute. Also at its right No. 4 contacts, relay 1101 opens the circuit previously traced from the brush of rate of climb potentimeter RCP1, over conductor 617, over the No. 4 back contact of relay 1101, over conductor 1103, through the true air speed potentiometer TASP6, thence through the winding of weight potentiometer WP1 in parallel with resistance 632 and through resistance 633 to ground. Therefore, the potential now derived at the brush of potentiometer WP1 and applied through resistance 634 to control conductor 1216 of the indicated air speed motor control circuit will operate the shafts 1210 and 601 controlled thereby in directions indicative of a reduction in air speed which will be indicated by the air speed indicators on the instrument panels.

To simulate the resistance to the operation of the controls, the spring tensioning motor control circuit 1603 has been operated in response to the operation of the ON relays 3912 and 3962 of brake horse-power motor control circuits and in response to the operation of the indicated air speed potentiometer IASP3 to rotate the drum 1604 in a direction to place tension on the loading springs of the elevator, aileron and rudder trimming mechanisms 1517, 1518 and 1519. For this purpose potential of phase $\varphi 1$ is applied from the 40$\varphi$1 bus bar through the potential divider comprising resistances 3916 and 3917 to ground and, potential derived therefrom is applied over the inner right contacts of ON relay 3912 over conductors 3913 and 1107, through resistance 1610 and to the control conductor of the spring tensioning motor control circuit 1603. Similarly, potential of phase $\varphi 1$ is applied from the 40$\varphi$1 bus bar through the potential divider comprising resistance 3966 and 3967 to ground and, potential derived therefrom is applied over the inner right contacts of ON relay 3962, over conductors 3963 and 1108, through resistance 1609, to the control conductor of the spring tensioning motor control circuit. No potential of phase $\varphi 1$ is applied over conductors 3918 and 3968 at this time since it has been assumed that in response to the operation of the feathering switches 1823 and 1824, the speeds of both engines have been reduced to zero and the ON relays 3912 and 3962 have been released. Potential of phase $\varphi 1$ is also applied from the 40$\varphi$1 bus bar through resistance 1219, through the winding of the indicated air speed potentiometer IASP3 and, potential derived at its brush is applied over conductor 1220 and through resistance 1608 to the control conductor of the spring tensioning motor control circuit. When relay 1101 operates, however, ground is connected over its Nos. 1, 2 and 3 right contacts and conductors 1106, 1107 and 1108 to conductors 1220, 3918 and 3968, whereupon the potential of phase $\varphi 1$ applied to these conductors is rendered ineffective and thereupon the spring tensioning motor control circuit is controlled by potential applied to its control conductor from its balancing potentiometer to cause the rotation of drum 1604 in a direction to remove the spring tension from the elevator, aileron and rudder trimming mechanisms 1517, 1518 and 1519. With the loadings thus removed, the yoke, aileron and rudder controls respond in a manner similar to the controls of an actual aircraft when a stalling condition is reached.

The pilot now adjusts the yoke 1411 until the indicated air speed rises to approximately 100 to 120 knots and the rate of descent, as indicated by the rate of climb indicators, is decreased to approximately 800 feet per minute. In response to the readjustment of the yoke, the angle of attack motor control circuit rotates the shafts 1110 and 591 in directions indicative of a reduction in the angle of attack, whereupon the L2 limit switch 1104 is operated to open the circuit of the stall relay 1101. Relay 1101 upon releasing removes ground from conductors 1220, 3918 and 3968 whereupon the spring tensioning motor control circuit is reoperated to reapply loading to the elevator, aileron and rudder controls. Also relay 1104 reclosing its outer right and outer left contacts restores the circuit over which lift potential of phase $\varphi 1$ is applied to control conductor 1162 of the rate of climb motor control circuit and restores the circuit over which potential under the control of the rate of climb potentiometer RCP1 was applied to the control conductor 1216 of the indicated air speed motor control circuit, whereupon these motor control circuits are controlled to cause the rate of climb indicators to show a rate of descent of approximately 800 feet per minute and to cause the air speed indicators to show an indicated air speed of from 100 to 120 knots per hour.

*Restarting the engines*

Preparatory to restarting the engines the pilot restores the propeller feathering switches 1823 and 1824 to their "off" positions, thereby releasing the FTR relays such as 5637 at the engine control circuits, Figs. 45 and 56. These relays upon releasing extinguish the propeller feathering lamps 2012 and 2112 at the instructor's desk and cause the operation of the propeller pitch motor control circuits of Fig. 44 to repitch the propellers, whereupon the propellers start into rotation. The pilot also pushes in the ignition switch 3014 thereby removing ground from conductors 5601, 5602, 4501 and 4502 whereupon the IGR and IGL relays, such as 5603 and 5604, of the engine control circuits reoperate.

The flight engineer now operates both supercharger speed controls 2918 and 2919 to their upper or low speed positions thereby opening the previously traced circuits for the SHR and SHL relays 5213 and 5221 which release and in turn release the SHR1 and SHL1 relays 5212 and 5222. These relays upon releasing restore the manifold pressure and brake horse-power control circuits to the condition simulating low speed supercharger blower operation and open the circuits of the lamps 2243 and 2242 at the instructor's desk, which have been lighted to indicate that high speed supercharger blower operation has been simulated. Also the operation of the controls 2918 and 2919 to their upper or low speed positions has reestablished the previously traced circuits for lamps 2210 and 2211 at the instructor's desk to indicate that the low speed operation of the supercharger blowers is being simulated. The throttles are also moved to their extreme rear or closed positions in which the sliders of the throttle rheostats and variacs will be at the lower ends of their windings.

With the main ignition switch pushed in and the propellers rotating both engines start since they are assumed to be driven by the windmilling of their propellers as will be indicated by the sound effects and by the operation of the tachometers to read 800 R. P. M. The engine throttles are then adjusted so that the manifold pressure indicators for both engines indicate a manifold pressure of 27.5 inches of mercury. It will be assumed that by the time the engines are both reoperating, the altitude at which the simulated flight is being flown will have decreased to 1000 feet and that thereupon the flight is leveled off at this altitude.

*Low fuel conditions*

In an aircraft of the type which the trainer under consideration is designed to simulate, three fuel tanks are located in the hull, one forward, one at the center and one aft. Two additional tanks are located in the wings adjacent to the engines and designated as left wing service tank and right wing service tank respectively, and two tanks are located in the bomb bays designated left and right bomb bay tanks. Two main fuel trunks are provided, one for serving the right side of the aircraft and the other for serving the left side. Four selector valves are provided, one of which is called the hull tank selector valve, two of which are called the right and left engine selector valves and the fourth of which is called a cross-over and defuel valve. These valves are controlled from the flight engineer's fuel tank panel. The hull tank selector valve has an "off" and three selection positions and when operated connects the suction pipe from any one of three hull tanks to both of the main fuel trunks. Each of the main fuel trunks after leaving the hull selector valve passes through a check valve which prevents fuel from flowing back into the hull tanks, then passes through a fuel transfer pump to an inlet port of one of the engine selector valves.

Each of the engine selector valves has an "off" and four selection positions. In one of the selection positions the main fuel trunk inlet port is connected to one outlet port which is connected by a pipe with the top of the wing service tank on the side of the aircraft which the valve serves and the outlet pipe from the wing service tank, which is connected with a second inlet port of the valve, is connected to a second outlet port which is connected through an engine driven fuel pump with the carbureter of the engine on the same side of the aircraft, whereby fuel is transferred from the selected hull tank to the wing service tank and from the wing service tank to the engine. In a second selection position, the main fuel trunk inlet port is connected to a second outlet port, whereby fuel is fed directly from the selected hull to the engine. In a third selection position the suction pipe from the bomb bay tank which is connected with a third inlet port valve, is connected with the second outlet port whereby fuel is fed directly from the bomb bay tank to the engine on the same side of the aircraft. In the fourth position of the valve, the outlet pipe from the wing service tank which is connected to the second inlet port, in addition to being connected to the second outlet port and to the engine is also connected to the main fuel trunk whereby fuel from the wing tank may be fed directly to the associated engine and to the main fuel trunk from which fuel may also be fed to the other engine or to a defueling trunk as may be desired and as determined by the selective operation of the cross-over valve.

The cross-over valve has an "off" position, a cross-over position and a defuel position. In the cross-over position, one inlet port connected with one fuel trunk is connected with one outlet port connected with the other fuel trunk whereby fuel flowing back from the engine selection valve of either trunk is permitted to flow to the other fuel trunk. Thus, for example, fuel from either wing service tank, which might become damaged, may be transferred through the associated engine selector valve, as previously described, to the main fuel trunk thence through the cross-over valve to the other fuel trunk and to the other engine so that both engines could be operated from the same service tank to keep them both running and to exhaust the fuel from the disabled tank more quickly. In the second selection position of the cross-over valve, both inlet ports are connected to both outlet ports, the second of which outlet ports is connected with a defueling drain trunk. Thus in the second selection position the fuel from the disabled tank in addition to being fed to both engines may also be allowed to drain away to even more quickly drain the disabled tank.

Each of the wing service tanks is provided with an automatic level mechanism which is controlled in accordance with the fuel level, whereby the valves may be selectively operated to control the fuel transfer.

In the trainer the functions of the hull tank selector valve are simulated by the group of relays disclosed in the lower portion of Fig. 35 comprising AH relay 3548, AHI relay 3550 and CH relay 3517 and CHI relay 3532, FH relay 3536 and FHI relay 3547. The functions performed by the right engine selector valve are simulated by RST relay 3509, RBB relay 3564 and RHT relay 3568 and the functions performed by the left engine selector valve are simulated by the LST relay 3508, LBB relay 3569 and LHT relay 3570. The functions of the right fuel transfer pump are simulated by RTP relay 3513 and RTPI relay 3521 and of the left fuel transfer pump by LTP relay 3512 and LTPI relay 3520. The functions of the cross-over and defueling valves are simulated by CO relay 3561 of Fig. 35 and LSD relay 3457, DF relay 3458 and RSD relay 3459 of Fig. 34.

The operations simulating the selection of a hull tank, the transfer of fuel from such tank to the wing service tanks from which the engines are supplied will first be described. It has been assumed that the hull tank selector valve switch 3516 has been moved to the FH position to simulate the selection of the forward hull tank for supplying fuel to the right and left engine service tanks and that FH relay 3536 has been operated. It will now be assumed that the instructor operates the knob 2406 of the forward hull tank fuel quantity control switch to the E or empty position in which cam operated contacts 2429 are opened and cam operated contacts 2428 are closed. The opening of contacts 2429 opens the circuit of FHI relay 3547 on the flight engineer's fuel control panel, which relay operated following the operation of the FH relay 3536, over conductor 3546 of cable 3500 and contacts 2429. The closure of contacts 2428 establishes a circuit from ground over the right No. 1 right contacts of relay 2609, over conductor 2611, contacts 2428, through lamp FH to battery and ground and over conductors of cables 3300 and 3321 to battery through lamp 2859 of the low fuel indicating lamps at the flight engineer's panel and over a conductor of cable 3380 to battery through lamp 1825 at the pilot's pedestal indicating low fuel in the forward hull tank.

The movement of knob 2406 has also moved the slider of potentiometer 2445 towards the No. 1 terminal of its winding and with the selector 2829 of the fuel indicator 2831 at the flight engineer's panel set in a position to indicate the fuel quantity in the forward hull tank, such indicator is controlled over a circuit extending from the slider of potentiometer 2445, over a conductor of cable 2830 and the brush of selector 2829 to operate the indicator 2831 to indicate the quantity of decreasing fuel in the forward hull tank.

It will now be assumed that the instructor moves the knob 2405 of the right wing service tank fuel quantity control switch to the No. 1 or 100 gallon position. With less than 180 gallons left in this tank, the cam operated contacts 2422 are opened thereby opening the operating circuit of RTP relay 3513 extending from ground on bus bar DB, over the lower contacts of FT relay 3339, operated upon the previous closure of circuit breaker 3340, over conductor 3534 of cable 3500, over contacts 2422, conductor 3581 of cable 3500 to battery through the winding of RTP relay 3513. Relay 3513 thereupon releases, its locking circuit having been opened by the release of the FH1 relay 3547, in turn releasing RTP1 relay 3521 and closing the circuit of the right fuel transfer pump dry lamp 3515. The circuit of lamp 3515 extends from battery through such lamp, over the back contact of relay 3513 and over the inner upper contacts of relay 3599 to ground on bus bar on DB. A circuit is also closed in parallel with lamp 3515 over conductor 3563 of cable 3500 and to battery through fuel pump dry lamp 2248 at the instructor's desk. These lamps become lighted through the closure of the cam operated contacts 2428 as soon as the fuel quantity control switch for the forward hull tank is moved into a position indicative that the tank is less than 10 per cent full. Lamp 3515 lights as a warning to the flight engineer that the pump which has been transferring fuel from the forward hull tank to the right wing or service tank is about to run dry and that the hull tank selector valve switch should be operated to render another hull tank available for supplying fuel to the wing service tanks.

The flight engineer thereupon moves the hull tank selector valve switch 3516 to the CH or center hull tank position thereby releasing FH relay 3536 and extinguishing the forward hull tank indicating lamp 2423 at the instructor's desk and establishing an obvious circuit for the CH relay 3517 which, upon operating, establishes a circuit from ground over its upper contacts and conductor 3518 of cable 3500 to battery through the center hull indicating lamp 2413 at the instructor's desk to inform the instructor that the flight engineer has now operated the selector valve switch to make fuel from the center hull tank available. Relay 3517 upon operating establishes a circuit from battery through the winding of the CH1 relay 3532, over the lower contacts of relay 3517 and conductor 3533 of cable 3500, over contacts 2418 to ground, whereupon relay 3532 operates. He also operates the fuel quantity indicator control switch 2829 to a position in which the fuel quantity indicator 2831 is controlled to indicate the quantity of fuel in the center hull tank.

The flight engineer now operates the left and right wing tank switches 3538 and 3539 to their right or automatic positions. The operation of switch 3538 establishes a circuit from ground over its right contact and over conductor 3540 of cable 3500, to battery through L relay 2424 associated with the fuel quantity control switch for the left wing service tank at the instructor's desk. The operation of switch 3539 establishes a circuit from ground over its right contact and over conductor 3541 of cable 3500, to battery through the R relay 2425 associated with the fuel quantity control switch for the right wing service tank at the instructor's desk. Relay 2424 upon operating establishes a circuit over conductor 2426 through the left wing tank automatic lamp 2244 to battery and relay 2425 upon operating establishes a circuit over conductor 2427 through the right wing tank automatic lamp 2245 to battery.

The flight engineer now operates tank switch 3542 to the right tank position momentarily, thereby establishing the circuit of RWT relay 3543 which establishes a circuit from ground over its upper contacts and conductor 3544 of cable 3500 through lamp 2246 to battery, which lamp lights to indicate to the instructor that the right wing service tank has less than 180 gallons of fuel left in it. Relay 3543 also establishes a circuit from ground over the right contact of switch 3536, over the lower contacts of relay 3543 and through the winding of RTP relay 3513 to battery. Relay 3513 thereupon operates, locks over its lower contacts and the lower contacts of CH1 relay 3532 to ground on conductor 3534, establishes the operating circuit for RTP1 relay 3521 extending over its upper front contact, the inner upper contacts of CH relay 3517 and over the upper contacts of CH1 relay 3532 to ground and opens the circuit of right transfer pump dry lamp 3515 at the flight engineer's panel and the circuit of right transfer pump dry lamp 2248 at the instructor's desk which lamps become extinguished. At this time fuel is being pumped from the center hull tank into the left and right wing service tanks.

It will now be assumed that the instructor turns the knob 2407 of the fuel quantity control switch for the center hull tank to the empty position in which position the cam operated contacts 2419 become closed and the cam operated contacts 2418 become opened. The closure of contacts 2419 establishes a circuit from ground over the No. 2 right contacts of relay 2609, over conductor 2610, over contacts 2419, through the low fuel lamp CH to battery and in parallel with lamp CH over conductors of cables 3300, 3380 and 3321 through the low fuel lamp 2858 on the flight engineer's panel to battery and through the low fuel lamp 1824 on the pilot's pedestal to battery, to indicate a low fuel condition with respect to the center hull tank. The opening of contacts 2418 now opens the previously traced circuit of CH1 relay 3532 which releases, in turn releasing relay 3513. Relay 3513 upon releasing now recloses the previously traced circuit for the right transfer fuel pump lamps 3515 and lamp 2248 which again light as a warning that the pump which has been transferring fuel from the center hull tank to the right wing tank is about to run dry and that the hull selector valve switch 3516 should be operated to render another fuel tank available for supplying fuel to the service tanks.

The flight engineer thereupon moves the hull selector valve switch 3516 to the AH or aft hull tank position thereby releasing CH relay 3517 and extinguishing the center hull tank indicating lamp 2413 at the instructor's desk and establishing an obvious circuit for the AH relay 3548 which upon operating establishes a circuit from ground over its upper contacts and conductor 3549 of cable 3500 to battery through the aft hull tank indicating lamp 2430 at the instructor's desk to inform the instructor that the flight engineer has now operated the selector valve switch to make fuel from the aft hull tank available. Upon the release of CH relay 3517 and with CH1 relay 3532 released, there is no circuit for holding RTP relay 3513 and RTP1 relay 3521 operated and they release. Relay 3548 upon operating establishes a circuit from battery through the winding of relay AH1 relay 3550, over the lower contacts of relay 3548 and conductor 3551 of cable 3500 to ground over the cam operated contacts 2612 of the fuel quantity control switch for the aft hull tank which contacts are closed as it is assumed that this tank is full.

It will now be assumed that the instructor turns the knob 2405 of the fuel quantity control switch for the right wing service tank to the empty position in which position the cam operated contacts 2433 close and the cam operated contacts 2416 open. The closure of contacts 2433 establishes a circuit from ground over the No. 4 right contacts of relay 2609, conductor 2618, over contacts 2433, through the low fuel lamp RW to battery and in parallel therewith over conductors of cables 3300, 3380 and 3321 through the low fuel lamp 2860 at the flight engineer's station to battery and through the low fuel lamp 1226 on the pilot's pedestal to battery to indicate a low fuel condition with respect to the right wing service tank which is supplying the right engine. The opening of contacts 2416 removes ground from conductor 3522 of cable 3509 and releases RF relay 3519 which upon releasing opens the circuit extending from ground over its inner upper contacts, over conductor 3525 extending to the R. P. M. motor control circuit of Fig. 40 for the right engine and thence over the lower No. 3 contacts of the ON relay 4009, over conductor 4015 through the winding of RFS relay 3526 to battery. Relay 3526 releases and with RFS1 relay 3527 locked operated under the control of RFS2 relay 3528, relay 3526 closes the filament circuit for the timing tube 3531 which after about 10 seconds becomes conductive and operates relay 3528 over its cathode-anode circuit to release relay 3527. Relay 3527 upon releasing opens the filament circuit of tube 3531, removes ground from conductor 3529 and disconnects conductor 3530 from conductor 2501 extending to the right engine disabling key 2509R, in the start circuit for the right engine, whereupon the ST relay 5638 of the right engine control circuit of Fig. 56 releases to cause the right engine to stop but to continue to be driven at 800 R. P. M. by the windmilling of its propeller. The trainer circuits now respond to the disabled condition of the right engine in the manner previously described. The flight engineer becomes aware of the fact that the right engine has stopped by the decrease in the engine noise and by the indication given by the right engine tachometer 2815. The timing tube 3531 after an interval becomes conducting and opens the circuit of relay 3528 which releases. This condition might, for example, signify that the right fuel transfer pump has failed to operate or that the flight engineer has failed to make the aft hull tank available.

The flight engineer will now operate the crossover defuel valve switch 3560 to the left or crossover position thereby establishing an obvious circuit for CO relay 3561. Relay 3561 upon operating establishes a circuit from ground over its inner upper contacts and conductor 3562 of cable 3560 through the cross-feed lamp 2432 to battery whereupon this lamp lights to inform the instructor that the cross-feed valve switch on the fuel transfer panel has been operated. Relay 3561 also connects the winding of RTP1 relay 3521 over its upper contacts in parallel with the winding of LTP1 relay 3523 to the inner upper front contact of LTP relay 3512 and since LTP relay 3512 is assumed to be operated at this time, RTP1 relay 3521 now operates in parallel with LTP1 relay 3523 in a circuit from ground over the upper contacts of AH1 relay 3550, over the inner upper contacts of AH relay 3548, over the upper front contact of LTP relay 3512, over the upper contacts of CO relay 3561 and through the winding of RTP1 relay 3521 to battery. Relay 3521 upon operating now establishes the circuit of RF relay 3519 from battery through the winding of such relay, over the inner lower contacts of the RST relay 3509 to ground over the alternate contacts of RTP1 relay 3521. With relay 3519 reoperated, the circuit of the RFS relay 3526 is reestablished and relay 3526 operates in turn causing the operation of relay 3527 which locks under the control of relay 3528, now released, and reestablishes the circuit of ST relay 5638 of Fig. 56 whereupon the right engine is again started in the manner previously described. When this engine starts in response to the simulated receipt of fuel from the left wing service tank, it increases in speed to 1800 R. P. M. and the sound effects circuit of Fig. 58 is controlled to cause a corresponding increase in the simulated engine noise.

The flight engineer will now operate the tank switch 3542 momentarily to the right, thereby causing the momentary operation of RWT relay 3543 which again causes the lighting of lamp 2246 at the instructor's desk and closes over its lower contacts, and the right contacts of switch 3539, the circuit of RTP relay 3513 which now operates and opens the circuit of the right fuel transfer pump dry lamp 3515 at the flight engineer's panel and the circuit of the corresponding lamp 2240 at the instructor's desk.

It will now be assumed that the right wing service tank has now become full through the operation of the transfer pump and to simulate this condition the instructor turns the knob 2405 to the F or full position in which position the cam operated contacts 2416 are closed, the cam operated contacts 2422 and 2433 are opened, lamp RW at the instructor's desk, lamp 1526 at the pilot's pedestal and lamp 2860 on the flight engineer's panel are now extinguished by the opening of contacts 2433 and the previously traced circuit for RTP relay 3513 is closed over contacts 2422.

It will now be assumed that the instructor instead of simulating the conditions in which the fuel supply in the right wing tank becomes depleted and causes the disabling of the right engine, simulates the depletion of the fuel supply in the left wing service tank thereby causing the disabling of the left engine. It will be assumed that the lamps FH, 2859 and 1825 have lighted indicative of a low fuel condition in the forward hull tank. The instructor now moves the knob 2404 of the fuel quantity control switch for the left wing service tank for indicating that only 100 gallons of fuel are left in such tank, whereupon the cam operated contacts 2421 open thereby opening the circuit of LTP relay 3512. Relay 3512 thereupon releases since its locking circuit has been opened by the release of the CH1 relay 3532, in turn releasing LTP1 relay 3523 and closing the circuit of the left fuel transfer pump dry lamp 3514. The circuit of lamp 3514 extends from battery through such lamp, over the back contact of relay 3512 and over the inner upper contacts of relay 3508 to ground on bus bar GB and in parallel over conductor 3545 of cable 3500 through lamp 2247 at the instructor's desk to battery. Lamps 3514 and 2247 light to indicate that the transfer pump which has been transferring fuel from the forward hull tank to the left wing service tank is about to run dry and that the fuel trunk selector valve switch should be operated to render another fuel tank available for supplying fuel to the wing service tanks.

The flight engineer thereupon moves the fuel selector valve switch 3516 to the CH or center hull position thereby releasing the FH relay 3535 and extinguishing the forward hull lamp 2423 at the instructor's desk and establishing the circuit of CH relay 3517 which in turn causes the lighting of lamp 2413 at the instructor's desk as previously described. With relay 3517 operated the previously traced circuit for CH1 relay 3532 is established. The flight engineer now operates the left and right wing tank switches 3538 and 3539 to their right or automatic positions thereby causing the operation of relays 2424 and 2425 and the lighting of lamps 2244 and 2245 at the instructor's desk as previously described. Thereafter the flight engineer operates the tank switch 3542 to the left tank position momentarily, thereby establishing the circuit of LWT relay 3566 which in turn establishes a circuit from ground over its upper contacts and conductor 3567 of cable 3500 through lamp 2249 to battery, which lamp lights to indicate to the instructor that the left wing service tank has less than 180 gallons of fuel in it. Relay 3566 also establishes a circuit from ground over the right contacts of switch 3538, over the lower contacts of relay 3566 and through the winding of LTP relay 3512 to battery. Relay 3512 thereupon operates, locks over its lower contacts and the lower contacts of CH1 relay 3532 to ground on conductor 3534, establishes the operating circuit for the LTP1 relay 3523 over its upper front contact and the inner upper contacts of CH relay 3517 and over the upper contacts of CH1 relay 3532 to ground, and opens the circuit of left pump dry lamps 3514 and 2247. At this time fuel is being pumped from the center hull tank into the wing service tanks.

It will now be assumed that the instructor turns the knob 2407 of the fuel quantity control switch for the center hull tank to the empty position in which position contacts 2419 are closed to establish the circuits of lamps CH, 1824 and 2858 as previously described to indicate the low fuel condition of the center hull tank, and in which position the contacts 2418 are opened to cause the release of CH1 relay 3532 which in turn causes the release of LTP relay 3512. Relay LTP upon releasing restores the previously traced circuits for the left fuel pump lamps 3514 and 2247 which again light as a warning that the pump which has been transferring fuel from the center hull tank to the left wing service tank is about to run dry and that the hull tank selector valve switch should be operated to render another fuel tank available for supplying fuel to the service tanks.

The flight engineer thereupon moves the fuel selector valve switch 3516 to the AH or aft hull position thereby releasing CH relay 3517 and extinguishing lamp 2413 and operating AH relay 3548 and lighting lamp 2430 as previously described. Relay 3548 upon operating establishes the previously traced circuit for AH1 relay 3550. It will now be assumed that the instructor turns the knob 2404 of the fuel quantity switch for the left wing service tank to the empty position in which position the cam operated contacts 2431 close and the cam operated contacts 2417 open. The closure of contacts 2431 establishes a circuit from ground over the No. 3 right contacts of relay 2609, conductor 2614, over contacts 2431 through the low fuel lamp LW to battery and in parallel therewith over conductors of cables 3300, 3380 and 3321 through the low fuel lamp 2862 at the flight engineer's station to battery and through the low fuel lamp 1828 on the pilot's pedestal to battery to indicate a low fuel condition with respect to the left wing service tank which is supplying the left engine. The opening of contacts 2417 removes ground from conductor 3524 of cable 3500 and thereby releases LF relay 3520 which removes ground from conductor 3552 extending to the R. P. M. motor control circuit of Fig. 40 for the left engine, thence over the lower No. 3 contact of the ON relay of such control circuit, corresponding to relay 4009, over conductor 3553, through the winding of LFS relay 3554 to battery. Relay 3554 releases and, with LFS1 relay 3555 locked operated under the control of LFS2 relay 3556, closes the filament circuit of timing tube 3557 whereby after an interval of about ten seconds, the tube becomes conducting and operates relay 3556 over its cathode-anode circuit. Relay 3556 upon operating, releases relay 3555 which opens the filament heating circuit of tube 3557 whereupon relay 3556 releases. Relay 3555 upon releasing removes ground from conductor 3558 and disconnects conductor 3559 from conductor 2528 extending to the left engine disabling key 2500L in the start circuit for the left engine, whereupon the ST relay of Fig. 45, corresponding to relay 5638 of Fig. 56, releases to cause the left engine to stop but the engine continues to be driven at 800 revolutions per minute by the windmilling of its propeller. The trainer circuits now respond in the manner previously described. The flight engineer becomes aware of the fact that the left engine has stopped by the decrease in the engine noise and by the indication given by the left engine tachometer 2814.

The flight engineer will now operate the crossover switch 3560 to the left or cross-over position thereby establishing an obvious circuit for CO relay 3561 which in turn establishes the circuit of lamp 2432 as previously described and connects the winding of LTP1 relay 3523 over its upper contacts in parallel with the winding of RTP1 relay 3521. Since RTP relay 3513 is assumed to be operated at this time, relay 3523 now operates in parallel with relay 3521 in the circuit previously traced and relay 3523 upon operating reestablishes the circuit of LF relay 3520 which may be traced from battery through the winding of such relay, over the inner lower contacts of LST relay 3508 to ground over the alternate contacts of LTP1 relay 3523. With relay 3520 reoperated, the circuit of the LFS relay 3554 is reestablished and relay 3554 operates in turn causing the operation of relay 3555 which locks under the control of relay 3556, now released, and reestablishes the circuit of the ST relay of Fig. 45 whereupon the left engine is again started in the manner previously described. When this engine starts in response to the simulated receipt of fuel from the right wing service tank it increases its speed to 1800 revolutions per minute and the sound effects circuit is controlled to cause a corresponding increase in the engine noise.

The flight engineer will now operate the tank switch 3542 momentarily towards the left thereby causing the momentary operation of LWT relay 3566 which again causes the lighting of lamp 2249 at the instructor's desk and closes over its lower contacts and the right contacts of switch 3538, the circuit of LTP relay 3512 which now operates and opens the circuit of the left fuel transfer pump dry lamp 3514 at the engineer's panel and of the corresponding lamp 2247 at the instructor's desk.

It will now be assumed that to simulate the empty condition of the aft hull tank, the instructor now turns the knob 2602 of the fuel quantity control switch for the aft hull tank to the empty position thereby opening the cam operated contacts 2612 and closing the cam operated contacts 2613. With contacts 2613 closed, a circuit is established from ground over the left No. 2 contacts of relay 2609, over contacts 2613 and through lamp RH to battery and in parallel with such lamp over conductors of cable 3300, 3380 and 3321 through lamp 2861 on the flight engineer's panel to battery and through lamp 1827 on the pilot's pedestal to battery to indicate a low fuel condition of the aft hull tank. The opening of contacts 2612 causes AH1 relay 3550 to release thereby opening the locking circuit of RTP relay 3513 which now releases in turn releasing RTP1 relay 3521 and closing the circuit of the right fuel transfer pump dry lamp 3515. The circuit of lamp 3515 may be traced from battery through such lamp, over the upper back contact of RTP relay 3513 and over the inner upper contacts of RST relay 3509 to the ground bus bar GB. In parallel with lamp 3515, a circuit is also established over conductor 3563 of cable 3500 through lamp 2248 at the instructor's desk to battery. Lamps 3515 and 2248 light to indicate that the right fuel pump is about to run dry. RTP relay 3513 upon releasing causes the release of RTP1 relay 3521 but RF relay 3519 does not release being held operated from ground supplied over the contacts 2416, conductor 3522 of cable 3500 over the lower contacts of RST relay 3509, the normal contacts of RTP1 relay 3521, over the inner lower contacts of relay 3509 and through the winding of relay 3519 to battery. Consequently the right engine continues to operate. The flight engineer now turns the cross-over switch 3560 to the off position thereby releasing CO relay 3561 and extinguishing lamp 2432 but without further effect.

The flight engineer now turns the selector valve switch 3507 for the right engine to the BB or bomb bay tank position whereupon RST relay 3509 releases and RBB relay 3564 operates. Relay 3509 upon releasing opens the circuit of lamp 2412 at the instructor's desk and lamp 2434 lights over a circuit which may be traced from battery through such lamp over conductor 3565 of cable 3500 to ground over the upper contacts of RBB relay 3564. The release of RST relay 3509 opens the previously traced circuit of RF relay 3519 which functions to release RFS relay 3526 and render the timing tube 3531 conducting. The tube 3531 requires about ten seconds to become conductive and to operate RFS2 relay 3528 to release RFS1 relay 3527 and thereby cause the stopping of the right engine as previously described. This ten-second time delay simulates the time required to drain the right engine carbureter should the flight engineer be slow in operating the right engine selector valve switch or not properly operate it. If he operates it soon enough and properly, then the operation of RBB relay 3564 will reestablish the circuit of RF relay 3519 and the circuit of RFS relay 3526 to prevent relay RFS1 relay 3527 from releasing to stop the right engine. Relay 3564 establishes the new circuit for RF relay 3519 extending through the winding thereof, over the inner lower contacts of relay 3564, conductor 3571 of cable 3500 to ground over the cam operated contacts 2615 of the fuel quantity control switch for the right bomb bay tank which contacts are closed since this tank is assumed to be full.

It will now be assumed that to simulate the empty condition of the right bomb bay tank, the instructor operates the knob 2603 of the fuel quantity control switch for the right bomb bay tank to the empty position thereby closing the cam operated contacts 2617 and opening the cam operated contacts 2615. The closure of contacts 2617 establishes a circuit from ground over the left No. 1 contacts of relay 2609, over contacts 2617 and to battery through lamp RBB and in parallel therewith over conductors of cables 3300, 3380 and 3321 to battery through lamp 1829 at the pilot's pedestal and lamp 2863 at the flight engineer's panel to indicate a low fuel condition of the right bomb bay tank. The opening of contacts 2615 opens the circuit of RF relay 3519 whereupon relay 3519 releases and in the manner previously described causes the right engine control circuit to function to simulate the stopping of the right engine which stopping becomes evident to the flight engineer through the reduced engine noise and the indication of the right engine tachometer 2815.

After the depletion of the fuel supply in the hull tanks, the flight engineer also operated the left engine selector valve switch 3506 to the BB position thereby releasing LST relay 3508 and extinguishing lamp 2411 and causing the operation of LBB relay 3569 which establishes a circuit from ground over its upper contacts and conductor 3572 of cable 3500 to battery through lamp 2435 at the instructor's desk to inform the instructor that the left bomb bay tank has been selected by the flight engineer. Relay 3569 now establishes a new circuit for LF relay 3520 which may be traced through the winding thereof, over the inner lower contacts of relay 3569, conductor 3573 of cable 3500 to ground over the cam operated contacts 2618 of the fuel quantity control switch for the left bomb bay tank which contacts are closed since this tank is assumed to be full.

It will now be assumed that to simulate the empty condition of the left bomb bay tank, the instructor operates the knob 2604 of the fuel quantity control switch for the left bomb bay tank to the empty position, thereby closing the cam operated contacts 2619 and opening cam operated contacts 2618. The closure of contacts 2619 establishes a circuit from ground over the left No. 3 contacts of relay 2609, over contacts 2619 and thence to battery through lamp LBB and in parallel therewith over conductors of cables 3300, 3380 and 3321 to battery through lamp 1830 of the pilot's pedestal and lamp 2864 at the flight engineer's panel to indicate a low fuel condition of the left bomb bay tank. The opening of contacts 2618 opens the circuit of LF relay 3520 whereupon this relay releases and in the manner previously described causes the left engine control circuit to function to simulate the stopping of the left engine, which stopping becomes evident to the flight engineer through the reduction of the engine noise and the reduction of the reading of the left engine tachometer 2814 to 800 revolutions per minute.

Should it be assumed that one of the wing service tanks becomes damaged so that no fuel may be fed from it to the engine on the same side of the aircraft, that engine could be fed from one of the hull tanks should there be fuel left in the hull tank. To simulate this condition and assuming that there is fuel for example in the center hull tank and that therefore CH relay 3517 and CH1 relay 3532 are both operated as previously described, and assuming that the right service tank has become damaged, the flight engineer operates the right engine selector valve switch 3507 to the HT position thereby releasing RST relay 3509, assumed to be operated, and operating RHT relay 3568. Relay 3509 upon releasing opens the circuit of lamp 2412 at the instructor's desk and relay 3568 closes the circuit of the right hull tank lamp 2436 over a circuit extending over conductor 3574 of cable 3500 and over the inner upper contacts of relay 3568 to ground. Relay 3568 also establishes a circuit from battery through the winding of RTP relay 3513, over the upper contacts of relay 3568, over the lower contacts of relay 3532 and to ground on conductor 3534 and relay 3513 operates establishing the previously traced circuit for RTP1 relay 3521. With relay 3521 operated the circuit of RF relay 3519 is established over the inner lower contacts of relay 3568 and to ground over the alternate contacts of relay 3521.

It will now be assumed that to simulate the exhaustion of the fuel in the center hull tank, the instructor turns the knob 2407 of the fuel quantity control switch for the center hull tank to the empty position thereby closing contacts 2419 to light lamps CH, 1524 and 2858 and opening contacts 2418 to release the CH1 relay 3532. Relay 3532 upon releasing opens the operating circuit of RTP relay 3513. If it also be assumed that the instructor has operated knob 2405 of the fuel quantity control switch for the right wing service tank to the empty position thereby opening cam operated contacts 2422 to remove ground from conductor 3536, there is no circuit for relay 3513 and it releases to close the circuit of the right fuel transfer pump dry lamp 3515 which lights. Relay 3513 upon releasing also releases RTP1 relay 3521 which opens the circuit of relay 3519 to cause the right engine to stop. The flight engineer will then operate the hull tank selector switch 3516 to select the aft hull tank if it has fuel, whereupon the CH relay 3517 will release and AH relay 3548 will operate, in turn operating AH1 relay 3550 as previously described. With RHT relay 3568 still operated, relay RF will again operate to start the right engine. With RHT relay 3568 operated, ground is applied directly to conductor 3529 from the upper contacts of relay 3519, over the lower contacts of relay 3568 to cause an immediate operation of ST relay 5750 of the fuel pressure motor control circuit whereby such circuit responds at once to cause an indication of fuel pressure rather than to wait for the reoperation of RFS1 relay 3527 signifying the right engine has been restarted. This is to simulate the condition in an actual aircraft whereby when the engine is being supplied directly from the fuel transfer pump, the fuel pressure will rise more quickly than when supplied from a wing service tank under pressure supplied by the engine driven fuel pump.

The same procedure may be followed to simulate the supplying of fuel from the hull tank directly to the left engine by the operation of the left engine selector valve switch 3509 to the HT position thereby releasing the previously operated LST relay 3509 and operating the LHT relay 3570. Relay 3570 upon operating connects ground to conductor 3575 of cable 3500 over its inner upper contacts whereby lamp 2437 at the instructor's desk is lighted and causing the operation of LTP relay 3512, LTP1 relay 3523 and LF relay 3520, the latter relay maintaining the left engine in operation if the flight engineer made the fuel transfer without delay.

The simulation of the operation of the cross-over valve to the cross-over position whereby both engines may be operated from one or the other of the wing service tanks has been previously described. The cross-over may also be effected whereby both engines may be supplied with fuel from a hull tank by the same fuel transfer pump. It will now be assumed that this latter condition is to be simulated and that at this time the right and left engine selector valve switches 3506 and 3507 are both operated to the HT position in which position RHT relay 3568 and LHT relay 3570 are operated. The flight engineer now operates the cross-over valve switch 3560 to the CO position thereby causing the operation of CO relay 3561. With fuel in the hull tank which has been selected for use, RTP relay 3513 and LTP relay 3512 will both be locked operated in turn holding RTP1 relay 3521 and LTP1 relay 3523 operated. With relay 3521 operated, the RF relay 3519 is operated over the inner lower contacts of relay 3568 and the alternate contacts of relay 3521 and, with relay 3523 operated, the LF relay 3520 is operated over the inner lower contacts of relay 3570 and the alternate contacts of relay 3523. With CO relay 3561 operated, the front contacts of both relays 3521 and 3523 are tied together over the upper contacts of relay 3561 so that the ground supplied to the front contact of either relay 3521 or 3522 will hold the RF and LF relays 3519 and 3520 operated to maintain both engines in operation.

To simulate the operation of the valves to quickly defuel a hull tank by supplying both engines from the same tank and permitting fuel to be drained away at the same time, the cross-over valve switch 3560 is operated to the defuel (DF) position thereby establishing the circuit of the DF relay 3458 which operates to establish a circuit from ground over its upper contacts and conductor 3578 of cable 3500 to battery through the hull tank defuel lamp 2449 at the instructor's desk to inform the instructor that a hull tank is being defueled. It will be assumed that the hull tank selector switch 3516 is operated into the AH position to defuel the aft hull tank, thereby operating AH relay 3548 and lighting aft hull tank lamp 2438 and causing AH1 relay 3550 to become operated. The right engine selector valve switch 3507 will be set to the HT position thereby operating RHT relay 3568 and the left engine selector valve switch 3506 will be set to the HT position thereby operating LHT relay 3570. With relay 3568 operated the RTP relay 3513 will be operated under the control of AH1 relay 3550 in turn causing the operation of RTP1 relay 3521 in the manner previously described. With relay 3570 operated the LTP relay 3512 will be operated under the control of AH1 relay 3550 in turn causing the operation of LTP1 relay 3523 in the manner previously described. Now with DF relay 3458 operated, the front contacts of RTP1 relay 3521 and LTP1 relay 3523 are interconnected and therefore so long as either the RTP1 relay 3521 or the LTP1 relay 3523 remain operated or until AH1 relay 3550 releases, when the instructor moves the knob 2602 of the fuel quantity control switch for the aft hull tank to the position indicating the complete defueling of the aft hull tank, both RF relay 3519 and LF relay 3520 will be held operated and both engines will continue to run. The circuit for relay 3519 is established over the inner lower contacts of relay 3568 to ground over the alternate contacts of relay 3521 and also over the lower contacts of DF relay 3458 and over the alternate contacts of relay 3523 to ground, and similarly the circuit of relay 3520 is established over the inner lower contacts of relay 3570 to ground over the alternate contacts of relay 3523 and also over the lower contacts of DF relay 3458 and over the alternate contacts of relay 3521 to ground. The flight engineer may determine when the hull tank is about to become defueled from the fuel quantity indicator 2831. Each of the other hull tanks may be defueled in the same manner.

To simulate the operation of the valve switches to quickly defuel a wing service tank by supplying both engines from that tank and also permitting fuel from the tank to be drained away, a condition which might occur if the service tank became damaged, the cross-over valve switch 3560 is set to its DF position thereby operating DF relay 3458 and lighting the defuel lamp 2449. If it be assumed that it becomes desirable to defuel the right wing service tank, the right engine selector valve switch 3507 is operated to the STD position and the left engine selector valve switch 3506 is set to the ST position. With switch 3507 set to the STD position, the circuit of RSD relay 3459 is established from ground over the contacts of switch 3507 and over conductor 2576 through the winding of relay 3459 to battery. With relay 3459 operated, the right wing service tank drain lamp 2438 at the instructor's desk is lighted over a circuit extending from ground over the upper contacts of relay 3459 and conductor 3577 of cable 3500 to battery through lamp 2438 to indicate to the instructor that the right wing service tank is being drained. With relay 3459 operated, a circuit is established from ground over the cam operated contacts 2416 of the fuel quantity control switch for the right wing service tank, over conductor 3522, over the lower contacts of relay 3459, over the normal contacts of RTP1 relay 3521, over the lower contacts of DF relay 3458, over the inner lower contacts of LST relay 3506 through the winding of LF relay 3520 to battery and in parallel over the inner lower contacts of RSD relay 3459 through the winding of RF relay 3519 to battery. With the LF relay 3520 and the RF relay 3519 both operated, both engines continue to run, supplied from the left wing service tank, until the instructor operates the knob 2405 of the fuel quantity control switch for the right wing service tank to the empty position indicating that the right wing service tank has become completely defueled. The flight engineer may follow the depletion of the fuel by observing the operation of the fuel quantity indicator 2831 in response to the movement of the right wing service tank fuel quantity control switch toward the empty position and take steps to operate the selector switches to maintain the engines running from fuel supplied from another tank.

A similar procedure may be followed to defuel the left wing service tank. In this case the left engine selector valve switch 3506 is operated to the STD position thereby causing the operation of the LSD relay 3457 which in turn establishes a circuit from ground over its upper contacts and conductor 3579 of cable 3500 to battery through lamp 2439 which lights to inform the instructor that the left service tank is to be defueled. The right engine selector valve switch 3507 is set to its ST position in which RST relay 3599 is operated. The cross-over switch 3560 is also operated to its DF position thereby causing the operation of DF relay 3458. Until the instructor operates the fuel quantity control switch for the left wing service tank to indicate the empty condition thereof, both RF relay 3519 and LF relay 3520 are maintained operated to keep both engines running on fuel supplied from the left wing service tank. The flight engineer may follow the depletion of the fuel by observing the operation the fuel quantity indicator 2831 in response to the operation by the instructor of the fuel quantity control switch towards its empty position and may take steps to operate the selectors to maintain the engines running on fuel supplied from another tank.

To stimulate the draining of the wing service tanks, the auxiliary power plant and the main engines by a drain valve on the flight engineer's panel, the drain switch 3599 is provided. If, for example, this switch is operated to the RE position indicative of the establishment of a condition to drain the right engine, a circuit is established from ground thereover, over conductor 3580 of cable 3500 to battery through RE drain lamp 2440 at the instructor's desk to inform the instructor that the right engine line is being drained. Similar circuits are established in the LE, APP, RST and LST positions of switch 3599 for the corresponding lamps 2441, 2442, 2443 and 2444 at the instructor's desk.

*Engine performance controls*

The instructor may simulate a change in the manifold pressure of both engines by turning the manifold pressure rheostats 2330 and 2340 in counter-clockwise directions, thereby reducing the potentials applied to the control conductors of the manifold pressure motor control circuits of Fig. 41 until the manifold pressure indicators controlled thereby indicate reductions of manifold pressures to, for example, 19 inches of mercury. The reductions in manifold pressures, will, as previously described, also result in a reduction of the engine speeds indicated by the tachometers mounted on the instrument panels.

To counteract this condition, the flight engineer should move the carbureter air control switches 2914 and 2915 to their upper or alternate air positions. In these positions the direct air lamps 2206 and 2207 at the instructor's desk become extinguished and circuits are established over the upper contacts of the switches and conductors 2857 and 2858 of cable 2850 to battery through the alternate air lamps 2250 and 2251 at the instructor's desk to indicate that the carbureters have been set for the alternate air supplies. The manifold pressure rheostats 2330 and 2340 may now be restored to their normal positions whereupon the indicated manifold pressures will return to their former values and the engine speeds will return to the assumed 1800 revolutions per minute.

The instructor may simulate increases in the cylinder temperatures of both engines by turning the cylinder temperature rheostats 2318 and 2322 in counter-clockwise directions, thereby increasing the currents flowing through the cylinder temperature indicators 2321 and 2839 to cause them to show increased cylinder temperatures, for example, of 150° C. The instructor may simulate increases in the right and left engine oil temperatures by turning the oil temperature rheostats 2306 and 2310 in clockwise directions thereby increasing the currents flowing through the engine oil temperature indicators 2308, 2312, 2817 and 2818 to cause them to show increased oil temperatures, for example, of 60° C. The increases in cylinder and oil temperatures might, for example, be due to the fact that the flight engineer had failed to open the cowl flaps of the engines.

The flight engineer upon observing the increased temperature readings of the cylinder temperature indicator 2839 and oil temperature indicators 2817 and 2818, will take steps to open the engine cowl flaps by the operation of the cowl flap keys 3449 and 3458 to their right or open positions, thereby operating the OP relays such as 5733 of the cowl flaps, motor control circuits of Figs. 57 and 46 and controlling these motor circuits to operate in the manner previously described in simulation of the opening of the cowl flaps. As these circuits operate, the brushes of their potentiometers, such as 5775 are moved toward the No. 1 terminals of their windings thereby controlling the engine cylinder and oil temperature motor control circuits of Figs. 57 and 46 in such a manner that the potentiometers controlled thereby, for example, the potentiometers 4625 and 4626, are adjusted to reduce the currents flowing through the cylinder temperature and oil temperature indicators. The flight engineer will hold the keys 3449 and 3458 operated until the temperature readings of the cylinder temperature indicator 2839 are reduced to 100° C. and the temperature readings of oil temperature indicators 2817 and 2818 are reduced to 25° C. The instructor is informed concerning the opening of the engine cowl flaps by the lighting of the cowl flaps open lamps 2224 and 2235 in the manner previously described and by the reduction of the indications on the cylinder temperature indicator 2321 and the oil temperature indicators 2308 and 2312 at his desk.

The instructor now returns the cylinder temperature rheostats 2318 and 2322 to normal in which positions, with the new settings of the cylinder temperature potentiometers, such as 4626, the cylinder temperature indicators 2321 and 2839 are controlled to reduce their temperature indications to approximately 50° C. At the same time the instructor also operates the oil temperature rheostats 2306 and 2310 to normal whereupon, with the new setting of the cylinder temperature potentiometers, such as 4625, the oil temperature indicators 2308 and 2312 at the instructor's desk and 2817 and 2818 at the flight engineer's instrument panel will be operated to change their readings, for example, to approximately 20° C.

To simulate a decrease in the cylinder temperatures of both engines, the instructor may turn the cylinder temperature rheostats 2318 and 2322 in a clockwise direction, thereby decreasing the currents flowing through the cylinder temperature indicators 2321 and 2839 to cause them to show decreased cylinder temperatures, for example, of 50° C. The instructor may simulate a decrease in the right and left engine oil temperatures by turning the oil temperature rheostats 2306 and 2310 in a counter-clockwise direction thereby decreasing the currents flowing through the engine oil temperature indicators 2308, 2312, 2817 and 2818 to show decreased oil temperatures, for example, of 20° C. These decreases in temperature might, for example, be due to high altitude flying with the engine cowl flaps open.

The flight engineer observing the decreased temperature readings would then cause the closure of the engine cowl flaps through the operation or the cowl flap keys 3449 and 3458 to their left or closed positions thereby operating the CL relays such as 5741 of the cowl flaps motor control circuits of Figs. 57 and 46. In the manner previously described, these motor control circuits operate their potentiometers, such as 5775, to cause the cylinder and oil temperature control circuits to reset the brushes of potentiometers 4625 and 4626 in directions indicative of an increase in the cylinder and oil temperatures until, for example, the cylinder temperature indicators 2321 and 2839 show temperatures of 100° C. and the oil temperature indicators 2308, 2312, 2817 and 2818 show temperatures of 25° C. Keys 3449 and 3458 are then moved to their open positions. The instructor is informed of the action taken by the flight engineer by the lighting of the cowl flaps closed lamps 2225 and 2236 and by the increased temperature readings of the indicators 2321, 2308 and 2312.

The instructor may simulate an increase in the engine oil pressures by the operation of increase pressure keys 2341 and 2342 and a decrease in the oil pressures by the operation of decrease pressure keys 2343 and 2344. When key 2344 is operated, a circuit is established from ground over its contacts, over conductor 5770 of cable 5700 to battery through the winding of DOP relay 5719 of the right engine oil pressure motor circuit of Fig. 57. Relay 5719 upon operating closes at its lower contacts, a circuit extending through the upper secondary winding of power transformer 5701, through resistance 5764, over the lower contacts of relay 5719, over the cam operated contacts 5730 and through the resistance 5716 and the rotor winding of motor 5715 whereby potential of phase $\varphi 1$ is applied across the rotor winding and the motor turns the shaft 5722 in such a direction that the transmitting autosyn 5723 operates the right engine oil pressure indicator 2335 at the instructor's desk and 2809 at the flight engineer's instrument panel to show a decreasing oil pressure. When the indicated oil pressure reaches 40 pounds, for example, the instructor opens the key 2344 thereby releasing relay 5719 to stop the motor 5715. In a similar manner the closure of the contacts of key 2343 establishes a circuit over conductor 4670 of cable 4600 to control the engine oil pressure motor circuit for the left engine, Fig. 46, to cause the oil pressure indicators 2335 and 2809 at the instructor's desk and on the flight engineer's panel to show a decreasing left engine oil pressure. When the indicated oil pressure reaches 40 pounds, for example, the instructor releases the key 2343 whereupon the motor of the left engine oil pressure circuit stops.

When the pressure increase key 2342 is operated, a circuit is established from ground over the contacts of such key, over conductor 5768 of cable 5700 to battery through the winding of IOP relay 5763 of the right engine oil pressure motor circuit of Fig. 57. Relay 5763 upon operating closes at its lower contacts a circuit extending through the lower secondary winding of the power transformer 5701, through resistance 5769, over the lower contacts of relay 5763, over the upper No. 2 contacts of ST relay 5713, through resistance 5716, and through the rotor winding of motor 5715 whereby potential of phase $\varphi 2$ is applied across the rotor winding and the motor drives shaft 5722 in such a direction that the transmitting autosyn 5723 operates the right engine oil pressure indicators 2334 and 2809 to show an increasing oil pressure. When the indicated oil pressure rises to 90 pounds, the instructor releases key 2342 thereby releasing relay 5763 to stop the motor 5715. In a similar manner the closure of the contacts of key 2341 establishes a circuit over conductor 4669 of cable 4600 to control the engine oil pressure motor circuit for the left engine, Fig. 46, to show an increasing oil pressure. When the indicated oil pressure reaches 90 pounds, for example, the instructor releases key 2341 whereupon the motor of the left engine oil pressure circuit stops.

The instructor may simulate an increase in the fuel pressures to the engines by the operation of the increase pressure keys 2345 and 2346 and a decrease in the fuel pressure by the operation of the decrease pressure keys 2347 and 2348. When the decrease pressure key 2348 is operated, a circuit is established from ground over its contacts, over conductor 5773 of cable 5700 to battery through the winding of DFP relay 5702 of the right engine fuel pressure motor circuit of Fig. 57. Relay 5702 upon operating closes at its lower contacts a circuit extending through the lower secondary winding of power transformer 5701, through resistance 5774, over the lower contacts of relay 5702, over the inner upper contacts of relay 5710, through resistance 5704 and through the rotor winding of motor 5705, whereby potential of phase $\varphi 2$ is applied across the rotor winding of the motor. The motor turns the shaft 5708 in such a direction that the transmitting autosyn 5724 operates the right engine fuel pressure indicator 2333 at the instructor's desk and indicator 2811 at the flight engineeer's instrument panel to show a decreasing fuel pressure. When the indicated fuel pressure falls to 2 pounds, for example, the key 2348 is released thereby releasing relay 5702 to stop the motor 5705. In a similar manner the closure of the contacts of key 2347 establishes a circuit over conductor 4673 of cable 4600 to control the fuel pressure circuit for the left engine, Fig. 46, to cause the left engine fuel pressure indicators 2333 and 2811 to show a falling fuel pressure. When the indicated fuel pressure has fallen to 2 pounds, key 2347 is released whereupon the motor of the left engine fuel pressure circuit stops.

When fuel pressure increase key 2346 is operated, a circuit is established from ground over its contacts and over conductor 5771 of cable 5700 to battery through the winding of IFP relay 5767. Relay 5767 upon operating closes a circuit extending through the upper secondary winding of power transformer 5701, through resistance 5772, over the upper contacts of relay 5767, through resistance 5704 and the rotor winding of motor 5705 whereby potential of phase $\varphi 1$ is applied across the rotor winding and the motor turns the shaft 5708 in such a direction that the autosyn 5724 operates the right engine fuel pressure indicators 2333 and 2811 to show an increasing fuel pressure. When the indicated fuel pressure rises to about 7 pounds, the key 2346 is released to release relay 5767 to stop motor 5705. In a similar manner, the closure of the contacts of key 2345 establishes a circuit over conductor 4671 of cable 4600 to control the fuel pressure circuit for the left engine, Fig. 47, to cause the left engine fuel pressure indicators 2333 and 2811 to show an increasing fuel pressure. When the indicated fuel pressure rises to about 7 pounds, key 2345 is released whereupon the motor of the left engine fuel pressure circuit stops.

The instructor may simulate a decrease in the cylinder temperature of the auxiliary power plant by turning the rheostat 2314 in a counter-clockwise direction until the indicator 2317 at the instructor's desk and the indicator 2838 on the flight engineer's instrument panel indicate, for example, a cylinder temperature of 80° C. and may simulate a decrease in the oil temperature of the auxiliary power plant by turning the rheostat 2301 in a counter-clockwise direction until the indicator APPO at the instructor's desk and the indicator 2812 on the flight engineer's instrument panel indicate, for example, an oil temperature of 20° C. These temperatures might result from the simulation of a flight at a high altitude.

The flight engineer observing the lower temperature readings of the indicators should now operate auxiliary power plant oil switch 3221 of Fig. 32 to its "on" position, thereby simulating the turning on of the auxiliary power plant oil heater of an actual aircraft. When this switch is operated, a circuit is established from ground over its contacts and conductor 3222 of cable 3200 and to battery through lamp 2252 at the instructor's desk to inform the instructor that the heater has been turned on. With the heater on the oil and cylinder temperatures of the auxiliary power plant should go up and this the instructor simulates by the movement of the cylinder temperature rheostat 2314 in a clockwise direction until the indicators 2317 and 2838 indicate a cylinder temperature of about 100° C. and by the auxiliary power plant oil temperature rheostat 2301 in a clockwise direction until the indicators APPO and 2812 indicate an oil temperature of about 25° C.

To simulate a change in oil pressure in the auxiliary power plant, the instructor may operate the increase and decrease pressure keys 2349 and 2350. If the decrease pressure key 2350 is operated, a circuit is established from ground over its contacts, over conductor 2351 to battery through DOP relay 3610 of Fig. 36. Relay 3610 upon operating connects potential of phase $\varphi 1$, through resistance 3624, over the lower contacts of relay 3610, over contacts 3615, through resistance 3606 and the rotor circuit of motor 3605 whereupon the motor drives the shaft 3612 in such a direction that the transmitting autosyn 3613 operates the auxiliary power plant oil pressure indicator 2357 at the instructor's desk and the oil pressure indicator 2807 at the flight engineer's instrument panel to indicate a decreasing oil pressure. When, for example, the pressure has fallen to say 20 pounds, the instructor opens key 2350, thereby releasing the DOP relay 3610 and stopping the motor 3605.

To simulate an increase in pressure, key 2349 is operated, thereby establishing a circuit from ground over its contacts and conductor 2352 to battery through the winding of IOP relay 3623, Fig. 36. Relay 3623 upon operating connects potential of phase $\varphi 2$ through resistance 3648, over the lower contacts of relay 3623, the lower No. 3 contacts of ST relay 3604, through resistance 3606 and the rotor winding of motor 3605 whereupon the motor drives the shaft 3612 in such a direction that the transmitting autosyn 3613 operates the auxiliary power plant oil pressure indicators 2357 and 2807 to show an increasing oil pressure. When, for example, the pressure rises to say 60 pounds, the instructor opens the key 2349 thereby releasing IOP relay 3623 to stop the motor 3605.

To simulate a change in the suction pressure the instructor may operate the increase and decrease pressure keys 2530 and 2531. If the increase pressure key 2530 is operated a circuit is established from ground over its contacts, over conductor 2532 to ground through the shaded pole winding 3628 of the motor 3626 of the suction motor control circuit of Fig. 36. The motor 3626 thereupon turns the shaft 3633 in such a direction that transmitting autosyn 3625 drives the indicator 2525 at the instructor's desk and indicator 1727 at the pilot's pedestal to indicate an increasing pressure. If the decrease pressure key 2531 is operated a circuit is established from ground over its contacts, over conductor 2533, over limit switch contacts 3649 and to ground through the right shaded pole winding 3650 of motor 3626 whereupon the motor turns the autosyn 3625 in such a direction as to cause the indicators 2525 and 1727 to indicate a decreasing suction.

The instructor may at any time cause any circuit breaker on the flight engineer's panel or on the pilot's pedestal to be thrown out to simulate a circuit trouble. Should the instructor operate any one of the keys disclosed in Figs. 20 and 21 and hold such key in its operated position for approximately six seconds, the corresponding circuit breaker will be thrown out. For example, the operation of bow turret key 2020, establishes a circuit from battery over the contacts of such key, over conductor 3408 of cable 3400 and through the bow turret circuit breaker 3401 to ground. This circuit breaker is of the thermal type and in response to the direct battery connected to conductor 3408 by the key 2020, the thermal element becomes heated sufficiently after about six seconds to trip the circuit breaker whereupon the lamp 2000 becomes extinguished, indicating that the circuit breaker has opened. If the instructor operates key 2013, a circuit is established from battery over the contacts of such key and conductor 3460 of cable 3400 to a point between the winding of PLW relay 3422 and the circuit breaker 3416, whereupon after about six seconds the circuit breaker is tripped thereby opening the circuit of PLW relay 3422 which upon releasing opens the circuit extending from ground over its contacts and conductor 3429 of cable 3400 through lamp 2006 and battery. Lamp 2006 now becomes extinguished. If the instructor operates the panel and flood light key 2014, a circuit is established from battery over the contacts of such key, conductor 3462 of cable 3400 to a point between the winding of PF relay 3436 and the circuit breaker 3434 whereupon after about six seconds the circuit breaker is tripped thereby opening the circuit of PF relay 3436 which releases, closing the circuit from ground over its back contact and conductor 3461 of cable 3400 to battery through the lamp 2015. Lamp 2015 thereupon lights. When the flight engineer restores the tripped circuit breakers 3401 and 3416, the lamps 2000 and 2006 again light and lamp 2015 becomes extinguished when the flight engineer restores the tripped circuit breaker 3434.

If the instructor operates the left safety On key 2016, the right safety On key 2116 or any one of the keys 2620 to 2624 inclusive, corresponding circuit breakers on the pilot's pedestal become tripped after about six seconds. For example, the operation of key 2016 establishes a circuit from battery over the contacts of such key, over conductor 2018 to a point between the winding of PL relay 1815 and the circuit breaker 1813 whereupon the circuit breaker becomes tripped and opens the circuit of relay 1815 which releases. Relay 1815 upon releasing establishes a circuit from ground over its back contact and conductor 2019 to battery through lamp 2017 which lamp lights. When the pilot restores the circuit breaker 1813 and PL relay 1815 operates the circuit of lamp 2017 is opened and the lamp becomes extinguished.

To simulate the firing of torpedoes, the pilot operates the firing key 1831 to the "on" position and then operates either the left or right torpedo release key 1832 or 1833. The operation of these keys establishes a circuit from ground over conductor 3387, over the lower contacts of relay 1800, through key 1831 and through either key 1832 or 1833 and over either conductor 1851 or 1852 of cable 1850 and to battery through either the left or right torpedo release lamp 2625 or 2626 at the instructor's desk.

To simulate the lighting of the navigation lamps the pilot may operate the switches 1834 to 1842 inclusive, switches 1834 and 1835 controlling the section lights, switch 1836 controlling the anchor light, switches 1837 and 1838 controlling the wing and tail running lights, switches 1839 and 1840 controlling the formation lights and switches 1841 and 1842 controlling the left and right landing lights. If, for example, the section lights switch 1834 is operated to the "on" position, and then the switch 1835 is operated to its upper or bright position, a circuit is established from ground on conductor 3387, over the lower contacts of EL relay 1802, over the contacts of switch 1834, over the upper contact of switch 1835 and conductor 1871 of cable 1870 to battery through the section lights on bright lamp 2627 at the instructor's desk to indicate that the section lights have been turned on bright. If the switch 1835 is operated to its lower or dim position, a circuit is established as traced to such switch and thence over conductor 1872 of cable 1870 to battery through the section lights on dim lamp 2628. Similar circuits are established over conductors of cable 1870 for lamps 2629 to 2632 inclusive, to indicate to the instructor when the running lights are turned on bright or dim, for lamps 2633 and 2634 to indicate when the formation lights are on bright or dim, for lamps 2635 to 2636 to indicate when the landing lights are on bright or dim and for lamp 2639 to indicate when the anchor lights are on.

In shutting down an aircraft in cold weather, it is the practice to dilute the engine oil with kerosene or a light lubricant to enable easier starting at a later time. To simulate this procedure, the flight engineer is provided with timing switches 3223 and 3224 for the left and right engines respectively, each of which switches when closed times for four minutes or the time usually measured for oil dilution. With OD relay 3225 operated by the previous closure of circuit breaker 3226 and after switches 3223 and 3224 become closed four minutes following the initiation of their operation, circuits are established from ground on bus bar GB over the upper contacts of relay 3225, over the contacts of switches 3223 and 3224 to battery through lamps 3227 and 3228 on the flight engineer's panel and over conductors 3229 and 3230 of cable 3200 to battery through oil dilution lamps 2253 and 2254 at the instructor's desk.

*Simulation of landing*

Preparing to land, it having been assumed that a flight course at 1000 feet altitude was being simulated, the pilot adjusts the propeller governor controls to their maximum R. P. M. positions in which the sliders of rheostats 3012 and 3013 are at the lower terminals of their windings, and moves both throttles back so that the sliders of the throttle rheostats and variacs move towards their lower or closed positions thereby reducing the simulated speeds of the engines. As before described, this will result in a reduction of the indicated air speed which in turn will reduce the rate of climb resulting in a descent at the rate of 200 feet per minute which will be indicated by the rate of climb indicators. The altimeter motor control circuit is also controlled by the rate of climb potentiometer RCP1 whereby the altimeters are operated to show a reduction in the altitude.

When the altitude of the simulated flight has been reduced to 500 feet, the pilot operates the wing flaps switch 1820 to its lower or down position, whereupon in the manner previously described the wing flaps motor control circuit of Fig. 7 is controlled to rotate the shafts 760 and 763 into positions indicative of the movement of the wing flaps to their down positions. When the wing flaps have moved until the wing flaps indicator 1525 indicates a 30-degree down position of the flaps, the switch 1820 is moved to its "off" position and the motor of the wing flaps motor control circuit then ceases to operate. With the wing flaps potentiometer WFP8 moved towards the No. 3 terminal of its winding, potential of phase $\phi 2$ applied from the brush of indicated air speed variac IASV2, over conductor 613, through resistance 614, through the winding of potentiometer WFP8, through resistance 638, over conductor 639, over the No. 3 back contact of F relay 1214 and over conductor 1218 to ground, is increased at the brush of potentiometer WFP8 and consequently the potential of phase $\varphi 2$ applied from such brush through resistance 615 to control conductor 1216 of the indicated air speed motor control circuit is increased and such motor control circuit operates the shafts 1210 and 601 driven thereby in directions indicative of a further decrease in air speed as indicated by the air speed indicators.

When the altitude is nearly zero, the pilot pulls back the yoke 1411 thereby moving the brush of yoke potentiometer YP1 towards the No. 3 terminal of its winding and increasing the potential of phase $\varphi 2$ applied from the brush of such potentiometer, through resistance 516 to the angle of attack motor control circuit, resulting in the rotation of shafts 1110 and 501 controlled thereby in directions indicative of an increase in the angle of attack and a resulting decrease in the indicated air speed until the indicated air speed indicators show an air speed of 85 knots. The rate of climb motor control circuit is also controlled by the angle of attack potentiometer AAP6 to rotate the shafts 1160 and 551 in directions indicative of a reduction in the rate of descent. Under the control of the rate of climb potentiometer RCP1, the altimeter motor control circuit is controlled to rotate the shafts 1260 and 651 operated thereby in directions indicative of a reduction in altitude, until when an altitude of between 100 and 600 feet is reached the L1 limit switch 1268 is operated to its alternate position followed when zero altitude is reached by the operation of L3 limit switch 1263 to its alternate position thereby closing the circuit of F relay 1214 which in turn closes the circuit of F1 relay 552.

With relay 552 now operated, potential of phase $\varphi 1$ is applied from the 40$\varphi 1$ bus bar through resistance 527, over the lower contacts of relay 552 and through the right half of the winding of rate of climb potentiometer RCP2 to ground and a potential derived at the brush of such potentiometer is applied over the upper contacts of relay 552 and through resistance 528 to ground and from the junction point between resistance 528 and the contacts of relay 552 through resistance 529 to control conductor 1162 of the rate of climb motor control circuit to insure that the shafts 1160 and 551 driven thereby shall reach a position in which the brush of potentiometer RCP2 stands at the mid-point of the winding indicative of a zero rate of climb.

The altimeters now read zero and the pilot knows that a landing has been made. The aircraft may now be assumed to be taxiing on the water and as soon as the indicated air speed falls below 30 knots the limit switch 1212 will close its contacts thereby reoperating H relay 602 and H1 relay 603. Relay 602 upon operating restores the circuit for controlling the indicated air speed motor control circuit to the condition which existed prior to take off and relay 603 introduces resistance 628 into the circuit extending through resistance 730 to control conductor 1311 of the pitch bar motor control circuit to desensitize this motor control circuit which controls the elevation and depression of the horizon bars or the artificial horizon instruments. As the L1 limit switch 1228 operates when the brushes of the indicated air speed potentiometers approach the No. 1 terminals of their windings or zero air speed, the circuits of ASN and ASN1 relays 404 and 403 are closed over conductor 440 to ground over the alternate contacts of L1 limit switch 1228. These relays operate to desensitize the motor control circuits which simulate the turning movement of the flight.

To stop the engines, the pilot may pull the main ignition switch 3014 as previously described, but it is more customary if the aircraft is to be anchored for some time for the flight engineer to operate the mixture control switches to their idling cut-off positions whereby the fuel feeds to the engines are closed and the engines run until all fuel in their carbureters is consumed. This procedure reduces the fire hazard. To simulate this procedure the flight engineer operates the mixture control switches 2925 and 2926 to their lower positions. Upon leaving their upper positions, switches 2925 and 2926 open the previously traced circuits over conductors 2853 and 2854 of cable 2850 through the rich mixture lamps 2208 and 2209 at the instructor's desk. Upon making their lower contacts, the switches establish circuits over conductors 2893 and 2894 of cable 2890 to battery through the winding of ICO relay 5654 of the right engine control circuit of Fig. 56 and to battery through the winding of the similar relay of the left engine control circuit of Fig. 45. Relay 5654 upon operating establishes a circuit from ground over its inner lower contacts and conductor 5691 of cable 5600 to battery through the right engine fuel cut-off lamp 2255 at the instructor's desk. The relay in Fig. 45 corresponding to relay 5634 closes a similar circuit over conductor 4591 of cable 4500 for lamp 2256. The lighting of these lamps informs the instructor that the flight engineer has operated the mixture control switches to their idling cut-off positions.

At its lower transfer contacts, relay 5654 substitutes direct ground for resistance ground in the circuit previously traced over conductor 5655, over the upper front contact of LL relay 5710, over conductor 5712 and through resistance 4808 to control conductor 4803 of the fuel flow motor control circuit for the right engine, whereby this circuit under the control of its balancing potentiometer RFFP1 rotates shafts 3710 and 4901 controlled thereby in directions indicative of the reduction of the fuel flow to zero whereby the fuel flow indicators on the instrument panels are operated to reduce their fuel flow indications to zero. At its upper contacts, relay 5654 establishes a circuit from ground through resistance 5687, over such contacts, over the upper back contact of PRM relay 5622, over the upper No. 3 front contacts of EST1 relay 5628, over conductor 5635, through resistance 5103 to control 4001 of the R. P. M. motor control circuit for the right engine, whereupon this motor control circuit operates under the control of its balancing potentiometer RRP10 to rotate the shafts 4010 and 5101 in directions indicative of the reduction of the R. P. M. of the right engine to zero, which reduction is indicated by the tachometers on the instrument panels. When the engine speed reaches zero relay 4009 releases and establishes a circuit from ground over the inner upper contacts of ICO relay 5654, over conductor 4018, over the upper No. 3 contacts of relay 4009, conductor 4017, through the winding of ICO1 relay 5690 to battery. Relay 5690 now operates and locks over its upper contacts to ground on conductor 4018 and at its lower contacts opens the locking circuit of ST relay 5638 which now releases in turn releasing EST1 relay 5628, ESTA relay 5639 and EST relay 5616. With these relays released, the right engine control circuit of Fig. 56 and all of the motor control circuits relating to the right engine restore to normal in the manner previously described.

Similarly, the relays of the left engine control circuit of Fig. 45, corresponding to ICO relay 5654 and ICO1 relay 5690 of Fig. 56, cause the restoration of the left engine control circuit and of the motor control circuits relating to the left engine.

The flight engineer preparatory to leaving the aircraft, operates the auxiliary generator switch 3127, the right engine generator switch 3139, the left engine generator switch 3151, the cabin heater fuel valve switch 3501, the inverter switch 3207, the auxiliary power plant fuel supply valve switch 3503, the main engine selector valve switches 3506 and 3507 and the hull tank selector valve switch 3516 to their "off" positions, thereby extinguishing the corresponding lamps controlled thereby as previously described.

The flight engineer also restores the carbureter air switches 2914 and 2915 to their direct air positions, restores the mixture control switches 2916, 2917, 2925 and 2926 to their rich mixture positions and restores the supercharger speed control switches 2918 and 2919 to their low speed positions.

The pilot turns off all panel and instrument lights and the navigator turns off all panel and instrument lights at his station and opens the drift sight control switches 2760 and 2753.

The flight engineer then turns off all panel and flood lights controllable from his panel and opens all of the circuit breakers thereby removing all power from the trainer. All apparatus of the trainer will now be restored to its normal condition.

What is claimed is:

1. In an aircraft simulator, a source of alternating current, a plurality of means directly or indirectly responsive to acts performed by a trainee in the simulation of the control of an airplane in preparation for and in flight for deriving potentials from said source of current, a plurality of instruments for indicating a plurality of operational and flight conditions, a motor driven means for controlling each of said instruments, circuit networks associated respectively with said motor means and responsive to the integration of different combinations of said derived potentials for controlling the operation of said motor driven means whereby said instruments are operated to indicate the instantaneous effects of said acts, and means operated by certain of said motor means for deriving potentials from said source to produce integration factors in the circuit networks associated with others of said motor means.

2. In an aircraft simulator, a source of alternating current, a plurality of stations for members of an aircraft crew under training, a plurality of means directly or indirectly responsive to acts performed by members of said crew in the simulation of the control of an airplane in preparation for and in flight for deriving potentials from said source of current, a plurality of instruments for indicating a plurality of operational and flight conditions, a motor driven means for controlling each of said instruments, circuit networks associated respectively with said motor means whereby said instruments are operated to indicate the instantaneous effects of said acts, and means operated by certain of said motor means for deriving potentials from said source to produce integration factors in the circuit networks associated with others of said motor means.

3. In an aircraft simulating device, a source of current, a plurality of controls operable to simulate factors affecting the flight of an airplane, means directly or indirectly responsive to said controls for deriving potentials from said source of current, a plurality of instruments for indicating a plurality of flight conditions, a motor driven means for controlling each of said instruments and responsive to the integration of different combinations of said derived potentials for controlling the operation of said motor driven means whereby said instruments are operated to indicate the instantaneous effects of the operation of said controls, and means operated by certain of said motor means for deriving potentials from said source to produce integration factors in the circuit networks associated with others of said motor means.

4. In a device for simulating the flight of an airplane, a source of current, means for simulating the elevator control of said airplane, means for simulating the thrust horse-power output of the power plant of said airplane, means for simulating the indicated air speed of said airplane, means for simulating the shifting of the longtudinal center of gravity of said airplane, means for simulating the effect of the movement of the wing flaps of said airplane, means responsive to said preceding means for deriving potentials from said source of current, and means operative in response to the summation of said derived potentials to a degree commensurate with the angle of attack of the simulated flight.

5. In a device for simulating the flight of an airplane, a source of current, a control conductor, a yoke for simulating the elevator control of said airplane, a potentiometer operable thereby for deriving a potential from said source commensurate with the movement of said yoke and for applying said potential to said conductor, a potentiometer operable to derive a potential from said latter potential in accordance with the simulated thrust horse-power output of the power plant of said airplane and for applying said potential to said conductor, a potentiometer operable to derive a potential from said source commensurate with the thrust horse-power output of said airplane, a potentiometer operable to modify said latter potential in accordance with the indicated air speed of the simulated flight and to apply said potential to said conductor, a rheostat operable to derive a potential from said source commensurate with the shifting of the longitudinal center of gravity of said airplane and for applying said potential to said conductor, a potentiometer operable to derive a potential from said source commensurate with the simulated position of the wing flaps of said airplane, and means operable in response to the summation of the potentials applied to said conductor to a degree commensurate with the angle of attack of the simulated flight.

6. In a device for simulating the flight of an airplane, a source of current, a control conductor, a yoke for simulating the elevator control of said airplane, a potentiometer operable thereby for deriving a potential from said source commensurate with the movement of said yoke and for applying said potential to said conductor, a potentiometer operable to derive a potential from said latter potential in accordance with the simulated thrust horse-power output of the power plant of said airplane and for applying said potential to said conductor, a potentiometer operable to derive a potential from said source commensurate with the thrust horsepower output of said airplane, a potentiometer operable to modify said latter potential in accordance with the indicated air speed of the simulated flight and to apply said potential to said conductor, a potentiometer operable to derive a potential from said source commensurate with the simulated position of the wing flaps of said airplane, an instructor's desk, a rheostat thereat the slider of which is adjustable to derive a potential from said source commensurate with the assumed position of the longitudinal center of gravity of said airplane, said potential being applied to said conductor, a balancing potentiometer for applying a potential derived from said source to said conductor, a motor for adjusting said latter potentiometer until the sum of the potentials applied to said conductor becomes zero, and other potentiometers for controlling other motor control circuit networks of said device adjustable by said motor to positions indicative of the angle of attack of the simulated flight.

7. In a device for simulating the flight of an airplane, a source of current, a control conductor, a yoke for simulating the elevator control of said airplane, a potentiometer operable thereby for deriving a potential from said source commensurate with the movement of said yoke and for applying said potential to said conductor, a potentiometer operable to derive a potential from said latter potential in accordance with the simulated thrust horse-power output of the power plant of said airplane and for applying said potential to said conductor, a potentiometer operable to derive a potential from said source commensurate with the thrust horsepower output of said airplane, a potentiometer operable to modify said latter potential in accordance with the indicated air speed of the simulated flight and to apply said potential to said conductor, a potentiometer operable to derive a potential from said source commensurate with the simulated position of the wing flaps of said airplane and to apply said potential to said conductor, an instructor's desk, a rheostat thereat the slider of which is adjustable to derive a potential from said source commensurate with the assumed position of the longitudinal center of gravity of said airplane, a first balancing potentiometer for modifying said latter potential and for applying it to said control conductor, a second balancing potentiometer for applying a potential derived from said source to said conductor, a motor for adjusting said balancing potentiometer until the sum of the potentials applied to said conductor becomes zero, and other potentiometers for controlling other motor control circuit networks adjustable by said motor to positions indicative of the angle of attack of the simulated flight.

8. In a device for simulating the flight of an airplane having a pilot's station, a reversible alternating current motor, a wing flaps control switch at the said pilot's station of the device for controlling the rotation of said motor in one direction simulating an upward movement of the wing flaps of an airplane and for controlling the rotation of said motor in the other direction for simulating a downward movement of the wing flaps, an instructor's desk, indicators at said instructor's desk and at the pilot's station in said device, means operable by said motor for operating said indicators for indicating the extent of simulated wing flaps movement in either the upward or downward direction, and potentiometers for introducing integration factors into other motor control circuit networks of said device and adjustable by said motor to positions indicative of the assumed positions of the wing flaps.

9. In a device for simulating the flight of an airplane, a source of current, means for simulating the indicated air speed of an airplane, means for simulating the positions of the wing flaps of said airplane, means for simulating the angle of attack of said airplane, means for simulating the weight of said airplane, means for simulating the banking of said airplane, means responsive to said preceding means for deriving potentials from said source of current, and means operative in response to the summation of said derived potentials to a degree commensurate with the rate of climb of the simulated flight.

10. In a device for simulating the flight of an airplane, a source of current, a control conductor, two tandem connected autotransformers for deriving a potential from said source which varies in accordance with the square of the indicated air speed of the simulated flight, potentiometers for modifying said derived potential in accordance with the assumed positions of the wing flaps of the simulated airplane, a potentiometer for further modifying said derived potential in accordance with the angle of attack of the simulated flight and for applying said modified potential to said control conductor, a potentiometer for deriving a potential from said source commensurate with the assumed weight of said airplane and for applying it to said control conductor, a motor operable in response to the summation of the potentials applied to said conductor to a degree commensurate with the rate of climb of the simulated flight, an instructor's desk, and indicators at the instructor's desk and at the pilot's station in said device operable by said motor to indicate the rate of climb of the simulated flight.

11. In a device for simulating the flight of an airplane, a source of current, a control conductor, two tandem connected autotransformers for deriving a potential from said source which varies in accordance with the square of the indicated air speed of the simulated flight, potentiometers for modifying said derived potential in accordance with the assumed positions of the wing flaps of the simulated airplane, a potentiometer for further modifying said derived potential in accordance with the angle of attack of the simulated flight, a potentiometer for still further modifying said potential in accordance with the cosine of the angle of bank of the simulated flight, said finally modified potential being applied to said control conductor, a potentiometer for deriving a potential from said source commensurate with the assumed weight of said airplane and for applying it to said control conductor, a motor operable in response to the summation of the potentials applied to said conductor to a degree commensurate with the rate of climb of the simulated flight, an instructor's desk, and indicators at said instructor's desk and at the pilot's station in said device operable by said motor to indicate the rate of climb of the simulated flight.

12. In a device for simulating the flight of an airplane, a source of current, a control conductor, two tandem connected autotransformers for deriving a potential from said source which varies in accordance with the square of the indicated air speed of the simulated flight, potentiometers for modifying said derived potential in accordance with the assumed positions of the wing flaps of the simulated airplane, a potentiometer for further modifying said derived potential in accordance with the angle of attack of the simulated flight, a potentiometer for still further modifying said potential in accordance with the cosine of the angle of bank of the simulated flight, said finally modified potential being applied to said control conductor, a potentiometer for deriving a potential from said source commensurate with the assumed weight of said airplane and for applying it to said control conductor, a motor operable in response to the summation of the potentials applied to said conductor to a degree commensurate with the rate of climb of the simulated flight, an instructor's desk, indicators at said instructor's desk and at the pilot's station in said device operable by said motor to indicate the rate of climb of the simulated flight, and a potentiometer operable by said motor for supplying an integration factor for the determination of the indicated air speed of the simulated flight.

13. In a device for simulating the flight of an airplane, an instructor's desk, a source of current, a control conductor, potentiometers for deriving a potential from said source commensurate with the lift factors of the simulated flight and for applying said potential to said conductor, means for applying a potential to said conductor commensurate with the down force factors of the simulated flight, said means comprising a potentiometer the brush of which is connected to said conductor and is adjustable with respect to the winding in accordance with the assumed weight of said airplane, and a rheostat at said instructor's desk for varying the value of current applied from said source through the winding of said latter potentiometer to simulate a change in lift and weight due to assumed icing conditions, a motor operable in response to the summation of the potentials applied to said conductor to a degree commensurate with the rate of climb of the simulated flight, indicators at the instructor's desk and at the pilot' station in said device operable by said motor to indicate the rate of climb of the simulated flight, and a potentiometer operable by said motor for supplying an integration factor for the determination of the indicated air speed of the simulated flight.

14. In a device for simulating the flight of an airplane, a source of current, a control conductor, potentiometers for deriving a potential from said source commensurate with the lift factors of the simulated flight and for applying said potential to said conductor, potentiometers for deriving a potential from said source commensurate with the down force factors of the simulated flight and for applying it to said control conductor, a motor responsive to the summation of the potentials applied to said conductor, apparatus operable by said motor to a degree indicative of the rate of climb of the simulated flight, a potentiometer operable by said motor for deriving a potential from said source, means for simulating the attainment of altitude of the simulated flight, and means operable in response to said latter means only when the altitude at which the simulated flight is being flown has returned to zero for applying said latter derived potential to said conductor to insure the operation of said motor to return the apparatus operated thereby to the normal position indicative of a zero rate of climb.

15. In a device for simulating the flight of an airplane, a source of current, a control conductor, potentiometers for deriving a potential from said source commensurate with the lift factors of the simulated flight and for applying said potential to said conductor, one of said potentiometers being operable in simulation of the angle of attack of the simulated flight, potentiometers for deriving a potential from said source commensurate with the down force factors of the simulated flight and for applying it to said control conductor, a motor responsive to the summation of the potentials applied to said conductor, apparatus operable by said motor to a degree indicative of the rate of climb of the simulated flight, and means for discontinuing the application of said lift potential to said conductor when the simulated angle of attack becomes increased to a degree indicative of a stall condition whereby said down force potential becomes effective to cause said motor to operate said apparatus to positions indicative of a negative rate of climb.

16. In a device for simulating the flight of an airplane, a source of current, a control conductor, a potentiometer for deriving a potential from said source commensurate with the rate of climb of the simulated flight and for applying said potential to said conductor, a potentiometer for deriving a potential from said source commensurate with the angle of attack of the simulated flight and for applying said latter potential to said conductor, a balancing potentiometer for deriving a potential from said source and applying it to said conductor, a motor for adjusting said latter potentiometer until the sum of the potentials applied to said conductor becomes zero, an instructor's desk, artificial horizon instruments at said instructor's desk and at the pilot's station in said device, and means controlled by said motor for elevating or depressing the artificial horizon bars of said instruments to indicate the nosing down, nosing up or level condition of the simulated flight.

17. In a device for simulating the flight of an airplane, a source of current, a control conductor, a potentiometer for deriving a potential from said source commensurate with the rate of climb of the simulated flight and for applying said potential to said conductor, a potentiometer for deriving a potential from said source commensurate with the angle of attack of the simulated flight and for applying said latter potential to said conductor, a balancing potentiometer for deriving a potential from said source and for applying it to said conductor, a motor for adjusting said latter potentiometer until the sum of the potentials applied to said conductor becomes zero, means operative commensurate with the indicated air spread of a simulated flight, means operable when the indicated air speed of the simulated flight decreases below a particular value for decreasing the effect of the potential derived as a result of a change in the simulated angle of attack, means operative when the indicated air speed becomes zero for removing the effect of the potential derived as a result of the change in the angle of attack, an instructor's desk, artificial horizon instruments at said instructor's desk and at the pilot's station in said device, and means controlled by said motor for elevating or depressing the artificial horizon bars of said instruments to indicate the nosing down, nosing up or level condition of the simulated flight.

18. In a device for simulating the flight of an airplane, a source of current, a yoke for simulating the elevator control of said airplane, a control conductor, a potentiometer for deriving a potential from said source commensurate with the thrust horsepower output of the power plant of said airplane, a potentiometer for modifying said potential in accordance with the assumed weight of said airplane, a potentiometer for further modifying said potential in accordance with the movement of said yoke, means for applying said modified potential to said conductor, means for deriving a potential from said source which varies in accordance with the indicated air speed of the simulated flight and for applying said potential to said conductor, a motor for adjusting said latter means until the sum of the potentials applied to said conductor becomes zero, an instructor's desk, indicators at said instructor's desk and at crew stations in said device controlled by said motor for indicating the air speed of the simulated flight, and means operable by said motor for introducing integration factors into other motor control circuit networks of the device indicative of the indicated air speed.

19. In a device for simulating the flight of an airplane, a source of current, a yoke for simulating the elevator control of an airplane, a control conductor, a potentiometer for deriving a potential from said source commensurate with the thrust horsepower output from the power plant of said airplane, a potentiometer for modifying said potential in accordance with the assumed weight of said airplane, a potentiometer for further modifying said potential in accordance with the movement of said yoke, means for simulating the attainment of altitude in a simulated flight, means for applying said modified potential to said conductor, means controlled by said altitude simulating means for discontinuing the application of said potential when the simulated altitude is representative of an air-borne condition, means for altering the modifying effect of said yoke control potentiometer after the simulated flight exceeds a specified air speed value, means for deriving a potential from said source which varies in accordance with the indicated air speed of the simulated flight and for applying said potential to said conductor, a motor for adjusting said latter means until the sum of the potentials applied to said conductor becomes zero, an instructor's desk, indicators at said instructor's desk and at crew stations in said device controlled by said motor for indicating the air speed of the simulated flight, and means operable by said motor for introducing integration factors into other motor control circuit networks of the device indicative of the indicated air speed.

20. In a device for simulating the flight of an airplane, a source of current, a yoke for simulating the elevator control of an airplane, a control conductor, means for applying a first control potential to said conductor derived from said source by a first potentiometer in accordance with the thrust horse-power output of the power plant of said airplane, modified by a second potentiometer in accordance with the assumed weight of said airplane, and further modified by a third potentiometer in accordance with the movement of said yoke, means for applying a second control potential to said conductor derived by said first potentiometer and modified by a fourth potentiometer in accordance with the true air speed of the simulated flight, means for applying a third potential to said conductor derived from said source by means adjusted in accordance with the indicated air speed of the simulated flight and modified by potentiometer means in accordance with the angle of attack of the simulated flight, means for applying a fourth potential to said conductor derived from said source by said means adjusted in accordance with the indicated air speed and modified by a potentiometer in accordance with the assumed positions of the wing flaps of the simulated airplane, means for simulating the attainment of altitude in a simulated flight, means controlled by said altitude simulating means when the simulated altitude is representative of an air-borne flight for rendering said first potential connecting means ineffective and for then rendering the other potential connecting means effective, a motor for adjusting said indicated air speed potential deriving means until the sum of the potentials applied to said conductor becomes zero, an instructor's desk, indicators at said instructor's desk and at crew stations in said device controlled by said motor for indicating the air speed of the simulated flight, and means operable by said motor for introducing integration factors into other motor control circuit networks of the device indicative of the indicated air speed.

21. In a device for simulating the flight of an airplane, a source of current, a control conductor, means for applying a first control potential to said conductor derived from said source by a first potentiometer in accordance with the thrust horsepower output of the power plant of said airplane and modified by a second potentiometer in accordance with the true air speed of the simulated flight, means for applying a second potential to said conductor derived from said source by means adjustable in accordance with the indicated air speed of the simulated flight and modified by potentiometer means in accordance with the angle of attack of the simulated flight, means for applying a third potential to said conductor derived from said source by said means adjusted in accordance with the indicated air speed and modified by a potentiometer in accordance with the assumed positions of the wing flaps of the simulated airplane, means for applying a fourth potential to said conductor derived from said source in accordance with the rate of climb of the simulated flight, modified by a potentiometer in accordance with the true air speed of the simulated flight, and further modified by a potentiometer in accordance with the assumed weight of the airplane, a motor for adjusting said indicated air speed potential deriving means until the sum of the potentials applied to said conductor, becomes zero, an instructor's desk, indicators at said instructor's desk and at crew stations in said device controlled by said motor for indicating the air speed of the simulated flight, and means operable by said motor for introducing integration factors into other motor control circuit networks of the device indicative of the indicated air speed.

22. In a device in accordance with claim 21, in which means is provided which is operable when the angle of attack of the simulated flight reaches a stall value for rendering the potential derived in accordance with the rate of climb, the true air speed and the assumed airplane weight ineffective whereby the motor is operated to cause the air speed indicators to show a decrease in the indicated air speed and a decrease in the integration factors.

23. In a device for simulating the flight of an airplane, a source of current, means for simulating the operation of the engines of an airplane, a control conductor, means effective when the engines are assumed to be delivering power for applying a potential of one phase from said source to said conductor which varies in accordance with the thrust horse-power output of the engines and in accordance with the true air speed of the simulated flight, means effective for deriving a potential from said source of opposite phase and applying it to said control conductor, a motor for adjusting said latter means until the sum of the potentials applied to said conductor becomes zero, an instructor's desk, indicators at said instructor's desk and at crew stations in said device controlled by said motor for indicating the air speed of the simulated flight, means operable by said motor for introducing integration factors into other motor control circuit networks of the device, and means operative upon the failure of one or all of the simulated engines to deliver power to reduce the potential of said first phase, whereupon said motor is operated to cause a reduction of the air speed indications and a reduction in the values of said integration factors.

24. In a device for simulating the flight of an airplane, a source of current, means for simulating the operation of the engines of an airplane, a control conductor, means effective when the engines are assumed to be delivering power for applying a potential of one phase from said source to said conductor which varies in accordance with the thrust horse-power output of the engines and in accordance with the true air speed of the simulated flight, means effective for deriving a potential from said source of opposite phase and applying it to said conductor, a motor for adjusting said latter means until the sum of the potentials applied to said conductor become zero, an instructor's desk, indicators at said instructor's desk and at crew stations in said device controlled by said motor for indicating the air speed of the simulated flight, means operable by said motor for introducing integration factors into other motor control circuit networks of said device, means operative upon the failure of one of the simulated engines to deliver power to reduce the potential of said first phase whereupon said motor is operated to cause a reduction of the air speed indications and a reduction in the values of said integration factors indicative of the loss of power incident to the windmilling operation of the engine which has failed to deliver power, means for simulating the feathering of the blades of the propeller driven by any engine, and means operative upon the simulated feathering of the blades of the propeller driven by the engine which is assumed to have failed for again increasing the potential of said first phase whereupon said motor is operated to cause an increase of the air speed indications and an increase in the values of said integration factors indicative of the increase of power incident to the arrest of the wind-milling action of such engine.

25. In a device for simulating the flight of an airplane, a source of current, a control conductor, a potentiometer for deriving a potential from said source which varies in accordance with the indicated air speed of the simulated flight and for applying said potential to said conductor, a potentiometer for deriving a potential from said source which varies in accordance with the altitude at which the simulated flight is being conducted, a potentiometer for modifying said latter potential in accordance with the true air speed of the simulated flight and for applying said latter potential to said conductor, a motor responsive to the potential on said conductor for adjusting said latter potentiometer until the sum of the potentials applied to said conductor becomes zero, and means controlled by said motor for introducing integration factors into other motor control circuit networks of the device indicative of the true air speed.

26. In a device for simulating the flight of an airplane, rudder pedals for simulating the rudder control of an airplane, a source of current, a control conductor, a potentiometer operative in response to the operation of the rudder pedals to apply a potential to said conductor commensurate with the simulated movement of the rudder of an airplane, a balancing potentiometer for deriving a potential from said source and for applying it to said conductor, a motor responsive to the potential on said conductor for adjusting said latter potentiometer until the sum of the potentials applied to said conductor becomes zero, an instructor's desk, indicators at said instructor's desk and at crew stations in the device controlled by said motor for indicating the rate of turn of the simulated flight, and means operated by said motor for introducing integration factors into other motor control circuit networks of the device indicative of the rate of turn.

27. In a device for simulating the flight of an airplane, rudder pedals for simulating the rudder control of an airplane, a source of current, a control conductor, means for deriving a potential from said source commensurate with the indicated air speed of a simulated flight, a potentiometer operative in response to the operation of the rudder pedals to modify said derived potential and to apply it to said conductor, a balancing potentiometer for deriving a potential from said source and for applying it to said conductor, a motor responsive to the potential on said conductor for adjusting said latter potentiometer until the sum of the potentials applied to said conductor becomes zero, an instructor's desk, indicators at said desk and at crew stations in said device controlled by said motor for indicating the rate of turn of the simulated flight, and means operated by said motor for introducing integration factors into other motor control circuit networks of the device indicative of the rate of turn.

28. In a device for simulating the flight of an airplane, a source of current, a control conductor, means for simulating the operation of the two engines of an airplane, a potentiometer for deriving a potential of one phase from said source commensurate with the brake horse-power output of the engine on one side of the airplane and for applying said potential to said conductor, a potentiometer for deriving a potential of the opposite phase from said source commensurate with the brake horse-power output of the engine on the other side of said airplane, said potentials balancing each other when said engines are both delivering the same horse-power, a balancing potentiometer for deriving a potential of either phase from said source and for applying it to said conductor, a motor responsive to any unbalanced potential condition on said conductor for adjusting said balancing potentiometer until the sum of the potentials applied to said conductor becomes zero, an instructor's desk, indicators at said desk and at crew stations in said device controlled by said motor for indicating the rate of turn of the simulated flight due to any unbalanced power output of the engines, and means operated by said motor for introducing integration factors into other motor control circuit networks in the device indicative of the unbalanced power outputs of the engines.

29. In a device for simulating the flight of an airplane, a source of current, a control conductor, means for simulating the operation of the two engines of an airplane, a potentiometer for deriving a potential of one phase from said source commensurate with the true air speed of the simulated flight, a potentiometer for modifying said potential in accordance with the brake horse-power output of the engine on one side of the airplane and for applying it to said conductor, a potentiometer for deriving a potential of the opposite phase from said source commensurate with the true air speed of the simulated flight, a potentiometer for modifying said latter potential in accordance with the brake horse-power output of the engine on the other side of the airplane, said modified potentials balancing each other when said engines are both delivering the same horse-power, a balancing potentiometer for deriving a potential of either phase from said source and for applying it to said conductor, a motor responsive to any unbalanced potential condition on said conductor for adjusting said balancing potentiometer until the sum of the potentials applied to said conductor becomes zero, an instructor's desk, indicators at said desk and at crew stations in said device controlled by said motor for indicating the rate of turn of the simulated flight due to any unbalanced power output of the engines, and means operated by said motor for introducing integration factors into other motor control circuit networks in the device indicative of the unbalanced power outputs of the engines.

30. In a device for simulating the flight of an airplane, a source of current, a control conductor, means for simulating rough air flight conditions and for deriving a potential of either one or the opposite phase from said source and for applying said potential to said control conductor, a balancing potentiometer for deriving a potential of either phase from said source of current and for applying it to said conductor, a motor responsive to an unbalanced potential condition on said conductor for adjusting said balancing potentiometer until the sum of the potentials applied to said conductor become zero, an instructor's desk, indicators at said instructor's desk and at crew stations in said device controlled by said motor for indicating the changes in the rate of turn incident to rough air conditions and means operated by said motor for introducing integration factors into other motor control circuits of the device indicative of the effect of rough air conditions.

31. In a device for simulating the flight of an airplane, rudder pedals for simulating the rudder control of an airplane, a source of current, a control conductor, a potentiometer operative in response to the operation of said rudder pedals for applying a potential of one or the opposite phase from said source to said conductor commensurate with the rate of turn of the simulated flight, an aileron wheel for simulating the aileron control of an airplane, a potentiometer responsive to the operation of said aileron wheel for deriving a potential of one phase from said source if said wheel is so operated as to simulate a side slipping turn of an airplane or for deriving a potential of the opposite phase from said source if said wheel is so operated as to simulate a skidding turn of an airplane and for applying the derived potential to said conductor, a balancing potentiometer for deriving a potential of either phase from said source and for applying it to said conductor, a motor responsive to an unbalanced potential condition on said conductor for adjusting said latter potentiometer until the sum of the potentials applied to said conductor becomes zero, an instructor's desk, indicators at said instructor's desk and at crew stations in said device controlled by said motor for indicating changes in the rate of turn, and means operated by said motor for introducing integration factors into other motor control circuit networks of the device indicative of the rate of turn.

32. In a device for simulating the flight of an airplane, a source of current, a control conductor, a potentiometer for deriving a potential from said source commensurate with the rate of turn of the simulated flight and for applying said potential to said conductor, a first motor responsive to the potential applied to said conductor for integrating the rate of turn with respect to time, a second motor operable at a uniform speed, a differential gear box the input shafts of which are driven by said first and second motors respectively whereby the output shaft is driven at a speed equal to the differential sum of the speeds of the input shafts, an instructor's desk and indicators simulating directional gyro compasses at said instructor's desk and at crew stations in said device operable in response to the operation of the output shaft of said gear box to indicate the directional gyro compass heading of the simulated flight.

33. In a device for simulating the flight of an airplane, a source of current, a control conductor, a potentiometer for deriving a potential from said source commensurate with the rate of turn of the simulated flight and for applying said potential to said conductor, a first motor responsive to the potential applied to said conductor for integrating the rate of turn with respect to time, a second motor operable at a uniform speed, a differential gear box the input shafts of which are driven by said first and said second motors respectively whereby the output shaft is driven at a speed equal to the differential sum of the speeds of the input shafts, an instructor's desk, indicators simulating magnetic compasses at said instructor's desk and at crew stations of said device operable in response to the operation of said first motor to indicate the magnetic compass heading of the simulated flight, and indicators simulating directional gyro compasses at said instructor's desk and at crew stations of said device operable in response to the operation of the output shaft of said gear box to indicate the directional gyro compass heading of the simulated flight.

34. In a device for simulating the flight of an airplane, a source of current, a control conductor, a potentiometer for deriving a potential from said source commensurate with the rate of turn of the simulated flight, a potentiometer for modifying said potential in accordance with the true air speed of the simulated flight and for applying said potential to said conductor, a potentiometer for deriving a potential from said source commensurate with the angle of bank of the simulated flight and for applying said potential to said conductor, the sum of said potentials being zero when a turn is simulated with the correct angle of bank, a balancing potentiometer for deriving a potential from said source and for applying it to said conductor, a motor responsive to any unbalanced potential applied to said conductor resulting from the execution of a turn with a lesser or greater angle of bank than is required to prevent a side slip or a skid for adjusting said latter potentiometer until the sum of the potentials applied to said conductor becomes zero, an instructor's desk, indicators at said instructor's desk and at crew stations in said device controlled by said motor for simulating ball indicators operable by said motor to indicate any failure to simulate a properly banked turn, and means operated by said motor to indicate any failure to simulate a properly banked turn, and means operated by said motor for introducing integration factors into other motor control circuit networks of the device.

35. In a device for simulating the flight of an airplane, a source of current, a control conductor, a potentiometer for deriving a potential of one or the opposite phase from said source commensurate with the rate of turn of the simulated flight, a potentiometer for modifying said potential in accordance with the true air speed of the simulated flight and for applying said potential to said conductor, a potentiometer for deriving a potential of one or the opposite phase from said source commensurate with the angle of bank of the simulated flight and for applying said potential to said conductor, the sum of said potentials being zero when a turn is simulated with the correct angle of bank, a balancing potentiometer for deriving a potential from said source of one or the opposite phase and for applying it to said conductor, a motor responsive to any unbalanced potential applied to said conductor resulting from the execution of a turn with a lesser or greater degree of bank than is required to prevent a side slip or a skid for adjusting said latter potentiometer until the sum of the potentials applied to said conductor becomes zero, an instructor's desk, indicators at said instructor's desk and at crew stations in said device controlled by said motor for simulating ball indicators operable by said motor to indicate any failure to simulate a properly banked turn, and means operated by said motor for introducing integration factors into other motor control circuit networks of the device.

36. In a device for simulating the flight of an airplane, a source of current, a control conductor, rudder pedals for simulating the rudder control of an airplane, an aileron wheel for simulating the aileron control of an airplane, means for deriving a potential from said source commensurate with the indicated air speed of the simulated flight, a potentiometer responsive to the operation of said rudder pedals for modifying said derived potential and for applying it to said conductor, a potentiometer responsive to the operation of said aileron wheel for modifying said derived potential and for applying it to said conductor, a potentiometer for deriving a potential from said source commensurate with the rate of turn of the simulated flight, a potentiometer for modifying said latter potential in accordance with the true air speed of the simulated flight and for applying said modified potential to said conductor, a balancing potentiometer for deriving a potential from said source and for applying said potential to said conductor, a motor responsive to an unbalanced potential condition on said conductor for adjusting said balancing potentiometer until the sum of the potentials applied to said conductor becomes zero, an instructor's desk, indicators at said instructor's desk and at crew stations in the device operable by said motor for indicating the angle of bank of the simulated flight, and means operated by said motor for introducing integration factors into other motor control circuit networks of the device indicative of the angle of bank.

37. In a device for simulating the flight of an airplane, a source of current, a control conductor, rudder pedals for simulating the rudder control of an airplane, an aileron wheel for simulating the aileron control of an airplane, tandem connected autotransformers for deriving a potential of one phase from said source which varies with the square of the indicated air speed of the simulated flight, other tandem connected autotransformers for deriving a potential of the opposite phase from said source which varies with the square of the indicated air speed of the simulated flight, a potentiometer responsive to the operation of said rudder pedals for deriving from said potentials a potential of one or the other phase and for applying it to said conductor, a potentiometer responsive to the operation of said aileron wheel for deriving from said potentials a potential of one or the other phase and for applying it to said conductor, a potentiometer for deriving a potential of one or the opposite phase from said source commensurate with the rate of turn of the simulated flight, a potentiometer for modifying said latter potential in accordance with the true air speed of the simulated flight and for applying it to said conductor, a balancing potentiometer for deriving a potential of one or the opposite phase from said source and for applying it to said conductor, a motor responsive to any unbalanced potential condition on said conductor for adjusting said balancing potentiometer until the sum of the potentials applied to said conductor becomes zero, an instructor's desk, indicators at said instructor's desk and at crew stations in the device operable by said motor for indicating the angle of bank of the simulated flight, and means operated by said motor for introducing integration factors to other motor control circuit networks of the device indicative of the angle of bank.

38. In a device of the character set forth in claim 36, a rheostat at the instructor's desk for applying a potential of one or the opposite phase to said control conductor to simulate either a right or left wing heavy condition whereby the response of said motor is affected to cause a change in the readings of the angle of bank indicators and a change in the values of the integration factors introduced into other motor control circuit networks of the trainer indicative of the assumed wing heavy condition.

39. In a device of the character set forth in claim 36, a potentiometer for deriving a potential of one or the opposite phase from said source and for applying it to said control conductor to simulate either a side slip or a skid condition on a simulated turn whereby the response of said motor is affected to cause a change in the readings of the angle of bank indicators and a change in the values of the integration factors introduced into other motor control circuit networks of the device indicative of the effects of an improperly executed turn on the banking of the simulated flight.

40. In a device of the character set forth in claim 36, means for deriving a varying potential of one or the opposite phase from said source and for applying said potential to said control conductor in simulation of rough air conditions whereby the response of said motor is affected to cause a change in the readings of the angle of bank indicators and a change in the values of the integration factors introduced into the motor control circuit networks of the device indicative of the effect of rough air conditions on the banking of the simulated flight.

41. In a device for simulating the flight of an airplane, means for simulating the air speed of a simulated flight, indicators for indicating the rate of turn and the angle of bank of a simulated flight, motor control circuits for causing the operation of said indicators in response to the execution of a turn in a simulated flight, means operative when the air speed of the simulated flight becomes zero and means effective in response to the operation of said operative means for rendering said motor control circuits inoperative whereby said indicators are rendered insensitive.

RICHARD C. DAVIS.
EDWARD J. FOGARTY.
ROBERT O. RIPPERE.

REFERENCES CITED

The following references are of record in the file of this patent:

UNITED STATES PATENTS

| Number | Name | Date |
|---|---|---|
| 1,825,462 | Link | Sept. 29, 1931 |
| 1,882,087 | Ocker | Oct. 11, 1932 |
| 2,038,059 | Reichel | Apr. 21, 1936 |
| 2,063,231 | Custer | Dec. 8, 1936 |
| 2,099,857 | Link | Nov. 23, 1937 |
| 2,124,684 | Behr | July 26, 1938 |
| 2,153,986 | MacLaren | Apr. 11, 1939 |
| 2,164,412 | Koster | July 4, 1939 |
| 2,218,546 | Muller | Oct. 22, 1940 |
| 2,259,123 | Wells | Oct. 14, 1941 |
| 2,283,190 | Crane | May 19, 1942 |
| 2,292,451 | Koster | Aug. 11, 1942 |
| 2,314,497 | Hargrave | Mar. 23, 1943 |
| 2,332,523 | Norden | Oct. 26, 1943 |
| 2,336,711 | Barber | Dec. 14, 1943 |
| 2,346,838 | Haight | Apr. 18, 1944 |
| 2,355,685 | Stout | Aug. 15, 1944 |
| 2,359,866 | Lowkrantz | Oct. 10, 1944 |
| 2,366,603 | Dehmel | Jan. 2, 1945 |
| 2,406,836 | Holden | Sept. 3, 1946 |
| 2,428,767 | Albert | Oct. 14, 1947 |
| 2,443,604 | Dehmel | June 22, 1948 |
| 2,448,544 | Muller | Sept. 7, 1948 |
| 2,453,436 | Hertz | Nov. 9, 1948 |
| 2,471,315 | Dehmel | May 24, 1949 |
| 2,494,508 | Dehmel | June 10, 1950 |

FOREIGN PATENTS

| Number | Country | Date |
|---|---|---|
| 540,736 | Great Britain | 1941 |